United States Patent
Najibi et al.

(10) Patent No.: US 12,514,865 B2
(45) Date of Patent: Jan. 6, 2026

(54) BIOMATERIAL-BASED ANTIGEN FREE VACCINE AND THE USE THEREOF

(71) Applicants: President and Fellows of Harvard College, Cambridge, MA (US); The General Hospital Corporation, Boston, MA (US)

(72) Inventors: Alexander J. Najibi, Cambridge, MA (US); Nisarg J. Shah, San Diego, MA (US); Hua Wang, Cambridge, MA (US); David J. Mooney, Sudbury, MA (US); David T. Scadden, Weston, MA (US)

(73) Assignees: President and Fellows of Harvard College, Cambridge, MA (US); The General Hospital Corporation, Boston, MA (US)

( * ) Notice: Subject to any disclaimer, the term of this patent is extended or adjusted under 35 U.S.C. 154(b) by 940 days.

(21) Appl. No.: 17/701,270

(22) Filed: Mar. 22, 2022

(65) Prior Publication Data
US 2022/0339274 A1    Oct. 27, 2022

Related U.S. Application Data

(63) Continuation of application No. PCT/US2020/052301, filed on Sep. 23, 2020.

(60) Provisional application No. 62/904,446, filed on Sep. 23, 2019.

(51) Int. Cl.
| A61P 35/02 | (2006.01) |
| A61K 31/7034 | (2006.01) |
| A61K 39/00 | (2006.01) |
| A61K 40/19 | (2025.01) |
| A61K 40/24 | (2025.01) |
| A61K 40/42 | (2025.01) |

(52) U.S. Cl.
CPC .. *A61K 31/7034* (2013.01); *A61K 39/001153* (2018.08); *A61K 40/19* (2025.01); *A61K 40/24* (2025.01); *A61K 40/42* (2025.01); *A61K 40/4243* (2025.01); *A61K 40/427* (2025.01); *A61P 35/02* (2018.01); *A61K 2039/55561* (2013.01)

(58) Field of Classification Search
None
See application file for complete search history.

(56) References Cited

U.S. PATENT DOCUMENTS

| 3,773,919 A | 11/1973 | Boswell et al. |
| 4,522,811 A | 6/1985 | Eppstein et al. |
| 4,946,778 A | 8/1990 | Ladner et al. |
| 5,091,513 A | 2/1992 | Huston et al. |
| 5,132,405 A | 7/1992 | Huston et al. |
| 5,885,829 A | 3/1999 | Mooney et al. |
| 5,888,987 A | 3/1999 | Haynes et al. |
| 5,906,826 A | 5/1999 | Emery et al. |
| 5,951,976 A | 9/1999 | Segal |
| 6,129,716 A | 10/2000 | Steer |
| 6,160,084 A | 12/2000 | Langer et al. |
| 6,193,970 B1 | 2/2001 | Pardoll et al. |
| 6,251,396 B1 | 6/2001 | Gaur et al. |
| 6,281,256 B1 | 8/2001 | Harris et al. |
| 6,334,968 B1 | 1/2002 | Shapiro et al. |
| 6,352,694 B1 | 3/2002 | June et al. |
| 6,403,374 B1 | 6/2002 | Tsien et al. |
| 6,429,199 B1 | 8/2002 | Krieg et al. |
| 6,511,511 B1 | 1/2003 | Slivka et al. |
| 6,511,650 B1 | 1/2003 | Eiselt et al. |
| 6,541,022 B1 | 4/2003 | Murphy et al. |
| 6,642,363 B1 | 11/2003 | Mooney et al. |
| 6,685,963 B1 | 2/2004 | Taupin et al. |
| 6,748,954 B2 | 6/2004 | Lee et al. |
| 6,767,928 B1 | 7/2004 | Murphy et al. |
| 6,783,712 B2 | 8/2004 | Slivka et al. |
| 6,790,840 B1 | 9/2004 | Lee et al. |
| 6,797,738 B2 | 9/2004 | Harris et al. |
| 6,800,733 B2 | 10/2004 | Tsien et al. |
| 6,858,222 B2 | 2/2005 | Nelson et al. |
| 6,974,698 B1 | 12/2005 | Miller et al. |
| 7,015,205 B1 | 3/2006 | Wallack et al. |
| 7,157,566 B2 | 1/2007 | Tsien et al. |
| 7,186,413 B2 | 3/2007 | Bouhadir et al. |
| 7,192,693 B2 | 3/2007 | Bryant et al. |
| 7,244,714 B1 | 7/2007 | Gonda et al. |
| 7,357,936 B1 | 4/2008 | Garcon |
| 7,410,953 B2 | 8/2008 | Kawasaki |
| 7,427,602 B1 | 9/2008 | Shea et al. |

(Continued)

FOREIGN PATENT DOCUMENTS

| AU | 2014200405 A1 | 2/2014 |
| AU | 2018201930 A1 | 4/2018 |

(Continued)

OTHER PUBLICATIONS

Ali et al. The efficacy of intracranial PLG-based vaccines is dependent on direct implantation into brain tissue. Journal of Controlled Release 154 (2011) 249-257.*

(Continued)

*Primary Examiner* — Nianxiang Zou
(74) *Attorney, Agent, or Firm* — McCarter & English, LLP; Maria Laccotripe Zacharakis; Maneesh Gulati, Esq.

(57) ABSTRACT

Disclosed herein are vaccine compostions and method to use the same. The compositions and methods disclosed herein provide means to prevent and/or treat a variety of cancers.

20 Claims, 76 Drawing Sheets
Specification includes a Sequence Listing.

(56) References Cited

U.S. PATENT DOCUMENTS

| | | |
|---|---|---|
| 7,569,850 B2 | 8/2009 | Noy et al. |
| 7,575,759 B2 | 8/2009 | Murphy et al. |
| 7,687,241 B2 | 3/2010 | Chen |
| 7,709,458 B2 | 5/2010 | Karaolis et al. |
| 7,790,699 B2 | 9/2010 | Melvik et al. |
| 8,067,237 B2 | 11/2011 | Mooney et al. |
| 8,188,058 B2 | 5/2012 | Hackam et al. |
| 8,273,373 B2 | 9/2012 | Alsberg et al. |
| 8,354,119 B2 | 1/2013 | Geistlich et al. |
| 8,367,628 B2 | 2/2013 | Goodwin et al. |
| 8,535,719 B2 | 9/2013 | Badylak et al. |
| 8,709,464 B2 | 4/2014 | Ma et al. |
| 8,728,456 B2 | 5/2014 | Sands et al. |
| 8,883,308 B2 | 11/2014 | Polshettiwar et al. |
| 8,932,583 B2 | 1/2015 | Mooney et al. |
| 9,012,399 B2 | 4/2015 | Cao et al. |
| 9,132,210 B2 | 9/2015 | Mooney et al. |
| 9,139,809 B2 | 9/2015 | Porcelli et al. |
| 9,150,631 B2 | 10/2015 | Super et al. |
| 9,370,558 B2 | 6/2016 | Ali et al. |
| 9,381,235 B2 | 7/2016 | Sands et al. |
| 9,446,107 B2 | 9/2016 | Mooney et al. |
| 9,486,512 B2 | 11/2016 | Kim et al. |
| 9,591,360 B2 | 3/2017 | Jennings et al. |
| 9,610,328 B2 | 4/2017 | Mooney et al. |
| 9,675,561 B2 | 6/2017 | Bencherif et al. |
| 9,770,535 B2 | 9/2017 | Mooney et al. |
| 9,821,045 B2 | 11/2017 | Ali et al. |
| 9,937,249 B2 | 4/2018 | Kim et al. |
| 10,045,947 B2 | 8/2018 | Bencherif et al. |
| 10,080,789 B2 | 9/2018 | Sands et al. |
| 10,137,184 B2 | 11/2018 | Mooney et al. |
| 10,149,897 B2 | 12/2018 | Mooney et al. |
| 10,258,677 B2 | 4/2019 | Mooney et al. |
| 10,328,133 B2 | 6/2019 | Mooney et al. |
| 10,406,216 B2 | 9/2019 | Kim et al. |
| 10,568,949 B2 | 2/2020 | Ali et al. |
| 10,682,400 B2 | 6/2020 | Ali et al. |
| 10,813,988 B2 | 10/2020 | Super et al. |
| 11,059,050 B2 | 7/2021 | Kang et al. |
| 11,096,997 B2 | 8/2021 | Mooney et al. |
| 11,150,242 B2 | 10/2021 | Ali et al. |
| 11,202,759 B2 | 12/2021 | Huebsch et al. |
| 11,278,604 B2 | 3/2022 | Kim et al. |
| 2002/0045672 A1 | 4/2002 | Harris et al. |
| 2002/0131853 A1 | 9/2002 | Nagasawa |
| 2002/0131953 A1 | 9/2002 | Takashima et al. |
| 2002/0150604 A1 | 10/2002 | Yi et al. |
| 2003/0075822 A1 | 4/2003 | Slivka et al. |
| 2003/0082806 A1 | 5/2003 | Berenson et al. |
| 2003/0095994 A1 | 5/2003 | Geistlich et al. |
| 2003/0100527 A1 | 5/2003 | Krieg et al. |
| 2003/0194397 A1 | 10/2003 | Mishra |
| 2003/0232895 A1 | 12/2003 | Omidian et al. |
| 2003/0235557 A1 | 12/2003 | Gaiger et al. |
| 2004/0028745 A1 | 2/2004 | Bouhadir et al. |
| 2004/0043034 A1 | 3/2004 | Jensenius et al. |
| 2004/0058883 A1 | 3/2004 | Phillips et al. |
| 2004/0063206 A1 | 4/2004 | Rowley et al. |
| 2004/0136968 A1 | 7/2004 | Zheng et al. |
| 2004/0151764 A1 | 8/2004 | Zamora |
| 2004/0213795 A1 | 10/2004 | Collins et al. |
| 2004/0220111 A1 | 11/2004 | Kleinman et al. |
| 2004/0228858 A1 | 11/2004 | Hanson et al. |
| 2004/0242469 A1 | 12/2004 | Lee et al. |
| 2004/0242482 A1 | 12/2004 | Gehring et al. |
| 2005/0002915 A1 | 1/2005 | Atala et al. |
| 2005/0037330 A1 | 2/2005 | Fischer et al. |
| 2005/0053667 A1 | 3/2005 | Irvine et al. |
| 2005/0079159 A1 | 4/2005 | Shastri et al. |
| 2005/0090008 A1 | 4/2005 | Segura et al. |
| 2005/0106211 A1 | 5/2005 | Nelson et al. |
| 2005/0154376 A1 | 7/2005 | Riviere et al. |
| 2005/0177249 A1 | 8/2005 | Kladakis et al. |
| 2005/0202394 A1 | 9/2005 | Dobson |
| 2006/0083712 A1 | 4/2006 | Anversa |
| 2006/0141018 A1 | 6/2006 | Cochrum et al. |
| 2006/0264380 A1 | 11/2006 | Hellstrom et al. |
| 2006/0292134 A1 | 12/2006 | Stohs |
| 2007/0003595 A1 | 1/2007 | Wang et al. |
| 2007/0020232 A1 | 1/2007 | Rossignol et al. |
| 2007/0026518 A1 | 2/2007 | Healy et al. |
| 2007/0081972 A1 | 4/2007 | Sandler et al. |
| 2007/0116680 A1 | 5/2007 | Stegemann et al. |
| 2007/0178159 A1 | 8/2007 | Chen et al. |
| 2007/0190646 A1 | 8/2007 | Engler et al. |
| 2008/0044900 A1 | 2/2008 | Mooney et al. |
| 2008/0044990 A1 | 2/2008 | Lee |
| 2008/0051490 A1 | 2/2008 | Williams et al. |
| 2008/0113929 A1 | 5/2008 | Lipford et al. |
| 2008/0138416 A1 | 6/2008 | Rauh et al. |
| 2008/0152624 A1 | 6/2008 | Paludan et al. |
| 2008/0159993 A1 | 7/2008 | Stauss et al. |
| 2008/0206308 A1 | 8/2008 | Jabbari et al. |
| 2008/0233181 A1 | 9/2008 | Nagy et al. |
| 2008/0268019 A1 | 10/2008 | Badylak et al. |
| 2008/0268052 A1 | 10/2008 | Voytik-Harbin et al. |
| 2009/0017096 A1 | 1/2009 | Lowman et al. |
| 2009/0041825 A1 | 2/2009 | Kotov et al. |
| 2009/0192079 A1 | 7/2009 | Santos et al. |
| 2009/0238853 A1 | 9/2009 | Liu et al. |
| 2009/0252752 A1 | 10/2009 | Tahara et al. |
| 2009/0297551 A1 | 12/2009 | Sattentau et al. |
| 2009/0297579 A1 | 12/2009 | Semino et al. |
| 2009/0305983 A1 | 12/2009 | Ying et al. |
| 2010/0015709 A1 | 1/2010 | Rehfeldt et al. |
| 2010/0055102 A1 | 3/2010 | Langermann |
| 2010/0055186 A1 | 3/2010 | Dadsetan et al. |
| 2010/0080816 A1 | 4/2010 | Hadeiba et al. |
| 2010/0129422 A1 | 5/2010 | Han et al. |
| 2010/0159008 A1 | 6/2010 | Barron et al. |
| 2010/0174346 A1 | 7/2010 | Boyden et al. |
| 2010/0189760 A1 | 7/2010 | Schaffer et al. |
| 2010/0190741 A1 | 7/2010 | Cohen et al. |
| 2010/0272771 A1 | 10/2010 | Harlow et al. |
| 2011/0008443 A1 | 1/2011 | Alsberg et al. |
| 2011/0020216 A1 | 1/2011 | Mooney et al. |
| 2011/0117170 A1 | 5/2011 | Cao et al. |
| 2011/0159023 A1 | 6/2011 | Langermann |
| 2011/0207166 A1 | 8/2011 | Vaiselbuh |
| 2011/0223255 A1 | 9/2011 | Thiesen et al. |
| 2011/0253643 A1 | 10/2011 | Polshettiwar et al. |
| 2011/0256184 A1 | 10/2011 | Lei et al. |
| 2011/0300186 A1 | 12/2011 | Hellstrom et al. |
| 2012/0040011 A9 | 2/2012 | Boons et al. |
| 2012/0100182 A1 | 4/2012 | Mooney et al. |
| 2012/0121539 A1 | 5/2012 | Sands et al. |
| 2012/0122218 A1 | 5/2012 | Huebsch et al. |
| 2012/0134967 A1 | 5/2012 | Mooney et al. |
| 2012/0256336 A1 | 10/2012 | Yano et al. |
| 2012/0264599 A1 | 10/2012 | Komatsu et al. |
| 2012/0294888 A1 | 11/2012 | Kishimoto et al. |
| 2012/0329791 A1 | 12/2012 | Ashwell et al. |
| 2013/0029030 A1 | 1/2013 | Larsen |
| 2013/0035283 A1 | 2/2013 | Super et al. |
| 2013/0045246 A1 | 2/2013 | Edwards et al. |
| 2013/0052117 A1 | 2/2013 | Imai et al. |
| 2013/0072547 A1 | 3/2013 | Hackam et al. |
| 2013/0145488 A1 | 6/2013 | Wang et al. |
| 2013/0202707 A1 | 8/2013 | Ali et al. |
| 2013/0251784 A1 | 9/2013 | Kim et al. |
| 2013/0302396 A1 | 11/2013 | Mooney et al. |
| 2013/0331343 A1 | 12/2013 | Cao et al. |
| 2014/0072510 A1 | 3/2014 | Shea et al. |
| 2014/0112990 A1 | 4/2014 | Bencherif et al. |
| 2014/0178964 A1 | 6/2014 | Mooney et al. |
| 2014/0193488 A1 | 7/2014 | Kim et al. |
| 2014/0227327 A1 | 8/2014 | Bencherif et al. |
| 2014/0227723 A1 | 8/2014 | Ingber et al. |
| 2014/0234423 A1 | 8/2014 | Sands et al. |
| 2015/0024026 A1 | 1/2015 | Mooney et al. |
| 2015/0030669 A1 | 1/2015 | Platscher et al. |
| 2015/0072009 A1 | 3/2015 | Kim et al. |
| 2015/0080321 A1 | 3/2015 | Li et al. |

(56) References Cited

U.S. PATENT DOCUMENTS

| | | | |
|---|---|---|---|
| 2015/0094518 A1 | 4/2015 | Wu et al. |
| 2015/0359928 A1 | 12/2015 | Gu et al. |
| 2015/0366956 A1 | 12/2015 | Mooney et al. |
| 2016/0033511 A1 | 2/2016 | Pannell et al. |
| 2016/0129053 A1 | 5/2016 | Brass et al. |
| 2016/0220668 A1 | 8/2016 | Mooney et al. |
| 2016/0228543 A1 | 8/2016 | Mooney et al. |
| 2016/0271298 A1 | 9/2016 | Mooney et al. |
| 2016/0279219 A1 | 9/2016 | Mooney et al. |
| 2016/0279220 A1 | 9/2016 | Mooney et al. |
| 2016/0296611 A1 | 10/2016 | Ali et al. |
| 2017/0362307 A1 | 12/2017 | Ingber et al. |
| 2017/0368169 A1 | 12/2017 | Loew et al. |
| 2018/0021253 A1 | 1/2018 | Sandeep et al. |
| 2018/0117171 A1 | 5/2018 | Mooney et al. |
| 2018/0243231 A1 | 8/2018 | Bencherif et al. |
| 2018/0298047 A1 | 10/2018 | Cheng et al. |
| 2018/0320157 A1 | 11/2018 | Super et al. |
| 2018/0326073 A1 | 11/2018 | Mooney et al. |
| 2018/0371058 A1 | 12/2018 | Watters et al. |
| 2019/0060525 A1 | 2/2019 | Shah et al. |
| 2019/0076373 A1 | 3/2019 | Bencherif et al. |
| 2019/0183992 A1 | 6/2019 | Sands et al. |
| 2019/0216910 A1 | 7/2019 | Mooney et al. |
| 2019/0290696 A1 | 9/2019 | De Miroschedji |
| 2019/0292517 A1 | 9/2019 | Cheung et al. |
| 2019/0367550 A1 | 12/2019 | Cheng et al. |
| 2020/0024339 A1 | 1/2020 | Springer et al. |
| 2020/0206333 A1 | 7/2020 | Shah et al. |
| 2020/0276290 A1 | 9/2020 | Ali et al. |
| 2020/0297854 A1 | 9/2020 | Ingber et al. |
| 2021/0170007 A1 | 6/2021 | Super et al. |
| 2021/0205233 A1 | 7/2021 | Bencherif et al. |
| 2022/0047778 A1 | 2/2022 | Shah et al. |
| 2022/0107308 A1 | 4/2022 | Ali et al. |

FOREIGN PATENT DOCUMENTS

| | | |
|---|---|---|
| CN | 1487839 A | 4/2004 |
| CN | 1527697 A | 9/2004 |
| CN | 1757662 A | 4/2006 |
| CN | 101584612 A | 11/2009 |
| CN | 101655611 A | 2/2010 |
| CN | 101829361 A | 9/2010 |
| CN | 102000689 A | 4/2011 |
| CN | 102006891 A | 4/2011 |
| CN | 102170903 A | 8/2011 |
| CN | 102947341 A | 2/2013 |
| CN | 103237885 A | 8/2013 |
| CN | 104411331 A | 3/2015 |
| EP | 0562862 A1 | 9/1993 |
| EP | 1452191 A2 | 9/2004 |
| EP | 1561481 A2 | 8/2005 |
| EP | 1712238 A1 | 10/2006 |
| EP | 1975230 A1 | 10/2008 |
| EP | 2254602 A2 | 12/2010 |
| JP | 2000-503884 A | 4/2000 |
| JP | 2001-049018 A | 2/2001 |
| JP | 2001-524136 A | 11/2001 |
| JP | 2003-506401 A | 2/2003 |
| JP | 2003-180815 A | 7/2003 |
| JP | 2004-159849 A | 6/2004 |
| JP | 2004-520043 A | 7/2004 |
| JP | 2005-160669 A | 6/2005 |
| JP | 2005-168760 A | 6/2005 |
| JP | 2005-170816 A | 6/2005 |
| JP | 2005-528401 A | 9/2005 |
| JP | 2007-500673 A | 1/2007 |
| JP | 2007-503881 A | 3/2007 |
| JP | 2007-505827 A | 3/2007 |
| JP | 2007-528848 A | 10/2007 |
| JP | 2008-515503 A | 5/2008 |
| JP | 2008-528114 A | 7/2008 |
| JP | 2009-519042 A | 5/2009 |
| JP | 2009-521406 A | 6/2009 |
| JP | 2009-540921 A | 11/2009 |
| JP | 2010-502824 A | 1/2010 |
| JP | 2010-508976 A | 3/2010 |
| JP | 2010-227012 A | 10/2010 |
| JP | 2011-511684 A | 4/2011 |
| JP | 2011-511834 A | 4/2011 |
| JP | 2013-531043 A | 8/2013 |
| JP | 2015-503626 A | 2/2015 |
| JP | 2015-516398 A | 6/2015 |
| JP | 2018-117680 A | 8/2018 |
| WO | WO-1996/02555 A1 | 2/1996 |
| WO | WO-1996/16086 A1 | 5/1996 |
| WO | WO-1998/012228 A1 | 3/1998 |
| WO | WO-1998/16266 A1 | 4/1998 |
| WO | WO-1999/44583 A2 | 9/1999 |
| WO | WO-1999/51259 A2 | 10/1999 |
| WO | WO-1999/52356 A1 | 10/1999 |
| WO | WO-2000/50006 A2 | 8/2000 |
| WO | WO-2001/10421 A1 | 2/2001 |
| WO | WO-2001/35932 A2 | 5/2001 |
| WO | WO-2001/37810 A2 | 5/2001 |
| WO | WO-2002/16557 A2 | 2/2002 |
| WO | WO-2002/40071 A1 | 5/2002 |
| WO | WO-2002/058723 A2 | 8/2002 |
| WO | WO-2002/092054 A2 | 11/2002 |
| WO | WO-2003/020161 A2 | 3/2003 |
| WO | WO-2003/020884 A2 | 3/2003 |
| WO | WO-2003/070291 A1 | 8/2003 |
| WO | WO-2003/088905 A2 | 10/2003 |
| WO | WO-2004/006990 A2 | 1/2004 |
| WO | WO-2004/029230 A2 | 4/2004 |
| WO | WO-2004/030706 A2 | 4/2004 |
| WO | WO-2004/031371 A2 | 4/2004 |
| WO | WO-2004/089413 A1 | 10/2004 |
| WO | WO-2005/013896 A2 | 2/2005 |
| WO | WO-2005/013933 A1 | 2/2005 |
| WO | WO-2005/020849 A2 | 3/2005 |
| WO | WO-2005/025614 A2 | 3/2005 |
| WO | WO-2005/026318 A2 | 3/2005 |
| WO | WO-2005/037190 A2 | 4/2005 |
| WO | WO-2005/037293 A1 | 4/2005 |
| WO | WO-2005/046748 A1 | 5/2005 |
| WO | WO-2005/072088 A2 | 8/2005 |
| WO | WO-2005/104755 A2 | 11/2005 |
| WO | WO-2006/039045 A2 | 4/2006 |
| WO | WO-2006/040128 A1 | 4/2006 |
| WO | WO-2006/078987 A2 | 7/2006 |
| WO | WO-2006/113407 A2 | 10/2006 |
| WO | WO-2006/119619 A1 | 11/2006 |
| WO | WO-2006/136905 A2 | 12/2006 |
| WO | WO-2007/001332 A2 | 1/2007 |
| WO | WO-2007/030901 A1 | 3/2007 |
| WO | WO-2007/039150 A2 | 4/2007 |
| WO | WO-2007/042554 A2 | 4/2007 |
| WO | WO-2007/051120 A2 | 5/2007 |
| WO | WO-2007/063075 A1 | 6/2007 |
| WO | WO-2007/064152 A1 | 6/2007 |
| WO | WO-2007/068489 A2 | 6/2007 |
| WO | WO-2007/070660 A2 | 6/2007 |
| WO | WO-2007/078196 A1 | 7/2007 |
| WO | WO-2007/087585 A1 | 8/2007 |
| WO | WO-2007/089870 A2 | 8/2007 |
| WO | WO-2007/107739 A1 | 9/2007 |
| WO | WO-2007/149161 A2 | 12/2007 |
| WO | WO-2007/150020 A1 | 12/2007 |
| WO | WO-2008/008266 A2 | 1/2008 |
| WO | WO-2008/018707 A2 | 2/2008 |
| WO | WO-2008/031525 A1 | 3/2008 |
| WO | WO-2008/043157 A1 | 4/2008 |
| WO | WO-2008/057600 A2 | 5/2008 |
| WO | WO-2008/109852 A2 | 9/2008 |
| WO | WO-2008/114149 A2 | 9/2008 |
| WO | WO-2008/148761 A1 | 12/2008 |
| WO | WO-2008/157394 A2 | 12/2008 |
| WO | WO-2009/002401 A2 | 12/2008 |
| WO | WO-2009/005769 A2 | 1/2009 |
| WO | WO-2009/018500 A1 | 2/2009 |
| WO | WO-2009/024775 A1 | 2/2009 |
| WO | WO-2009/072767 A2 | 6/2009 |

(56) References Cited

FOREIGN PATENT DOCUMENTS

| WO | WO-2009/074341 A1 | 6/2009 |
|---|---|---|
| WO | WO-2009/100716 A2 | 8/2009 |
| WO | WO-2009/102465 A2 | 8/2009 |
| WO | WO-2009/146456 A1 | 12/2009 |
| WO | WO-2009/155583 A1 | 12/2009 |
| WO | WO-2010/078209 A2 | 7/2010 |
| WO | WO-2010/120749 A2 | 10/2010 |
| WO | WO-2011/014871 A1 | 2/2011 |
| WO | WO-2011/043834 A1 | 4/2011 |
| WO | WO-2011/043835 A1 | 4/2011 |
| WO | WO-2011/063336 A2 | 5/2011 |
| WO | WO-2011/109834 A2 | 9/2011 |
| WO | WO-2011/130753 A2 | 10/2011 |
| WO | WO-2011/150240 A1 | 12/2011 |
| WO | WO-2011/151431 A1 | 12/2011 |
| WO | WO-2011/163669 A2 | 12/2011 |
| WO | WO-2012/009611 A2 | 1/2012 |
| WO | WO-2012/019049 A1 | 2/2012 |
| WO | WO-2012/048165 A2 | 4/2012 |
| WO | WO-2012/064697 A2 | 5/2012 |
| WO | WO-2012/148684 A1 | 11/2012 |
| WO | WO-2012/149358 A1 | 11/2012 |
| WO | WO-2012/167230 A1 | 12/2012 |
| WO | WO-2013/012924 A2 | 1/2013 |
| WO | WO-2013/106852 A1 | 7/2013 |
| WO | WO-2013/158673 A1 | 10/2013 |
| WO | WO-2013/172967 A1 | 11/2013 |
| WO | WO-2013/190555 A1 | 12/2013 |
| WO | WO-2014/063128 A1 | 4/2014 |
| WO | WO-2014/189805 A1 | 11/2014 |
| WO | WO-2014/190229 A1 | 11/2014 |
| WO | WO-2015/066535 A1 | 5/2015 |
| WO | WO-2015/154078 A1 | 10/2015 |
| WO | WO-2015/168379 A2 | 11/2015 |
| WO | WO-2016/004068 A1 | 1/2016 |
| WO | WO-2016/123573 A1 | 8/2016 |
| WO | WO-2016/161372 A1 | 10/2016 |
| WO | WO-2017/136837 A1 | 8/2017 |
| WO | WO-2017/143024 A2 | 8/2017 |
| WO | WO-2018/013797 A1 | 1/2018 |
| WO | WO-2018/026884 A1 | 2/2018 |
| WO | WO-2018/144966 A1 | 8/2018 |
| WO | WO-2018/170414 A1 | 9/2018 |
| WO | WO-2018/213631 A1 | 11/2018 |
| WO | WO-2018/227205 A1 | 12/2018 |
| WO | WO-2020/061129 A1 | 3/2020 |
| WO | WO-2021/155297 A1 | 8/2021 |

OTHER PUBLICATIONS

Chew et al. Biomaterial-Based Implantable Devices for Cancer Therapy. Adv. Healthcare Mater. 2017, 6, 1600766.*
Chong et al. Combining cancer vaccines with chemotherapy. Expert Opin. Pharmacother. (2005) 6(16):2813-2820.*
Sakai et al. Clinical effect and immunological response in patients with advanced malignant glioma treated withWT1-pulsed dendritic cell-based immunotherapy: A report of two cases. Interdisciplinary Neurosurgery: Advanced Techniques and Case Management 9 (2017) 24-29.*
Abrahams et al., Expression and secretion of antiviral factors by trophoblast cells following stimulation by the TLR-3 agonist, Poly(I : C). Hum Reprod. Sep. 2006;21(9):2432-9.
Agache et al., Mechanical properties and Young's modulus of human skin in vivo. Arch Dermatol Res. 1980;269(3):221-32.
Agrawal et al., Cutting edge: different Toll-like receptor agonists instruct dendritic cells to induce distinct Th responses via differential modulation of extracellular signal-regulated kinase-mitogen-activated protein kinase and c-Fos. J Immunol. Nov. 15, 2003;171(10):4984-9.
Aguado et al., Improving viability of stem cells during syringe needle flow through the design of hydrogel cell carriers. Tissue Eng Part A. Apr. 2012;18(7-8):806-15.

Akira et al., Pathogen recognition and innate immunity. Cell. Feb. 24, 2006;124(4):783-801.
Akira et al., Toll-like receptors: critical proteins linking innate and acquired immunity. Nat Immunol. Aug. 2001;2(8):675-80.
Akpalo et al., Fibrin-polyethylene oxide interpenetrating polymer networks: new self-supported biomaterials combining the properties of both protein gel and synthetic polymer. Acta Biomater. Jun. 2011;7(6):2418-27.
Aldhous, Print Me a Heart and a Set of Arteries. New Scientist. 2006;2547:19.
Ali et al., Biomaterial-based vaccine induces regression of established intracranial glioma in rats. Pharm Res. May 2011;28(5):1074-80.
Ali et al., Controlled Local Delivery of GM-CSF From Polymer-Based Vaccines Enhances Anti-Tumor Immune Responses by Priming Host Dendritic Cells. 2007 AACR Annual Meeting. 2007;48:652, Abstract #2736.
Ali et al., Converging Cell Therapy with Biomaterials. Cell Transplantation from Laboratory to Clinic. 2006:591-609.
Ali et al., Identification of immune factors regulating antitumor immunity using polymeric vaccines with multiple adjuvants. Cancer Res. Mar. 15, 2014;74(6):1670-81.
Ali et al., In situ regulation of DC subsets and T cells mediates tumor regression in mice. Sci Transl Med. Nov. 25, 2009;1(8):8ra19, 1-10.
Ali et al., Infection-mimicking materials to program dendritic cells in situ. Nat Mater. Feb. 2009;8(2):151-8.
Ali et al., Inflammatory cytokines presented from polymer matrices differentially generate and activate DCs in situ . . . Adv Funct Mater. Aug. 1, 2013;23(36):4621-4628.
Ali et al., Relationship of vaccine efficacy to the kinetics of DC and T-cell responses induced by PLG-based cancer vaccines. Biomater. 2011;1(1):66-75.
Ali et al., Sustained GM-CSF and PEI condensed pDNA presentation increases the level and duration of gene expression in dendritic cells. J Control Release. Dec. 18, 2008;132(3):273-8.
Ali et al., The efficacy of intracranial PLG-based vaccines is dependent on direct implantation into brain tissue. J Control Release. Sep. 25, 2011;154(3):249-57.
Allen et al., Regulation of satellite cells during skeletal muscle growth and development. Proc Soc Exp Biol Med. Jun. 1990;194(2):81-6.
Allen et al., Regulation of skeletal muscle satellite cell proliferation by bovine pituitary fibroblast growth factor. Exp Cell Res. May 1984;152(1):154-60.
Almarza et al., Evaluation of three growth factors in combinations of two for temporomandibular joint disc tissue engineering. Arch Oral Biol. Mar. 2006;51(3):215-21.
Alsberg et al., Cell-interactive alginate hydrogels for bone tissue engineering. J Dent Res. Nov. 2001;80(11):2025-9.
Alsberg et al., Engineering growing tissues. Proc Natl Acad Sci U S A. Sep. 17, 2002;99(19):12025-30.
Alsberg et al., Regulating bone formation via controlled scaffold degradation. J Dent Res. Nov. 2003;82(11):903-8.
Ambrosini et al., Astrocytes produce dendritic cell-attracting chemokines in vitro and in multiple sclerosis lesions. J Neuropathol Exp Neurol. Aug. 2005;64(8):706-15.
Anderson et al., Biomaterial microarrays: rapid, microscale screening of polymer-cell interaction. Biomaterials. Aug. 2005;26(23):4892-7.
Anderson et al., Crosslinking CD3 with CD2 using sepharose-immobilized antibodies enhances T lymphocyte proliferation. Cell Immunol. Sep. 1988;115(2):246-56.
Anderson et al., Nanoliter-scale synthesis of arrayed biomaterials and application to human embryonic stem cells. Nat Biotechnol. Jul. 2004;22(7):863-6.
Anderson, A role for nitric oxide in muscle repair: nitric oxide-mediated activation of muscle satellite cells. Mol Biol Cell. May 2000;11(5):1859-74.
Andersson et al., HSP70 promoter-driven activation of gene expression for immunotherapy using gold nanorods and near infrared light. Vaccines (Basel). Mar. 25, 2014;2(2):216-27.

(56) References Cited

OTHER PUBLICATIONS

Annabi et al., Controlling the porosity and microarchitecture of hydrogels for tissue engineering. Tissue Eng Part B Rev. Aug. 2010;16(4):371-83.
Annual Review. 2008:122-131.
Arany et al., At the edge of translation—materials to program cells for directed differentiation. Oral Dis. Apr. 2011;17(3):241-51.
Aschner et al., Metabolic memory for vascular disease in diabetes. Diabetes Technol Ther. Jun. 2012;14 Suppl 1:S68-74.
Atala et al., Endoscopic treatment of vesicoureteral reflux with a chondrocyte-alginate suspension. J Urol. Aug. 1994;152(2 Pt 2):641-3.
Aubin et al., Directed 3D cell alignment and elongation in microengineered hydrogels. Biomaterials. Sep. 2010;31(27):6941-6951.
Augst et al., Alginate hydrogels as biomaterials. Macromol Biosci. Aug. 7, 2006;6(8):623-33.
Babensee et al., Host response to tissue engineered devices. Advanced Drug Delivery Reviews. Aug. 3, 1998;33(1-2):111-139.
Bachelder et al., Acid-degradable polyurethane particles for protein-based vaccines: biological evaluation and in vitro analysis of particle degradation products. Mol Pharm. Sep.-Oct. 2008;5(5):876-84.
Bachem et al., Superior antigen cross-presentation and XCR1 expression define human CD11c+CD141+ cells as homologues of mouse CD8+ dendritic cells. J Exp Med. Jun. 7, 2010;207(6):1273-81.
Badovinac et al., Regulation of CD8+ T cells undergoing primary and secondary responses to infection in the same host. J Immunol. May 15, 2003;170(10):4933-42.
Bakri et al., Pharmacokinetics of intravitreal bevacizumab (Avastin). Ophthalmology. May 2007;114(5):855-9.
Balakrishna et al., Structural correlates of antibacterial and membrane-permeabilizing activities in acylpolyamines. Antimicrob Agents Chemother. Mar. 2006;50(3):852-61.
Banchereau et al., Dendritic cells and the control of immunity. Nature. Mar. 19, 1998;392(6673):245-52.
Bar-Cohen et al., Electroactive Polymer Actuators and Sensors. MRS Bullet. 2008;33(3):173-181.
Bar-Or et al., Induction of antigen-specific tolerance in multiple sclerosis after immunization with DNA encoding myelin basic protein in a randomized, placebo-controlled phase 1/2 trial. Arch Neurol. Oct. 2007;64(10):1407-15.
Barbero et al., Growth factor supplemented matrigel improves ectopic skeletal muscle formation—a cell therapy approach. J Cell Physiol. Feb. 2001;186(2):183-92.
Barbucci et al., Hyaluronic acid hydrogel in the treatment of osteoarthritis. Biomaterials. Dec. 2002;23(23):4503-13.
Baroja et al., The anti-T cell monoclonal antibody 9.3 (anti-CD28) provides a helper signal and bypasses the need for accessory cells in T cell activation with immobilized anti-CD3 and mitogens. Cell Immunol. Apr. 15, 1989;120(1):205-17.
Barrio et al., A two-dimensional numerical study of spatial pattern formation in interacting Turing systems. Bull Math Biol. May 1999;61(3):483-505.
Baskin et al., Copper-free click chemistry for dynamic in vivo imaging. Proc Natl Acad Sci U S A. Oct. 23, 2007;104(43):16793-7.
Bates, Improved muscle regeneration by combining VEGF with IGF1. Regen Med. Nov. 2010;5(6):853-4.
Beaucage et al., The Functionalization of Oligonucleotides Via Phosphoramidite Derivatives. Tetrahedron. Mar. 5, 1993;49(10)1925-1963.
Beauchamp et al., Dynamics of myoblast transplantation reveal a discrete minority of precursors with stem cell-like properties as the myogenic source. J Cell Biol. Mar. 22, 1999;144(6):1113-22.
Becker et al., Cytological demonstration of the clonal nature of spleen colonies derived from transplanted mouse marrow cells. Nature. Feb. 2, 1963;197:452-4.

Beduer et al., A compressible scaffold for minimally invasive delivery of large intact neuronal networks. Adv Healthc Mater. Jan. 28, 2015;4(2):301-12.
Beebe et al., Functional hydrogel structures for autonomous flow control inside microfluidic channels. Nature. Apr. 6, 2000;404(6778):588-90.
Bekiari et al., Study of poly(N,N-dimethylacrylamide)/CdS nanocomposite organic/inorganic gels. Langmuir. Sep. 14, 2004;20(19):7972-5.
Bell, Models for the specific adhesion of cells to cells. Science. May 12, 1978;200(4342):618-27.
Bencherif et al., End-group effects on the properties of PEG-co-PGA hydrogels. Acta Biomater. Jul. 2009;5(6):1872-83.
Bencherif et al., Influence of cross-linker chemistry on release kinetics of PEG-co-PGA hydrogels. J Biomed Mater Res A. Jul. 2009;90(1):142-53.
Bencherif et al., Influence of the degree of methacrylation on hyaluronic acid hydrogels properties. Biomaterials. Apr. 2008;29(12):1739-49.
Bencherif et al., Injectable preformed scaffolds with shape-memory properties. Proc Natl Acad Sci U S A. Nov. 27, 2012;109(48):19590-5.
Bencherif et al., Nanostructured hybrid hydrogels prepared by a combination of atom transfer radical polymerization and free radical polymerization. Biomaterials. Oct. 2009;30(29):5270-8.
Bencherif et al., Synthesis by AGET ATRP of degradable nanogel precursors for in situ formation of nanostructured hyaluronic acid hydrogel. Biomacromolecules. Sep. 14, 2009;10(9):2499-507.
Benton et al., Photocrosslinking of gelatin macromers to synthesize porous hydrogels that promote valvular interstitial cell function. Tissue Eng Part A. Nov. 2009;15(11):3221-30.
Berg et al., Il-10 is a central regulator of cyclooxygenase-2 expression and prostaglandin production. J Immunol. Feb. 15, 2001;166(4):2674-80.
Bergstraesser et al., Stimulation and inhibition of human mammary epithelial cell duct morphogenesis in vitro. Proc Assoc Am Physicians. Mar. 1996;108(2):140-54.
Bhardwaj et al., TLR Agonists: Are They Good Adjuvants? Cancer J. 2010;16(4):382-391.
Bianco et al., The meaning, the sense and the significance: translating the science of mesenchymal stem cells into medicine. Nat Med. Jan. 2013;19(1):35-42.
Bierer et al., T cell receptors: adhesion and signaling. Adv Cancer Res. 1991;56:49-76.
Bilodeau et al., Regular Pyramid Punch Problem. J Appl Mech. 1992;59(3):519-523.
Bischoff, Proliferation of muscle satellite cells on intact myofibers in culture. Dev Biol. May 1986;115(1):129-39.
Bjork et al., Tuning the shape of mesoporous silica particles by alterations in parameter space: from rods to platelets. Langmuir. Nov. 5, 2013;29(44):13551-61.
Blumenthal et al., Polyurethane scaffolds seeded with genetically engineered skeletal myoblasts: a promising tool to regenerate myocardial function. Artif Organs. Feb. 2010;34(2):E46-54.
Boateng et al., Wound healing dressings and drug delivery systems: a review. J Pharm Sci. Aug. 2008;97(8):2892-923.
Boerckel et al., Mechanical regulation of vascular growth and tissue regeneration in vivo. Proc Natl Acad Sci U S A. Sep. 13, 2011;108(37):E674-80.
Bohl et al., Role of synthetic extracellular matrix in development of engineered dental pulp. J Biomater Sci Polym Ed. 1998;9(7):749-64.
Bojarova et al., Sugared biomaterial binding lectins: achievements and perspectives. Biomater Sci. Jul. 19, 2016;4(8):1142-60.
Bonauer et al., MicroRNA-92a controls angiogenesis and functional recovery of ischemic tissues in mice. Science. Jun. 26, 2009;324(5935):1710-3.
Boontheekul et al., Controlling alginate gel degradation utilizing partial oxidation and bimodal molecular weight distribution. Biomaterials. May 2005;26(15):2455-65.
Boontheekul et al., Regulating myoblast phenotype through controlled gel stiffness and degradation. Tissue Eng. Jul. 2007;13(7):1431-42.

(56) References Cited

OTHER PUBLICATIONS

Borselli et al., Functional muscle regeneration with combined delivery of angiogenesis and myogenesis factors. Proc Natl Acad Sci U S A. Feb. 23, 2010;107(8):3287-92.
Bouhadir et al., Degradation of partially oxidized alginate and its potential application for tissue engineering. Biotechnol Prog. Sep.-Oct. 2001;17(5):945-50.
Bouhadir et al., Synthesis of Cross-Linked Poly(aldehyde guluronate) Hydrogels. Polymer. Jun. 1999;40(12):3575-3584.
Bowne et al., Injection of DNA encoding granulocyte-macrophage colony-stimulating factor recruits dendritic cells for immune adjuvant effects. Cytokines Cell Mol Ther. Dec. 1999;5(4):217-25.
Brignone et al., A phase I pharmacokinetic and biological correlative study of IMP321, a novel MHC class II agonist, in patients with advanced renal cell carcinoma. Clin Cancer Res. Oct. 1, 2009;15(19):6225-31.
Brinkman et al., Photo-cross-linking of type I collagen gels in the presence of smooth muscle cells: mechanical properties, cell viability, and function. Biomacromolecules. Jul.-Aug. 2003;4(4):890-5.
Brinkmann et al., Neutrophil extracellular traps kill bacteria. Science. Mar. 5, 2004;303(5663):1532-5.
Bristol-Myers Squibb, Investigational Anti-PD-1 Immunotherapy BMS-936558 Showed Clinical Activity in Phase 1 Trial of Patients with Previously-Treated non-Small-Cell Lung Cancer, Metastatic Melanoma adn Renal Cell Cancer. Financial Times. 3 pages, Jun. 2, 2012.
Brodie et al., In vivo migration and function of transferred HIV-1-specific cytotoxic T cells. Nat Med. Jan. 1999;5(1):34-41.
Brouwers et al., Can the growth factors PTHrP, Ihh and VEGF, together regulate the development of a long bone? J Biomech. 2006;39(15):2774-82.
Broxmeyer, Insights into the biology of cord blood stem/progenitor cells. Cell Prolif. Apr. 2011;44 Suppl 1:55-9.
Brunner et al., Enhanced dendritic cell maturation by TNF-alpha or cytidine-phosphate-guanosine DNA drives T cell activation in vitro and therapeutic anti-tumor immune responses in vivo. J Immunol. Dec. 1, 2000;5(11):6278-86.
Bryant et al., Photo-patterning of porous hydrogels for tissue engineering. Biomaterials. Jul. 2007;28(19):2978-86.
Buckwalter et al., Form of Antigen Dictates Immunity: Irradiated Cell vs. Whole Cell Lysate Vaccination. J Immunol. Apr. 1, 2007;178(1 Suppl):S77.
Bullard et al., Fetal wound healing: current biology. World J Surg. Jan. 2003;27(1):54-61.
Buonaguro et al., Translating tumor antigens into cancer vaccines. Clin Vaccine Immunol. Jan. 2011;18(1):23-34.
Burdick et al., Controlled degradation and mechanical behavior of photopolymerized hyaluronic acid networks. Biomacromolecules. Jan.-Feb. 2005;6(1):386-91.
Burdick et al., Photoencapsulation of osteoblasts in injectable RGD-modified PEG hydrogels for bone tissue engineering. Biomaterials. Nov. 2002;23(22):4315-23.
Burdick et al., Stimulation of neurite outgrowth by neurotrophins delivered from degradable hydrogels. Biomaterials. Jan. 2006;27(3):452-9.
Burger et al., Effect of VEGF and its receptor antagonist SU-5416, an inhibitor of angiogenesis, on processing of the beta-amyloid precursor protein in primary neuronal cells derived from brain tissue of Tg2576 mice. Int J Dev Neurosci. Nov. 2010;28(7):597-604.
Bégué et al., Vaccination against human papillomavirus. Implementation and efficacy against cervical cancer control. Bull Acad Natl Med. Dec. 2007;191(9):1805-16.
Callahan et al., At the bedside: CTLA-4- and PD-1-blocking antibodies in cancer immunotherapy. J Leukoc Biol. Jul. 2013;94(1):41-53.
Calvert, Electroactive Polymer Gels. Electroactive Polymer (EAP) Acutators as Artificial Muscle: Reality, Potential, and Challenges. Bar-Cohen, (Ed.), Spie Press, Bellingham, WA. 151-170. (2004).
Calvert, Gel Sensors and Actuators. MRS Bullet. 2008;33(3):207-212.
Cameron et al., The influence of substrate creep on mesenchymal stem cell behaviour and phenotype. Biomaterials. Sep. 2011;32(26):5979-93.
Cao et al., Promoting angiogenesis via manipulation of VEGF responsiveness with notch signaling. Biomaterials. Sep. 2009;30(25):4085-93.
care.diabetesjournals.org, Standards of Medical Care in Diabetes. Diabetes Care. Jan. 2013;36(Suppl 1):S1-S2.
Carlson et al., Notch signaling pathway and tissue engineering. Front Biosci. Sep. 1, 2007;12:5143-56.
Carmeliet et al., Angiogenesis in cancer and other diseases. Nature. Sep. 14, 2000;407(6801):249-57.
Carmeliet, Mechanisms of angiogenesis and arteriogenesis. Nat Med. Apr. 2000;6(4):389-95.
Casanova et al., Human Mannose-binding Lectin in Immunity: Friend, Foe, or Both?. J Exp Med. 2004;199(10):1295-1299.
Caulfield et al., Regulation of major histocompatibility complex class II antigens on human alveolar macrophages by granulocyte-macrophage colony-stimulating factor in the presence of glucocorticoids. Immunology. Sep. 1999;98(1):104-10.
Ceriello et al., Clinical review 2: The "metabolic memory": is more than just tight glucose control necessary to prevent diabetic complications? J Clin Endocrinol Metab. Feb. 2009;94(2):410-5.
Ceriello et al., The emerging challenge in diabetes: the "metabolic memory". Vascul Pharmacol. Nov.-Dec. 2012;57(5-6):133-8.
Champion et al., Shape induced inhibition of phagocytosis of polymer particles. Pharm Res. Jan. 2009;26(1):244-9.
Chan et al., Antifibrotic effects of suramin in injured skeletal muscle after laceration. J Appl Physiol. Sep. 2003;95(2):771-80.
Chan et al., Helix induction in antimicrobial peptides by alginate in biofilms. J Biol Chem. Sep. 10, 2004;279(37):38749-54.
Chan et al., Traction dynamics of filopodia on compliant substrates. Science. Dec. 12, 2008;322(5908):1687-91.
Chang, Mouse models for studies of retinal degeneration and diseases. Methods Mol Biol. 2013;935:27-39.
Chao et al., Morphological control on SBA-15 mesoporous silicas via a slow self-assembling rate. J Mater Sci. 2009;44:6453-62.
Chapman, Endosomal proteases in antigen presentation. Curr Opin Immunol. Feb. 2006;18(1):78-84.
Che et al., Synthesis and characterization of chiral mesoporous silica. Nature. May 20, 2004;429(6989):281-4.
Chen et al., Adipogenic differentiation of adipose tissue-derived human mesenchymal stem cells: effect of gastric bypass surgery. Surg Endosc. Dec. 2012;26(12):3449-56.
Chen et al., Enhanced humoral and cell-mediated immune responses generated by cationic polymer-coated PLA microspheres with adsorbed HBsAg. Mol Pharm. Jun. 2, 2014;11(6):1772-84.
Chen et al., Functional Human Vascular Network Generated in Photocrosslinkable Gelatin Methacrylate Hydrogels. Adv Funct Mater. May 23, 2012;22(10):2027-2039.
Chen et al., Integrated approach to designing growth factor delivery systems. FASEB J. Dec. 2007;21(14):3896-903.
Chen et al., Morphological control of mesoporous silica SBA-15 synthesized at low temperature without additives. J Porous Mater. 2011;18:211-6.
Chen et al., Polymeric growth factor delivery strategies for tissue engineering. Pharm Res. Aug. 2003;20(8):1103-12.
Chen et al., Quantitative proteomic profiling of pancreatic cancer juice. Proteomics. Jul. 2006;6(13):3871-9.
Chen et al., Skeletal muscle stem cells. Reprod Biol Endocrinol. Nov. 13, 2003;1:101. 7 pages.
Chen et al., Spatio-temporal VEGF and PDGF delivery patterns blood vessel formation and maturation. Pharm Res. Feb. 2007;24(2):258-64.
Cheung et al., Engineered Materials for Cancer Immunotherapy. Nano Today. Aug. 1, 2015;10(4):511-531.
Cheung et al., Scaffolds that mimic antigen-presenting cells enable ex vivo expansion of primary T cells. Nat Biotechnol. Feb. 2018;36(2):160-169.
Chiang et al., Whole tumor antigen vaccines. Semin Immunol. Jun. 2010;22(3):132-43.

(56) References Cited

OTHER PUBLICATIONS

Choi et al., Facile synthesis of high quality mesoporous SBA-15 with enhanced control of the porous network connectivity and wall thickness. Chem Commun (Camb). Jun. 21, 2003;(12):1340-1.

Choi et al., In vitro mineralization by preosteoblasts in poly(DL-lactide-co-glycolide) inverse opal scaffolds reinforced with hydroxyapatite nanoparticles. Langmuir. Jul. 20, 2010;26(14):12126-31.

Choi et al., Three-dimensional scaffolds for tissue engineering: the importance of uniformity in pore size and structure. Langmuir. Dec. 21, 2010;26(24):19001-6.

Choi, Replacement Organs, Hot off the Press. New Scientist. 2003;177(2379):16.

Chou et al., Characterization of Photocross Linked Alginate Hydrogels for Nucleus Pulposus Cell Encapsulation. J Biomed Mater Res A. 2009;91A(1):187-194.

Chromiak et al., Bioreactor perfusion system for the long-term maintenance of tissue-engineered skeletal muscle organoids. In Vitro Cell Dev Biol Anim. Oct. 1998;34(9):694-703.

Clark et al., Myosin II and mechanotransduction: a balancing act. Trends Cell Biol. Apr. 2007;17(4):178-86.

Clauss et al., Interstitial transport of rabbit and sheep antibodies in normal and neoplastic tissues. Cancer Res. Jun. 15, 1990;50(12):3487-92.

ClinicalTrials.gov, NCT00729664, Multiple Ascending Dose (MDX1105-01) (Anti-PDL1). 4 pages, Sep. 3, 2015.

ClinicalTrials.gov, NCT00730639, A Phase 1 Study of Nivolumab (BMS-936558) in Subjects with Advanced or Recurrent Malignancies (MDX1106-03). 5 pages, Mar. 24, 2016.

ClinicalTrials.gov, NCT01352884, Study to Assess the Safety, and Pharmacokinetics of AMP-224 in Patients with Advanced Cancer. 3 pages, Sep. 2, 2016.

ClinicalTrials.gov, NCT01391143, Safety Study of MGA271 in Refractory Cancer. 4 pages, Sep. 28, 2016.

Cohen et al., Controlled delivery systems for proteins based on poly(lactic/glycolic acid) microspheres. Pharm Res. Jun. 1991;8(6):713-20.

Comisar et al., Engineering RGD nanopatterned hydrogels to control preosteoblast behavior: a combined computational and experimental approach. Biomaterials. Oct. 2007;28(30):4409-17.

Conboy et al., The regulation of Notch signaling controls satellite cell activation and cell fate determination in postnatal myogenesis. Dev Cell. Sep. 2002;3(3):397-409.

Conconi et al., In vitro and in vivo evaluation of acellular diaphragmatic matrices seeded with muscle precursors cells and coated with VEGF silica gels to repair muscle defect of the diaphragm. J Biomed Mater Res A. May 2009;89(2):304-16.

Conn et al., Purification of a glycoprotein vascular endothelial cell mitogen from a rat glioma-derived cell line. Proc Natl Acad Sci U S A. Feb. 1990;87(4):1323-7.

Cook et al., A sialomucopeptide liberated by trypsin from the human erythrocyte. Nature. Dec. 17, 1960;188:1011-2.

Cooper et al., Extended amplification in vitro and replicative senescence: key factors implicated in the success of human myoblast transplantation. Hum Gene Ther. Aug. 10, 2003;14(12):1169-79.

Cooper, A Genetic Pathogen Capture Technology for Sepsis Diagnosis. Submitted to the Department of Chemical Engineering in Partial Fulfillment of the Requirements for the Degree of Doctor of Philosophy in Medical and Engineering Physics at the Massachusetts Institute of Technology. 130 pages, May 1, 2013.

Cooper, Metabolic memory: implications for diabetic vascular complications. Pediatr Diabetes. Aug. 2009;10(5):343-6.

Corcione et al., CCL19 and CXCL12 trigger in vitro chemotaxis of human mantle cell lymphoma B cells. Clin Cancer Res. Feb. 1, 2004;10(3):964-71.

Cornelison et al., Single-cell analysis of regulatory gene expression in quiescent and activated mouse skeletal muscle satellite cells. Dev Biol. Nov. 15, 1997;191(2):270-83.

Cornelison et al., Syndecan-3 and syndecan-4 specifically mark skeletal muscle satellite cells and are implicated in satellite cell maintenance and muscle regeneration. Dev Biol. Nov. 1, 2001;239(1):79-94.

Coulson et al., Flow of Fluids through Granular Beds and Packed Columns. Chemical Engineering, vol. 2. Third Edition. Pergamon Press. Chapter 4, pp. 125-171, (1978).

Crameri et al., Improved green fluorescent protein by molecular evolution using DNA shuffling. Nat Biotechnol. Mar. 1996;14(3):315-9.

Cuda et al., In vitro actin filament sliding velocities produced by mixtures of different types of myosin. Biophys J. Apr. 1997;72(4):1767-79.

Cukierman et al., Taking cell-matrix adhesions to the third dimension. Science. Nov. 23, 2001;294(5547):1708-12.

Cullen et al., Investigation of vascular endothelial growth factor effects on pulmonary endothelial monolayer permeability and neutrophil transmigration. Gen Pharmacol. Sep. 2000;35(3):149-57.

Curiel et al., Tumor immunotherapy: inching toward the finish line. J Clin Invest. Feb. 2002;109(3):311-2.

Curran et al., PD-1 and CTLA-4 combination blockade expands infiltrating T cells and reduces regulatory T and myeloid cells within B16 melanoma tumors. Proc Natl Acad Sci U S A. Mar. 2, 2010;107(9):4275-80.

D'Amico et al., The early progenitors of mouse dendritic cells and plasmacytoid predendritic cells are within the bone marrow hemopoietic precursors expressing Flt3. J Exp Med. Jul. 21, 2003;198(2):293-303.

Dainiak et al., Gelatin-fibrinogen cryogel dermal matrices for wound repair: preparation, optimisation and in vitro study. Biomaterials. Jan. 2010;31(1):67-76.

Damle et al., Stimulation via the CD3 and CD28 molecules induces responsiveness to IL-4 in CD4+CD29+CD45R-memory T lymphocytes. J Immunol. Sep. 15, 1989;143(6):1761-7.

Dar et al., Optimization of cardiac cell seeding and distribution in 3D porous alginate scaffolds. Biotechnol Bioeng. Nov. 5, 2002;80(3):305-12.

Daro et al., Polyethylene glycol-modified GM-CSF expands CD11b(high)CD11c(high) but not CD11b(low)CD11c(high) murine dendritic cells in vivo: a comparative analysis with Flt3 ligand. J Immunol. Jul. 1, 2000;165(1):49-58.

David et al., The in vitro Desensitization of Sensitive Cells by Trypsin. J Exp Med. Dec. 1, 1964;120:1189-200.

Davies et al., Antibody-antigen complexes. Annu Rev Biochem. 1990;59:439-73.

De Jong et al., Regulation of Notch signaling genes during BMP2-induced differentiation of osteoblast precursor cells. Biochem Biophys Res Commun. Jul. 16, 2004;320(1):100-7.

De Temmerman et al., Particulate vaccines: on the quest for optimal delivery and immune response. Drug Discov Today. Jul. 2011;16(13-14):569-82.

Del Chiaro et al., Early detection and prevention of pancreatic cancer: is it really possible today? World J Gastroenterol. Sep. 14, 2014;20(34):12118-31.

Dembo et al., Stresses at the cell-to-substrate interface during locomotion of fibroblasts. Biophys J. Apr. 1999;76(4):2307-16.

Den Haan et al., CD8(+) but not CD8(-) dendritic cells cross-prime cytotoxic T cells in vivo. J Exp Med. Dec. 18, 2000;192(12):1685-96.

Dengler et al., Mesoporous silica-supported lipid bilayers (protocells) for DNA cargo delivery to the spinal cord. J Control Release. Jun. 10, 2013;168(2):209-24.

Dennis et al., Excitability and contractility of skeletal muscle engineered from primary cultures and cell lines. Am J Physiol Cell Physiol. Feb. 2001;280(2):C288-95.

Dennis et al., Excitability and isometric contractile properties of mammalian skeletal muscle constructs engineered in vitro. In Vitro Cell Dev Biol Anim. May 2000;36(5):327-35.

Deshmane et al., Monocyte chemoattractant protein-1 (MCP-1): an overview. J Interferon Cytokine Res. Jun. 2009;29(6):313-26.

Dexter et al., Conditions controlling the proliferation of haemopoietic stem cells in vitro. J Cell Physiol. Jun. 1977;91(3):335-44.

(56) References Cited

OTHER PUBLICATIONS

Diduch et al., Two cell lines from bone marrow that differ in terms of collagen synthesis, osteogenic characteristics, and matrix mineralization. J Bone Joint Surg Am. Jan. 1993;75(1):92-105.
Dieu et al., Selective recruitment of immature and mature dendritic cells by distinct chemokines expressed in different anatomic sites. J Exp Med. Jul. 20, 1998;188(2):373-86.
Diridollou et al., Skin ageing: changes of physical properties of human skin in vivo. Int J Cosmet Sci. Dec. 2001;23(6):353-62.
Discher et al., Tissue cells feel and respond to the stiffness of their substrate. Science. Nov. 18, 2005;310(5751):1139-43.
Disis et al., Granulocyte-macrophage colony-stimulating factor: an effective adjuvant for protein and peptide-based vaccines. Blood. Jul. 1, 1996;88(1):202-10.
Doan et al., Antigens and Receptors. Lippincott's Illustrated Reviews: Immunology. Wolters Kluwer/Lippincott Williams & Wilsons, Philadelphia. Chapter 12, pp. 11-23, (2008).
Doan et al., Subcellular localization of a sporulation membrane protein is achieved through a network of interactions along and across the septum. Mol Microbiol. Mar. 2005;55(6):1767-81.
Donati et al., New hypothesis on the role of alternating sequences in calcium-alginate gels. Biomacromolecules. Mar.-Apr. 2005;6(2):1031-40.
Dong et al., Antitumor effect of secreted Flt3-ligand can act at distant tumor sites in a murine model of head and neck cancer. Cancer Gene Ther. Feb. 2003;10(2):96-104.
Dor et al., Making vascular networks in the adult: branching morphogenesis without a roadmap. Trends Cell Biol. Mar. 2003;13(3):131-6.
Douay et al., Ex vivo production of human red blood cells from hematopoietic stem cells: what is the future in transfusion? Transfus Med Rev. Apr. 2007;21(2):91-100.
Dranoff et al., Vaccination with irradiated tumor cells engineered to secrete murine granulocyte-macrophage colony-stimulating factor stimulates potent, specific, and long-lasting anti-tumor immunity. Proc Natl Acad Sci U S A. Apr. 15, 1993;90(8):3539-43.
Dranoff, Cytokines in cancer pathogenesis and cancer therapy. Nat Rev Cancer. Jan. 2004;4(1):11-22.
Dranoff, GM-CSF-based cancer vaccines. Immunol Rev. Oct. 2002;188:147-54.
Drury et al., Hydrogels for tissue engineering: scaffold design variables and applications. Biomaterials. Nov. 2003;24(24):4337-51.
Dudley et al. Adoptive cell transfer therapy following non-myeloablative but lymphodepleting chemotherapy for the treatment of patients with refractory metastatic melanoma. J Clin Oncol. Apr. 1, 2005;23(10):2346-57.
Dudley et al., CD8+ enriched "young" tumor infiltrating lymphocytes can mediate regression of metastatic melanoma. Clin Cancer Res. Dec. 15, 2010;16(24):6122-31.
Dufort et al., Balancing forces: architectural control of mechanotransduction. Nat Rev Mol Cell Biol. May 2011;12(5):308-19.
Dupont et al., Role of YAP/TAZ in mechanotransduction. Nature. Jun. 8, 2011;474(7350):179-83.
Duraiswamy et al., Dual blockade of PD-1 and CTLA-4 combined with tumor vaccine effectively restores T-cell rejection function in tumors—response. Cancer Res. Jan. 15, 2014;74(2):633-4.
Duraiswamy et al., Dual blockade of PD-1 and CTLA-4 combined with tumor vaccine effectively restores T-cell rejection function in tumors. Cancer Res. Jun. 15, 2013;73(12):3591-603.
Edwards et al., Evaluation of biomechanical properties of human skin. Clin Dermatol. Jul.-Aug. 1995;13(4):375-80.
Egea et al., Role of secreted glyceraldehyde-3-phosphate dehydrogenase in the infection mechanism of enterohemorrhagic and enteropathogenic *Escherichia coli*: interaction of the extracellular enzyme with human plasminogen and fibrinogen. Int J Biochem Cell Biol. 2007;39(6):1190-203.
Eggermont et al., Towards efficient cancer immunotherapy: advances in developing artificial antigen-presenting cells. Trends Biotechnol. Sep. 2014;32(9):456-65.
Egholm et al., Peptide Nucleic Acids (PNA). Oligonucleotide Analogues with an Achiral Peptide Backbone. J Am Chem Soc. 1992;114(5):1895-1897.
Egholm et al., PNA hybridizes to complementary oligonucleotides obeying the Watson-Crick hydrogen-bonding rules. Nature. Oct. 7, 1993;365(6446):566-8.
Ehrbar et al., Endothelial cell proliferation and progenitor maturation by fibrin-bound VEGF variants with differential susceptibilities to local cellular activity. J Control Release. Jan. 3, 2005;101(1-3):93-109.
Eiselt et al., Porous carriers for biomedical applications based on alginate hydrogels. Biomaterials. Oct. 2000;21(19):1921-7.
El-Backly et al., Regeneration of dentine/pulp-like tissue using a dental pulp stem cell/poly(lactic-co-glycolic) acid scaffold construct in New Zealand white rabbits. Aust Endod J. Aug. 2008;34(2):52-67.
El-Behi et al., The encephalitogenicity of T(H) 17 cells is dependent on IL-1- and IL-23-induced production of the cytokine GM-CSF. Nat Immunol. Jun. 2011; 12(6):568-75.
Eldar et al., Elucidating mechanisms underlying robustness of morphogen gradients. Curr Opin Genet Dev. Aug. 2004;14(4):435-9.
Eldar et al., Robustness of the BMP morphogen gradient in *Drosophila* embryonic patterning. Nature. Sep. 19, 2002;419(6904):304-8.
Eldar et al., Self-enhanced ligand degradation underlies robustness of morphogen gradients. Dev Cell. Oct. 2003;5(4):635-46.
Eming et al., Inflammation in wound repair: molecular and cellular mechanisms. J Invest Dermatol. Mar. 2007;127(3):514-25.
Engler et al., Matrix elasticity directs stem cell lineage specification. Cell. Aug. 25, 2006;126(4):677-89.
Engler et al., Microtissue elasticity: measurements by atomic force microscopy and its influence on cell differentiation. Methods Cell Biol. 2007;83:521-45.
Engler et al., Substrate compliance versus ligand density in cell on gel responses. Biophys J. Jan. 2004;86(1 Pt 1):617-28.
Ennett et al., Temporally regulated delivery of VEGF in vitro and in vivo. J Biomed Mater Res A. Oct. 2006;79(1):176-84.
Ennett, Temporal Delivery of Multiple Growth Factors from Polymer Scaffolds to Enhance Neovascularization. A dissertation submitted in partial fulfillment of the requirements for the degree of Doctor of Philosophy (Biomedical Engineering) in the University of Michigan. 186 pages, (2004).
Exposito et al., The fibrillar collagen family. Int J Mol Sci. Jan. 28, 2010;11(2):407-26.
Fadel et al., A carbon nanotube-polymer composite for T-cell therapy. Nat Nanotechnol. Aug. 2014;9(8):639-47.
Fadel et al., Enhanced cellular activation with single walled carbon nanotube bundles presenting antibody stimuli. Nano Lett. Jul. 2008;8(7):2070-6.
Faissner et al., Boundaries and inhibitory molecules in developing neural tissues. Glia. Apr. 1995;13(4):233-54.
Falanga, Wound healing and its impairment in the diabetic foot. Lancet. Nov. 12, 2005;366(9498):1736-43.
Falsey et al., Peptide and small molecule microarray for high throughput cell adhesion and functional assays. Bioconjug Chem. May-Jun. 2001;12(3):346-53.
Farrar et al., T helper subset development: roles of instruction, selection, and transcription. J Clin Invest. Feb. 2002;109(4):431-5.
Fauquemberque et al., HLA-A*0201-restricted CEA-derived peptide CAP1 is not a suitable target for T-cell-based immunotherapy. J Immunother. May 2010;33(4):402-13.
Ferrara et al., Angiogenesis as a therapeutic target. Nature. Dec. 15, 2005;438(7070):967-74.
Ferrara et al., Discovery and development of bevacizumab, an anti-VEGF antibody for treating cancer. Nat Rev Drug Discov. May 2004;3(5):391-400.
Fesnak et al., Engineered T cells: the promise and challenges of cancer immunotherapy. Nat Rev Cancer. Aug. 23, 2016;16(9):566-81.
Fischbach et al., Polymeric Systems for Bioinspired Delivery of Angiogenic Molecules. Adv Polym Sci. 2006;203:191-221.

(56) References Cited

OTHER PUBLICATIONS

Fischer et al., A brilliant monomeric red fluorescent protein to visualize cytoskeleton dynamics in Dictyostelium. FEBS Lett. Nov. 5, 2004;577(1-2):227-32.
Fischer et al., Visualizing cytoskeleton dynamics in mammalian cells using a humanized variant of monomeric red fluorescent protein. FEBS Lett. May 1, 2006;580(10):2495-502.
Fisher et al., The study of protein mechanics with the atomic force microscope. Trends Biochem Sci. Oct. 1999;24(10):379-84.
Folkman, Angiogenesis. Annu Rev Med. 2006;57:1-18.
Fonseca et al., Capitalizing on the immunogenicity of dying tumor cells. Clin Cancer Res. Mar. 15, 2008;14(6):1603-8.
Fontaine et al., Surgical treatment of peripheral circulation disorders. Helv Chir Acta. Dec. 1954;21(5-6):499-533.
Fox, Management of worsening multiple sclerosis with mitoxantrone: a review. Clin Ther. Apr. 2006;28(4):461-74.
Fransen et al., Local immunomodulation for cancer therapy: Providing treatment where needed. Oncoimmunology. Nov. 1, 2013;2(11):e26493.
Friedenstein et al., Fibroblast precursors in normal and irradiated mouse hematopoietic organs. Exp Hematol. Sep. 1976;4(5):267-74.
Friedrich et al., Promoter traps in embryonic stem cells: a genetic screen to identify and mutate developmental genes in mice. Genes Dev. Sep. 1991;5(9):1513-23.
Fukushima et al., The use of an antifibrosis agent to improve muscle recovery after laceration. Am J Sports Med. Jul.-Aug. 2001;29(4):394-402.
Furdui et al., Immunomagnetic T cell capture from blood for PCR analysis using microfluidic systems. Lab Chip. Dec. 2004;4(6):614-8.
Furqan et al., STAT inhibitors for cancer therapy. J Hematol Oncol. Dec. 5, 2013;6:90. 11 pages.
Gamvrellis et al., Vaccines that facilitate antigen entry into dendritic cells. Immunol Cell Biol. Oct. 2004;82(5):506-16.
Gao et al., Immune cell recruitment and cell-based system for cancer therapy. Pharm Res. Apr. 2008;25(4):752-68.
Gardel et al., Traction stress in focal adhesions correlates biphasically with actin retrograde flow speed. J Cell Biol. Dec. 15, 2008;183(6):999-1005.
Garlie et al., T cells coactivated with immobilized anti-CD3 and anti-CD28 as potential immunotherapy for cancer. J Immunother. Jul. 1999;22(4):336-45.
Gasic et al., Removal and regeneration of the cell coating in tumour cells. Nature. Oct. 13, 1962;196:170.
Gauthier et al., Temporary increase in plasma membrane tension coordinates the activation of exocytosis and contraction during cell spreading. Proc Natl Acad Sci U S A. Aug. 30, 2011;108(35):14467-72.
Geerligs et al., Linear viscoelastic behavior of subcutaneous adipose tissue. Biorheology. 2008;45(6):677-88.
GenBank Accession No. 000082.2, May 10, 2014.
GenBank Accession No. 000091.4, May 10, 2014.
GenBank Accession No. 000230.2, Dec. 17, 2012.
GenBank Accession No. 000514.3, Aug. 19, 2012.
GenBank Accession No. 000572.2, May 18, 2014.
GenBank Accession No. 000601.4, Nov. 25, 2012.
GenBank Accession No. 000614.3, Sep. 9, 2012.
GenBank Accession No. 000629.3, May 4, 2014.
GenBank Accession No. 000638.3, May 4, 2014.
GenBank Accession No. 000660.4, Dec. 9, 2012.
GenBank Accession No. 000749.2, May 4, 2014.
GenBank Accession No. 000758.3, May 4, 2014.
GenBank Accession No. 000800.3, Mar. 4, 2012.
GenBank Accession No. 000876.3, Apr. 13, 2014.
GenBank Accession No. 000885.4, Apr. 13, 2014.
GenBank Accession No. 000954.1, Jun. 13, 2014.
GenBank Accession No. 000963.3, Jun. 13, 2014.
GenBank Accession No. 001001522.1, May 18, 2014.
GenBank Accession No. 001096124.1, Dec. 16, 2012.
GenBank Accession No. 001102654.1, Dec. 16, 2012.
GenBank Accession No. 001111283.1, Dec. 9, 2012.
GenBank Accession No. 001171630.1, Dec. 9, 2012.
GenBank Accession No. 001202.3, Nov. 18, 2012.
GenBank Accession No. 001836.2, May 3, 2014.
GenBank Accession No. 001845.4, May 3, 2014.
GenBank Accession No. 001892.1, May 18, 2014.
GenBank Accession No. 001901.2, May 18, 2014.
GenBank Accession No. 002010.2, Dec. 9, 2012.
GenBank Accession No. 002421.3, May 11, 2014.
GenBank Accession No. 002506.2, Dec. 9, 2012.
GenBank Accession No. 002632.4, May 4, 2011.
GenBank Accession No. 002973.1, May 3, 2014.
GenBank Accession No. 002982.3, May 3, 2014.
GenBank Accession No. 003236.2, Aug. 21, 2011.
GenBank Accession No. 003239.2, Feb. 18, 2014.
GenBank Accession No. 003254.2, Jan. 5, 2013.
GenBank Accession No. 003255.2, Jan. 6, 2013.
GenBank Accession No. 003259.2, Nov. 25, 2012.
GenBank Accession No. 003263.3, Jan. 5, 2013.
GenBank Accession No. 003264.3, Jan. 6, 2013.
GenBank Accession No. 003268.5, Nov. 25, 2012.
GenBank Accession No. 003368.1, May 5, 2014.
GenBank Accession No. 003377.4, May 5, 2014.
GenBank Accession No. 003383.2, May 5, 2014.
GenBank Accession No. 003392.4, May 5, 2014.
GenBank Accession No. 004460.1, May 25, 2014.
GenBank Accession No. 004469.4, May 25, 2014.
GenBank Accession No. 005420.1, May 11, 2014.
GenBank Accession No. 005429.3, Mar. 31, 2014.
GenBank Accession No. 006059.2, Oct. 28, 2012.
GenBank Accession No. 006068.4, Oct. 28, 2012.
GenBank Accession No. 015719.3, Feb. 26, 2014.
GenBank Accession No. 016562.3, Jan. 6, 2013.
GenBank Accession No. 030956.3, Oct. 28, 2012.
GenBank Accession No. 033023.4, Nov. 18, 2012.
GenBank Accession No. 056534.2, Feb. 26, 2014.
GenBank Accession No. 057646.1, Jan. 6, 2013.
GenBank Accession No. 112218.2, Oct. 28, 2012.
GenBank Accession No. 138554.4, Dec. 29, 2012.
GenBank Accession No. 138636.4, Dec. 23, 2012.
GenBank Accession No. 170731.4, Dec. 9, 2012.
GenBank Accession No. 205819.3, Dec. 6, 2012.
GenBank Accession No. 205820.1, Jan. 5, 2013.
GenBank Accession No. 205823.2, Jan. 6, 2013.
GenBank Accession No. 570912.2, Nov. 18, 2012.
GenBank Accession No. 612564.1, Dec. 29, 2012.
GenBank Accession No. 619542.1, Dec. 23, 2012.
GenBank Accession No. 991388.2, Dec. 6, 2012.
GenBank Accession No. 991389.1, Jan. 5, 2013.
GenBank Accession No. 991392.1, Jan. 6, 2013.
GenBank Accession No. A32848.1, Jul. 5, 2002.
GenBank Accession No. AAA35789.1, Apr. 27, 1993.
GenBank Accession No. AAA36738.1, Aug. 3, 1993.
GenBank Accession No. AAA56738.1, Dec. 7, 1994.
GenBank Accession No. AAA60022.1, Jan. 7, 1995.
GenBank Accession No. AAA60552.1, Nov. 24, 2003.
GenBank Accession No. AAA64239.1, Mar. 23, 1995.
GenBank Accession No. AAA64297.1, Mar. 24, 1995.
GenBank Accession No. AAB18786.3, Jul. 12, 1999.
GenBank Accession No. AAB21432.2, Jun. 5, 2000.
GenBank Accession No. AAB29057.2, Mar. 6, 2001.
GenBank Accession No. AAB31818.1, Jan. 25, 1995.
GenBank Accession No. AAC16450.1, May 15, 1998.
GenBank Accession No. AAH07789.1, Jun. 9, 2008.
GenBank Accession No. AAH32517.2, Jun. 9, 2008.
GenBank Accession No. AAH93731.1, Jul. 17, 2006.
GenBank Accession No. AAH94877.1, May 20, 2005.
GenBank Accession No. AAI44040, Mar. 18, 2009.
GenBank Accession No. ABC86910, Jan. 3, 2011.
GenBank Accession No. AEO22039.1, Sep. 17, 2011.
GenBank Accession No. AF344424.1, Apr. 8, 2002.
GenBank Accession No. AF414120.1, Sep. 26, 2001.
GenBank Accession No. AF450242.1, Feb. 11, 2002.

(56) References Cited

OTHER PUBLICATIONS

GenBank Accession No. AJ583695.1, Oct. 7, 2008.
GenBank Accession No. AY291313.1, Apr. 26, 2004.
GenBank Accession No. BC094887.1, Jul. 21, 2006.
GenBank Accession No. CAA01954.1, Jun. 15, 1995.
GenBank Accession No. CAA01955.1, Nov. 14, 2006.
GenBank Accession No. CAA40093.1, Oct. 7, 2008.
GenBank Accession No. CAA62632.1, Sep. 15, 1995.
GenBank Accession No. CAG29322.1, Oct. 16, 2008.
GenBank Accession No. CAG33149.1, Oct. 21, 2008.
GenBank Accession No. CAG46721.1, Jun. 29, 2004.
GenBank Accession No. CBI71013.1, Feb. 2, 2010.
GenBank Accession No. DQ103757.1, Jul. 25, 2005.
GenBank Accession No. EF064765.1, Nov. 13, 2006.
GenBank Accession No. EU826563.1, Jul. 23, 2008.
GenBank Accession No. JN602184.1, Sep. 17, 2011.
GenBank Accession No. M16006.1, Jan. 7, 1995.
GenBank Accession No. M24902.1, Jan. 7, 1995.
GenBank Accession No. M73239.1, Mar. 23, 1995.
GenBank Accession No. U76381.2, Jul. 12, 1999.
Genes et al., Effect of substrate mechanics on chondrocyte adhesion to modified alginate surfaces. Arch Biochem Biophys. Feb. 15, 2004;422(2):161-7.
Gerhardt et al., VEGF guides angiogenic sprouting utilizing endothelial tip cell filopodia. J Cell Biol. Jun. 23, 2003;161(6):1163-77.
Gilboa, DC-based cancer vaccines. J Clin Invest. May 2007;117(5):1195-203.
Gimmi et al., B-cell surface antigen B7 provides a costimulatory signal that induces T cells to proliferate and secrete interleukin 2. Proc Natl Acad Sci U S A. Aug. 1, 1991;88(15):6575-9.
Glasbey et al., Image Analysis and Three-Dimensional Modelling of Pores in Soil Aggregates. Eur J Soil Sci. Sep. 1991;42(3):479-486.
Gnjatic et al., Toll-like receptor agonists: are they good adjuvants? Cancer J. Jul.-Aug. 2010;16(4):382-91.
Godbey et al. Tracking the intracellular path of poly(ethylenimine)/DNA complexes for gene delivery. Proc Natl Acad Sci U S A. Apr. 27, 1999;96(9):5177-81.
Goddard et al., Polymer surface modification for the attachment of bioactive compounds. Progress in Polymer Science. Jul. 2007;32(7):698-725.
Gospodarowicz et al., Effect of fibroblast growth factor on the division and fusion of bovine myoblasts. J Cell Biol. Aug. 1976;70(2 pt 1):395-405.
Grabowska et al., Systemic in vivo delivery of siRNA to tumours using combination of polyethyleneimine and transferrin-polyethyleneimine conjugates. Biomater Sci. Nov. 2015;3(11):1439-48.
Graessley, Entangled Linear, Branched and Network Polymer Systems - Molecular Theories. Adv Poly Sci. 1982;47:67-117.
Griffith et al., Tissue engineering—current challenges and expanding opportunities. Science. Feb. 8, 2002;295(5557):1009-14.
Grimmer et al., Tracheal reconstruction using tissue-engineered cartilage. Arch Otolaryngol Head Neck Surg. Oct. 2004;130(10):1191-6.
Gros et al., A common somitic origin for embryonic muscle progenitors and satellite cells. Nature. Jun. 16, 2005;435(7044):954-8.
Guillaume et al., Two abundant proteasome subtypes that uniquely process some antigens presented by HLA class I molecules. Proc Natl Acad Sci U S A. Oct. 26, 2010;107(43):18599-604.
Gullberg et al., Extracellular matrix and its receptors during development. Int J Dev Biol. Oct. 1995;39(5):845-54.
Guo et al., Droplet microfluidics for high-throughput biological assays. Lab Chip. Jun. 21, 2012;12(12):2146-55.
Gupta et al., Magnetically controlled targeted micro-carrier systems. Life Sci. 1989;44(3):175-86.
Gurkan et al., The mechanical environment of bone marrow: a review. Ann Biomed Eng. Dec. 2008;36(12):1978-91.
Gussoni et al., Dystrophin expression in the mdx mouse restored by stem cell transplantation. Nature. Sep. 23, 1999;401(6751):390-4.
Halim et al., Biologic and synthetic skin substitutes: An overview. Indian J Plast Surg. Sep. 2010;43(Suppl):S23-8.
Hamby et al., Small molecule inhibitors of tumor-promoted angiogenesis, including protein tyrosine kinase inhibitors. Pharmacol Ther. May-Jun. 1999;82(2-3):169-93.
Hamdy et al., Targeting dendritic cells with nano-particulate PLGA cancer vaccine formulations. Adv Drug Deliv Rev. Sep. 10, 2011;63(10-11):943-55.
Hamilton et al., GM-CSF Biology. Growth Factors. Dec. 2004;22(4):225-31.
Hamilton, GM-CSF in inflammation and autoimmunity. Trends Immunol. Aug. 2002;23(8):403-8.
Han et al., Synthesis of rod-like mesoporous silica using mixed surfactants of cetyltrimethylammonium bromide and cetyltrimethylammonium chloride as templates. Materials Letters. 2003;57:4520-4.
Hanada, Efficacy of rehabilitative therapy in regional musculoskeletal conditions. Best Pract Res Clin Rheumatol. Feb. 2003;17(1):151-66.
Hansen et al., Comparison of clinical grade type 1 polarized and standard matured dendritic cells for cancer immunotherapy. Vaccine. Jan. 11, 2013;31(4):639-46.
Hansen et al., Integrin binding and cell spreading on extracellular matrix act at different points in the cell cycle to promote hepatocyte growth. Mol Biol Cell. Sep. 1994;5(9):967-75.
Harding et al., CD28-mediated signalling co-stimulates murine T cells and prevents induction of anergy in T-cell clones. Nature. Apr. 16, 1992;356(6370):607-9.
Harris et al., Open pore biodegradable matrices formed with gas foaming. J Biomed Mater Res. Dec. 5, 1998;42(3):396-402.
Harrison, What is the status of reaction-diffusion theory thirty-four years after turing? J Theor Biol. Apr. 21, 1987;125(4):369-84.
Hartgerink et al., Peptide-amphiphile nanofibers: a versatile scaffold for the preparation of self-assembling materials. Proc Natl Acad Sci U S A. Apr. 16, 2002;99(8):5133-8.
Hartmann et al., CpG DNA: a potent signal for growth, activation, and maturation of human dendritic cells. Proc Natl Acad Sci U S A. Aug. 3, 1999;96(16):9305-10.
Hasan et al., Artificial Antigen Presenting Cells: An off the Shelf Approach for Generation of Desirable T-Cell Populations for Broad Application of Adoptive Immunotherapy. Advancements in Genetic Engineering. 2015;4(3):1-10.
Hashimoto et al., Development of alginate wound dressings linked with hybrid peptides derived from laminin and elastin. Biomaterials. Mar.-Apr. 2004;25(7-8):1407-14.
Haso et al., Anti-CD22-chimeric antigen receptors targeting B-cell precursor acute lymphoblastic leukemia. Blood. Feb. 14, 2013;121(7):1165-74.
Hawke et al., Myogenic satellite cells: physiology to molecular biology. J Appl Physiol (1985). Aug. 2001;91(2):534-51.
Heath, Cells for tissue engineering. Trends Biotechnol. Jan. 2000;18(1):17-9.
Helm et al., Synergy between interstitial flow and VEGF directs capillary morphogenesis in vitro through a gradient amplification mechanism. Proc Natl Acad Sci U S A. Nov. 1, 2005;102(44):15779-84.
Henry et al., VIVA Investigators. The VIVA trial: Vascular endothelial growth factor in Ischemia for Vascular Angiogenesis. Circulation. Mar. 18, 2003;107(10):1359-65.
Hermanson, Bioconjugate Techniques. Academic Press, New York. pp. 152-186, (1996).
Heslop et al., Transplanted primary neonatal myoblasts can give rise to functional satellite cells as identified using the Myf5nlacZl+ mouse. Gene Ther. May 2001;8(10):778-83.
Hildner et al., Batf3 deficiency reveals a critical role for CD8alpha+ dendritic cells in cytotoxic T cell immunity. Science. Nov. 14, 2008;322(5904):1097-100.
Hill et al., Designing scaffolds to enhance transplanted myoblast survival and migration. Tissue Eng. May 2006;12(5):1295-304.
Hill et al., Muscle satellite (stem) cell activation during local tissue injury and repair. J Anat. Jul. 2003;203(1):89-99.
Hill, Macroporous Scaffold Architecture, Peptide, HGF/FGF and Myoblast Incorporation Enhance Myogenesis. IADR/AADR/CADR 83rd General Session. Mar. 9-12, 2005. Poster #2829.

(56) References Cited

OTHER PUBLICATIONS

Hirano et al., Peptide and Protein Presenting Materials for Tissue Engineering. Adv Mat. Jan. 16, 2004;16(1):17-25.
Hodge-Dufour et al., Inhibition of interferon gamma induced interleukin 12 production: a potential mechanism for the anti-inflammatory activities of tumor necrosis factor. Proc Natl Acad Sci U S A. Nov. 10, 1998;95(23):13806-11.
Hodi et al., Immunologic and clinical effects of antibody blockade of cytotoxic T lymphocyte-associated antigen 4 in previously vaccinated cancer patients. Proc Natl Acad Sci U S A. Feb. 26, 2008;105(8):3005-10.
Hodi et al., Improved survival with ipilimumab in patients with metastatic melanoma. N Engl J Med. Aug. 19, 2010;363(8):711-23.
Holland et al., Dual growth factor delivery from degradable oligo(poly(ethylene glycol) fumarate) hydrogel scaffolds for cartilage tissue engineering. Journal of Controlled Release. 2005;101:111-125.
Holland et al., Transforming growth factor-beta 1 release from oligo(poly(ethylene glycol) fumarate) hydrogels in conditions that model the cartilage wound healing environment. J Control Release. Jan. 8, 2004;94(1):101-14.
Hollyman et al., Manufacturing validation of biologically functional T cells targeted to CD19 antigen for autologous adoptive cell therapy. J Immunother. Feb.-Mar. 2009;32(2):169-80.
Horsley et al., IL-4 acts as a myoblast recruitment factor during mammalian muscle growth. Cell. May 16, 2003;113(4):483-94.
Hsiong et al., Differentiation stage alters matrix control of stem cells. J Biomed Mater Res A. Apr. 2008;85A(1):145-56.
Huang et al., Fabrication and in vitro Testing of Polymeric Delivery Systems for Condensed DNA. J Biomed Mater Res. 2003;67:1384-1392.
Huang et al., Long-Term In Vivo Gene Expression via Delivery of PEI-DNA Condensates From Porous Polymer Scaffolds. Hum Gene Ther. 2005;16(5):609-617.
Hubbell et al., Materials Engineering for Immunomodulation. Nature. 2009;462:449-460.
Hubbell, Biomaterials in tissue engineering. Biotechnology (N Y). Jun. 1995;13(6):565-76.
Huebsch et al., Harnessing traction-mediated manipulation of the cell/matrix interface to control stem-cell fate. Nat Mater. Jun. 2010;9(6):518-26.
Humphries et al., Integrin ligands at a glance. J Cell Sci. Oct. 1, 2006;119(Pt 19):3901-3.
Huppa et al., T-cell-antigen recognition and the immunological synapse. Nat Rev Immunol. Dec. 2003;3(12):973-83.
Huston et al., Protein engineering of antibody binding sites: recovery of specific activity in an anti-digoxin single-chain Fv analogue produced in *Escherichia coli*. Proc Natl Acad Sci U S A. Aug. 1988;85(16):5879-83.
Hutson et al., Synthesis and characterization of tunable poly(ethylene glycol): gelatin methacrylate composite hydrogels. Tissue Eng Part A. Jul. 2011;17(13-14):1713-23.
Hwang et al., Fabrication of three-dimensional porous cell-laden hydrogel for tissue engineering. Biofabrication. Sep. 2010;2(3):035003. 12 pages.
Ichida et al., A small-molecule inhibitor of tgf-Beta signaling replaces sox2 in reprogramming by inducing nanog. Cell Stem Cell. Nov. 6, 2009;5(5):491-503.
Iellem et al., Unique chemotactic response profile and specific expression of chemokine receptors CCR4 and CCR8 by CD4(+)CD25(+) regulatory T cells. J Exp Med. Sep. 17, 2001;194(6):847-53.
Ihnat et al., Hypothesis: the 'metabolic memory', the new challenge of diabetes. Diabet Med. Jun. 2007;24(6):582-6.
Ii et al., A novel cyclohexene derivative, ethyl (6R)-6-[N-(2-Chloro-4-fluorophenyl)sulfamoyl]cyclohex-1-ene-1-carboxylate (TAK-242), selectively inhibits toll-like receptor 4-mediated cytokine production through suppression of intracellular signaling. Mol Pharmacol. Apr. 2006;69(4):1288-95.

Irintchev et al., Formation of Skeletal Muscle After Subcutaneous Implantation of Cultured Myoblasts. Bio/Technology. p. 366, Abstract 153.06, Jun. 1995.
Irvine et al., Engineering synthetic vaccines using cues from natural immunity. Nat Mater. Nov. 2013;12(11):978-90.
Isern et al., Self-renewing human bone marrow mesenspheres promote hematopoietic stem cell expansion. Cell Rep. May 30, 2013;3(5):1714-24.
Ishihara et al., Roles of bradykinin in vascular permeability and angiogenesis in solid tumor. Int Immunopharmacol. Mar. 2002;2(4):499-509.
Iwamoto et al., Preparation of an Ionic Polymer Gel Microactuator and Measurement of its Periodic Motions. Nippon Kagaku Kaishi. 1997;9:609-614.
Jain et al., Macroporous interpenetrating cryogel network of poly(acrylonitrile) and gelatin for biomedical applications. J Mater Sci Mater Med. Dec. 2009;20 Suppl 1:S173-9.
Jain, Molecular Regeneration of Vessel Maturation. Nat Med. Jun. 1, 2003;9:685-693.
Jain, The manufacturing techniques of various drug loaded biodegradable poly(lactide-co-glycolide) (PLGA) devices. Biomaterials. Dec. 2000;21(23):2475-90.
Jankovic et al., In the absence of IL-12, CD4(+) T cell responses to intracellular pathogens fail to default to a Th2 pattern and are host protective in an IL-10(−/−) setting. Immunity. Mar. 2002;16(3):429-39.
Janmey et al., From tissue mechanics to transcription factors. Differentiation. Oct. 2013;86(3):112-20.
Jego et al., Plasmacytoid dendritic cells induce plasma cell differentiation through type I interferon and interleukin 6. Immunity. Aug. 2003;19(2):225-34.
Jiang et al. Two-piconewton slip bond between fibronectin and the cytoskeleton depends on talin. Nature. Jul. 17, 2003;424(6946):334-7.
Jiang et al., Click hydrogels, microgels and nanogels: emerging platforms for drug delivery and tissue engineering. Biomaterials. Jun. 2014;35(18):4969-85.
Jiang et al., Self-organization of periodic patterns by dissociated feather mesenchymal cells and the regulation of size, number and spacing of primordia. Development. Nov. 1999;126(22):4997-5009.
Jiang, Application of polymers in nucleic acid delivery. Thesis in partial fulfillment of the requirements for the Doctor of Philosophy degree in Pharmacy in the Graduate College of the University of Iowa. 138 pages, Dec. 2011.
Jinushi et al., Enhancing the clinical activity of granulocyte-macrophage colony-stimulating factor-secreting tumor cell vaccines. Immunol Rev. Apr. 2008;222:287-98.
Jinushi et al., MFG-E8-mediated uptake of apoptotic cells by APCs links the pro- and antiinflammatory activities of GM-CSF. J Clin Invest. Jul. 2007;117(7):1902-13.
Johansson, Controlling the Pore Size and Morphology of Mesoporous Silica. Linköping Studies in Science and Technology Licentiate Thesis No. 1451, 53 pages, (2010).
John et al., Passive and active mechanisms trap activated CD8+ T cells in the liver. J Immunol. May 1, 2004;172(9):5222-9.
Johnson et al., Activation of skeletal muscle satellite cells and the role of fibroblast growth factor receptors. Exp Cell Res. Aug. 1995;219(2):449-53.
Jokinen et al., Integrin-mediated cell adhesion to type I collagen fibrils. J Biol Chem. Jul. 23, 2004;279(30):31956-63.
Jugdutt et al., Aging and defective healing, adverse remodeling, and blunted post-conditioning in the reperfused wounded heart. J Am Coll Cardiol. Apr. 8, 2008;51(14):1399-403.
June et al., Adoptive cellular therapy: a race to the finish line. Sci Transl Med. Mar. 25, 2015;7(280):280ps7.
June et al., The B7 and CD28 receptor families. Immunol Today. Jul. 1994;15(7):321-31.
Juntanon et al., Electrically controlled release of sulfosalicylic acid from crosslinked poly(vinyl alcohol) hydrogel. Int J Pharm. May 22, 2008;356(1-2):1-11.
Kang et al., Effect of Porous Structure on the Degradation of Freeze-Dried Gelatin Hydrogels. J Bioact Compat Poly. Jul. 1, 1999;14(4):331-343.

(56) References Cited

OTHER PUBLICATIONS

Kanzler et al., Therapeutic targeting of innate immunity with Toll-like receptor agonists and antagonists. Nat Med. May 2007;13(5):552-9.
Kared et al., Treatment with granulocyte colony-stimulating factor prevents diabetes in NOD mice by recruiting plasmacytoid dendritic cells and functional CD4(+)CD25(+) regulatory T-cells. Diabetes. Jan. 2005;54(1):78-84.
Katayama et al., Integrated analysis of the genome and the transcriptome by FANTOM. Brief Bioinform. Sep. 2004;5(3):249-58.
Kathuria et al., Synthesis and characterization of elastic and macroporous chitosan-gelatin cryogels for tissue engineering. Acta Biomater. Jan. 2009;5(1):406-18.
Kawai et al., Innate immune recognition of viral infection. Nat Immunol. Feb. 2006;7(2):131-7.
Kawasaki, Molecular mechanisms of the development of insulitis and beta-cell damage in type 1 diabetes. Japanese Journal of Clinical Medicine. 2008;66(Suppl. 3):348-53.
Kawashima et al., Pulmonary delivery of insulin with nebulized DL-lactide/glycolide copolymer (PLGA) nanospheres to prolong hypoglycemic effect. J Control Release. Nov. 1, 1999;62(1-2):279-87.
Kearney et al., Macroscale delivery systems for molecular and cellular payloads. Nat Mater. Nov. 2013;12(11):1004-17.
Kennedy et al., Rapid and extensive collapse from electrically responsive macroporous hydrogels. Adv Healthc Mater. Apr. 2014;3(4):500-7.
Khetan et al., Degradation-mediated cellular traction directs stem cell fate in covalently crosslinked three-dimensional hydrogels. Nat Mater. May 2013;12(5):458-65.
Khownium et al., Novel endotoxin-sequestering compounds with terephthalaldehyde-bis-guanylhydrazone scaffolds. Bioorg Med Chem Lett. Mar. 1, 2006;16(5):1305-8.
Kim et al., An overview of cartilage tissue engineering. Yonsei Med J. Dec. 2000;41(6):766-73.
Kim et al., Galectin-3 binding protein promotes cell motility in colon cancer by stimulating the shedding of protein tyrosine phosphatase kappa by proprotein convertase 5. Biochem Biophys Res Commun. Jan. 7, 2011;404(1):96-102.
Kim et al., Injectable, spontaneously assembling, inorganic scaffolds modulate immune cells in vivo and increase vaccine efficacy. Nat Biotechnol. Jan. 2015;33(1):64-72.
Kim et al., Multifunctional capsule-in-capsules for immunoprotection and trimodal imaging. Angew Chem Int Ed Engl. Mar. 1, 2011;50(10):2317-21.
Kim et al., The effect of VEGF on the myogenic differentiation of adipose tissue derived stem cells within thermosensitive hydrogel matrices. Biomaterials. Feb. 2010;31(6):1213-8.
Kinoshita et al., Successive injections in mdx mice of myoblasts grown with bFGF. Neuromuscul Disord. May 1996;6(3):187-93.
Kisak et al. The vesosome—a multicompartment drug delivery vehicle. Curr Med Chem. Jan. 2004;11(2):199-219.
Klebanoff et al., CD8+ T-cell memory in tumor immunology and immunotherapy. Immunol Rev. Jun. 2006;211:214-24.
Klein et al., Cell-Cycle Control by Physiological Matrix Elasticity and In Viivo Tissue Stiffening. Curr Biol. Sep. 29, 2009;19:1511-1518.
Klinman, Immunotherapeutic uses of CpG oligodeoxynucleotides. Nat Rev Immunol. Apr. 2004;4(4):249-58.
Kohane, Microparticles and nanoparticles for drug delivery. Biotechnol Bioeng. Feb. 1, 2007;96(2):203-9.
Kondo et al., A reaction-diffusion wave on the skin of the marine angelfish *Pomacanthus*. Nature. Aug. 31, 1995;376(6543):765-8.
Kong et al., Controlling Degradation of Hydrogels via the Size of Cross-Linked Junctions. Adv Mater. Nov. 30, 2004;16(21):1917-1921.
Kong et al., Controlling rigidity and degradation of alginate hydrogels via molecular weight distribution. Biomacromolecules. Sep.-Oct. 2004;5(5):1720-7.

Kong et al., Decoupling the Dependence of Rheological/Mechanical Properties of Hydrogels from Solids Concentration. Polymer. 2002;43(23):6239-6246.
Kong et al., Design of biodegradable hydrogel for the local and sustained delivery of angiogenic plasmid DNA. Pharm Res. May 2008;25(5):1230-8.
Kong et al., Designing alginate hydrogels to maintain viability of immobilized cells. Biomaterials. Oct. 2003;24(22):4023-9.
Kong et al., FRET measurements of cell-traction forces and nanoscale clustering of adhesion ligands varied by substrate stiffness. Proc Natl Acad Sci U S A. Mar. 22, 2005;102(12):4300-5.
Kong et al., Non-viral gene delivery regulated by stiffness of cell adhesion substrates. Nat Mater. Jun. 2005;4(6):460-4.
Koo et al., Bioorthogonal copper-free click chemistry in vivo for tumor-targeted delivery of nanoparticles. Angew Chem Int Ed Engl. Nov. 19, 2012;51(47):11836-40.
Kosuge et al., Morphological Control of Rod- and Fiberlike SBA-15 Type Mesoporous Silica Using Water-Soluble Sodium Silicate. Chem Mater. 2004;16:899-905.
Kratky et al., Direct activation of antigen-presenting cells is required for CD8+ T-cell priming and tumor vaccination. Proc Natl Acad Sci U S A. Oct. 18, 2011;108(42):17414-9.
Kratz, Albumin as a drug carrier: design of prodrugs, drug conjugates and nanoparticles. J Control Release. Dec. 18, 2008;132(3):171-83.
Krieg, Development of TLR9 agonists for cancer therapy. J Clin Invest. May 2007;117(5):1184-94.
Krishnamachari et al., PLGA Microparticles that Co-deliver Antigen and Toll Like Receptor Ligand Adjuvants for Applications in Cancer Immunotherapy. AAPS Annual Meeting and Exposition. Nov. 9, 2009. 1 page.
Kumamoto et al., Induction of tumor-specific protective immunity by in situ Langerhans cell vaccine. Nat Biotechnol. Jan. 2002;20(1):64-9.
Kumar et al., Toll-like receptors and innate immunity. Biochem Biophys Res Commun. Oct. 30, 2009;388(4):621-5.
Kupferschmidt et al., Mesoporous silica particles potentiate antigen-specific T-cell responses. Nanomedicine (Lond). 2014;9(12):1835-46.
Kuwahara et al., Cell delivery using an injectable and adhesive transglutaminase-gelatin gel. Tissue Eng Part C Methods. Aug. 2010;16(4):609-18.
Kwon et al., Electrically erodible polymer gel for controlled release of drugs. Nature. Nov. 28, 1991;354(6351):291-3.
Kwon et al., In vivo targeting of dendritic cells for activation of cellular immunity using vaccine carriers based on pH-responsive microparticles. Proc Natl Acad Sci U S A. Dec. 20, 2005;102(51):18264-8.
Kyi et al., Checkpoint blocking antibodies in cancer immunotherapy. FEBS Lett. Jan. 21, 2014;588(2):368-76.
Lacy et al., Cytokine release from innate immune cells: association with diverse membrane trafficking pathways. Blood. 2011;118(1):9-18.
Langenkamp et al., Kinetics of dendritic cell activation: impact on priming of TH1, TH2 and nonpolarized T cells. Nat Immunol. Oct. 2000;1(4):311-6.
Langer et al., Tissue engineering. Science. May 14, 1993;260(5110):920-6.
Lanzavecchia et al., Regulation of T cell immunity by dendritic cells. Cell. Aug. 10, 2001;106(3):263-6.
Lao et al., Magnetic and hydrogel composite materials for hyperthermia applications. J Mater Sci Mater Med. Oct. 2004;15(10):1061-4.
Latorre et al., Applications of magnetic nanoparticles in medicine: magnetic fluid hyperthermia. P R Health Sci J. Sep. 2009;28(3):227-38.
Latz et al., TLR9 signals after translocating from the ER to CpG DNA in the lysosome. Nat Immunol. Feb. 2004;5(2):190-8.
Lauterbach et al., Mouse CD8alpha+ DCs and human BDCA3+ DCs are major producers of IFN-lambda in response to poly IC. J Exp Med. Nov. 22, 2010;207(12):2703-17.
Lauw et al., Proinflammatory effects of IL-10 during human endotoxemia. J Immunol. Sep. 1, 2000;165(5):2783-9.

(56) References Cited

OTHER PUBLICATIONS

Leach et al., Coating of VEGF-releasing scaffolds with bioactive glass for angiogenesis and bone regeneration. Biomaterials. Jun. 2006;27(17):3249-55.

Lee et al., Chemical tumor-targeting of nanoparticles based on metabolic glycoengineering and click chemistry. ACS Nano. Mar. 25, 2014;8(3):2048-63.

Lee et al., Controlling Mechanical and Swelling Properties of Alginate Hydrogels Independently by Cross-Linker Type and Cross-Linking Density. Macromolecules. Apr. 2000;33(11):4291-4294.

Lee et al., Effect of dual treatment with SDF-1 and BMP-2 on ectopic and orthotopic bone formation. PLoS One. Mar. 17, 2015;10(3):e0120051, 15 pages.

Lee et al., Engineering liver tissue spheroids with inverted colloidal crystal scaffolds. Biomaterials. Sep. 2009;30(27):4687-94.

Lee et al., Hydrogel Formation via Vell Crosslinking. Advanced Materials. Nov. 2003;15(21):1828-1832.

Lee et al., Hydrogels for tissue engineering. Chem Rev. Jul. 2001;101(7):1869-79.

Lee et al., Intravenous hMSCs improve myocardial infarction in mice because cells embolized in lung are activated to secrete the anti-inflammatory protein TSG-6. Cell Stem Cell. Jul. 2, 2009;5(1):54-63.

Lee et al., The immunological synapse balances T cell receptor signaling and degradation. Science. Nov. 14, 2003;302(5648):1218-22.

Lefaucheur et al., The cellular events of injured muscle regeneration depend on the nature of the injury. Neuromuscul Disord. Nov. 1995;5(6):501-9.

Lele et al., Investigating complexity of protein-protein interactions in focal adhesions. Biochem Biophys Res Commun. May 9, 2008;369(3):929-34.

Lensch et al., Scientific and clinical opportunities for modeling blood disorders with embryonic stem cells. Blood. Apr. 1, 2006;107(7):2605-12.

Leor et al., Cells, scaffolds, and molecules for myocardial tissue engineering. Pharmacol Ther. Feb. 2005;105(2):151-63.

Leshem et al., Hepatocyte growth factor (HGF) inhibits skeletal muscle cell differentiation: a role for the bHLH protein twist and the cdk inhibitor p27. J Cell Physiol. Jul. 2000;184(1):101-9.

Letsinger et al., Phosphoramidate analogs of oligonucleotides. J Org Chem. Nov. 1970;35(11):3800-3.

Levental et al., Soft biological materials and their impact on cell function. Soft Matter. 2007;3:299-306.

Levine et al., Effects of CD28 costimulation on long-term proliferation of CD4+ T cells in the absence of exogenous feeder cells. J Immunol. Dec. 15, 1997;159(12):5921-30.

Li et al., Effect of growth factors and extracellular matrix materials on the proliferation and differentiation of microencapsulated myoblasts. J Biomater Sci Polym Ed. 2003;14(6):533-49.

Li et al., Effects of Three-Dimensional Scaffolds on Cell Organization and Tissue Development. Biotechnology and Bioprocess Engineering. Oct. 2001;6(5):311-325.

Li et al., Mesoporous silica nanoparticles in biomedical applications. Chem Soc Rev. Apr. 7, 2012;41(7):2590-605.

Li et al., pH sensitive Laponite/alginate hybrid hydrogels: swelling behaviour and release mechanism. Soft Matter. 2011;7:6231-6238.

Li et al., Purified hybrid cells from dendritic cell and tumor cell fusions are superior activators of antitumor immunity. Cancer Immunol Immunother. Nov. 2001;50(9):456-62.

Li et al., Recent advances of biomaterials in biotherapy. Regen Biomater. Jun. 2016;3(2):99-105.

Li et al., The effect of surface modification of mesoporous silica micro-rod scaffold on immune cell activation and infiltration. Biomaterials. Mar. 2016;83:249-56.

Li, TNF-alpha is a mitogen in skeletal muscle. Am J Physiol Cell Physiol. Aug. 2003;285(2):C370-6.

Liao et al., Synthesis of mesoporous silica nanoparticle-encapsulated alginate microparticles for sustained release and targeting therapy. J Biomed Mater Res B Appl Biomater. Feb. 2014;102(2):293-302.

Liederer et al., Enzymes involved in the bioconversion of ester-based prodrugs. J Pharm Sci. Jun. 2006;95(6):1177-95.

Lin et al., Transdermal regulation of vascular network bioengineering using a photopolymerizable methacrylated gelatin hydrogel. Biomaterials. Sep. 2013;34(28):6785-96.

Lindstein et al., Regulation of lymphokine messenger RNA stability by a surface-mediated T cell activation pathway. Science. Apr. 21, 1989;244(4902):339-43.

Linsley et al., The role of the CD28 receptor during T cell responses to antigen. Annu Rev Immunol. 1993;11:191-212.

Lipson et al., Ipilimumab: an anti-CTLA-4 antibody for metastatic melanoma. Clin Cancer Res. Nov. 15, 2011;17(22):6958-62.

Lipton et al., Developmental fate of skeletal muscle satellite cells. Science. Sep. 21, 1979;205(4412):1292-4.

Liu et al., Fecal markers, intestinal inflammation and inflammatory enteritis. Clinical Journal of Digestive Disease. 2003;15(6):275-7.

Liu et al., Heterobifunctional poly(ethylene glycol)-tethered bone morphogenetic protein-2-stimulated bone marrow mesenchymal stromal cell differentiation and osteogenesis. Tissue Eng. May 2007;13(5):1113-24.

Liu et al., Immunostimulatory CpG oligodeoxynucleotides enhance the immune response to vaccine strategies involving granulocyte-macrophage colony-stimulating factor. Blood. Nov. 15, 1998;92(10):3730-6.

Liu et al., Nanostructured materials designed for cell binding and transduction. Biomacromolecules. 2001 Summer;2(2):362-8.

Liu et al., On the viscoelastic character of liver tissue: experiments and modelling of the linear behaviour. Biorheology. 2000;37(3):191-201.

Liu et al., Porous nanoparticle supported lipid bilayers (protocells) as delivery vehicles. J Am Chem Soc. Feb. 4, 2009;131(4):1354-5.

Liu et al., Preparation of uniform calcium alginate gel beads by membrane emulsification coupled with internal gelation. Journal of Applied Polymer Science. Nov. 22, 2002;87(5):848-852.

Liu, Dendritic cell subsets and lineages, and their functions in innate and adaptive immunity. Cell. Aug. 10, 2001;106(3):259-62.

Lo et al., Cell movement is guided by the rigidity of the substrate. Biophys J. Jul. 2000;79(1):144-52.

Lodish et al., Collagen: The Fibrous Proteins of the Matrix. Molecular Cell Biology. W.H. Freeman, New York. 2000;Section 22.3:979-985.

Lopez et al., Magnetic Applications of Polymer Gels. Macromol Symp. 2001;166(1):173-178.

Lu et al., Muscle-derived stem cells seeded into acellular scaffolds develop calcium-dependent contractile activity that is modulated by nicotinic receptors. Urology. Jun. 2003;61(6):1285-91.

Lubeck, The costs of musculoskeletal disease: health needs assessment and health economics. Best Pract Res Clin Rheumatol. Jun. 2003;17(3):529-39.

Ludewig et al., Immunotherapy with dendritic cells directed against tumor antigens shared with normal host cells results in severe autoimmune disease. J Exp Med. Mar. 6, 2000;191(5):795-804.

Lumelsky et al., Differentiation of embryonic stem cells to insulin-secreting structures similar to pancreatic islets. Science. May 18, 2001;292(5520):1389-94.

Lungu et al., Linear and Branched PEIs (Polyethylenimines) and Their Property Space. Int J Mol Sci. Apr. 13, 2016;17(4):555.

Lutolf et al., Repair of bone defects using synthetic mimetics of collagenous extracellular matrices. Nat Biotechnol. May 2003;21(5):513-8.

Lutterotti et al., Antigen-specific tolerance by autologous myelin peptide-coupled cells: a phase 1 trial in multiple sclerosis. Sci Transl Med. Jun. 5, 2013;5(188):188ra75.

Mach et al., Differences in dendritic cells stimulated in vivo by tumors engineered to secrete granulocyte-macrophage colony-stimulating factor or Flt3-ligand. Cancer Res. Jun. 15, 2000;60(12):3239-46.

(56) References Cited

OTHER PUBLICATIONS

Magram et al., IL-12-deficient mice are defective but not devoid of type 1 cytokine responses. Ann N Y Acad Sci. Oct. 31, 1996;795:60-70.
Mahony et al., Mesoporous silica nanoparticles act as a self-adjuvant for ovalbumin model antigen in mice. Small. Sep. 23, 2013;9(18):3138-46.
Maini, Spatial and spatio-temporal patterns in a cell-haptotaxis model. J Math Biol. 1989;27(5):507-22.
Majeti et al., Identification of a hierarchy of multipotent hematopoietic progenitors in human cord blood. Cell Stem Cell. Dec. 13, 2007;1(6):635-45.
Maldonado et al., How tolerogenic dendritic cells induce regulatory T cells. Adv Immunol. 2010;108:111-65.
Maley et al., Extracellular matrix, growth factors,genetics: their influence on cell proliferation and myotube formation in primary cultures of adult mouse skeletal muscle. Exp Cell Res. Jul. 1995;219(1):169-79.
Malhotra et al., Use of an oncolytic virus secreting GM-CSF as combined oncolytic and immunotherapy for treatment of colorectal and hepatic adenocarcinomas. Surgery. Apr. 2007;141(4):520-9.
Malmqvist, Biospecific interaction analysis using biosensor technology. Nature. Jan. 14, 1993;361(6408):186-7.
Mammoto et al., Mechanical control of tissue and organ development. Development. May 2010;137(9):1407-20.
Manavski et al., Vascular niche controls organ regeneration. Circ Res. Mar. 28, 2014;114(7):1077-9.
Mandal et al., Polymer-based synthetic dendritic cells for tailoring robust and multifunctional T cell responses. ACS Chem Biol. Feb. 20, 2015;10(2):485-92.
Mangsbo et al., Enhanced tumor eradication by combining CTLA-4 or PD-1 blockade with CpG therapy. J Immunother. Apr. 2010;33(3):225-35.
Mansoor et al., Engineering T cells for cancer therapy. Br J Cancer. Nov. 14, 2005;93(10):1085-91.
Martinsen et al., Alginate as immobilization material: I. Correlation between chemical and physical properties of alginate gel beads. Biotechnol Bioeng. Jan. 5, 1989;33(1):79-89.
Marui et al., Simultaneous application of basic fibroblast growth factor and hepatocyte growth factor to enhance the blood vessels formation. J Vasc Surg. Jan. 2005;41(1):82-90.
Masedunskas et al., Role for the actomyosin complex in regulated exocytosis revealed by intravital microscopy. Proc Natl Acad Sci U S A. Aug. 16, 2011;108(33):13552-7.
Massia et al., An RGD spacing of 440 nm is sufficient for integrin alpha V beta 3-mediated fibroblast spreading and 140 nm for focal contact and stress fiber formation. J Cell Biol. Sep. 1991;114(5):1089-100.
Matthew et al., Subperiosteal behaviour of alginate and cellulose wound dressing materials. Biomaterials. Mar. 1995;16(4):275-8.
Maus et al., Ex vivo expansion of polyclonal and antigen-specific cytotoxic T lymphocytes by artificial APCs expressing ligands for the T-cell receptor, CD28 and 4-1BB. Nat Biotechnol. Feb. 2002;20(2):143-8.
McColl, Chemokines and dendritic cells: a crucial alliance. Immunol Cell Biol. Oct. 2002;80(5):489-96.
McConnell et al., Vaccination with outer membrane complexes elicits rapid protective immunity to multidrug-resistant Acinetobacter baumannii. Infect Immun. Jan. 2011;79(1):518-26.
McDonald et al., Early fracture callus displays smooth muscle-like viscoelastic properties ex vivo: implications for fracture healing. J Orthop Res. Nov. 2009;27(11):1508-13.
McKay et al., Click chemistry in complex mixtures: bioorthogonal bioconjugation. Chem Biol. Sep. 18, 2014;21(9):1075-101.
McKinney-Freeman et al., Muscle-derived hematopoietic stem cells are hematopoietic in origin. Proc Natl Acad Sci U S A. Feb. 5, 2002;99(3):1341-6.
McKinnon et al., Biophysically defined and cytocompatible covalently adaptable networks as viscoelastic 3D cell culture systems. Adv Mater. Feb. 12, 2014;26(6):865-72.

McPherron et al., Regulation of skeletal muscle mass in mice by a new TGF-beta superfamily member. Nature. May 1, 1997;387(6628):83-90.
McQualter et al., Granulocyte macrophage colony-stimulating factor: a new putative therapeutic target in multiple sclerosis. J Exp Med. Oct. 1, 2001;194(7):873-82.
McWhorter et al., Modulation of macrophage phenotype by cell shape. Proc Natl Acad Sci U S A. Oct. 22, 2013;110(43):17253-8.
Mehta et al., Engineering New Approaches to Cancer Vaccines. Cancer Immunol Res. Aug. 2015;3(8):836-43.
Meier et al., Peptide Nucleic Acids(PNAs)—Unusual Properties of Noionic Oligonucleotide Analogues. Angewandte Chemie, Int'l Edition. Aug. 1992;31(8):1008-1010.
Melero-Martin et al., Engineering robust and functional vascular networks in vivo with human adult and cord blood-derived progenitor cells. Circ Res. Jul. 18, 2008;103(2):194-202. Includes supplementary materials.
Melief et al., Immunotherapy of established (pre)malignant disease by synthetic long peptide vaccines. Nat Rev Cancer. May 2008;8(5):351-60.
Melief et al., T-cell immunotherapy of tumors by adoptive transfer of cytotoxic T lymphocytes and by vaccination with minimal essential epitopes. Immunol Rev. Jun. 1995;145:167-77.
Mellman et al., Dendritic cells: specialized and regulated antigen processing machines. Cell. Aug. 10, 2001;106(3):255-8.
Menetry et al., Suturing Versus Immobilization of a Muscle Laceration: A Morphological and Functional Study in a Mouse Model. Am J Sports Med. 1999;27(2):222-229.
Meng et al., Use of a lipid-coated mesoporous silica nanoparticle platform for synergistic gemcitabine and paclitaxel delivery to human pancreatic cancer in mice. ACS Nano. 2015;9(4):3540-57.
Meraz et al., Mesoporous Silicon Particles for the Presentation of Tumor Antigens and Adjuvant for Anti-Cancer Immunity. Cancer Res. 2011;71(S24):159s-160s, Abstract #P1-01-12.
Merck, Merck Announces Presentation of Interim Data from Phase 1B Study of MK-3475, Investigational anti-PD-1 Immunotherapy, in Previously-Treated Patients with Non-Small Cell Lung Cancer (NSCLC) at 15th World Conference on Lung Cancer. Merck Newsroom Home. 3 pages, Oct. 29, 2013.
Merkel et al., Using mechanobiological mimicry of red blood cells to extend circulation times of hydrogel microparticles. Proc Natl Acad Sci U S A. Jan. 11, 2011;108(2):586-91.
Merriam-Webster, Transient. Merriam-Webster Dictionary. Web. Jul. 18, 2014. www.merriam-webster.com/dictionary/transient. 3 pages.
MeSH, Nivolumab. Retrieved online at: https://www.ncbi.nlm.nih.gov/mesh/?term=nivolumab. 2 pages, (2010).
Metters et al., Fundamental studies of biodegradable hydrogels as cartilage replacement materials. Biomed Sci Instrum. 1999;35:33-8.
Meyer et al., Biodegradable nanoellipsoidal artificial antigen presenting cells for antigen specific T-cell activation. Small. Apr. 2015;11(13):1519-25.
Meyer et al., Clinical investigations of Toll-like receptor agonists. Expert Opin Investig Drugs. Jul. 2008;17(7):1051-65.
Meylan et al., Intracellular pattern recognition receptors in the host response. Nature. Jul. 6, 2006;442(7098):39-44.
MGI, Mouse Facts. Retrieved online at: http://www.informatics.jax.org/mgihome/other/mouse_facts1.shtml. 2 pages. Jul. 31, 2018.
Miljkovic et al., Chondrogenesis, bone morphogenetic protein-4 and mesenchymal stem cells. Osteoarthritis Cartilage. Oct. 2008;16(10):1121-30.
Millar et al., Prediction of local recurrence, distant metastases, and death after breast-conserving therapy in early-stage invasive breast cancer using a five-biomarker panel. J Clin Oncol. Oct. 1, 2009;27(28):4701-8.
Miller et al., Hepatocyte growth factor affects satellite cell activation and differentiation in regenerating skeletal muscle. Am J Physiol Cell Physiol. Jan. 2000;278(1):C174-81.
Miller et al., Lipopolysaccharide sequestrants: structural correlates of activity and toxicity in novel acylhomospermines. J Med Chem. Apr. 7, 2005;48(7):2589-99.
Miller et al., Melanoma. N Engl J Med. Jul. 6, 2006;355(1):51-65.

(56) References Cited

OTHER PUBLICATIONS

Milone et al., Powered and controlled T-cell production. Nat Biomed Eng. Mar. 2018;2(3):148-150.

Miralles et al., Actin dynamics control SRF activity by regulation of its coactivator MAL. Cell. May 2, 2003;113(3):329-42.

Mitchell et al., The exogenous administration of basic fibroblast growth factor to regenerating skeletal muscle in mice does not enhance the process of regeneration. Growth Factors. 1996;13(1-2):37-55.

Miyata et al., Biomolecule-sensitive hydrogels. Adv Drug Deliv Rev. Jan. 17, 2002;54(1):79-98.

Mohan et al., Novel Porous, Polysaccharide Scaffolds for Tissue Engineering Applications. Trends Biomater Artif Organs. 2005;18(2):219-224.

Moioli et al., Matrices and scaffolds for drug delivery in dental, oral and craniofacial tissue engineering. Adv Drug Deliv Rev. May 30, 2007;59(4-5):308-24.

Molinari et al., Modification of surface membrane antigens by trypsin. Proc Soc Exp Biol Med. Apr. 1975;148(4):991-4.

Molloy et al., Movement and force produced by a single myosin head. Nature. Nov. 9, 1995;378(6553):209-12.

Mooney et al., Cytoskeletal filament assembly and the control of cell spreading and function by extracellular matrix. J Cell Sci. Jun. 1995;108 (Pt 6):2311-20.

Mooney et al., Switching from differentiation to growth in hepatocytes: control by extracellular matrix. J Cell Physiol. Jun. 1992;151(3):497-505.

Moser et al., Dendritic cell regulation of TH1-TH2 development. Nat Immunol. Sep. 2000;1(3):199-205.

Mu et al., Identification and characterization of a mannose-binding lectin from Nile tilapia (*Oreochromis niloticus*). Fish Shellfish Immunol. 2017;67:244-253.

Mulder et al., Wound Management: Past, Present, and Future. Clinicians' Pocket Guide to Chronic Wound Repair. Springhouse Corporation, Springhouse, Pennsylvania. 1998:85-90.

Muralidharan-Chari et al., ARF6-regulated shedding of tumor cell-derived plasma membrane microvesicles. Curr Biol. Dec. 1, 2009;19(22):1875-85.

Murdan, Electro-responsive drug delivery from hydrogels. J Control Release. Sep. 19, 2003;92(1-2):1-17.

Murray et al., Discussion: Turing's Theory of Morphogenesis—Its Influence on Modelling Biological Pattern and Form. Bull Math Biol. 1990;52(1-2):119-152.

Nagai et al., A variant of yellow fluorescent protein with fast and efficient maturation for cell-biological applications. Nat Biotechnol. Jan. 2002;20(1):87-90.

Naik et al., Development of plasmacytoid and conventional dendritic cell subtypes from single precursor cells derived in vitro and in vivo. Nat Immunol. Nov. 2007;8(11):1217-26.

NCBI Accession No. 000749.2, Apr. 1, 2012.
NCBI Accession No. 001020537, Jan. 30, 2011.
NCBI Accession No. 001020538, Jan. 30, 2011.
NCBI Accession No. 001020539, Jan. 30, 2011.
NCBI Accession No. 001020540, Jan. 30, 2011.
NCBI Accession No. 001028928, Jan. 30, 2011.
NCBI Accession No. 001193, May 3, 2014.
NCBI Accession No. 001552.2, Mar. 16, 2014.
NCBI Accession No. 001561.5, Mar. 16, 2014.
NCBI Accession No. 003237.2, May 25, 2014.
NCBI Accession No. 003265, Dec. 30, 2012.
NCBI Accession No. 003318.1, May 4, 2014.
NCBI Accession No. 003327.3, May 4, 2014.
NCBI Accession No. 003367, Jan. 30, 2011.
NCBI Accession No. 004119, Apr. 14, 2013.
NCBI Accession No. 004448.3, Apr. 23, 2014.
NCBI Accession No. 005009.2, Apr. 27, 2014.
NCBI Accession No. 005018.2, Apr. 27, 2014.
NCBI Accession No. 006274.2, Mar. 31, 2013.
NCBI Accession No. 017442, Apr. 14, 2012.
NCBI Accession No. 059138, Apr. 14, 2012.
NCBI Accession No. 181780.3, Jan. 27, 2014.
NCBI Accession No. 861445.3, Jan. 27, 2014.

NCBI, MeSH. Nivolumab. Retrieved online at: https://www.ncbi.nlm.nih/gov/mesh/?term=nivolumab. 3 pages, (2010).

Nehls et al., A novel, microcarrier-based in vitro assay for rapid and reliable quantification of three-dimensional cell migration and angiogenesis. Microvasc Res. Nov. 1995;50(3):311-22.

Nestle et al., Vaccination of melanoma patients with peptide- or tumorlysate-pulsed dendritic cells. Nature Medicine. Mar. 1, 1998;4(3):328-32.

Niamlang et al., Electrically controlled release of salicylic acid from poly(p-phenylene vinylene)/polyacrylamide hydrogels. Int J Pharm. Apr. 17, 2009;371(1-2):126-33.

Nichol et al., Cell-laden microengineered gelatin methacrylate hydrogels. Biomaterials. Jul. 2010;31(21):5536-44.

Nicodemus et al., Cell encapsulation in biodegradable hydrogels for tissue engineering applications. Tissue Eng Part B Rev. Jun. 2008;14(2):149-65.

Niessen et al., The alpha 6 beta 4 integrin is a receptor for both laminin and kalinin. Exp Cell Res. Apr. 1994;211(2):360-7.

NIH—National Cancer Institute, AMP-224, anti-PD-1 fusion protein AMP-224. Retrieved online at: https://www.cancer/gov/publications/dictionaries/cancer-drug/def/anti-pd-1-fusion-protein-amp-224. 1 page, (2019).

Noguera-Troise et al., Blockade of Dll4 inhibits tumour growth by promoting non-productive angiogenesis. Nature. Dec. 21, 2006;444(7122):1032-7.

Nuttelman et al., Dexamethasone-functionalized gels induce osteogenic differentiation of encapsulated hMSCs. J Biomed Mater Res A. Jan. 2006;76(1):183-95.

Ní Annaidh et al., Characterization of the anisotropic mechanical properties of excised human skin. J Mech Behav Biomed Mater. Jan. 2012;5(1):139-48.

O'Garra et al., Are dendritic cells afraid of commitment? Nat Immunol. Dec. 2004;5(12):1206-8.

O'Shea et al., Type 1 IFNs and regulation of TH1 responses: enigmas both resolved and emerge. Nat Immunol. Jul. 2000;1(1):17-9.

Ohashi et al., Surgical excision combined with autologous whole tumor cell vaccination is an effective therapy for murine neuroblastoma. J Pediatr Surg. Aug. 2006;41(8):1361-8.

Ohlstein et al., The stem cell niche: theme and variations. Curr Opin Cell Biol. Dec. 2004;16(6):693-9.

Oldenburg et al., TLR13 recognizes bacterial 23S rRNA devoid of erythromycin resistance-forming modification. Science. Aug. 31, 2012;337(6098):1111-5.

Oldenhove et al., Decrease of Foxp3+ Treg cell number and acquisition of effector cell phenotype during lethal infection. Immunity. Nov. 20, 2009;31(5):772-86.

Oneto et al., Implantable biomaterial based on click chemistry for targeting small molecules. Acta Biomaterialia. 2014;10:5099-5105.

Orner et al., Arrays for the combinatorial exploration of cell adhesion. J Am Chem Soc. Sep. 8, 2004;126(35):10808-9.

Osunkoya et al., Synthesis and fate of immunological surface receptors on cultured Burkitt lymphoma cells. Int J Cancer. Mar. 15, 1969;4(2):159-65.

Ota et al., Percutaneous subxiphoid access to the epicardium using a miniature crawling robotic device. Innovations (Phila). 2006 Fall;1(5):227-31.

Overwijk et al., Tumor regression and autoimmunity after reversal of a functionally tolerant state of self-reactive CD8+ T cells. J Exp Med. Aug. 18, 2003;198(4):569-80.

Ozawa et al., Microenvironmental VEGF concentration, not total dose, determines a threshold between normal and aberrant angiogenesis. J Clin Invest. Feb. 2004;113(4):516-27.

Padilla et al., Insufficient TLR activation contributes to the slow development of CD8+ T cell responses in Trypanosoma cruzi infection. J Immunol. Jul. 15, 2009;183(2):1245-52.

Page-McCaw et al., Matrix metalloproteinases and the regulation of tissue remodelling. Nat Rev Mol Cell Biol. Mar. 2007;8(3):221-33.

Pailler-Mattei et al., In vivo measurements of the elastic mechanical properties of human skin by indentation tests. Med Eng Phys. Jun. 2008;30(5):599-606.

(56) References Cited

OTHER PUBLICATIONS

Pajonk et al., From sol-gel to aerogels and cryogels. J Non Cryst Solids. May 1990;121(1-3):66-67.
Palacio et al., Interleukin 10 and tumor necrosis factor alpha gene expression in respiratory and peripheral muscles. Relation to sarcolemmal damage. Arch Bronconeumol. Jul. 2002;38(7):311-6.
Paradee et al., Effects of crosslinking ratio, model drugs, and electric field strength on electrically controlled release for alginate-based hydrogel. J Mater Sci Mater Med. Apr. 2012;23(4):999-1010.
Pardoll, The blockade of immune checkpoints in cancer immunotherapy. Nat Rev Cancer. Mar. 22, 2012;12(4):252-64.
Parekh et al., Modulus-driven differentiation of marrow stromal cells in 3D scaffolds that is independent of myosin-based cytoskeletal tension. Biomaterials. Mar. 2011;32(9):2256-64.
Parekkadan et al., Mesenchymal stem cell-derived molecules reverse fulminant hepatic failure. PLoS One. Sep. 26, 2007;2(9):e941.
Park et al., Photopolymerized hyaluronic acid-based hydrogels and interpenetrating networks. Biomaterials. Mar. 2003;24(6):893-900.
Parker et al., Effect of mitoxantrone on outcome of children with first relapse of acute lymphoblastic leukaemia (ALL R3): an open-label randomised trial. Lancet. Dec. 11, 2010;376(9757):2009-17.
Partridge et al., Conversion of mdx myofibres from dystrophin-negative to -positive by injection of normal myoblasts. Nature. Jan. 12, 1989;337(6203):176-9.
Patterson et al., Differential binding of chemokines to macrophages and neutrophils in the human inflamed synovium. Arthritis Res. 2002;4(3):209-14.
Pawlaczyk et al., Age-dependent biomechanical properties of the skin. Postepy Dermatol Alergol. Oct. 2013;30(5):302-6.
Pedersen et al., Induction of regulatory dendritic cells by dexamethasone and 1alpha,25-Dihydroxyvitamin D(3). Immunol Lett. Jan. 30, 2004;91(1):63-9.
Pek et al., The effect of matrix stiffness on mesenchymal stem cell differentiation in a 3D thixotropic gel. Biomaterials. Jan. 2010;31(3):385-91.
Pelinkovic et al., Tissue engineering and gene therapy of the musculoskeletal system with muscle cells. Z Orthop Ihre Grenzgeb. Sep.-Oct. 2000;138(5):402-6.
Pena et al., Effects of TGF-beta and TGF-beta neutralizing antibodies on fibroblast-induced collagen gel contraction: implications for proliferative vitreoretinopathy. Invest Ophthalmol Vis Sci. May 1994;35(6):2804-8.
Perica et al., Enrichment and Expansion with Nanoscale Artificial Antigen Presenting Cells for Adoptive Immunotherapy. ACS Nano. Jul. 28, 2015;9(7):6861-71.
Peters et al., Engineering vascular networks in porous polymer matrices. J Biomed Mater Res. Jun. 15, 2002;60(4):668-78.
Peyton et al., The use of poly(ethylene glycol) hydrogels to investigate the impact of ECM chemistry and mechanics on smooth muscle cells. Biomaterials. Oct. 2006;27(28):4881-93.
Phillippi, Patterning of Multiple Cell Lineages from a Single Stem Cell Population. Annual Meeting of the American Society for Cell Biology. Dec. 10, 2006.
Pinho et al., PDGFRa and CD51 mark human nestin+ sphere-forming mesenchymal stem cells capable of hematopoietic progenitor cell expansion. J Exp Med. Jul. 1, 2013;210(7):1351-67.
Platten et al., Cancer Immunotherapy by Targeting IDO1/TDO and Their Downstream Effectors. Front Immunol. Jan. 12, 2015;5:673. 7 pages.
Pluen et al., Role of tumor-host interactions in interstitial diffusion of macromolecules: cranial vs. subcutaneous tumors. Proc Natl Acad Sci U S A. Apr. 10, 2001;98(8):4628-33.
Pooyan et al., Conjugates bearing multiple formyl-methionyl peptides display enhanced binding to but not activation of phagocytic cells. Bioconjug Chem. Mar.-Apr. 2002;13(2):216-23.
Pope et al., Organ-specific regulation of the CD8 T cell response to Listeria monocytogenes infection. J Immunol. Mar. 1, 2001;166(5):3402-9.
Porter et al., Separation of Natural Populations of Coliform Bacteria from Freshwater and Sewage by Magnetic-Bead Cell Sorting. J Microbiol Meth. 1998;33(3):221-226.
Pouzet et al., Factors affecting functional outcome after autologous skeletal myoblast transplantation. Ann Thorac Surg. Mar. 2001;71(3):844-50; discussion 850-1.
PRNewsWire, GlaxoSmithKline and Amplimmune Form Global Strategic Collaboration. Alliance to Focus on AMP-224 for Cancer and Other Diseases. 3 pages, Aug. 4, 2010.
Pulendran et al., Flt3-ligand and granulocyte colony-stimulating factor mobilize distinct human dendritic cell subsets in vivo. J Immunol. Jul. 1, 2000;165(1):566-72.
Qi et al., Patterned differentiation of individual embryoid bodies in spatially organized 3D hybrid microgels. Adv Mater. Dec. 7, 2010;22(46):5276-81.
Qiao et al., Synthesis and Bio-adsorptive Properties of Large-Pore Periodic Mesoporous Organosilica Rods. Chem Mater. 2005;17:6172-6.
Qin et al., CD22-Targeted Chimeric Antigen Receptor (CAR) T Cells Containing the 4-1BB Costimulatory Domain Demonstrate Enhanced Persistence and Superior Efficacy Against B-Cell Precursor Acute Lymphoblastic Leukemia (ALL) Compared to Those Containing CD28. Blood. 2013;122:1431.
Qin et al., Soft lithography for micro- and nanoscale patterning. Nat Protoc. Mar. 2010;5(3):491-502.
Qiu et al., Environment-sensitive hydrogels for drug delivery. Adv Drug Deliv Rev. Dec. 31, 2001;53(3):321-39.
Qu et al., Development of approaches to improve cell survival in myoblast transfer therapy. J Cell Biol. Sep. 7, 1998;142(5):1257-67.
Qu-Petersen et al., Identification of a novel population of muscle stem cells in mice: potential for muscle regeneration. J Cell Biol. May 27, 2002;157(5):851-64.
Quezada et al., CTLA4 blockade and GM-CSF combination immunotherapy alters the intratumor balance of effector and regulatory T cells. J Clin Invest. Jul. 2006;116(7):1935-45.
Quintana et al., Autoantibody patterns in diabetes-prone NOD mice and in standard C57BL/6 mice. J Autoimmun. Nov. 2001;17(3):191-7.
Raeber et al., Molecularly engineered PEG hydrogels: a novel model system for proteolytically mediated cell migration. Biophys J. Aug. 2005;89(2):1374-88.
Rajagopalan et al., Regional angiogenesis with vascular endothelial growth factor in peripheral arterial disease: a phase II randomized, double-blind, controlled study of adenoviral delivery of vascular endothelial growth factor 121 in patients with disabling intermittent claudication. Circulation. Oct. 21, 2003;108(16):1933-8.
Ramón-Azcón et al., Gelatin methacrylate as a promising hydrogel for 3D microscale organization and proliferation of dielectrophoretically patterned cells. Lab on a Chip. Aug. 21, 2012;12(16):2959-69.
Randolph et al., Migration of dendritic cell subsets and their precursors. Annu Rev Immunol. 2008;26:293-316.
Ranganath et al., Harnessing the mesenchymal stem cell secretome for the treatment of cardiovascular disease. Cell Stem Cell. Mar. 2, 2012;10(3):244-58.
Raposo et al., Extracellular vesicles: exosomes, microvesicles, and friends. J Cell Biol. Feb. 18, 2013;200(4):373-83.
Rappolee et al., Macrophage-derived growth factors. Curr Top Microbiol Immunol. 1992;181:87-140.
Rapraeger, Syndecan-regulated receptor signaling. J Cell Biol. May 29, 2000;149(5):995-8.
Reddy et al., Exploiting lymphatic transport and complement activation in nanoparticle vaccines. Nat Biotechnol. Oct. 2007;25(10):1159-64.
Reimann et al., Satellite Cells in Normal and Regenerated Soleus Muscles of mdx and Control Mice. Eur J Neurosci. 1998;10:366, Abstract No. 153.07.
Reis E Sousa., Activation of dendritic cells: translating innate into adaptive immunity. Curr Opin Immunol. Feb. 2004;16(1):21-5.
Research Results of National Institute of Advanced Industrial Science and Technology, retrieved online at: http://www.aist.go.jp/aist_j/press_release/pr2006/pr20060719.html. 4 pages, (2006).

(56) References Cited

OTHER PUBLICATIONS

Rhoads et al., Satellite cell-mediated angiogenesis in vitro coincides with a functional hypoxia-inducible factor pathway. Am J Physiol Cell Physiol. Jun. 2009;296(6):C1321-8.
Ribas et al., Phase III randomized clinical trial comparing tremelimumab with standard-of-care chemotherapy in patients with advanced melanoma. J Clin Oncol. Feb. 10, 2013;31(5):616-22.
Richards Grayson et al., Multi-pulse drug delivery from a resorbable polymeric microchip device. Nat Mater. Nov. 2003;2(11):767-72.
Richardson et al., Polymeric system for dual growth factor delivery. Nat Biotechnol. Nov. 2001;19(11):1029-34.
Riddell et al., Phase I Study of Cellular Adoptive Immunotherapy Using Genetically Modified CD8+ HIV-Specific T Cells for HIV Seropositive Patients Undergoing Allogeneic Bone Marrow Transplant. Fred Hutchinson Cancer Research Center and the University of Washington. Human Gene Therapy. Jun. 1992;3(3):319-338.
Riddell et al., Principles for adoptive T cell therapy of human viral diseases. Annu Rev Immunol. 1995;13:545-86.
Riddell et al., Restoration of viral immunity in immunodeficient humans by the adoptive transfer of T cell clones. Science. Jul. 10, 1992;257(5067):238-41.
Riddell et al., The use of anti-CD3 and anti-CD28 monoclonal antibodies to clone and expand human antigen-specific T cells. J Immunol Methods. Apr. 17, 1990;128(2):189-201.
Riddle et al., Role of poly(lactide-co-glycolide) particle size on gas-foamed scaffolds. J Biomater Sci Polym Ed. 2004;15(12):1561-70.
Ridgway et al., Inhibition of Dll4 signalling inhibits tumour growth by deregulating angiogenesis. Nature. Dec. 21, 2006;444(7122):1083-7.
Rinderknecht et al., The amino acid sequence of human insulin-like growth factor I and its structural homology with proinsulin. J Biol Chem. Apr. 25, 1978;253(8):2769-76.
Rizzo et al., An improved cyan fluorescent protein variant useful for FRET. Nat Biotechnol. Apr. 2004;22(4):445-9.
Roccaro et al., BM mesenchymal stromal cell-derived exosomes facilitate multiple myeloma progression. J Clin Invest. Apr. 2013;123(4):1542-55.
Rodriguez et al., Minimal "Self" peptides that inhibit phagocytic clearance and enhance delivery of nanoparticles. Science. Feb. 22, 2013;339(6122):971-5.
Rosenberg et al., Adoptive cell transfer as personalized immunotherapy for human cancer. Science. Apr. 3, 2015;348(6230):62-8.
Rosenberg et al., Cancer immunotherapy: moving beyond current vaccines. Nat Med. Sep. 2004;10(9):909-15.
Rosenberg et al., Durable complete responses in heavily pretreated patients with metastatic melanoma using T-cell transfer immunotherapy. Clin Cancer Res. Jul. 1, 2011;17(13):4550-7.
Roth et al., SC68896, a novel small molecule proteasome inhibitor, exerts antiglioma activity in vitro and in vivo. Clin Cancer Res. Nov. 1, 2009;15(21):6609-18.
Rowlands et al., Directing osteogenic and myogenic differentiation of MSCs: interplay of stiffness and adhesive ligand presentation. Am J Physiol Cell Physiol. Oct. 2008;295(4):C1037-44.
Rowley et al., Alginate hydrogels as synthetic extracellular matrix materials. Biomaterials. Jan. 1999;20(1):45-53.
Rowley et al., Alginate type and RGD density control myoblast phenotype. J Biomed Mater Res. May 2002;60(2):217-23.
Rowley et al., Biomaterials to Spatially Regulate Cell Fate. Adv Mater. Jun. 2002;14(12):886-889.
Rubbi et al., Evidence of surface antigen detachment during incubation of cells with immunomagnetic beads. J Immunol Methods. Dec. 3, 1993;166(2):233-41.
Rubin et al., Dissociation of heparan sulfate and receptor binding domains of hepatocyte growth factor reveals that heparan sulfate-c-met interaction facilitates signaling. J Biol Chem. Aug. 31, 2001;276(35):32977-83.

Ryten et al., ATP regulates the differentiation of mammalian skeletal muscle by activation of a P2X5 receptor on satellite cells. J Cell Biol. Jul. 22, 2002;158(2):345-55.
Ryu et al., The construction of three-dimensional micro-fluidic scaffolds of biodegradable polymers by solvent vapor based bonding of micro-molded layers. Biomaterials. Feb. 2007;28(6):1174-84.
Sacchetti et al., Self-renewing osteoprogenitors in bone marrow sinusoids can organize a hematopoietic microenvironment. Cell. Oct. 19, 2007;131(2):324-36.
Sakai et al., An injectable, in situ enzymatically gellable, gelatin derivative for drug delivery and tissue engineering. Biomaterials. Jul. 2009;30(20):3371-7.
Salem et al., Defining the antigen-specific T-cell response to vaccination and poly(I:C)/TLR3 signaling: evidence of enhanced primary and memory CD8 T-cell responses and antitumor immunity. J Immunother. May-Jun. 2005;28(3):220-8.
Salvador et al., Combination of immune stimulating adjuvants with poly(lactide-co-glycolide) microspheres enhances the immune response of vaccines. Vaccine. Jan. 11, 2012;30(3):589-96.
Salvay et al., Inductive tissue engineering with protein and DNA-releasing scaffolds. Mol Biosyst. Jan. 2006;2(1):36-48.
Sano et al., Swift development of protective effector functions in naive CD8(+) T cells against malaria liver stages. J Exp Med. Jul. 16, 2001;194(2):173-9.
Sansonetti, The innate signaling of dangers and the dangers of innate signaling. Nat Immunol. Dec. 2006;7(12):1237-42.
Sarkar et al., Condensation of oligonucleotides assembled into nicked and gapped duplexes: potential structures for oligonucleotide delivery. Nucleic Acids Res. Jan. 7, 2005;33(1):143-51.
Sato, Human dendritic cells. Biotherapy. Nov. 2004;18(6):467-77.
Saxena et al., Skeletal muscle tissue engineering using isolated myoblasts on synthetic biodegradable polymers: preliminary studies. Tissue Eng. Dec. 1999;5(6):525-32.
Schaefer et al., Innate immunity in the human female reproductive tract: antiviral response of uterine epithelial cells to the TLR3 agonist poly(I:C). J Immunol. Jan. 15, 2005;174(2):992-1002.
Scheel et al., Toll-like receptor-dependent activation of several human blood cell types by protamine-condensed mRNA. Eur J Immunol. May 2005;35(5):1557-66.
Schijns et al., Mice lacking IL-12 develop polarized Th1 cells during viral infection. J Immunol. Apr. 15, 1998;160(8):3958-64.
Schnorrer et al., The dominant role of CD8+ dendritic cells in cross-presentation is not dictated by antigen capture. Proc Natl Acad Sci U S A. Jul. 11, 2006;103(28):10729-34.
Schofield, The relationship between the spleen colony-forming cell and the haemopoietic stem cell. Blood Cells. 1978;4(1-2):7-25.
Schuler et al., The use of dendritic cells in cancer immunotherapy. Curr Opin Immunol. Apr. 2003;15(2):138-47.
Schwartz, A cell culture model for T lymphocyte clonal anergy. Science. Jun. 15, 1990;248(4961):1349-56.
Schwartz, Integrins and extracellular matrix in mechanotransduction. Cold Spring Harb Perspect Biol. Dec. 2010;2(12):a005066.
Seale et al., Pax7 is required for the specification of myogenic satellite cells. Cell. Sep. 15, 2000;102(6):777-86.
Sensi et al., Unique tumor antigens: evidence for immune control of genome integrity and immunogenic targets for T cell-mediated patient-specific immunotherapy. Clin Cancer Res. Sep. 1, 2006;12(17):5023-32.
Shah et al., An injectable bone marrow-like scaffold enhances T cell immunity after hematopoietic stem cell transplantation. Nat Biotechnol. Mar. 2019;37(3):293-302.
Shakweh et al., Design and characterisation of poly(lactide-co-glycolide) small particulate systems for the delivery of immunostimulant CpG oligonucleotide. J Nanosci Nanotechnol. Sep.-Oct. 2006;6(9-10):2811-20.
Shaner et al., Improved monomeric red, orange and yellow fluorescent proteins derived from *Discosoma* sp. red fluorescent protein. Nat Biotechnol. Dec. 2004;22(12):1567-72.
Shansky et al., A simplified method for tissue engineering skeletal muscle organoids in vitro. In Vitro Cell Dev Biol Anim. Oct. 1997;33(9):659-61.
Shapiro et al., Sizing it up: cellular MRI using micron-sized iron oxide particles. Magn Reson Med. Feb. 2005;53(2):329-38.

(56) References Cited

OTHER PUBLICATIONS

Sheehan et al., Skeletal muscle satellite cell proliferation in response to members of the fibroblast growth factor family and hepatocyte growth factor. J Cell Physiol. Dec. 1999;181(3):499-506.
Sheppard et al., Polyethyleneimine is a potent systemic adjuvant for glycoprotein antigens. Int Immunol. Oct. 2014;26(10):531-8.
Sheridan et al., Bioabsorbable polymer scaffolds for tissue engineering capable of sustained growth factor delivery. J Control Release. Feb. 14, 2000;64(1-3):91-102.
Shi et al., A novel Toll-like receptor that recognizes vesicular stomatitis virus. J Biol Chem. Feb. 11, 2011;286(6):4517-24.
Shi et al., Granulocyte-macrophage colony-stimulating factor (GM-CSF) and T-cell responses: what we do and don't know. Cell Res. Feb. 2006;16(2):126-33.
Shibuya et al., Anti-CD3/anti-CD28 bead stimulation overcomes CD3 unresponsiveness in patients with head and neck squamous cell carcinoma. Arch Otolaryngol Head Neck Surg. Apr. 2000;126(4):473-9.
Shin et al., Contractile forces sustain and polarize hematopoiesis from stem and progenitor cells. Cell Stem Cell. Jan. 2, 2014;14(1):81-93.
Shin et al., Lamins regulate cell trafficking and lineage maturation of adult human hematopoietic cells. Proc Natl Acad Sci U S A. Nov. 19, 2013;110(47):18892-7.
Shin et al., Myosin-II inhibition and soft 2D matrix maximize multinucleation and cellular projections typical of platelet-producing megakaryocytes. Proc Natl Acad Sci U S A. Jul. 12, 2011;108(28):11458-63.
Shoichet et al., Stability of hydrogels used in cell encapsulation: An in vitro comparison of alginate and agarose. Biotechnol Bioeng. May 20, 1996;50(4):374-81.
Shortman et al., Steady-state and inflammatory dendritic-cell development. Nat Rev Immunol. Jan. 2007;7(1):19-30.
Shukla, Controlled Generation of Progenitor T-cells from Hematopoietic Stem Cells and Pluripotent Stem Cells. A thesis submitted in conformity with the requirements for the degree of Doctorate of Philosophy, Institute of Biomaterials and Biomedical Engineering, University of Toronto. 214 pages, (2017).
Sick et al., WNT and DKK determine hair follicle spacing through a reaction-diffusion mechanism. Science. Dec. 1, 2006;314(5804):1447-50.
Siegwart et al., Synthesis, characterization, and in vitro cell culture viability of degradable poly(N-isopropylacrylamide-co-5,6-benzo-2-methylene-1,3-dioxepane)-based polymers and crosslinked gels. J Biomed Mater Res A. Nov. 2008;87(2):345-58.
Silva et al., Effects of VEGF temporal and spatial presentation on angiogenesis. Biomaterials. Feb. 2010;31(6):1235-41.
Silva et al., Material-based deployment enhances efficacy of endothelial progenitor cells. Proc Natl Acad Sci U S A. Sep. 23, 2008;105(38):14347-52.
Silva et al., Spatiotemporal control of vascular endothelial growth factor delivery from injectable hydrogels enhances angiogenesis. J Thromb Haemost. Mar. 2007;5(3):590-8.
Simmons et al., GM-CSF as a systemic adjuvant in a phase II prostate cancer vaccine trial. Prostate. Jun. 1, 1999;39(4):291-7.
Simpson et al., Fc-dependent depletion of tumor-infiltrating regulatory T cells co-defines the efficacy of anti-CTLA-4 therapy against melanoma. J Exp Med. Aug. 26, 2013;210(9):1695-710.
Singer et al., Cutaneous wound healing. N Engl J Med. Sep. 2, 1999;341(10):738-46.
Singh et al., Hydrogels and scaffolds for immunomodulation. Adv Mater. Oct. 2014;26(38):6530-41.
Skokos et al., CD8-DCs induce IL-12-independent Th1 differentiation through Delta 4 Notch-like ligand in response to bacterial LPS. J Exp Med. Jul. 9, 2007;204(7):1525-31.
Skuk et al., Efficacy of myoblast transplantation in nonhuman primates following simple intramuscular cell injections: toward defining strategies applicable to humans. Exp Neurol. May 2002;175(1):112-26.
Skuk et al., Myoblast transplantation: the current status of a potential therapeutic tool for myopathies. J Muscle Res Cell Motil. 2003;24(4-6):285-300.
Sletten et al., A hydrophilic azacyclooctyne for Cu-free click chemistry. Org Lett. Jul. 17, 2008;10(14):3097-9.
Smidsrød et al., Alginate as immobilization matrix for cells. Trends Biotechnol. Mar. 1990;8(3):71-8.
Sobral et al., Antigen-free cancer vaccine to treat poorly immunogenic tumors. Cancer Immunol Res. 2019;7(2 Suppl):Abstract B045.
Sohier et al., Critical factors in the design of growth factor releasing scaffolds for cartilage tissue engineering. Expert Opin Drug Deliv. May 2008;5(5):543-66.
Solon et al., Fibroblast adaptation and stiffness matching to soft elastic substrates. Biophys J. Dec. 15, 2007;93(12):4453-61.
Sonawane et al., Chloride accumulation and swelling in endosomes enhances DNA transfer by polyamine-DNA polyplexes. J Biol Chem. Nov. 7, 2003;278(45):44826-31.
Springer et al., The lymphocyte function-associated LFA-1, CD2, and LFA-3 molecules: cell adhesion receptors of the immune system. Annu Rev Immunol. 1987;5:223-52.
Stachowiak et al., Inverse opal hydrogel-collagen composite scaffolds as a supportive microenvironment for immune cell migration. J Biomed Mater Res A. Jun. 1, 2008;85(3):815-28.
Stanley et al., Transjugular intrahepatic portosystemic shunt as a treatment for protein-losing enteropathy caused by portal hypertension. Gastroenterology. Dec. 1996;111(6):1679-82.
Steenblock et al., A comprehensive platform for ex vivo T-cell expansion based on biodegradable polymeric artificial antigen-presenting cells. Mol Ther. Apr. 2008;16(4):765-72.
Steenblock et al., An artificial antigen-presenting cell with paracrine delivery of IL-2 impacts the magnitude and direction of the T cell response. J Biol Chem. Oct. 7, 2011;286(40):34883-92.
Steinman et al., Taking dendritic cells into medicine. Nature. Sep. 27, 2007;449(7161):419-26.
Stephen et al., Biopolymer implants enhance the efficacy of adoptive T-cell therapy. Nat Biotechnol. Jan. 2015;33(1):97-101.
Stockmann et al., Exploring isonitrile-based click chemistry for ligation with biomolecules. Organic & Biomolecular Chemistry. 2011;9:7300-7302.
Storrie et al., Sustained delivery of plasmid DNA from polymeric scaffolds for tissue engineering. Adv Drug Deliv Rev. Jul. 7, 2006;58(4):500-14.
Straub et al., Animal models for muscular dystrophy show different patterns of sarcolemmal disruption. J Cell Biol. Oct. 20, 1997;139(2):375-85.
Sun et al., Biomimetic interpenetrating polymer network hydrogels based on methacrylated alginate and collagen for 3D pre-osteoblast spreading and osteogenic differentiation. Soft Matter. Jan. 12, 2012;8:2398-2404.
Sun et al., Highly stretchable and tough hydrogels. Nature. Sep. 6, 2012;489(7414):133-6.
Sun et al., Sustained vascular endothelial growth factor delivery enhances angiogenesis and perfusion in ischemic hind limb. Pharm Res. Jul. 2005;22(7):1110-6.
Sunshine et al., Nanoengineering approaches to the design of artificial antigen-presenting cells. Nanomedicine. 2013;8(7):1173-89.
Sunshine et al., Particle shape dependence of CD8+ T cell activation by artificial antigen presenting cells. Biomaterials. Jan. 2014;35(1):269-277.
Super et al., Biomaterial vaccines capturing pathogen-associated molecular patterns protect against bacterial infections and septic shock. Nat Biomed Eng. Jan. 2022;6(1):8-18.
Suri et al., Photopatterned collagen-hyaluronic acid interpenetrating polymer network hydrogels. Acta Biomater. Sep. 2009;5(7):2385-97.
Suzuki et al., A novel small-molecule inhibitor of transforming growth factor beta type I receptor kinase (SM16) inhibits murine mesothelioma tumor growth in vivo and prevents tumor recurrence after surgical resection. Cancer Res. Mar. 1, 2007;67(5):2351-9.
Swift et al., Nuclear lamin-A scales with tissue stiffness and enhances matrix-directed differentiation. Science. Aug. 30, 2013;341(6149):1240104. 17 pages.

(56) References Cited

OTHER PUBLICATIONS

Syed et al., Stem cell therapy market. Nat Rev Drug Discov. Mar. 2013;12(3):185-6.
Tabata et al., Enhanced Vascularization and Tissue Granulation by Basic Fibroblast Growth Factor Impregnated in Gelatin Hydrogels. Journal of Controlled Release. Sep. 1994;31(2):189-199.
Takahashi et al., Induction of pluripotent stem cells from adult human fibroblasts by defined factors. Cell. Nov. 30, 2007;131(5):861-72.
Takamura et al., Regulatory role of lymphoid chemokine CCL19 and CCL21 in the control of allergic rhinitis. J Immunol. 2007;179(9):5897-5906.
Takeshita et al., Therapeutic angiogenesis. A single intraarterial bolus of vascular endothelial growth factor augments revascularization in a rabbit ischemic hind limb model. J Clin Invest. Feb. 1994;93(2):662-70.
Tamura et al., Immunotherapy of tumors with autologous tumor-derived heat shock protein preparations. Science. Oct. 3, 1997;278(5335):117-20.
Tanaka et al., Collapse of gels in an electric field. Science. Oct. 29, 1982;218(4571):467-9.
Tang et al., Combining radiation and immunotherapy: a new systemic therapy for solid tumors? Cancer Immunol Res. Sep. 2014;2(9):831-8.
Tannous, Gaussia luciferase reporter assay for monitoring biological processes in culture and in vivo. Nat Protoc. 2009;4(4):582-91.
Tatsumi et al., HGF/SF is present in normal adult skeletal muscle and is capable of activating satellite cells. Dev Biol. Feb. 1, 1998;194(1):114-28.
Ten Dijke et al., Growth Factors for Wound Healing. Nat Biotechnol. 1989;7:793-798.
Thelin et al., In Vivo Enrichment of Diabetogenic T Cells. Diabetes. Aug. 2017;66(8):2220-2229.
Thielemann et al., Pore structure and surface area of silica SBA-15: influence of washing and scale-up. Beilstein J Nanotechnol. 2011;2:110-8.
Thomas et al., Intravenous infusion of bone marrow in patients receiving radiation and chemotherapy. N Engl J Med. Sep. 12, 1957;257(11):491-6.
Thornton et al., Shape retaining injectable hydrogels for minimally invasive bulking. J Urol. Aug. 2004;172(2):763-8.
Thurner et al., Vaccination with mage-3A1 peptide-pulsed mature, monocyte-derived dendritic cells expands specific cytotoxic T cells and induces regression of some metastases in advanced stage IV melanoma. J Exp Med. Dec. 6, 1999;190(11):1669-78.
Thurston et al., The Delta paradox: DLL4 blockade leads to more tumour vessels but less tumour growth. Nat Rev Cancer. May 2007;7(5):327-31.
Tidball, Inflammatory cell response to acute muscle injury. Med Sci Sports Exerc. Jul. 1995;27(7):1022-32.
Titan et al., Growth Factor Delivery to a Bovine Defect Using Leukocyte-Rich Platelet-Rich Concentrates on a Hyaluronic Acid Scaffold. Arthroscopy: The Journal of Arthroscopic and Related Surgery. Pre-publication edition, 33 pages, Dec. 2019.
Tomer et al., Electrically Controlled Release of Macromolecules from Cross-Linked Hyaluronic Acid Hydrogels. Journal of Controlled Release. Mar. 1995:33(3):405-413.
Tong et al., Engineering interpenetrating network hydrogels as biomimetic cell niche with independently tunable biochemical and mechanical properties. Biomaterials. Feb. 2014;35(6):1807-15.
Tourniaire et al., Polymer microarrays for cellular adhesion. Chem Commun (Camb). May 28, 2006;(20):2118-20.
Trappmann et al., Extracellular-matrix tethering regulates stem-cell fate. Nat Mater. May 27, 2012;11(7):642-9.
Trappmann et al., How cells sense extracellular matrix stiffness: a material's perspective. Curr Opin Biotechnol. Oct. 2013;24(5):948-53.
Tripathi et al., Elastic and macroporous agarose-gelatin cryogels with isotropic and anisotropic porosity for tissue engineering. J Biomed Mater Res A. Sep. 1, 2009;90(3):680-94.
Tsien, The green fluorescent protein. Annu Rev Biochem. 1998;67:509-44.
Turing, The Chemical Basis of Morphogenesis. Philosophical Transactions of the Royal Society of London. Series B. 1952;237(641):37-72.
Turtle et al. CD19 CAR-T cells of defined CD4+:CD8+ composition in adult B cell ALL patients. J Clin Invest. Jun. 1, 2016;126(6):2123-38.
Turtle et al., Anti-CD19 Chimeric Antigen Receptor-Modified T Cell Therapy for B Cell Non-Hodgkin Lymphoma and Chronic Lymphocytic Leukemia: Fludarabine and Cyclophosphamide Lymphodepletion Improves In Vivo Expansion and Persistence of CAR-T Cells and Clinical Outcomes. Blood. 2015;126:184.
Uchida et al., Immunization by particle bombardment of antigen-loaded poly-(DL-lactide-co-glycolide) microspheres in mice. Vaccine. Mar. 15, 2006;24(12):2120-30.
Ugarte et al., Notch signaling enhances osteogenic differentiation while inhibiting adipogenesis in primary human bone marrow stromal cells. Exp Hematol. Jul. 2009;37(7):867-875.e1.
Uhlenbruck, Action of proteolytic enzymes on the human erythrocyte surface. Nature. Apr. 8, 1961;190:181.
Ulrich et al., Probing cellular mechanobiology in three-dimensional culture with collagen-agarose matrices. Biomaterials. Mar. 2010;31(7):1875-84.
UniProtKB/Swiss-Prot Accession No. P02751.4, Apr. 16, 2014.
UniProtKB/Swiss-Prot Accession No. P02778.2, Jun. 11, 2014.
UniProtKB/Swiss-Prot Accession No. P04626.1, Apr. 16, 2014.
UniProtKB/Swiss-Prot Accession No. P05121.1, Apr. 16, 2014.
UniProtKB/Swiss-Prot Accession No. P05231.1, Jun. 11, 2014.
UniProtKB/Swiss-Prot Accession No. P09038.3, Jun. 11, 2014.
UniProtKB/Swiss-Prot Accession No. P10145.1, Jun. 11, 2014.
UniProtKB/Swiss-Prot Accession No. P13500.1, Jun. 11, 2014.
UniProtKB/Swiss-Prot Accession No. P14210.2, Jun. 11, 2014.
UniProtKB/Swiss-Prot Accession No. P14780.3, Jun. 11, 2014.
UniProtKB/Swiss-Prot Accession No. P14902.1, May 14, 2014.
UniProtKB/Swiss-Prot Accession No. P15692.2, Jun. 11, 2014.
UniProtKB/Swiss-Prot Accession No. P16035.2, Jun. 11, 2014.
UniProtKB/Swiss-Prot Accession No. P16410.3, Apr. 16, 2014.
UniProtKB/Swiss-Prot Accession No. P48061.1, Jun. 18, 2014.
UniProtKB/Swiss-Prot Accession No. P80162.4, Jun. 11, 2014.
UniProtKB/Swiss-Prot Accession No. P98066.2, Feb. 19, 2014.
UniProtKB/Swiss-Prot Accession No. Q8TDQ0.3, Mar. 19, 2014.
UniProtKB/Swiss-Prot Accession No. Q96HF1.2, May 14, 2014.
UniProtKB/Swiss-Prot Accession No. Q9BQ51.2, Mar. 19, 2014.
UniProtKB/Swiss-Prot Accession No. Q9HCB6.2, Jun. 11, 2014.
UniProtKB/Swiss-Prot Accession No. Q9NZQ7.1, Apr. 16, 2014.
Urbanek et al., Stem cell niches in the adult mouse heart. Proc Natl Acad Sci U S A. Jun. 13, 2006;103(24):9226-31.
Van Berkel et al., Metal-free triazole formation as a tool for bioconjugation. Chembiochem. Sep. 3, 2007;8(13):1504-8.
Van Der Bruggen et al., Peptide Database: T cell-defined tumor antigens. Cancer Immunity. Retrieved online at: http://www.cancerimmunity.org/peptide/ 59 pages. (2013).
Van Duin et al., Triggering TLR signaling in vaccination. Trends Immunol. Jan. 2006;27(1):49-55.
Van Elsas et al., Combination immunotherapy of B16 melanoma using anti-cytotoxic T lymphocyte-associated antigen 4 (CTLA-4) and granulocyte/macrophage colony-stimulating factor (GM-CSF)-producing vaccines induces rejection of subcutaneous and metastatic tumors accompanied by autoimmune depigmentation. J Exp Med. Aug. 2, 1999;190(3):355-66.
Van Elsas et al., Elucidating the autoimmune and antitumor effector mechanisms of a treatment based on cytotoxic T lymphocyte antigen-4 blockade in combination with a B16 melanoma vaccine: comparison of prophylaxis and therapy. J Exp Med. Aug. 20, 2001;194(4):481-9.
Vandenburgh et al., Tissue-engineered skeletal muscle organoids for reversible gene therapy. Hum Gene Ther. Nov. 10, 1996;7(17):2195-200.
Veldhoen et al., TGFbeta1, a "Jack of all trades": the link with pro-inflammatory IL-17-producing T cells. Trends Immunol. Aug. 2006;27(8):358-61.

(56) References Cited

OTHER PUBLICATIONS

Venturoni et al., Investigations into the polymorphism of rat tail tendon fibrils using atomic force microscopy. Biochem Biophys Res Commun. Apr. 4, 2003;303(2):508-13.
Vieira et al., Polysaccharide-based hydrogels: preparation, characterization, and drug interaction behaviour. Biomacromolecules. Apr. 2008;9(4):1195-9.
Vieira et al., The bulk of endogenously produced IgG2a is eliminated from the serum of adult C57BL/6 mice with a half-life of 6-8 days. Eur J Immunol. Jul. 1986;16(7):871-4.
Vieira et al., The half-lives of serum immunoglobulins in adult mice. Eur J Immunol. Feb. 1988;18(2):313-6.
Villadangos et al., Intrinsic and cooperative antigen-presenting functions of dendritic-cell subsets in vivo. Nat Rev Immunol. Jul. 2007;7(7):543-55.
Villadangos, Presentation of antigens by MHC class II molecules: getting the most out of them. Mol Immunol. Sep. 2001;38(5):329-46.
Vincent et al., Stem cell differentiation: Post-degradation forces kick in. Nat Mater. May 2013;12(5):384-6.
Vogel et al., Local force and geometry sensing regulate cell functions. Nat Rev Mol Cell Biol. Apr. 2006;7(4):265-75.
Von Dassow et al., The segment polarity network is a robust developmental module. Nature. Jul. 13, 2000;406(6792):188-92.
W.H.O., World Health Organization, Global Burden of Musculoskeletal Disease Revealed in new WHO Report. Bull World Health Organ. 2003;81(11):853-854.
W.H.O., World Health Organization, The World Health Report 2004: Changing History. The World Health Report. 2004:1-169.
Wakim et al., Dendritic cell-induced memory T cell activation in nonlymphoid tissues. Science. Jan. 11, 2008;319(5860):198-202.
Wan et al., Peritoneal macrophage uptake, pharmacokinetics and biodistribution of macrophage-targeted PEG-fMLF (N-formyl-methionyl-leucyl-phenylalanine) nanocarriers for improving HIV drug delivery. Pharm Res. Nov. 2007;24(11):2110-9.
Wang et al., Biological activity of bevacizumab, a humanized anti-VEGF antibody in vitro. Angiogenesis. 2004;7(4):335-45.
Wang et al., Evolution of new nonantibody proteins via iterative somatic hypermutation. Proc Natl Acad Sci U S A. Nov. 30, 2004;101(48):16745-9.
Wang et al., Mechanotransduction at a distance: mechanically coupling the extracellular matrix with the nucleus. Nat Rev Mol Cell Biol. Jan. 2009;10(1):75-82.
Wang et al., Mouse CD229 Ligation Co-stimulates T Cell Activation. The Journal of Immunology. May 2012;188(suppl 1):176.7.
Wang et al., Photothermal effects of supramolecularly assembled gold nanoparticles for the targeted treatment of cancer cells. Angew Chem Int Ed Engl. May 17, 2010;49(22):3777-81.
Wang-Gillam et al., A phase I study of IMP321 and gemcitabine as the front-line therapy in patients with advanced pancreatic adenocarcinoma. Invest New Drugs. Jun. 2013;31(3):707-13.
Warner et al., Cyclooxygenases: new forms, new inhibitors, and lessons from the clinic. FASEB J. May 2004;18(7):790-804.
Weeks et al., The effects of chemokine, adhesion and extracellular matrix molecules on binding of mesenchymal stromal cells to poly(I-lactic acid). Cytotherapy. Oct. 2012;14(9):1080-8.
Wegman et al., Combination of bone morphogenetic protein-2 plasmid DNA with chemokine CXCL12 creates an additive effect on bone formation onset and volume. Eur Cell Mater. Jul. 27, 2015;30:1-11.
Wegmann et al., Polyethyleneimine is a potent mucosal adjuvant for viral glycoprotein antigens. Nat Biotechnol. Sep. 2012;30(9):883-8.
Wei et al., Global mapping of H3K4me3 and H3K27me3 reveals specificity and plasticity in lineage fate determination of differentiating CD4+ T cells. Immunity. Jan. 16, 2009;30(1):155-67.
Weiner et al., Immunostimulatory oligodeoxynucleotides containing the CpG motif are effective as immune adjuvants in tumor antigen immunization. Proc Natl Acad Sci U S A. Sep. 30, 1997;94(20):10833-7.
Weiner, Induction and mechanism of action of transforming growth factor-beta-secreting Th3 regulatory cells. Immunol Rev. Aug. 2001;182:207-14.
Weisenberger et al., Comprehensive DNA Methylation Analysis on the Illumina® Infinium® Assay Platform. Illumina, Inc., 4 pages, Mar. 25, 2008.
Weiss et al., The demonstration of rupture of cell surfaces by an immunological technique. Exp Cell Res. Apr. 1963;30:331-8.
Wen et al., Mechanically Robust Gelatin-Alginate IPN Hydrogels by a Combination of Enzymatic and Ionic Crosslinking Approaches. Macromol Mater Eng. Apr. 2014;299(4):504-513.
Wernig et al., Function of skeletal muscle tissue formed after myoblast transplantation into irradiated mouse muscles. J Physiol. Jan. 15, 2000;522 Pt 2:333-45.
White et al., Leukemia inhibitory factor enhances regeneration in skeletal muscles after myoblast transplantation. Muscle Nerve. May 2001;24(5):695-7.
Wieland et al., Engineering molecular circuits using synthetic biology in mammalian cells. Annu Rev Chem Biomol Eng. 2012;3:209-34.
Wipff et al., Myofibroblast contraction activates latent TGF-beta1 from the extracellular matrix. J Cell Biol. Dec. 17, 2007;179(6):1311-23.
Wolchok et al., Nivolumab plus ipilimumab in advanced melanoma. N Engl J Med. Jul. 11, 2013;369(2):122-33.
Wong et al., Focal adhesion kinase links mechanical force to skin fibrosis via inflammatory signaling. Nat Med. Dec. 11, 2011;18(1):148-52.
Wong et al., Mechanical force prolongs acute inflammation via T-cell-dependent pathways during scar formation. FASEB J. Dec. 2011;25(12):4498-510.
Wong et al., Pushing back: wound mechanotransduction in repair and regeneration. J Invest Dermatol. Nov. 2011;131(11):2186-96.
Wozniak et al., Mechanotransduction in development: a growing role for contractility. Nat Rev Mol Cell Biol. Jan. 2009;10(1):34-43.
Wright et al., Muscle-based gene therapy and tissue engineering for the musculoskeletal system. Drug Discov Today. Jul. 1, 2001;6(14):728-733.
Wu et al., Intraperitoneal administration of poly(I:C) with polyethylenimine leads to significant antitumor immunity against murine ovarian tumors. Cancer Immunol Immunother. Aug. 2011;60(8):1085-96.
Xie et al., Preparation and Application of Surface-Coated Superparamagnetic Nanobeads in the Isolation of Genomic DNA. J Magn Magnetic Mater. Jun. 2004;277(1-2):16-23.
Xiong et al., Transcription Factor STAT3 as a Novel Molecular Target for Cancer Prevention. Cancers (Basel). Apr. 16, 2014;6(2):926-57.
Yamazaki et al., CD8+ CD205+ splenic dendritic cells are specialized to induce Foxp3+ regulatory T cells. J Immunol. Nov. 15, 2008;181(10):6923-33.
Yancopoulos et al., Vascular-specific growth factors and blood vessel formation. Nature. Sep. 14, 2000;407(6801):242-8.
Yang et al., The effect of incorporating RGD adhesive peptide in polyethylene glycol diacrylate hydrogel on osteogenesis of bone marrow stromal cells. Biomaterials. Oct. 2005;26(30):5991-8.
Yee et al., Melanocyte destruction after antigen-specific immunotherapy of melanoma: direct evidence of t cell-mediated vitiligo. J Exp Med. Dec. 4, 2000;192(11):1637-44.
Yeung et al., Effects of substrate stiffness on cell morphology, cytoskeletal structure, and adhesion. Cell Motil Cytoskeleton. Jan. 2005;60(1):24-34.
Yoo et al., Bio-inspired, bioengineered and biomimetic drug delivery carriers. Nat Rev Drug Discov. Jul. 1, 2011;10(7):521-35.
Yoon, Hidden Markov Models and their Applications in Biological Sequence Analysis. Curr Genomics. Sep. 2009;10(6):402-15.
Young et al., Gelatin as a delivery vehicle for the controlled release of bioactive molecules. J Control Release. Dec. 5, 2005;109(1-3):256-74.
Yu et al., Induced pluripotent stem cell lines derived from human somatic cells. Science. Dec. 21, 2007;318(5858):1917-20.

(56) References Cited

OTHER PUBLICATIONS

Yu et al., Specific bone cells produce DLL4 to generate thymus-seeding progenitors from bone marrow. J Exp Med. May 4, 2015;212(5):759-74.
Yu, Designed synthesis of mono-dispersed silica-based nanostructures and their applications in drug/gene delivery. A thesis submitted for the degree of Doctor of Philosophy at the University of Queensland in 2014, 196 pages.
Yuen et al., Mimicking nature by codelivery of stimulant and inhibitor to create temporally stable and spatially restricted angiogenic zones. Proc Natl Acad Sci U S A. Oct. 19, 2010;107(42):17933-8.
Yuk et al., Electric current-sensitive drug delivery systems using sodium alginate/polyacrylic acid composites. Pharm Res. Jul. 1992;9(7):955-7.
Zammit et al., Kinetics of myoblast proliferation show that resident satellite cells are competent to fully regenerate skeletal muscle fibers. Exp Cell Res. Nov. 15, 2002;281(1):39-49.
Zammit et al., Muscle satellite cells adopt divergent fates: a mechanism for self-renewal? J Cell Biol. Aug. 2, 2004;166(3):347-57.
Zappasodi et al., The effect of artificial antigen-presenting cells with preclustered anti-CD28/-CD3/-LFA-1 monoclonal antibodies on the induction of ex vivo expansion of functional human antitumor T cells. Haematologica. Oct. 2008;93(10):1523-34.
Zeltinger et al., Effect of pore size and void fraction on cellular adhesion, proliferation, and matrix deposition. Tissue Eng. Oct. 2001;7(5):557-72.
Zemel et al., Optimal matrix rigidity for stress fiber polarization in stem cells. Nat Phys. Jun. 1, 2010;6(6):468-473.
Zhang et al., A comparative study of the antigen-specific immune response induced by co-delivery of CpG ODN and antigen using fusion molecules or biodegradable microparticles. J Pharm Sci. Dec. 2007;96(12):3283-92.
Zhang et al., A tension-induced mechanotransduction pathway promotes epithelial morphogenesis. Nature. Mar. 3, 2011;471(7336):99-103.
Zhang et al., Generation of a syngeneic mouse model to study the effects of vascular endothelial growth factor in ovarian carcinoma. Am J Pathol. Dec. 2002;161(6):2295-309.
Zhang et al., Talin depletion reveals independence of initial cell spreading from integrin activation and traction. Nat Cell Biol. Sep. 2008;10(9):1062-8.
Zhao et al., A cell-permeable Stat3 SH2 domain mimetic inhibits Stat3 activation and induces antitumor cell effects in vitro. J Biol Chem. Nov. 12, 2010;285(46):35855-65.
Zhao et al., Active scaffolds for on-demand drug and cell delivery. Proc Natl Acad Sci U S A. Jan. 4, 2011;108(1):67-72.
Zhao et al., Directed cell migration via chemoattractants released from degradable microspheres. Biomaterials. Aug. 2005;26(24):5048-63.
Zhao et al., Stress-relaxation behavior in gels with ionic and covalent crosslinks. J Appl Phys. Mar. 15, 2010;107(6):63509.
Zhou et al., Instability of the transcription factor Foxp3 leads to the generation of pathogenic memory T cells in vivo. Nat Immunol. Sep. 2009;10(9):1000-7.
Zhou et al., Microstructure and Mechanical Properties of Poly(L-lactide) Scaffolds Fabricated by Gelatin Particle Leaching Method. J Appl Polymer Sci. Nov. 5, 2005;98(3):1373-1379.
Zizzari et al., The Macrophage Galactose-Type C-Type Lectin (MGL) Modulates Regulatory T Cell Functions. PLoS One. Jul. 6, 2015;10(7):e0132617. 12 pages.
U.S. Appl. No. 15/434,781, filed Feb. 16, 2017, U.S. Pat. No. 10,813,988, Issued.
U.S. Appl. No. 17/015,177, filed Sep. 9, 2020, 2021-0170007, Published.
U.S. Appl. No. 13/386,950, filed Jan. 25, 2012, U.S. Pat. No. 8,728,456, Issued.
U.S. Appl. No. 14/185,494, filed Feb. 20, 2014, U.S. Pat. No. 9,381,235, Issued.
U.S. Appl. No. 15/147,442, filed May 5, 2016, U.S. Pat. No. 10,080,789, Issued.
U.S. Appl. No. 16/121,988, filed Sep. 5, 2018, 2019-0183992, Abandoned.
U.S. Appl. No. 15/564,905, filed Oct. 6, 2017, U.S. Pat. No. 11,150,242, Issued.
U.S. Appl. No. 17/501,821, filed Oct. 14, 2021, 2022-0107308, Published.
U.S. Appl. No. 16/316,778, filed Jan. 10, 2019, 2019-0292517, Published.
U.S. Appl. No. 11/638,796, filed Dec. 13, 2006, U.S. Pat. No. 8,067,237, Issued.
U.S. Appl. No. 13/305,088, filed Nov. 28, 2011, U.S. Pat. No. 8,932,583, Issued.
U.S. Appl. No. 14/223,759, filed Mar. 24, 2014, U.S. Pat. No. 9,132,210, Issued.
U.S. Appl. No. 14/750,423, filed Jun. 25, 2015, U.S. Pat. No. 9,446,107, Issued.
U.S. Appl. No. 15/085,858, filed Mar. 30, 2016, 2016-0271298, Abandoned.
U.S. Appl. No. 15/135,207, filed Apr. 21, 2016, U.S. Pat. No. 10,149,897, Issued.
U.S. Appl. No. 15/135,213, filed Apr. 21, 2016, U.S. Pat. No. 10,137,184, Issued.
U.S. Appl. No. 16/170,313, filed Oct. 25, 2018, U.S. Pat. No. 11,096,997, Issued.
U.S. Appl. No. 17/381,031, filed Jul. 20, 2021, Abandoned.
U.S. Appl. No. 13/877,572, filed Nov. 19, 2013, U.S. Pat. No. 11,202,759, Issued.
U.S. Appl. No. 17/522,297, filed Nov. 9, 2021, 2022-0192986, Published.
U.S. Appl. No. 14/112,096, filed Dec. 27, 2013, U.S. Pat. No. 10,045,947, Issued.
U.S. Appl. No. 14/166,689, filed Jan. 28, 2014, U.S. Pat. No. 9,675,561, Issued.
U.S. Appl. No. 15/617,837, filed Jun. 8, 2017, 2018-0243231, Abandoned.
U.S. Appl. No. 16/033,025, filed Jul. 11, 2018, 2019-0076373, Published.
U.S. Appl. No. 17/083,720, filed Oct. 29, 2020, 2021-0205233, Published.
U.S. Appl. No. 14/394,552, filed Oct. 15, 2014, U.S. Pat. No. 9,937,249, Issued.
U.S. Appl. No. 15/935,392, filed Mar. 26, 2018, U.S. Pat. No. 11,278,604, Issued.
U.S. Appl. No. 17/693,017, filed Mar. 11, 2022, Pending.
U.S. Appl. No. 15/303,985, filed Oct. 13, 2016, U.S. Pat. No. 10,682,400, Issued.
U.S. Appl. No. 16/877,274, filed May 18, 2020, 2020-0276290, Published.
U.S. Appl. No. 16/263,098, filed Jan. 31, 2019, 2019-0216910, Published.
U.S. Appl. No. 12/867,426, filed Jan. 13, 2012, U.S. Pat. No. 10,328,133, Issued.
U.S. Appl. No. 15/135,255, filed Apr. 21, 2016, U.S. Pat. No. 10,258,677, Issued.
U.S. Appl. No. 15/135,290, filed Apr. 21, 2016, 2016-0228543, Abandoned.
U.S. Appl. No. 15/135,294, filed Apr. 21, 2016, 2016-0220668, Abandoned.
U.S. Appl. No. 13/510,356, filed May 17, 2012, Abandoned.
U.S. Appl. No. 14/123,615, filed Mar. 17, 2014, U.S. Pat. No. 9,486,512, Issued.
U.S. Appl. No. 15/345,131, filed Nov. 7, 2016, U.S. Pat. No. 10,406,216, Issued.
U.S. Appl. No. 13/741,271, filed Jan. 14, 2013, U.S. Pat. No. 9,370,558, Issued.
U.S. Appl. No. 15/135,216, filed Apr. 21, 2016, U.S. Pat. No. 9,821,045, Issued.
U.S. Appl. No. 15/818,509, filed Nov. 20, 2017, U.S. Pat. No. 10,568,949, Issued.
U.S. Appl. No. 15/563,878, filed Oct. 2, 2017, 2018-0117171, Abandoned.
U.S. Appl. No. 15/546,852, filed Jul. 27, 2017, 2018-0021253, Published.

(56) References Cited

OTHER PUBLICATIONS

U.S. Appl. No. 16/075,937, filed Aug. 6, 2018, 2019-0060525, Published.
U.S. Appl. No. 16/708,218, filed Dec. 9, 2019, 2020-0206333, Published.
U.S. Appl. No. 17/414,037, filed Jun. 15, 2021, 2022-0047778, Published.

* cited by examiner

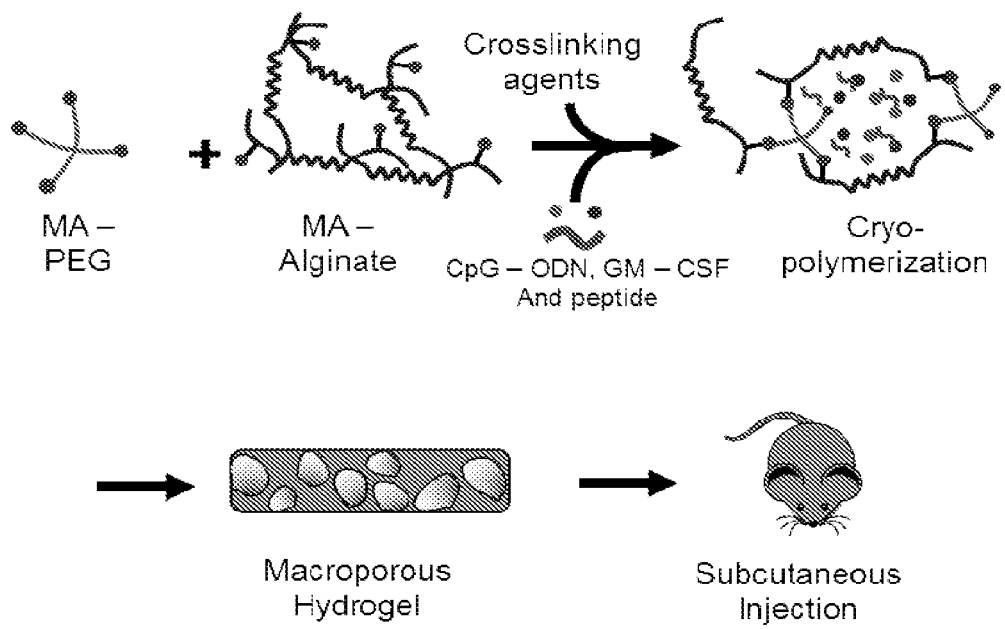
FIG. 1A
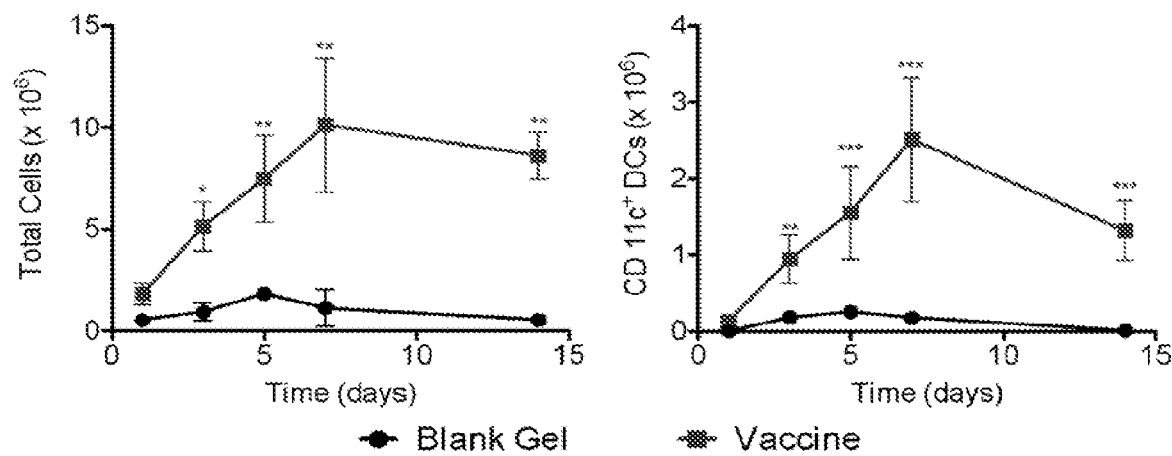
FIG. 1B
FIG. 1C

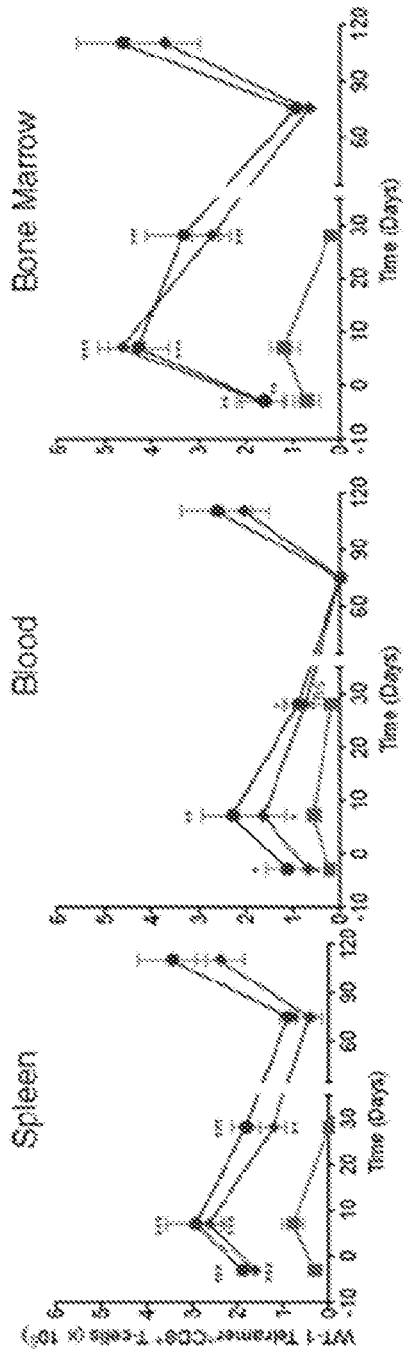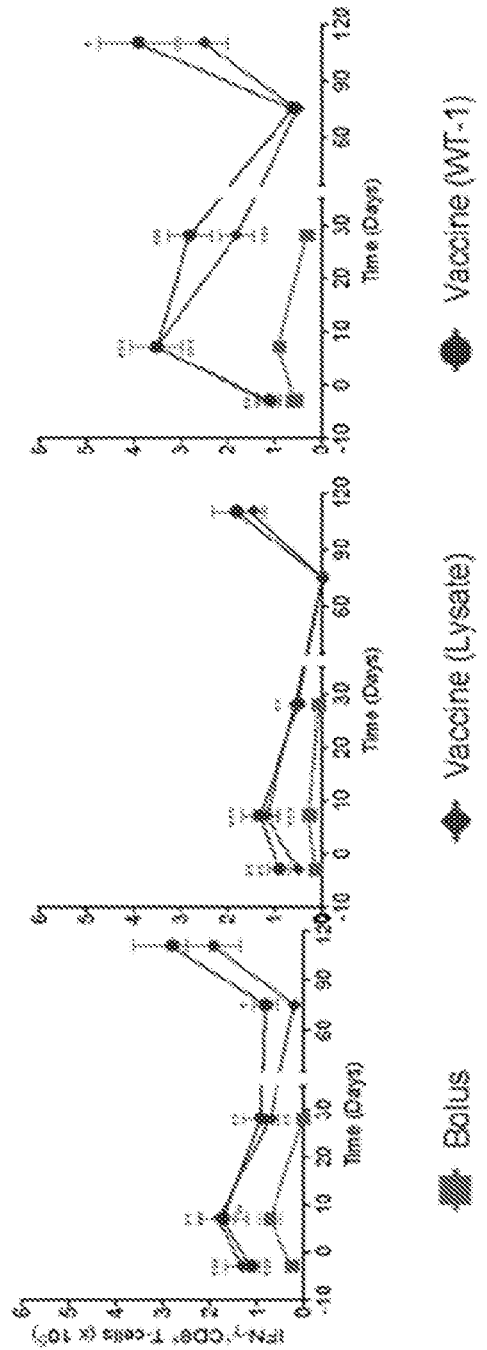
FIG. 6C
FIG. 6D

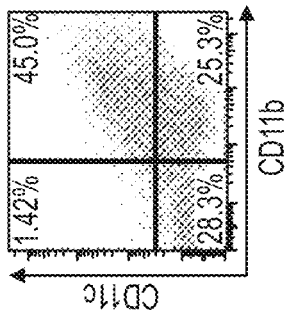
FIG. 22F
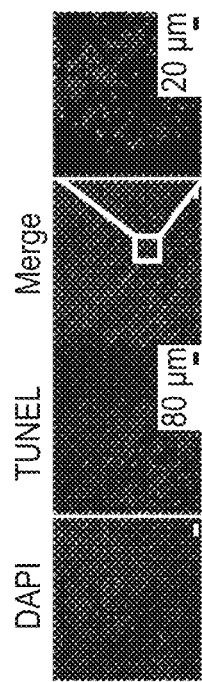
FIG. 22E
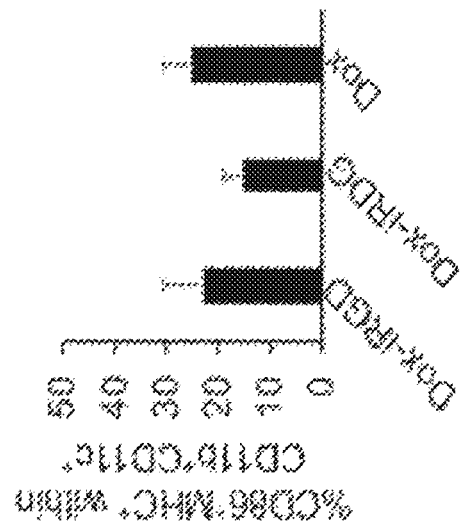
FIG. 22I
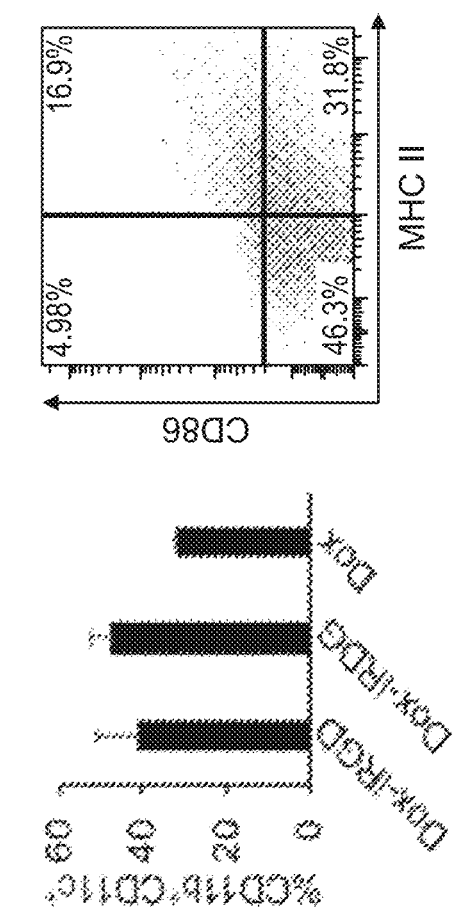
FIG. 22H
FIG. 22G

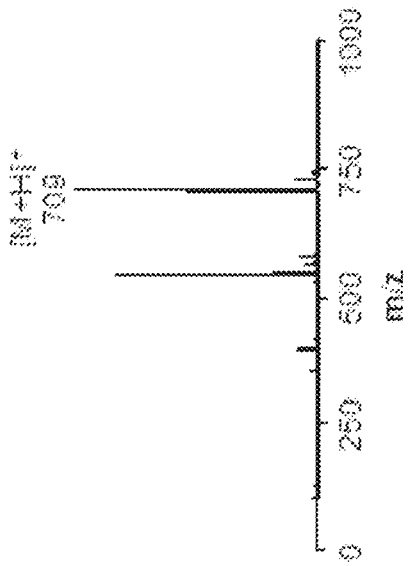
FIG. 24B
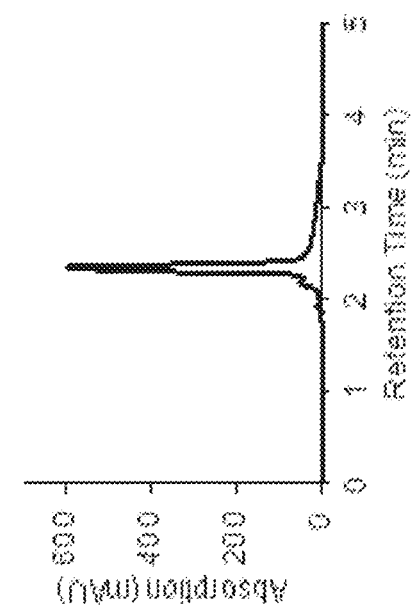
FIG. 24D
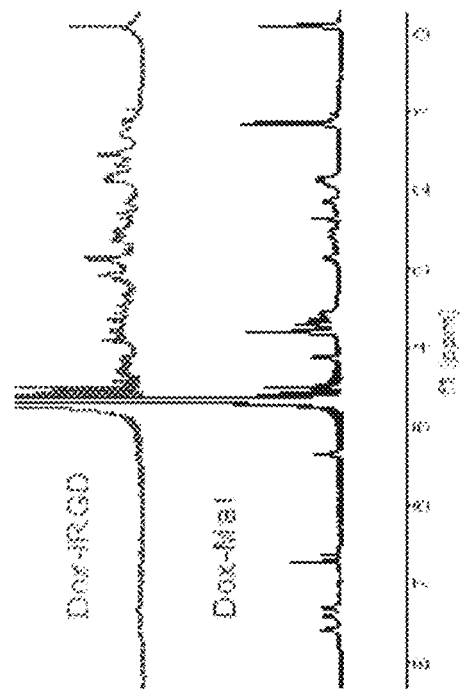
FIG. 24C
FIG. 24E

| Group Description | Median Survival (day) | Survival Increase (day) | % Survival Increase |
|---|---|---|---|
| Dox-iRGD+CpG | 39 | 12 | 44.4 |
| CpG | 32 | 5 | 18.5 |
| Dox-iRGD | 31 | 4 | 14.8 |
| Untreated | 27 | -- | -- |

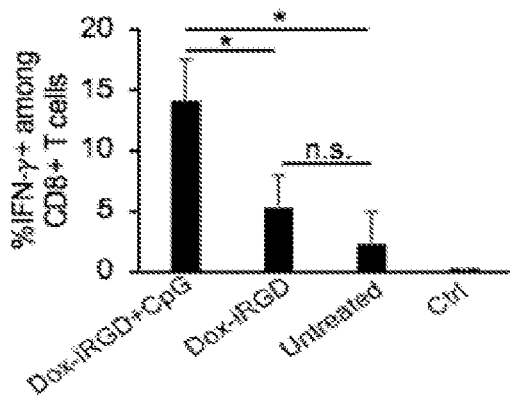 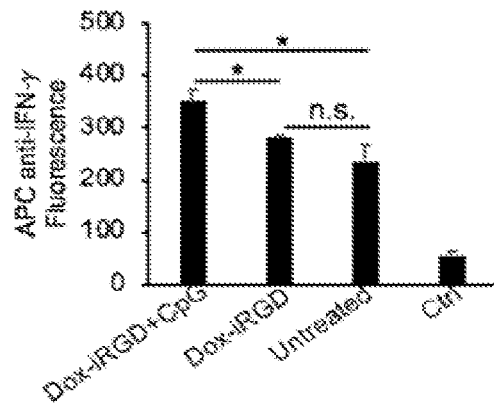
FIG. 28D          FIG. 28E
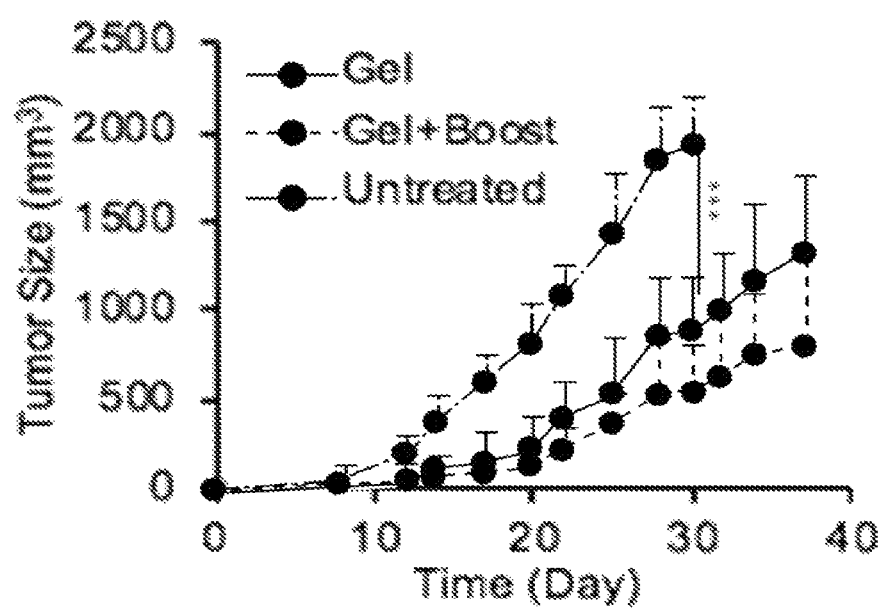
FIG. 28F

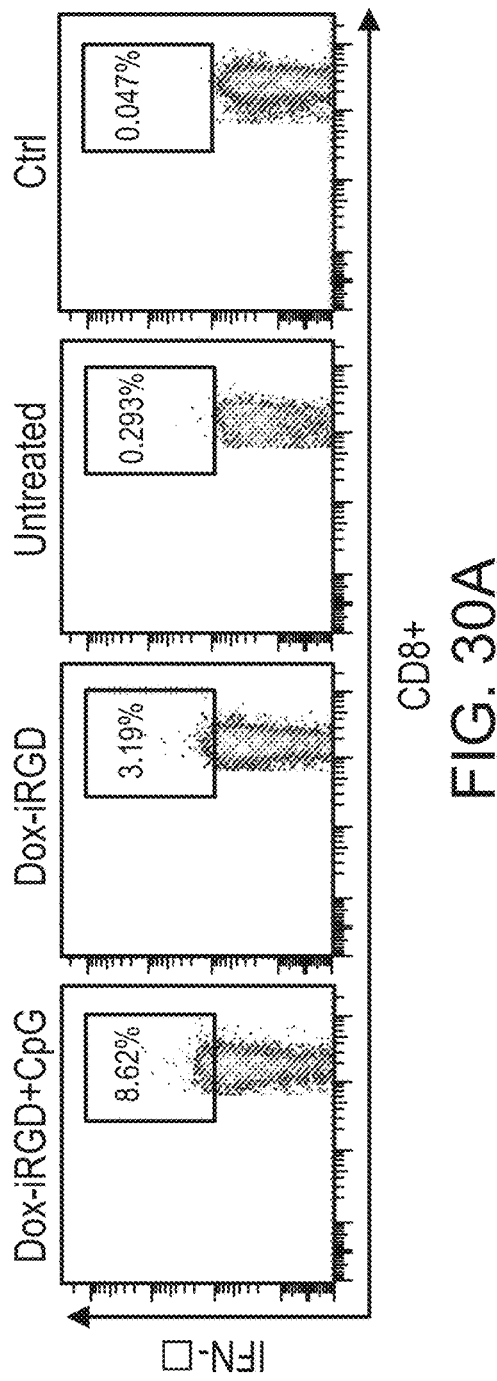
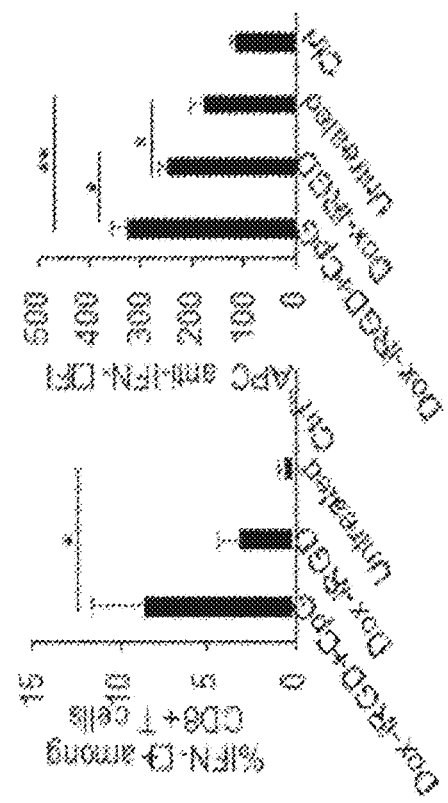
FIG. 30A
FIG. 30B
FIG. 30C

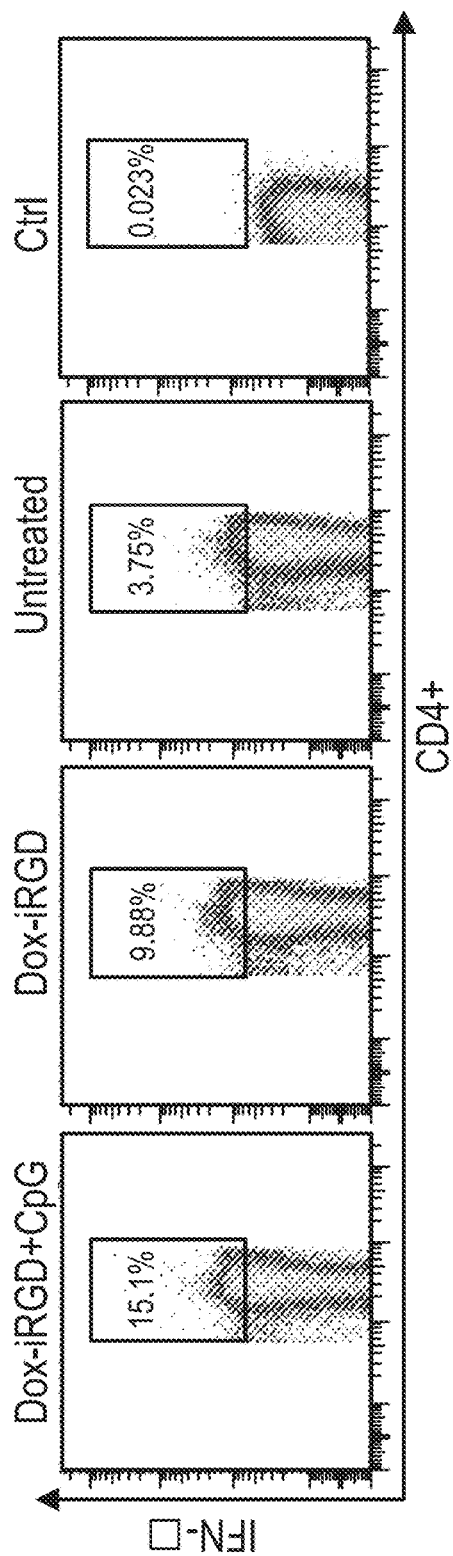
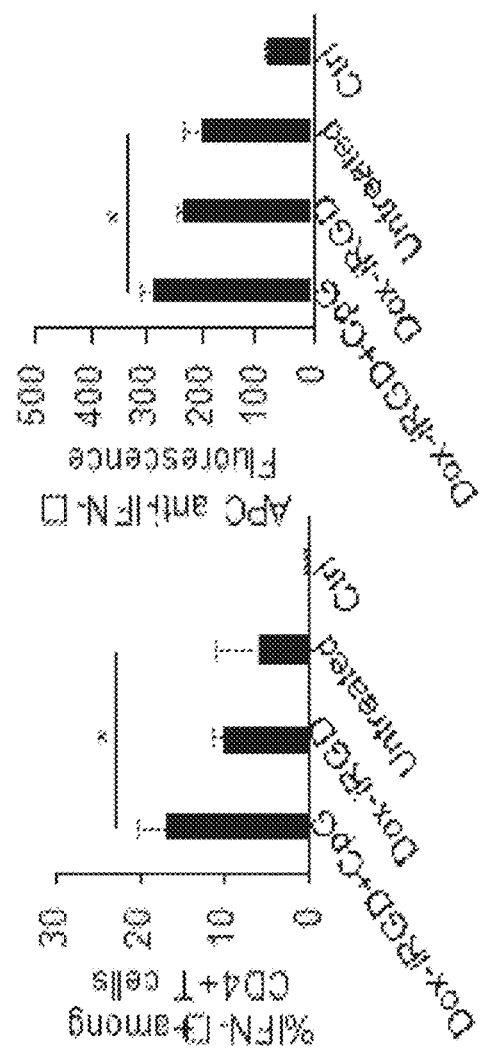
FIG. 30G
FIG. 30H
FIG. 30I

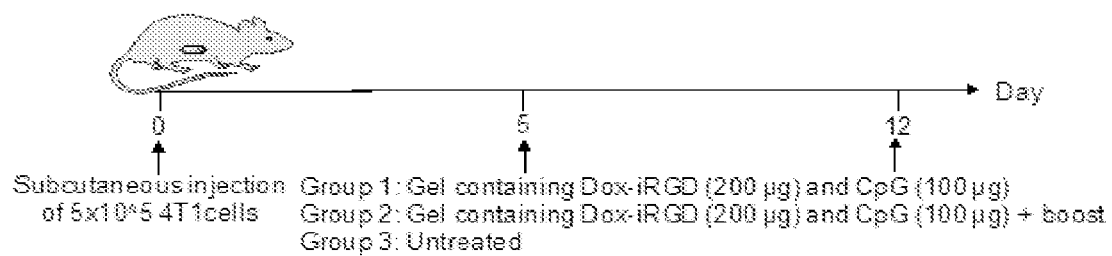
FIG. 31A
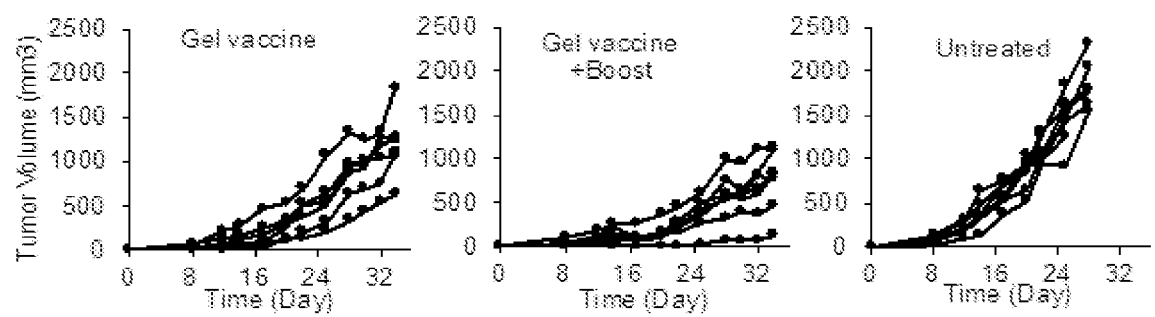
FIG. 31B
| Group Description | Median Survival (day) | Survival Increase (day) | % Survival Increase |
|---|---|---|---|
| Gel | 45.0 | 15.0 | 50.0 |
| Gel + Boost | 49.0 | 19.0 | 63.3 |
| Untreated | 30.0 | -- | -- |
FIG. 31C

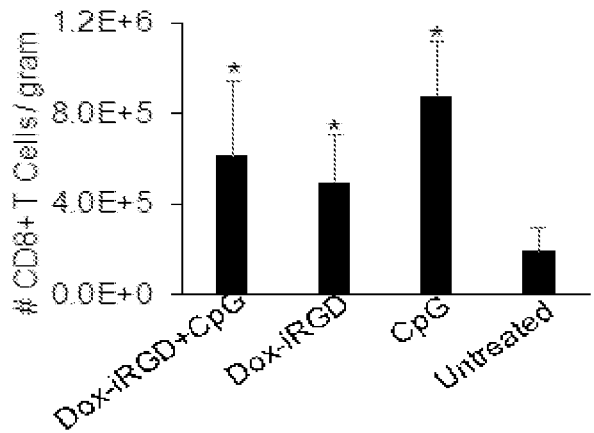
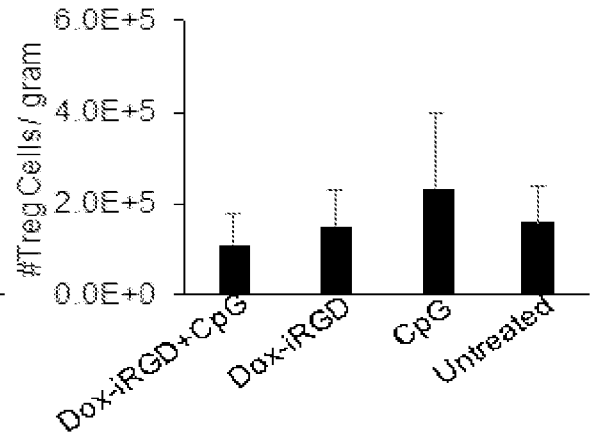
FIG. 35A    FIG. 35B
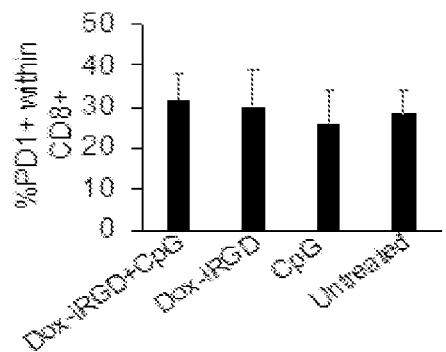
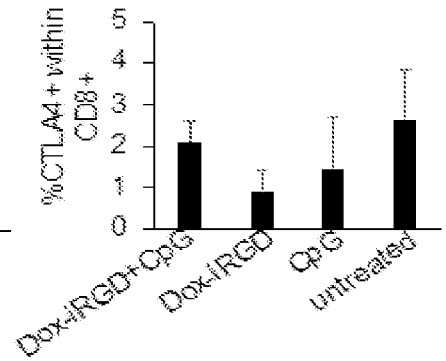
FIG. 36A    FIG. 36B

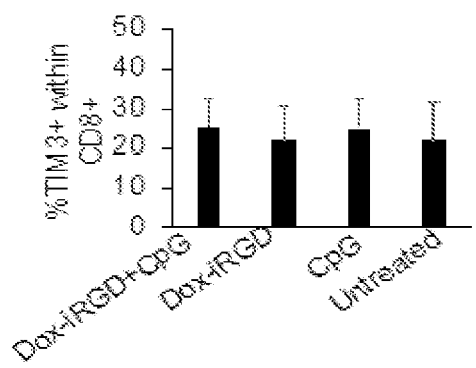 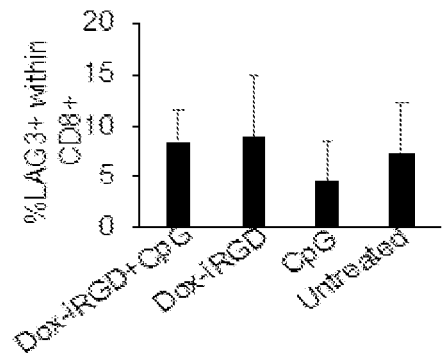
FIG. 36C                              FIG. 36D

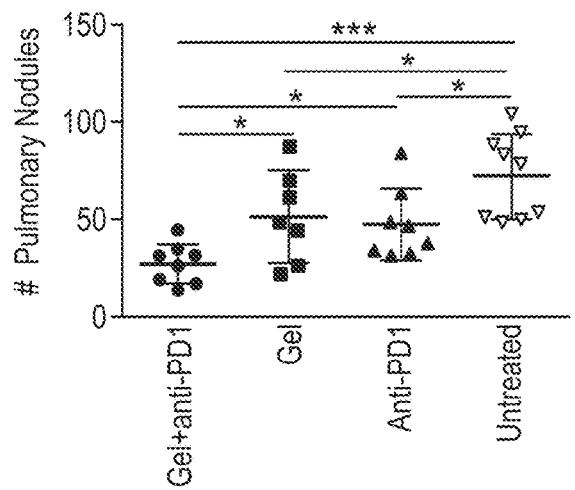
FIG. 37F
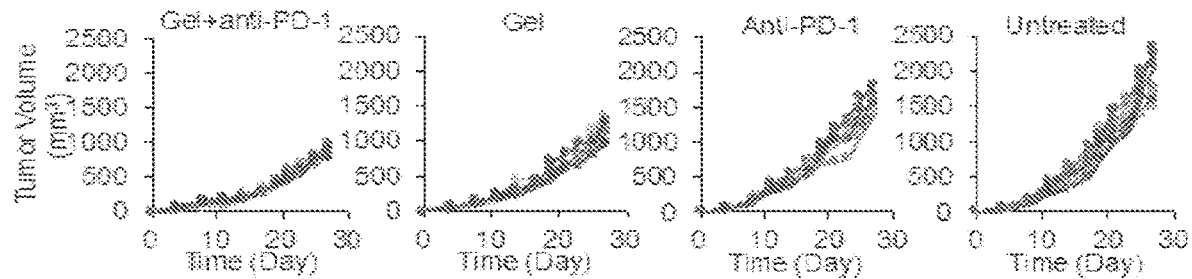
FIG. 38A
FIG. 38B

SEQUENCE LISTING

```
<160> NUMBER OF SEQ ID NOS: 3

<210> SEQ ID NO 1
<211> LENGTH: 9
<212> TYPE: PRT
<213> ORGANISM: Artificial Sequence
<220> FEATURE:
<223> OTHER INFORMATION: Antigen Peptide

<400> SEQUENCE: 1

Arg Met Phe Pro Asn Ala Pro Tyr Leu
1               5

<210> SEQ ID NO 2
<211> LENGTH: 20
<212> TYPE: DNA
<213> ORGANISM: Artificial Sequence
<220> FEATURE:
<223> OTHER INFORMATION: Synthesized Oligonucleotide Adjuvant

<400> SEQUENCE: 2
tccatgacgt tcctgacgtt                                                      20

<210> SEQ ID NO 3
<211> LENGTH: 24
<212> TYPE: DNA
<213> ORGANISM: Artificial Sequence
<220> FEATURE:
<223> OTHER INFORMATION: Synthesized Oligonucleotide Adjuvant

<400> SEQUENCE: 3
ttagggttag ggttagggtt aggg                                                 24
```

US 12,514,865 B2

BIOMATERIAL-BASED ANTIGEN FREE VACCINE AND THE USE THEREOF

CROSS-REFERENCE TO RELATED APPLICATIONS

The instant application is a continuation of PCT Application No. PCT/US2020/052301, filed on Sep. 23, 2020, which claims priority to U.S. Provisional Application No. 62/904,446, filed on Sep. 23, 2019, the entire contents of each of which are incorporated herein by reference in their entirety.

GOVERNMENT SUPPORT

This invention was made with Government support under CA223255, EB023287, HL129903 and CA214369 awarded by the National Institutes of Health. The Government has certain rights in the invention.

REFERENCE TO THE SEQUENCE LISTING

The instant application contains a Sequence Listing which has been submitted electronically in ASCII format and is hereby incorporated by reference in its entirety. Said ASCII copy, created on Mar. 21, 2022, is named 117823_20502_Sequence_Final.txt and is 838 bytes in size.

BACKGROUND OF THE INVENTION

Many cancers remain resistant to current chemotherapies and/or immunotherapies. Cancer vaccines that deliver antigens and adjuvants to antigen-presenting cells (APCs) (e.g., dendritic cells (DCs)) and subsequently elicit antigen-specific cytotoxic T lymphocyte (CTL) and humoral responses can synergize with these cancer immunotherapies to enhance response rates, and potentially reduce adverse effects. However, traditional cancer vaccines that deliver mixtures of antigens and adjuvants are not effective in treating established cancers, likely due to inadequate activation of adaptive immune responses.

There is a need for newer, more effective treatment for cancers, particularly for cancers that are resistant to chemotherapies and/or immunotherapies.

SUMMARY OF THE INVENTION

Disclosed herein are novel compositions and methods for enhancing an immune response against a cancer. The composition and methods disclosed herein provide a means to treat and/or prevent cancer.

In one aspect, the present invention provides method of preventing or treating a cancer in a subject. The method includes administering to the subject a vaccine composition, wherein the vaccine composition comprises a porous scaffold; and a recruitment composition that recruits an immune cell to the scaffold, wherein the vaccine composition does not comprise a cancer antigen prior to the administration of the vaccine composition to the subject; and administering to the subject an agent that induces an immunogenic cancer cell death, thereby preventing or treating the cancer.

In one embodiment, the method reduces tumor size, reduces cancer burden, increases survival time, prevents cancer from developing in the subject, depletes cancer cells in the subject, prevents or reduces cancer relapse, or prevents or reduces cancer recurrence or metastasis.

In another aspect, the present invention provides a method of enhancing an immune response against a cancer in a subject. The method includes administering to the subject a vaccine composition, wherein the vaccine composition comprises a porous scaffold; and a recruitment composition that recruits an immune cell to the scaffold, wherein the vaccine composition does not comprise a cancer antigen prior to the administration of the vaccine composition to the subject; and administering to the subject an agent that induces an immunogenic cancer cell death, thereby enhancing the immune response against the cancer.

In one embodiment, the immune response is selected from the group consisting of activation of dendritic cell, sustained activation of dendritic cell, activation of dendritic cell in tumor microenvironment, recognition of antigen by a cytotoxic T lymphocyte, increase of tumor infiltrating T cells, and enhancement of CD8+:Treg ratio at tumor site.

In still another aspect, the present invention provides a method of preventing or reducing the recurrence of a solid tumor after surgery in the subject. The method includes administering to the subject a vaccine composition after a primary tumor resection at or near the original tumor area, wherein the vaccine composition comprises a porous scaffold, an agent that induces an immunogenic cancer cell death, and a recruitment composition that recruits an immune cell to the scaffold, wherein the vaccine composition does not comprise a cancer antigen prior to the administration of the composition to the subject, thereby preventing or reducing recurrence of the tumor.

In yet another aspect, the present invention provides method of treating a cancer in a subject. The method includes administering to the subject an inhibitor of immunosuppression and a vaccine composition, wherein the vaccine composition comprises: a porous scaffold; a recruitment composition that recruits an immune cell to the scaffold; and an agent that induces an immunogenic cancer cell death wherein the vaccine composition does not comprise a cancer antigen before the administration to the subject.

In one embodiment of various aspects of the invention, the vaccine composition further comprises an adjuvant.

In one embodiment, the inhibitor of immunosuppression comprises an antibody against an immune checkpoint protein. In another embodiment, the antibody comprises an anti-PD-1 antibody or an anti-PD-L1 antibody. In another embodiment, the vaccine composition is administered prior to, concurrently with, or after the administration of the inhibitor of the immunosuppressor. In still another embodiment, the vaccine composition is administered prior to the administration of the inhibitor of immunosuppression. In yet another embodiment, the vaccine composition is administered 1 day, 2 days, 4 days, one week, two weeks, one month, 2 months, 4 months, or 6 months prior to the administration of the inhibitor of the immunosuppression.

In various embodiments of any aspects of the invention, the agent that induces the immunogenic cancer cell death is selected from the group consisting of a radiation therapy and a chemotherapeutic agent. In one embodiment, the agent is a chemotherapeutic agent. In still another embodiment, the chemotherapeutic agent is selected from the group consisting of anthracycline, oxaliplatin, bortezomib and derivative or analog thereof. In yet another embodiment, the chemotherapeutic agent comprises an anthracycline or derivative or analog thereof. In another embodiment, the chemotherapeutic agent is selected from the group consisting of doxorubicin, daunorubicin, epirubicin, idarubicin, valrubicin, and derivative or analog thereof. In still another embodiment, the chemotherapeutic agent comprises doxorubicin or doxorubicin-iRGD.

In various embodiments of any aspects of the invention, the cancer is a poorly immunogenic cancer.

In still another aspect, the agent that induces an immunogenic cancer cell death is administered prior to, concurrently with, or after the administration of the vaccine composition. In one embodiment, the agent that induces an immunogenic cancer cell death is administered prior to the administration of the vaccine composition. In another embodiment, the agent that induces an immunogenic cancer cell death is administered at least 1 day, 7 days, 14 days, 1 month, 2 months, 3 months, or 6 months prior to the administration of the vaccine composition.

In various embodiments of any aspects of the invention, the cancer comprises a hematological malignancy or a solid tumor cancer that has developed a metastatic cell. In one embodiment, the vaccine composition is administered subcutaneously, intraperitoneally, intravenously, or intramuscularly.

In another embodiment, the hematological malignancy is selected from the group consisting of Hodgkin's disease, non-Hodgkin's lymphoma (such as Burkitt's lymphoma, anaplastic large cell lymphoma, spelenic marginal zone lymphoma, hepatospelenic T-cell lymphoma, angioimmunoblastic T-cell lymphoma), multiple myeloma, Waldenstrom macroglobulinemia, plasmacytoma, acute lymphcytic leukemia (ALL), chronic lyphcytic leukemia (CLL), acute myeloid leukemia (AML), acute megakaryoblastic leukemia (AMKL), chronic idiopthic myelofibrosis (MF), chronic myelogenous leukemia (CML), T-cell prolymphocytic leukemia (T-PLL), B-cell prolymphocytic leukemia (B-PLL), chronic neutrophilic leukemia (CNL), hairy cell leukemia (HCL), T-cell large granular lymphocyte leukemia (T-LGL), and aggressive NK-cell leukemia.

In still another embodiment, the hematological malignancy comprises AML.

In various embodiments of any aspects of the invention, the cancer comprises a solid tumor cancer. In one embodiment, the vaccine composition is administered peritumorally or intratumorally. In another embodiment, the solid tumor is selected from the group consisting of bladder cancer, breast cancer, cervical cancer, colon and rectal cancer, endometrial cancer, kidney cancer, lip and oral cancer, liver cancer, melanoma, mesothelioma, non-small cell lung cancer, non-melanoma skin cancer, ovarian cancer, pancreatic cancer, prostate cancer, sarcoma, small cell lung cancer, and thyroid cancer.

In various embodiments of any aspects of the invention, the porous scaffold comprises open, interconnected macropores.

In various embodiments of any aspects of the invention, the porous scaffold comprises a hydrogel. In one embodiment, the porous scaffold comprises a cryogel.

In various embodiments of any aspects of the invention, the scaffold comprises a polymer or co-polymer selected from the group consisting of polylactic acid, polyglycolic acid, PLGA, alginate or an alginate derivative, gelatin, collagen, agarose, hyaluronic acid, poly(lysine), polyhydroxybutyrate, poly-epsilon-caprolactone, polyphosphazines, poly(vinyl alcohol), poly(alkylene oxide), poly(ethylene oxide), poly(allylamine), poly(acrylate), poly(4-aminomethyl styrene), pluronic polyol, polyoxamer, poly(uronic acid), poly(anhydride), poly(vinylpyrrolidone), and any combination thereof.

In various embodiments of any aspects of the invention, the scaffold comprises a click-hydrogel or click cryogel. In one embodiment, the scaffold comprises a click-alginate, a click gelatin, or a click hyaluronic acid.

In various embodiments of any aspects of the invention, the scaffold comprises a polymer or co-polymer selected from the group consisting of alginate, alginate derivative, hyaluronic acid, hyaluronic acid derivative, gelatin, gelatin derivative, polyethylene glycol (PEG), polyethylene glycol derivative, and the combination thereof. In one embodiment, the scaffold comprises methacrylated alginate (MA-alginate), methacrylated PEG (MA-PEG), or the combination thereof. In another embodiment, the scaffold comprises methacrylated alginate (MA-alginate) and methacrylated PEG (MA-PEG). In still another embodiment, the molar ratio between MA-alginate and MA-PEG is about from 100:1 to 0.1:1. In yet another embodiment, the molar ratio between MA-alginate and MA-PEG is about 50:1, 25:1, 10:1, 4:1, 2:1, or 1:1. In another embodiment, the scaffold comprises MA-alginate and is substantially free of MA-PEG. In various embodiments of any aspects of the invention, the scaffold comprises pores having a diameter between about 1 µm and 500 µm. In one embodiment, the scaffold comprises macropores. In another embodiment, the macropores have a diameter between about 50 µm and 300 µm. In still another embodiment, the macropores are of of different sizes.

In various embodiments of any aspects of the invention, the scaffold does not comprise a macropore prior to the administration to a subject, wherein the scaffold comprises porogen hydrogel microbeads and a bulk hydrogel, and wherein the porogen hydrogel microbeads degrade at least 10% faster than the bulk hydrogel polymer scaffold following administration of the scaffold into a subject, thereby resulting in a macropore network.

In one embodiment, the porogen hydrogel microbeads comprise oxidized alginate, or reduced alginate. In another embodiment, the bulk hydrogel comprises alginate.

In various embodiments of any aspects of the invention, the recruitment composition comprises a growth factor or a cytokine. In one embodiment, the growth factor or the cytokine is selected from a group consisting of GM-CSF, Flt3L, CCL-19, CCL-20, CCL-21, a N-formyl peptide, fractalkine, monocyte chemotactic protein-1, MIP-3α, CXCL10 (IP-10), CXCL9 (MIG), and CCLS. In another embodiment, the growth factor or the cytokine comprises GM-CSF.

In various embodiments of any aspects of the invention, the adjuvant is selected from the group consisting of mineral salt-based adjuvants such as alum-based adjuvants, calcium-based adjuvants, iron-based adjuvants, or zirconium-based adjuvants; particulate adjuvants; mucosal adjuvants; tensoactive adjuvants; bacteria-derived adjuvants; oil-based adjuvants; cytokines; liposome adjuvants; polymeric microsphere adjuvants; and carbohydrate adjuvants.

In one embodiment, the adjuvant is selected from the group consisting of aluminium hydroxide, aluminum phosphate, calcium phosphate, Quil A, Quil A derived saponin QS-21, or other types of saponins, Detox, ISCOMs, cell wall peptidoglycan or lipopolysaccharide of Gram-negative bacteria, trehalose dimycolate, bacterial nucleic acids such as DNA containing CpG motifs, FIA, Montanide, Adjuvant 65, Freund's complete adjuvant, Freund's incomplete adjuvant, Lipovant, interferon, granulocyte-macrophage colony stimulating factor (GM-CSF), AS03, ASO4, IL-1, IL-2, IL-3, IL-4, IL-5, IL-6, IL-7, IL-8, IL-10, IL-12, IL-15, IL-17, IL-18, STING, Toll-like receptor ligand, CD40L, ovalbumin (OVA), monophosphoryl lipid A (MPL), polyinosinic:polycytidylic acid (poly(I:C)), a combination of LPS (or MPLA) and OxPAPC, MF59, N-acetyl muramyl-L-alanyl-D-isoglutamine (MDP), poly (DL-lactide-coglycolide) microspheres, paraffin oil, squalene, virosome, gamma inulin, glucans, dextrans, lentinans, glucomannans and galactomannans, pathogen-associated molecular patterns (PAMPs), damage-associated molecular pattern molecules (DAMPs), antibodies against immune suppressive molecules (e.g., antibody or antagonist against transforming growth factor (TGF)-beta, A2aR antagonists), Freund's complete adjuvant, Freund's incomplete adjuvant, lipopolysaccharides (LPS), Fas ligand, Trail, lymphotactin, Mannan (M-FP), APG-2, Hsp70 and Hsp90.

In various embodiments of any aspects of the invention, the adjuvant comprises a TLR agonist. In one embodiment, the TLR agonist is selected from the group consisting of TLR1 agonist, TLR2 agonist, TLR3 agonist, TLR4 agonist, TLR5 agonist, TLR6 agonist, TLR7 agonist, TLR8 agonist, TLR9 agonist, TLR10 agonist, TLR11 agonist, TLR12 agonist, and TLR13 agonist. In another embodiment, the TLR agonist comprises a TLR9 agonist. In still another embodiment, the TLR9 agonist comprises CpG-ODN.

In various embodiments of any aspects of the invention, the immune cell comprises a cell selected from the group consisting of T cells, B cells, leukocytes, lymphocytes, antigen presenting cells, dendritic cells, neutrophils, eosinophils, basophils, monocytes, macrophages, histiocytes, mast cells, microglia, and NK cells. In one embodiment, the immune cell comprises an antigen presenting cell. In another embodiment, the antigen presenting cell is selected from the group consisting of dendritic cells, macrophages, Langerhans cells and B cells. In still another embodiment, the antigen presenting cell comprises a dendritic cell.

In various embodiments of any aspects of the invention, the vaccine composition comprises a cancer cell chemoattractant that recruits the cancer cell to the scaffold. In one embodiment, the cancer cell chemoattractant recruits the cancer cell that is susceptible to, is undergoing immunogenic cell death or has undergone immunogenic cell death.

In various embodiments of any aspects of the invention, the vaccine composition attracts, traps, captures or otherwise acquires a cancer antigen to or near the vaccine composition. In one embodiment, the cancer antigen comprises a cancer specific antigen, a cancer associated antigen, a cancer cell lysate, or a live attenuated cancer cell. In another embodiment, the cancer antigen is derived from an intracellular protein.

In one aspect, the present invention provides a vaccine composition for enhancing an immune response against a disease. The vaccine composition includes a porous scaffold; a recruitment composition that recruits an immune cell to the scaffold; and an adjuvant. In one embodiment, the composition does not comprise a cancer antigen prior to the administration to a subject.

In various embodiments of any aspects of the invention, the porous scaffold comprises open, interconnected macropores.

In various embodiments of any aspects of the invention, the porous scaffold comprises a hydrogel. In one embodiment, the porous scaffold comprises a cryogel.

In various embodiments of any aspects of the invention, the scaffold comprises a polymer or co-polymer selected from the group consisting of polylactic acid, polyglycolic acid, PLGA, alginate or an alginate derivative, gelatin, collagen, agarose, hyaluronic acid, poly(lysine), polyhydroxybutyrate, poly-epsilon-caprolactone, polyphosphazines, poly(vinyl alcohol), poly(alkylene oxide), poly(ethylene oxide), poly(allylamine), poly(acrylate), poly(4-aminomethyl styrene), pluronic polyol, polyoxamer, poly (uronic acid), poly(anhydride), poly(vinylpyrrolidone), and any combination thereof.

In various embodiments of any aspects of the invention, the scaffold comprises a click-hydrogel or click cryogel. In one embodiment, the scaffold comprises a click-alginate, a click gelatin, or a click hyaluronic acid.

In various embodiments of any aspects of the invention, the scaffold comprises a polymer or co-polymer selected from the group consisting of alginate, alginate derivative, hyaluronic acid, hyaluronic acid derivative, gelatin, gelatin derivative, polyethylene glycol (PEG), polyethylene glycol derivative, and the combination thereof. In one embodiment, the scaffold comprises methacrylated alginate (MA-alginate), methacrylated PEG (MA-PEG), or the combination thereof. In another embodiment, the scaffold comprises methacrylated alginate (MA-alginate) and methacrylated PEG (MA-PEG). In still another embodiment, the molar ratio between MA-alginate and MA-PEG is about from 100:1 to 0.1:1. In yet another embodiment, the molar ratio between MA-alginate and MA-PEG is about 50:1, 25:1, 10:1, 4:1, 2:1, or 1:1. In another embodiment, the scaffold comprises MA-alginate and is substantially free of MA-PEG.

In various embodiments of any aspects of the invention, the scaffold comprises pores having a diameter between about 1 μm and 500 μm. In one embodiment, the scaffold comprises a macropore. In another embodiment, the macropore has a diameter between about 50 μm and 300 μm. In still another composition, scaffold comprises macropores of different sizes.

In various embodiments of any aspects of the invention, the composition does not comprise a macropore prior to the administration to a subject, and wherein the porogen hydrogel microbeads degrade at least 10% faster than the bulk hydrogel polymer scaffold following administration of the scaffold into a subject, resulting in a macropore network in their places. In one embodiment, the porogen hydrogel microbeads comprise oxidized or reduced alginate. In another embodiment, the bulk hydrogel comprises alginate.

In various embodiments of any aspects of the invention, the disease comprises a cancer or an infectious disease. In one embodiment, the cancer is a hematologic malignancy or a solid tumor cancer.

In one embodiment, the hematological malignancy is selected from the group consisting of Hodgkin's disease, non-Hodgkin's lymphoma (such as Burkitt's lymphoma, anaplastic large cell lymphoma, spelenic marginal zone lymphoma, hepatospelenic T-cell lymphoma, angioimmunoblastic T-cell lymphoma), multiple myeloma, Waldenstrom macroglobulinemia, plasmacytoma, acute lymphcytic leukemia (ALL), chronic lyphcytic leukemia (CLL), acute myeloid leukemia (AML), acute megakaryoblastic leukemia (AMKL), chronic idiopthic myelofibrosis (MF), chronic myelogenous leukemia (CML), T-cell prolymphocytic leukemia (T-PLL), B-cell prolymphocytic leukemia (B-PLL), chronic neutrophilic leukemia (CNL), hairy cell leukemia (HCL), T-cell large granular lymphocyte leukemia (T-LGL), and aggressive NK-cell leukemia.

In another embodiment, the solid tumor cancer is selected from the group consisting of bladder cancer, breast cancer, cervical cancer, colon and rectal cancer, endometrial cancer, kidney cancer, lip and oral cancer, liver cancer, melanoma, mesothelioma, non-small cell lung cancer, nonmelanoma skin cancer, ovarian cancer, pancreatic cancer, prostate cancer, sarcoma, small cell lung cancer, and thyroid cancer.

In various embodiments of any aspects of the invention, wherein the cancer is a poorly immunogenic cancer.

In various embodiments of any aspects of the invention, the composition further comprises a cancer antigen. In one embodiment, the antigen is derived from an extracellular protein or an intracellular protein. In another embodiment, the cancer antigen is a cancer specific antigen, a cancer associated antigen, a cancer cell lysate, or a live attenuated cancer cell.

In one embodiment, the cancer specific antigen or the cancer associated antigen is selected from the group consisting of central nervous system (CNS) cancer antigen, CNS germ cell tumor antigen, lung cancer antigen, leukemia antigen, acute myeloid leukemia antigen, multiple myeloma antigen, renal cancer antigen, malignant glioma antigen, medulloblastoma antigen, breast cancer antigen, prostate cancer antigen, Kaposi's sarcoma antigen, ovarian cancer antigen, adenocarcinoma antigen, and melanoma antigen.

In another embodiment, the cancer specific antigen or the cancer associated antigen is selected from the group consisting of MAGE series of antigens (MAGE-1 is an example), MART-1/melana, tyrosinase, ganglioside, gp100, GD-2, O-acetylated GD-3, GM-2, MUC-1, Sosl, Protein kinase C-binding protein, Reverse transcriptase protein, AKAP protein, VRK1, KIAA1735, T7-1, T11-3, T11-9, Homo Sapiens telomerase ferment (hTRT), Cytokeratin-19 (CYFRA21-1), SQUAMOUS CELL CARCINOMA ANTIGEN 1 (SCCA-1), (PROTEIN T4-A), SQUAMOUS CELL CARCINOMA ANTIGEN 2 (SCCA-2), Ovarian carcinoma antigen CA125 (1A1-3B) (KIAA0049), MUCIN 1 (TUMOR-ASSOCIATED MUCIN), (CARCINOMA-ASSOCIATED MUCIN), (POLYMORPHIC EPITHELIAL MUCIN), (PEM), (PEMT), (EPISIALIN), (TUMOR-ASSOCIATED EPITHELIAL MEMBRANE ANTIGEN), (EMA), (H23AG), (PEANUT-REACTIVE URINARY MUCIN), (PUM), (BREAST CARCINOMA-ASSOCIATED ANTIGEN DF3), CTCL tumor antigen sel-1, CTCL tumor antigen se14-3, CTCL tumor antigen se20-4, CTCL tumor antigen se20-9, CTCL tumor antigen se33-1, CTCL tumor antigen se37-2, CTCL tumor antigen se57-1, CTCL tumor antigen se89-1, Prostate-specific membrane antigen, 5T4 oncofetal trophoblast glycoprotein, Orf73 Kaposi's sarcoma-associated herpesvirus, MAGE-C1 (cancer/testis antigen CT7), MAGE-B1 ANTIGEN (MAGE-XP ANTIGEN) (DAM10), MAGE-B2 ANTIGEN (DAME), MAGE-2 ANTIGEN, MAGE-4a antigen, MAGE-4b antigen, Colon cancer antigen NY-CO-45, Lung cancer antigen NY-LU-12 variant A, Cancer associated surface antigen, Adenocarcinoma antigen ART1, Paraneoplastic associated brain-testis-cancer antigen (onconeuronal antigen MA2; paraneoplastic neuronal antigen), Neuro-oncological ventral antigen 2 (NOVA2), Hepatocellular carcinoma antigen gene 520, TUMOR-ASSOCIATED ANTIGEN CO-029, Tumor-associated antigen MAGE-X2, Synovial sarcoma, X breakpoint 2, Squamous cell carcinoma antigen recognized by T cell, Serologically defined colon cancer antigen 1, Serologically defined breast cancer antigen NY-BR-15, Serologically defined breast cancer antigen NY-BR-16, Chromogranin A; parathyroid secretory protein 1, DUPAN-2, CA 19-9, CA 72-4, CA 195, Carcinoembryonic antigen (CEA), Trp2, ovalbumin, M27, M30, p53, hCGβ, TARP, hTERT, MIF, proteinase 3, and Wilms Tumor protein-1 (WT-1).

In another embodiment, the cancer specific antigen or the cancer associated antigen comprises an acute myeloid leukemia antigen. In still another embodiment, the cancer antigen is WT-$1_{126-134}$ antigen (SEQ ID NO: 1). In yet another embodiment, the cancer specific antigen or the cancer associated antigen is a breast cancer antigen.

In various embodiments of any aspects of the invention, the recruitment composition comprises a growth factor or a cytokine. In one embodiment, the recruitment composition is selected from a group consisting of GM-CSF, Flt3L, CCL-19, CCL-20, CCL-21, a N-formyl peptide, fractalkine, monocyte chemotactic protein-1, and MIP-3α. In another embodiment, the recruitment composition comprises GM-CSF.

In various embodiments of any aspects of the invention, the adjuvant is selected from the group consisting of mineral salt-based adjuvants such as alum-based adjuvants, calcium-based adjuvants, iron-based adjuvants, zirconium-based adjuvants, particulate adjuvants, mucosal adjuvants, tensoactive adjuvants, bacteria-derived adjuvants; oil-based adjuvants, cytokines, liposome adjuvants, polymeric microsphere adjuvants, and carbohydrate adjuvants.

In one embodiment, the adjuvant is selected from the group consisting of aluminium hydroxide, aluminum phosphate, calcium phosphate, Quil A, Quil A derived saponin QS-21, or other types of saponins, Detox, ISCOMs, cell wall peptidoglycan or lipopolysaccharide of Gram-negative bacteria, trehalose dimycolate, bacterial nucleic acids such as DNA containing CpG motifs, FIA, Montanide, Adjuvant 65, Freund's complete adjuvant, Freund's incomplete adjuvant, Lipovant, interferon, granulocyte-macrophage colony stimulating factor (GM-CSF), AS03, AS04, IL-1, IL-2, IL-3, IL-4, IL-5, IL-6, IL-7, IL-8, IL-10, IL-12, IL-15, IL-17, IL-18, STING, Toll-like receptor ligand, CD40L, ovalbumin (OVA), monophosphoryl lipid A (MPL), polyinosinic:polycytidylic acid (poly(I:C)), a combination of LPS (or MPLA) and OxPAPC, MF59, N-acetyl muramyl-L-alanyl-D-isoglutamine (MDP), poly (DL-lactide-coglycolide) microspheres, paraffin oil, squalene, virosome, gamma inulin, glucans, dextrans, lentinans, glucomannans and galactomannans, pathogen-associated molecular patterns (PAMPs), damage-associated molecular pattern molecules (DAMPs), antibodies against immune suppressive molecules (e.g., antibody or antagonist against transforming growth factor (TGF)-beta, A2aR antagonists), Freund's complete adjuvant, Freund's incomplete adjuvant, lipopolysaccharides (LPS), Fas ligand, Trail, lymphotactin, Mannan (M-FP), APG-2, Hsp70 and Hsp90.

In various embodiments of any aspects of the invention, the adjuvant comprises a TLR agonist. In one embodiment, the TLR agonist is selected from the group consisting of TLR1 agonist, TLR2 agonist, TLR3 agonist, TLR4 agonist, TLR5 agonist, TLR6 agonist, TLR7 agonist, TLR8 agonist, TLR9 agonist, TLR10 agonist, TLR11 agonist, TLR12 agonist, and TLR13 agonist. In another embodiment, the TLR agonist comprises a TLR9 agonist. In still another embodiment, the TLR9 agonist comprises a CpG-ODN.

In various embodiments of any aspects of the invention, the immune cell comprises a cell selected from the group consisting of T cells, B cells, leucocytes, lymphocytes, antigen presenting cells, dendritic cells, neutrophils, eosinophils, basophils, monocytes, macrophages, histiocytes, mast cells, and microglia. In one embodiment, the immune cell comprises an antigen presenting cell. In another embodiment, the antigen presenting cell is selected from the group consisting of dendritic cells, macrophages, Langerhans cells and B cells. In still another embodiment, the antigen present cell comprises a dendritic cell.

In various embodiments of any aspects of the invention, the vaccine composition, further comprising an agent that induces an immunogenic cancer cell death. In one embodiment, the agent is selected from the group consisting of chemotherapeutic agent, radiation therapy, an agent that delivers radiation therapy, photodynamic therapy, and an agent that delivers photodynamic therapy. In another embodiment, the agent comprises a chemotherapeutic agent. In still another embodiment, the chemotherapeutic agent comprises a cytarabine or an anthracycline. In yet another embodiment, the chemotherapeutic agent is selected from the group consisting of doxorubicin, daunorubicin, epirubicin, idarubicin, valrubicin, and derivative or analog thereof. In one embodiment, the chemotherapeutic agent is selected doxorubicin or doxorubicin-iRGD.

In various embodiments of any aspects of the invention, the vaccine composition further includes a cancer cell chemoattractant that recruits a cancer cell to the scaffold. In one embodiment, the cancer cell is susceptible to, is undergoing, or has undergone immunogenic cell death.

In still another aspect, the present invention provides a vaccine composition for enhancing an immune response in a subject against a cancer, comprising a macroporous cryogel scaffold, wherein the cryogel comprises an MA-alginate and an MA-PEG, and wherein the cryogel is injectable; a cell recruitment composition, wherein the cell recruitment composition comprises a GM-CSF; and an adjuvant, wherein the adjuvant comprises a CpG-ODN. In one embodiment, the composition does not comprise a cancer antigen prior to the administration of the composition to a subject. In another embodiment, the vaccine composition further includes a cancer specific antigen or a cancer associated antigen. In still another embodiment, the cancer is acute amyloid leukemia (AML). In yet another embodiment, the antigen is a WT-1 H-2D peptide (SEQ ID No: 1) or a AML cancer cell lysate.

In various embodiments of any aspects of the invention, the vaccine composition is used in a prevention or treatment of a cancer. In one embodiment, the cancer is AML.

In yet another aspect, the present invention provides a vaccine composition for enhancing an immune response in a subject against a cancer. The vaccine composition includes a pore-forming hydrogel scaffold, wherein the scaffold comprises porogen hydrogel microbeads and a bulk hydrogel, wherein the porogen hydrogel microbeads degrade at least 10% faster than the bulk hydrogel polymer scaffold following administration of the scaffold into a subject, and wherein the porogen hydrogel comprises an oxidized or a reduced alginate, and the bulk hydrogel comprises an alginate; a recruitment composition comprising a GM-CSF; an adjuvant, wherein the adjuvant comprises a CpG-ODN; and an agent that induces immunogenic cancer cell death, wherein the agent comprises doxorubicin-iRGD conjugate. In one embodiment, the composition does not comprise a cancer antigen prior to the administration to a subject. In another embodiment, the vaccine composition further comprises a cancer antigen for the cancer. In still another embodiment, the cancer is a triple negative breast cancer. In yet another embodiment, the vaccine composition is used in a prevention or treatment of a cancer. In one embodiment, the cancer is triple negative breast cancer.

In one aspect, the present invention provides a method of enhancing an immune response against a cancer in a subject. The method includes administering to the subject the vaccine composition of any aspects of this invention, thereby enhancing the immune response against the tumor in the subject. In one embodiment, the immune response is selected from the group consisting of activation of dendritic cell, sustained activation of dendritic cell, activation of dendritic cell in tumor microenvironment, recognition of antigen by a cytotoxic T lymphocyte, increase of tumor infiltrating T cells, and enhancement of CD8+: Treg ratio at tumor site.

In another aspect, the present invention provides a method of preventing or treating cancer in a subject. The method includes administering to the subject the vaccine composition of any aspect of the invention, thereby preventing or treating the cancer. In one embodiment, the method reduces tumor size, reduces cancer burden, increases survival time, prevents cancer from developing in the subject, depletes cancer cells in the subject, prevents or reduces cancer relapse, or prevents or reduces cancer recurrence or metastasis.

In various embodiments of any aspects of the invention, the vaccine composition does not comprise a cancer antigen prior to the administration of the vaccine composition to the subject.

In various embodiments of any aspects of the invention, the vaccine composition further comprises a cancer antigen.

In various embodiments of any aspects of the invention, the method further comprises administering to the subject an agent that induces an immunogenic cancer cell death. In one embodiment, the agent that induces the immunogenic cancer cell death is administered to the subject prior to, concurrently with, or after the administration of the vaccine composition. In another embodiment, the agent that induces the immunogenic cancer cell death is administered to the subject prior to the administration of the vaccine composition. In still another embodiment, the agent that induces the immunogenic cancer cell death is administered to the subject 1 day, 2 days, 7 days, 14 days, 1 month, 2 months, 3 months, or 6 months prior to the administration of the vaccine composition.

In various embodiments of any aspects of the invention, wherein the agent is selected from the group consisting of a radiation therapy and a chemotherapeutic agent. In one embodiment, the agent is a chemotherapeutic agent. In another embodiment, the chemotherapeutic agent is selected from the group consisting of anthracycline, oxaliplatin, bortezomib and derivative or analog thereof. In still another embodiment, the chemotherapeutic agent is an anthracycline or derivative or analog thereof. In yet another embodiment, the chemotherapeutic agent is selected from the group consisting of doxorubicin, daunorubicin, epirubicin, idarubicin, valrubicin, and derivative or analog thereof.

In various embodiments of any aspects of the invention, the cancer is a poorly immunogenic cancer.

BRIEF DESCRIPTION OF THE DRAWINGS

FIGS. 1A-1F show that PEG-Alginate based cryogel vaccine sustains release of cytokines in vitro, and preferentially concentrates and activates antigen-presenting cells in vivo.

FIG. 1A shows a schematic for the covalently crosslinked cryogel vaccine loaded with cytokines and antigen, followed by subcutaneous injection.

FIGS. 1B and 1C show total number of recruited host cells (FIG. 1B) and CD11c$^+$ dendritic cells (FIG. 1C) in a WT-1$_{126-134}$ cryogel vaccine (square) or blank cryogel (circle).

FIGS. 1D and 1E show comparison of different cell types, including CD14$^+$ monocytes, CD11c$^+$ dendritic cells, B220$^+$ B-cells and CD3$^+$ T cells contained within a WT-1$_{126-134}$ cryogel vaccine (FIG. 1D) or blank cryogel (FIG. 1E) up to 14 days post injection.

FIG. 1F shows numbers of CD11c$^+$ CD86$^+$ dendritic cells in dLNs after vaccination of the mice with the complete cryogel vaccine or a bolus subcutaneous injection of GM-CSF/CpG/antigen (n=5). (*P<0.05, P<0.01, *P<0.001, analysis of variance (ANOVA) with a Tukey post hoc test).

FIG. 5A shows measurement of the hydrogel injection site volume after subcutaneous injection over a period of 2 weeks (*P<0.05, P<0.01, *P<0.001, n.s., not significant (P>0.05), analysis of variance (ANOVA) with a Tukey post hoc test; n=5).

FIG. 5B shows CD11c$^+$ DC recruitment to a cryogel vaccine containing only GM-CSF and CpG compared to subcutaneous skin in bolus-injected mice (Mann-Whitney test; n=5).

FIG. 5C shows percent of CD11c$^+$ DCs expressing CD86 (two-tailed t test; n=5).

FIGS. 6A-6F show prophylactic immunization with BM lysate and WT-1 peptide prevents AML engraftment.

FIG. 6A shows schedule of administration of the prophylactic vaccine, AML challenge and the monitoring of leukemia.

FIG. 6B shows representative FACS gating strategy for identifying WT-1 tetramer$^+$ CD8$^+$ T cells and IFN-γ$^+$ CD8$^+$ T cells.

FIGS. 6C and 6D show the absolute number of WT-1 tetramer$^+$ CD8$^+$ T cells (FIG. 6C) and IFN-γ$^+$ CD8$^+$ T cells (FIG. 6D) in spleen, blood and bone marrow over the course of the study (n=5 per group for each time point).

FIG. 6E shows progression of AML in prophylactically treated study groups, measured as whole body radiance from luciferase expressing AML cells. Note: Both lysate and WT-1 vaccine groups showed no evidence of AML presence and the curve followed the X-axis (n=10 per group).

FIG. 6F shows survival rate after subcutaneous injection of various prophylactic vaccine formulations, AML challenge (Day 0) and Re-challenge (Day 100). (*P<0.05, P<0.01, *P<0.001, n.s., not significant (P>0.05), analysis of variance (ANOVA) with a Tukey post hoc test).

FIG. 9A shows GFP expression to monitor residual AML cells in bone marrow cells harvested from WT-1 prophylactically vaccinated mice and positive control of MLL-AF9 AML cells.

FIG. 9B shows WT-1 tetramer$^+$ CD8$^+$ T cells in the harvested bone marrow cells from WT-1 prophylactically vaccinated animals and bone marrow from naïve mice.

FIG. 9C shows schedule of secondary transplant assay to test transfer of leukemia or immunity.

FIGS. 9D and 9E show IFN-γ$^+$ CD8$^+$ T cells (FIG. 9D) in spleen and bone marrow of transplanted and naïve mice over the course of the study (n=5 per group for each time point) and survival rate (FIG. 9E) of naïve and transplanted mice after AML challenge (n=10 per group).

FIG. 9F shows cell lysis as measured by the level of [$^3$H]thymidine labeled DNA fragments from target cells in the presence of effector cells isolated from vaccinated or control mice, or lineage-depleted hematopoietic cells. Symbols represent the mean lysis for the experiments shown. (*P<0.05, P<0.01, *P<0.001, n.s., not significant (P>0.05), analysis of variance (ANOVA) with a Tukey post hoc test).

FIG. 10A: Whole body radiance from luciferase expressing AML cells (analysis of variance (ANOVA) with a Tukey post hoc test, n=5 per group), FIG. 10B: survival rate (log-rank (Mantel-Cox) test, n=5 per group) and FIG. 10C: bioluminescence images from mice quantified in FIG. 10A. Results from one experiment; data depict means±S.D.

FIG. 11A shows percent apoptotic and calreticulin-expressing cells 3 h after exposure to iCt at two concentrations in vitro, (n=3 per group).

FIG. 11B shows timeline for AML establishment, administration of the treatments and monitoring of disease progression.

FIG. 11C shows number of WT-1 tetramer$^+$ CD8$^+$ T cells and IFN-γ$^+$ CD8$^+$ T cells in spleen, blood and bone marrow over the course of the study (n=5 per group for each time point).

FIGS. 11D and 11E show (FIG. 11D) AML burden measured as whole body radiance from luciferase expressing AML cells and (FIG. 11E) survival rate in MLL-AF9 AML model (n=10 per group). Experiment was repeated with the same results and the second experiment is shown here. Note: BLI in responding groups was measured until BLI signal was no longer detectable above background.

FIG. 11F shows schedule of assays in FIGS. 11D and 11E. Five million (5×10$^6$) ovalbumin-expressing AML cells (oAML cells) were injected into naïve mice i.v. and mice were treated and monitored as indicated in FIG. 11F. Staining with SIINFEKL-H-2K$^b$ tetramers on peripheral blood mononuclear cells was performed on day 28.

FIG. 11G shows box plots (whiskers 5-95 percentile) from one of two independent experiments (n=10 mice per group). *P<0.05, P<0.01, *P<0.001, n.s., not significant (P>0.05), analysis of variance (ANOVA) with a Tukey post hoc test); multiplicity-adjusted p values reported.

FIGS. 12A-12C show (FIG. 12A) AML burden measured as whole body radiance from luciferase expressing AML cells and survival rate in (FIG. 12B) MLL-AF9 AML and (FIG. 12C) HoxA9-Meis1 models (log-rank (Mantel-Cox) test, n=10 per group).

FIG. 12D shows expression of a subset of AML associated genes on Day 28 in AML cells harvested and pooled from the bone marrow, liver and spleen in relapsed mice. Transcripts with lower expression in vaccine groups are indicated by a blue arrow. Transcripts with higher expression in vaccine groups are indicated by a blue arrow. AML cells from untreated mice and mice treated with the combination cryogel vaccine and iCt were not included as none of the mice survived at the time of analysis for the former, and treatment efficacy led to no residual AML cells in the latter.

FIG. 13A shows progression of AML in treated study groups, measured as whole body radiance from luciferase expressing AML cells.

FIG. 13B shows survival rate in mice challenged with MLL-AF9 cells given treatment as indicated (GM-gel and CpG-gel refer to antigen-free vaccines containing only GM-CSF or CpG, respectively).

FIG. 13C shows bioluminescence images from mice quantified in (a). *P<0.05, P<0.01, *P<0.001, n.s., not significant (P>0.05), log-rank (Mantel-Cox) test. Results from one experiment; data depict means±S.D.

FIG. 14A shows timeline for treatment of the antigen-free vaccine single therapy (above) and combination with iCt (below).

FIG. 14B shows recruitment of GFP$^+$ AML cells to the cryogel scaffold and draining lymph nodes (two-tailed t test (left), Mann-Whitney test (right); n=4-5 per group for each time point).

FIG. 14C shows flow cytometry with Annexin V to detect apoptotic GFP$^+$ AML cells in cryogel scaffolds (left) and draining lymph nodes (right) on Day 9 following vaccination. Only 2/4 mice from the combination iCt+antigen-free vaccine group had sufficient detectable GFP$^+$ cells for analysis.

FIGS. 14D and 14E show total number of CD3$^+$ T cells on Days 3 and 6 (FIG. 14D) and CD4$^+$FoxP3$^+$ CD25$^+$ $T_{regs}$ on Day 3 (FIG. 14E) following vaccination in the bone marrow of treated mice (Mann-Whitney test (FIG. 14D), two-tailed t test (FIG. 14E); n=4-5 per group for each time point).

FIGS. 14F and 14G show total number of WT-1 tetramer$^+$ CD8$^+$ T cells on Days 6 and 9 (FIG. 14F) and CD8/$T_{reg}$ ratio on Day 9 (FIG. 14G) post-vaccination in bone marrow of treated mice (two-tailed t test; n=4-5 per group for each time point). Results from one experiment; data depict means±S.D.

FIG. 16A shows CD11c$^+$ DC recruitment to a cryogel vaccine containing only GM-CSF and CpG delivered in an established model of AML with or without chemotherapy (Mann-Whitney test, n=4-5 per group for each time point).

FIG. 16B shows percent of CD11c$^+$ DCs expressing CD86 (Mann-Whitney test; n=4-5 per group for each time point). Data are means±SD.

FIGS. 17A and 17B show number of GFP$^+$ AML cells in bone marrow (FIG. 17A) and spleen (FIG. 17B) of mice treated with the antigen-free cryogel vaccine with and without chemotherapy on Day 6 post vaccination (two-tailed t test (FIG. 17A), Mann-Whitney test (FIG. 17B); n=4-5 per group for each time point).

FIGS. 17C and 17D show percent of total bone marrow (FIG. 17C) and spleen (FIG. 17D) cells expressing GFP (i.e. AML cells) on Day 9 post vaccination (two-tailed t test; n=4-5 per group for each time point).

FIG. 20A shows GFP expression to monitor residual AML cells in bone marrow cells harvested from AML-bearing mice treated with combination iCt and cryogel vaccination (left) and positive control of MLL-AF9 AML cells (right).

FIG. 20B shows WT-1 tetramer$^+$ CD8$^+$ T cells in the harvested bone marrow cells of mice receiving iCt and WT-1 vaccination, and bone marrow from naïve mice.

FIG. 20C shows schedule of secondary transplant assay to determine transference of leukemia or immunity.

FIGS. 20D-20F show IFN-γ$^+$ CD8$^+$ T (FIG. 20D) cells in spleen and bone marrow of transplanted and naïve mice over the course of the study (n=5 per group for each time point) and survival rate in transplants from MLL-AF9 (FIG. 20E) and HoxA9-Meis1 (FIG. 20F) animals (n=10 per group) (*P<0.05, P<0.01, *P<0.001, n.s., not significant (P>0.05), analysis of variance (ANOVA) with a Tukey post hoc test).

FIGS. 22A-22I show pore-forming alginate gels containing Dox-iRGD and GM-CSF induce apoptosis of 4T1 tumor cells, and concentrated DCs in situ.

FIG. 22A shows representative flow cytometry histograms for calreticulin on the surface of 4T1 cells after treatment with different concentrations of Dox for 24 h in vitro.

FIG. 22B shows release profiles of Dox and Dox-iRGD from pore-forming alginate gels (n=4).

FIGS. 22C-22I show gels containing Dox-iRGD and GM-CSF were peritumorally injected when the tumors reached a diameter of 6-7 mm.

FIG. 22C shows confocal images of tumor and gel sections at 4 days post peritumoral injection of pore-forming gels containing Dox-iRGD (red), Dox-iRDG (red), and Dox (red), respectively. GM-CSF was incorporated in all groups.

Cell nuclei were stained with DAPI (blue). White dotted lines indicate the tumor-gel boundary. Scale bar: 200 μm.

Figure 22A:
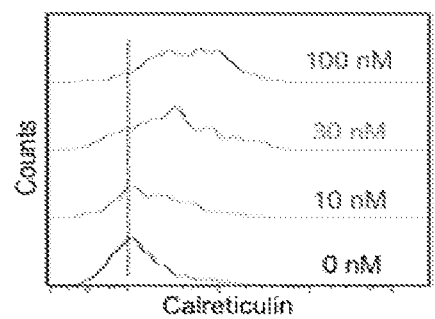
Figure 22B:
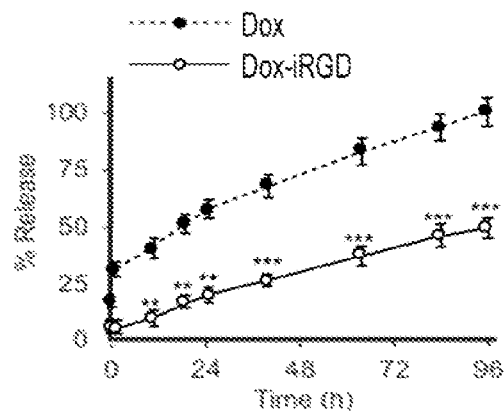
Figure 22C:
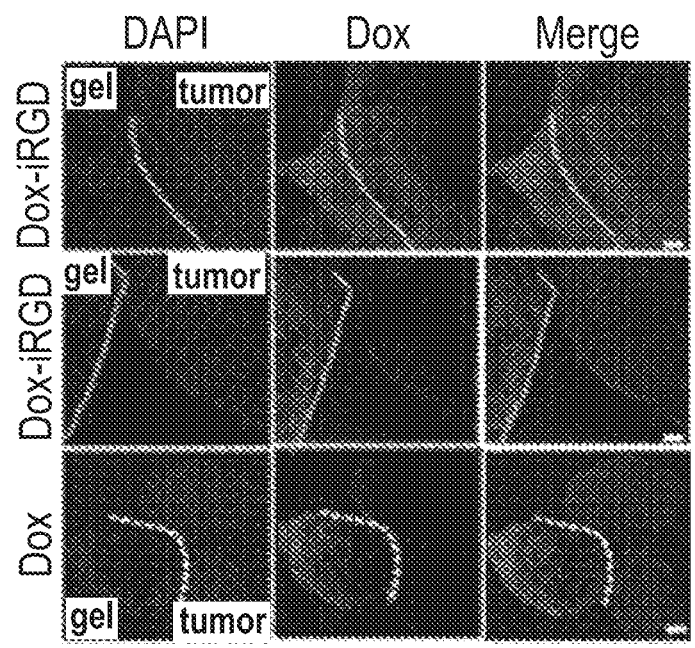
Figure 22D:
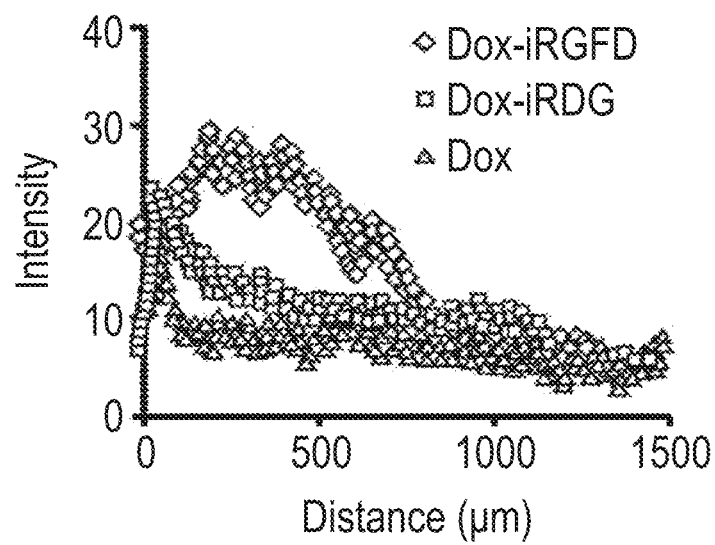

FIG. 22D shows semi-quantitative tumor penetration profiles of Dox-iRGD, Dox-iRDG, and Dox, respectively.

FIG. 22E shows representative TUNEL staining of 4T1 tumors from mice treated with gels containing GM-CSF and Dox-iRGD. Scale bar: 80 except for last image, which is a magnified view of the merged image.

FIG. 22F shows representative flow cytometry plot of $CD11b^+$ $CD11c^+$ cells in Dox-iRGD loaded gels at 18 days post gel injection.

FIG. 22G shows percentage of $CD11b^+$ $CD11c^+$ DCs among the recruited cells in pore-forming gels (n=4).

FIG. 22H shows representative flow cytometry plot of $CD86^+MHCI^+$ cells within $CD11b^+$ $CD11c^+$ cells in Dox-iRGD loaded gels at 18 days post gel injection.

FIG. 22I shows percentage of $CD86^+MHCI^+$ cells within $CD11b^+$ $CD11c^+$ cells in pore-forming gels (n=4). All the numerical data in FIGS. 22A-22I are presented as mean±SD ($0.01<*P≤0.05$; $P≤0.01$; $*P≤0.001$).

Figure 23B:
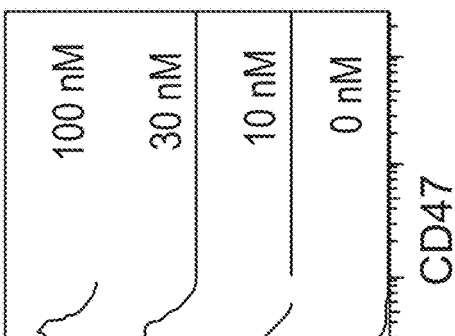
Figure 23A:
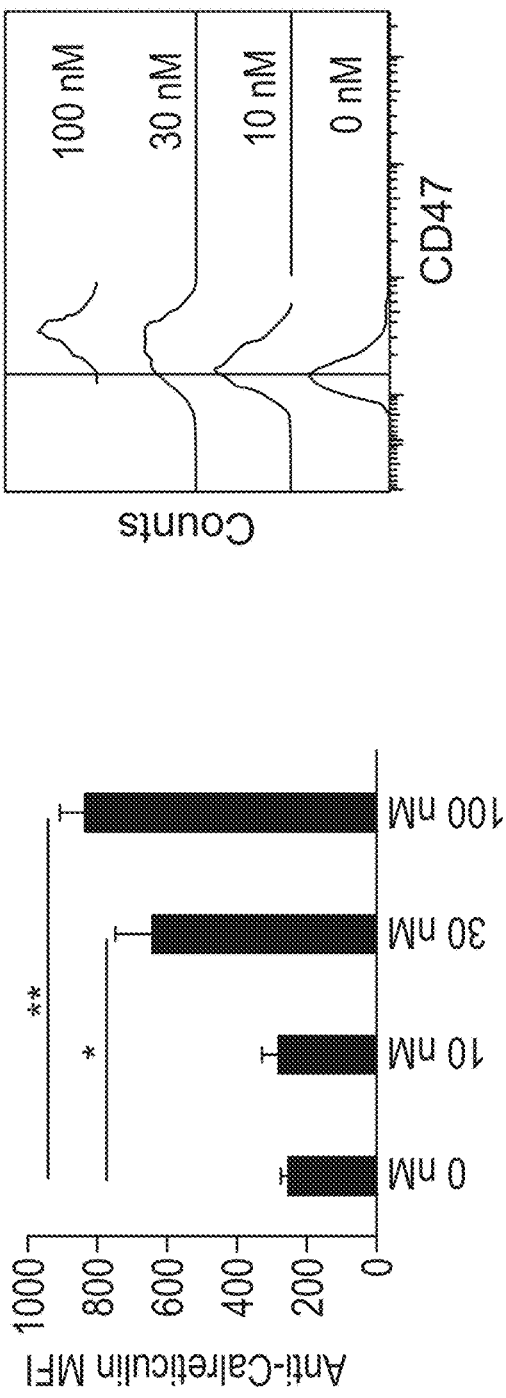
Figure 23C:
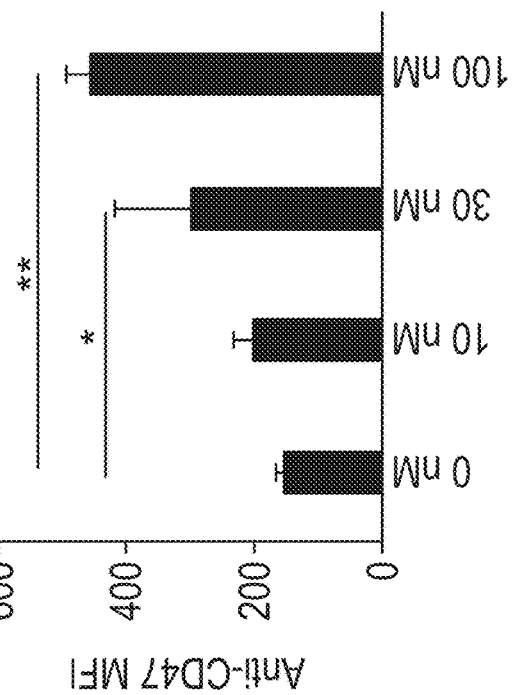

FIGS. 23A-23C show that Dox induces immunogenic death of 4T1 cells in vitro.

FIG. 23A shows mean Alexa Fluor 647 fluorescence intensity of 4T1 cells after treatment with different concentrations of Dox for 24 h and incubation with Alexa Fluor 647-conjugated anti-calreticulin for 20 min.

FIG. 23B shows representative flow cytometry histograms of 4T1 cells after treatment with different concentrations of Dox for 24 h and incubation with FITC-conjugated anti-CD47 for 20 min (n=4). Live/dead cell gating has already been performed.

FIG. 23C shows mean FITC fluorescence intensity of 4T1 cells with the same treatment in (b). All the numerical data in FIGS. 23A-23C are presented as mean±SD ($0.01<*P≤0.05$; $P≤0.01$; $*P≤0.001$).

FIGS. 24A-24G show synthesis and characterization of Dox-iRGD.

Figure 24A:
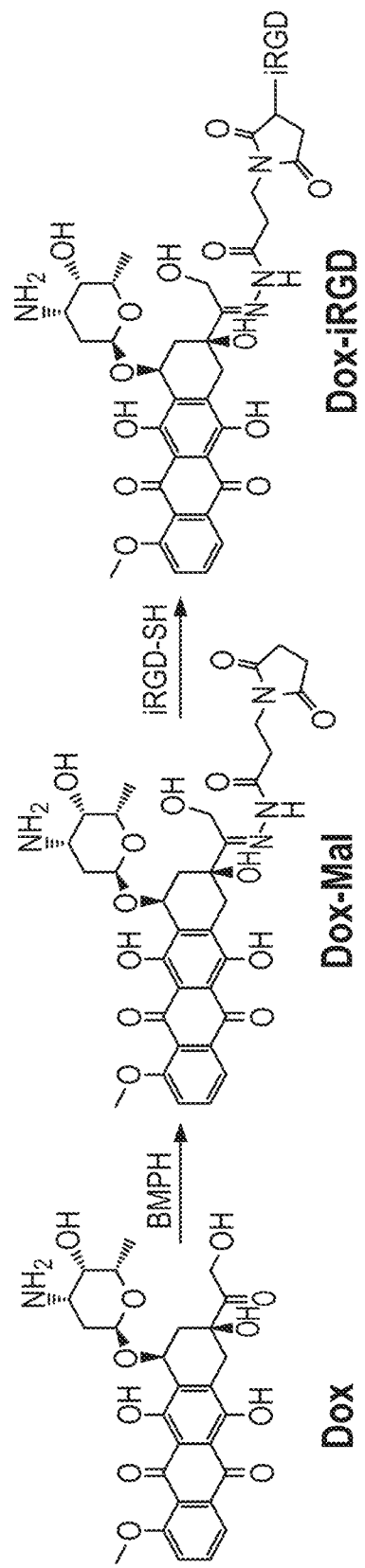

FIG. 24A shows synthetic route of Dox-iRGD.

FIGS. 24B and 24C show high-performance liquid chromatography (FIG. 24B) and mass spectrum (FIG. 24C) of Dox-Mal, at the detection wavelength of 254 nm.

FIG. 24D shows $^1H$ NMR spectra of Dox-Mal and Dox-iRGD, respectively.

FIG. 24E shows MALDI spectrum of Dox-iRGD.

Figure 24F:
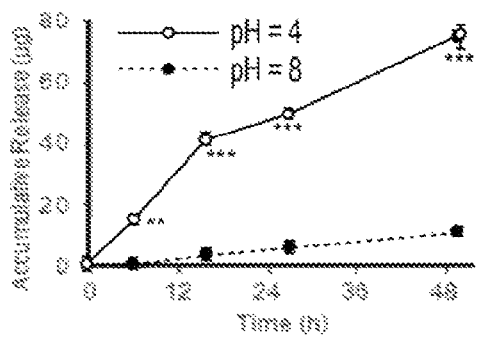

FIG. 24F shows degradation profiles of Dox-iRGD into Dox at pH 4 and 8, respectively (n=4).

Figure 24G:
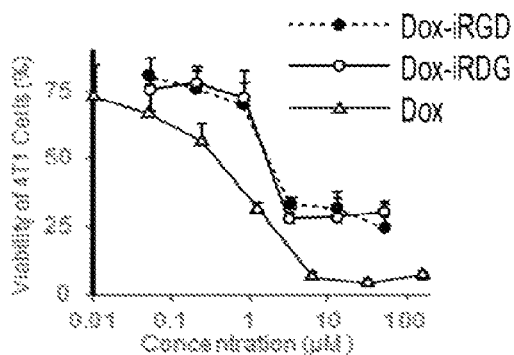

FIG. 24G shows viability of 4T1 cells after incubation with different concentrations of Dox-iRGD, Dox-iRDG, and Dox, respectively for 48 h. All the numerical data in FIGS. 24A-24G are presented as mean±SD ($0.01<*P≤0.05$; $P≤0.01$; $*P≤0.001$).

Figure 25A:
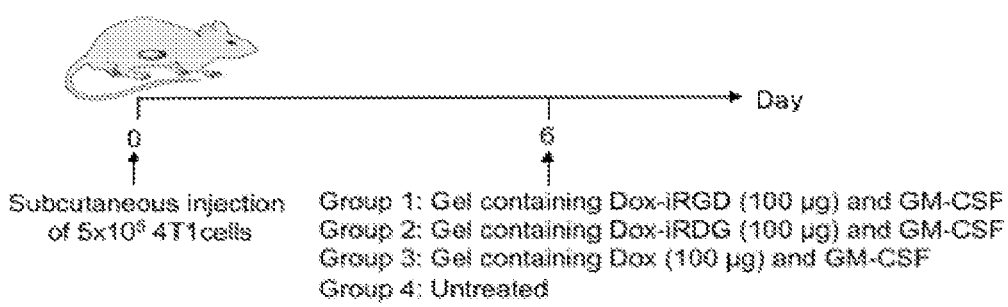
Figure 25B:
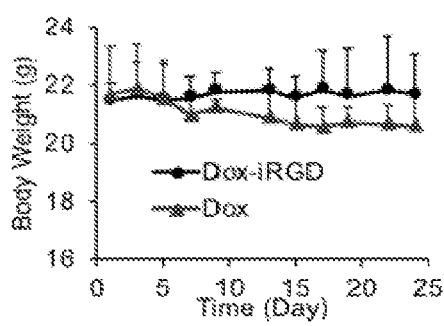

FIGS. 25A and 25B show pore-forming gels containing Dox-iRGD improve antitumor efficacy and reduce systemic toxicity compared to gels containing Dox.

FIG. 25A shows timeframe of efficacy study. Gels were peritumorally injected when the tumors grew to ~6-7 mm. The drug dose is described in Dox equivalent.

FIG. 25B shows average body weight of mice treated with gels containing Dox-iRGD and Dox, respectively (n=4-5).

FIGS. 26A-26D show pore-forming alginate gels containing Dox-iRGD and GM-CSF delay 4T1 tumor growth and reduce metastases. Gels were peritumorally injected when the tumors grew to ~6-7 mm. GM-CSF was incorporated in all gels. Mice without gel treatment were used as controls.

Figure 26A:
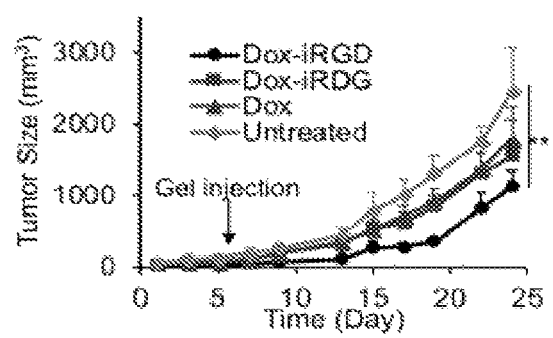

FIG. 26A shows average 4T1 tumor volume of each group over the course of the efficacy study (n=5).

Figure 26B:
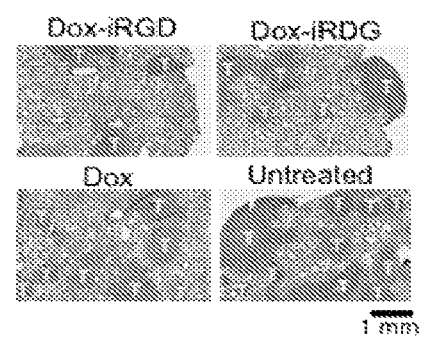

FIG. 26B shows representative images of H&E stained lung tissues harvested at 18 days post peritumoral injection of gels containing Dox-iRGD, Dox-iRDG, and Dox, respectively. T indicates tumors.

Figure 26C:
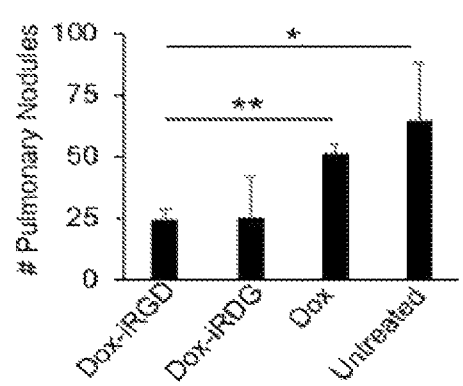

FIG. 26C shows average tumor nodule counts on the lung tissues at 18 days post gel injection. Data were presented as mean±SD (n=5).

Figure 26D:
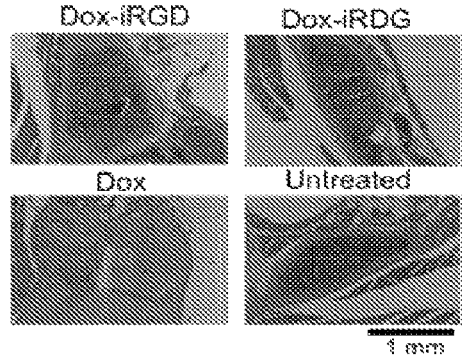

FIG. 26D shows histopathology of spinal bone marrow tissues harvested at 18 days post gel treatment. Scale bar: 1 mm.

Figures 27A, 27B:
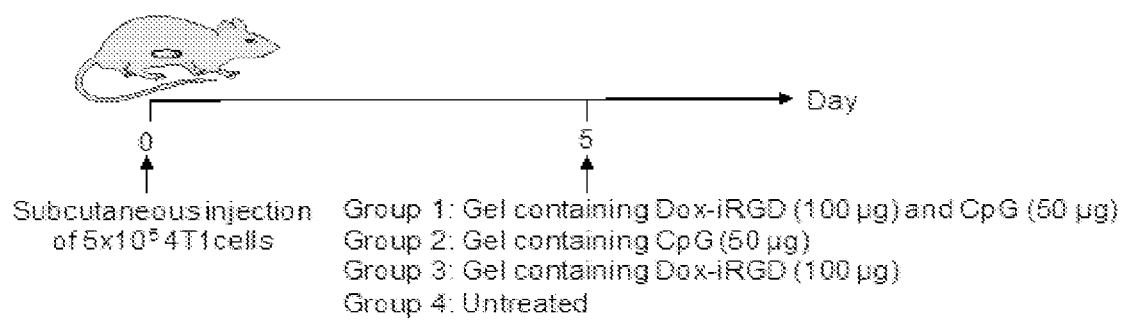

FIGS. 27A and 27B show in situ gel vaccine containing GM-CSF, Dox-iRGD (100 μg) and CpG (50 μg) prolongs animal survival.

FIG. 27A shows time frame of efficacy study. GM-CSF was incorporated in all gels.

FIG. 27B shows summary of median survival for each group and increase of median survival in treatment groups in comparison to untreated group.

FIGS. 28A-28G show pore-forming gels loaded with GM-CSF, Dox-iRGD and CpG improve tumor-specific CTL responses and antitumor efficacy against 4T1 triple-negative breast cancer.

Figure 28A:
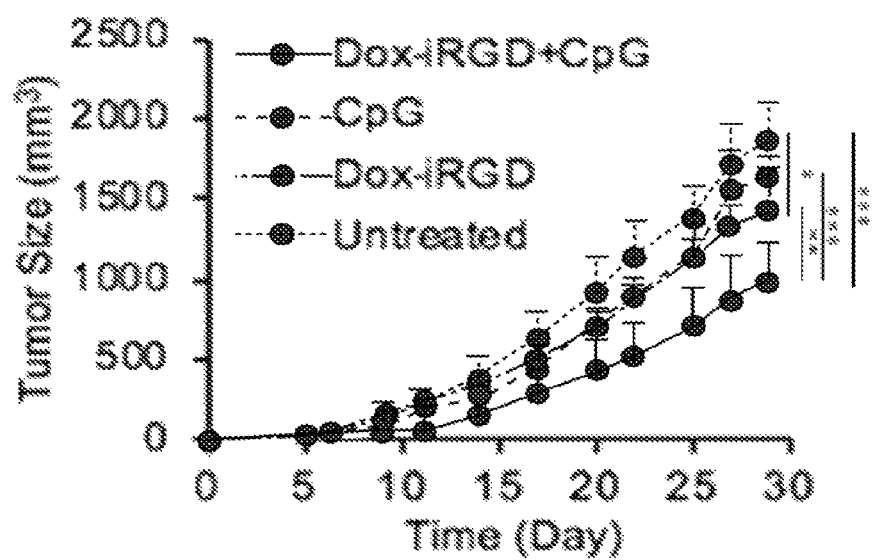
Figure 28B:
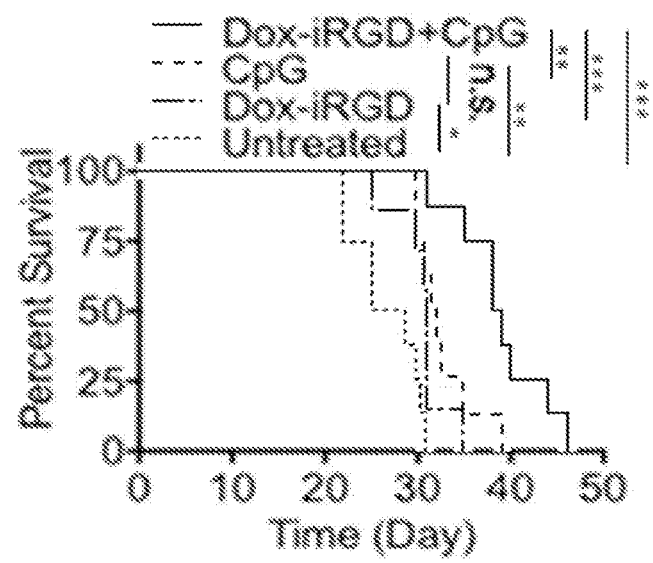

FIGS. 28A and 28B show 4T1 cells were injected subcutaneously on day 0. Mice were untreated or treated with gels containing Dox-iRGD (100 μg) and CpG (50 μg) or Dox-iRGD (100 μg) alone or CpG (50 μg) alone on day 5. GM-CSF was incorporated in all groups.

FIG. 28A shows average 4T1 tumor volume of each group over the course of the efficacy study (n=7-8).

FIG. 28B shows Kaplan-Meier plots for all groups.

FIGS. 28C-28G shows that, following 4T1 tumor inoculation on day 0, gels containing Dox-iRGD (200 μg) and CpG (100 μg) or Dox-iRGD (200 μg) alone or CpG (100 μg) alone were injected peritumorally on day 5. GM-CSF was incorporated in all groups.

Figure 28C:
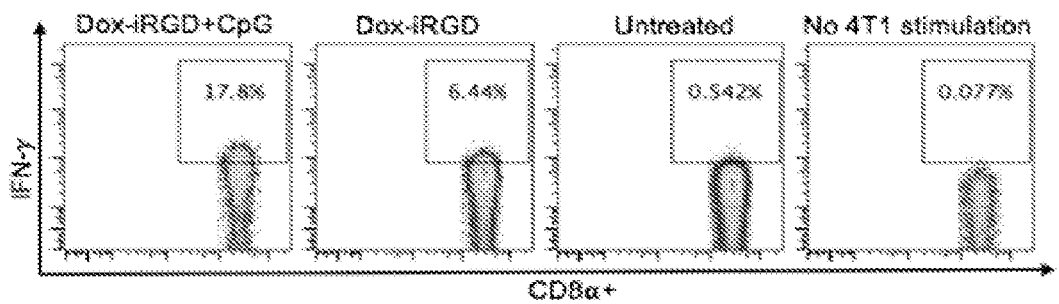

FIG. 28C shows representative FACS plots of cells isolated from tumor-draining lymph nodes at 4 days post gel injection and restimulated with 4T1 cells. APC-conjugated anti-IFN-γ and pacific blue-conjugated anti-CD8 were used for staining. Cells without restimulation were used as control.

FIG. 28D shows percentage of $IFN-γ^+$ $CD8^+$ cells (n=3).

FIG. 28E shows mean APC fluorescence intensity of $CD8^+$ T cells (n=3).

FIG. 28F shows average 4T1 tumor volume of each group over the course of the efficacy study (n=7).

Figure 28G:
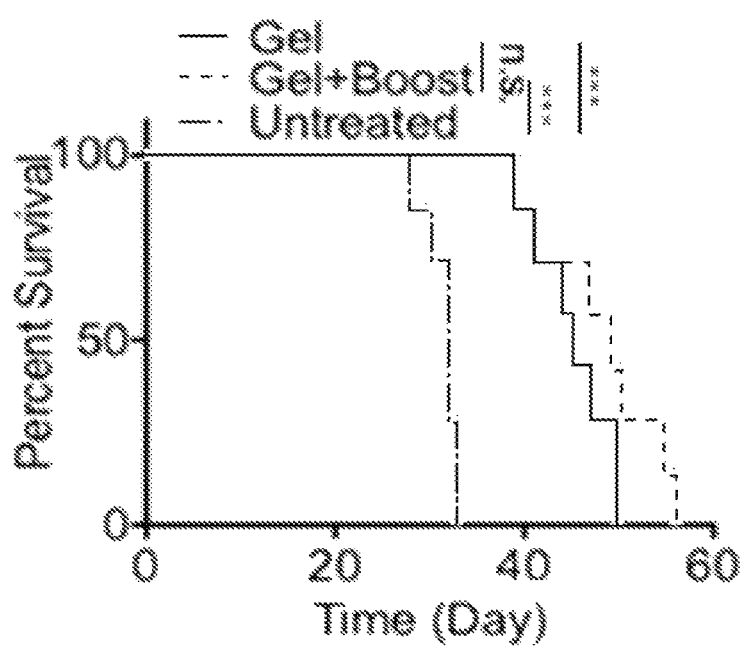

FIG. 28G shows Kaplan-Meier plots for all groups (n=7). All the numerical data in FIGS. 28A-28G are presented as mean±SD ($0.01<*P≤0.05$; $P≤0.01$; $*P≤0.001$).

FIGS. 29A-29D show pore-forming gels containing GM-CSF, Dox-iRGD and CpG recruit and activate DCs.

Figure 29A:
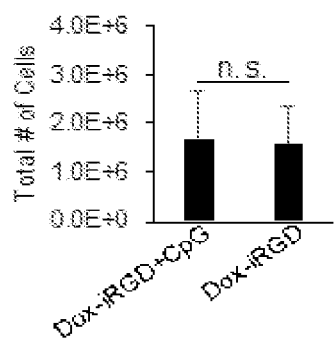

FIG. 29A shows total number of recruited cells in gels at 4 days post injection of gels containing Dox-iRGD (200 μg) and CpG (100 μg) or Dox-iRGD alone. GM-CSF was incorporated in all gels.

Figure 29B:
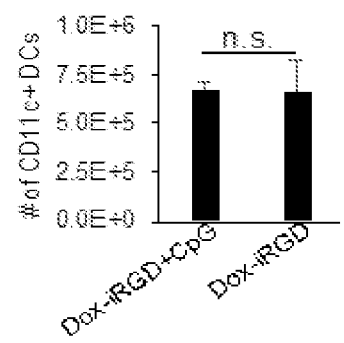

FIG. 29B shows number of CD11 DCs in gels at 4 days post gel injection.

Figure 29C:
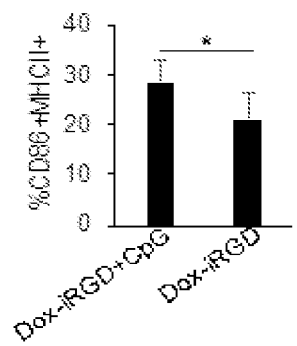

FIG. 29C shows percentage of $CD86^+MHCII^+$ cells among CD11 DCs in gels.

Figure 29D:
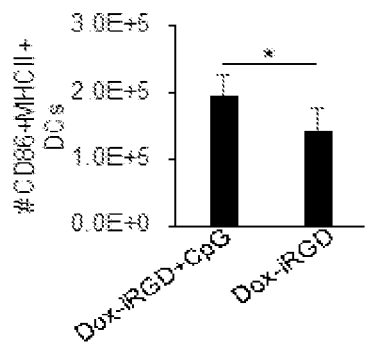

FIG. 29D shows number of $CD86^+MHCII^+$ DCs in gels. All the numerical data in FIG. 29A-29D are presented as mean±SD (n=6; $0.01<*P≤0.05$; $P≤0.01$; $*P≤0.001$).

FIGS. 30A-30I show pore-forming gels containing GM-CSF, Dox-iRGD and CpG generate potent systemic tumor-specific CTL responses. GM-CSF was incorporated in all gels.

FIG. 30A shows representative IFN-γ versus CD8 plots of splenocytes at 4 days post injection of gels containing Dox-iRGD (200 μg) and CpG (100 μg) or Dox-iRGD alone. GM-CSF was incorporated in all gels.

FIGS. 30B and 30C shows (FIG. 30B) percentage of IFN-γ$^+$ cells and (FIG. 30C) mean APC anti-IFN-γ fluorescence intensity among CD8$^+$ T cells.

Figure 30D:
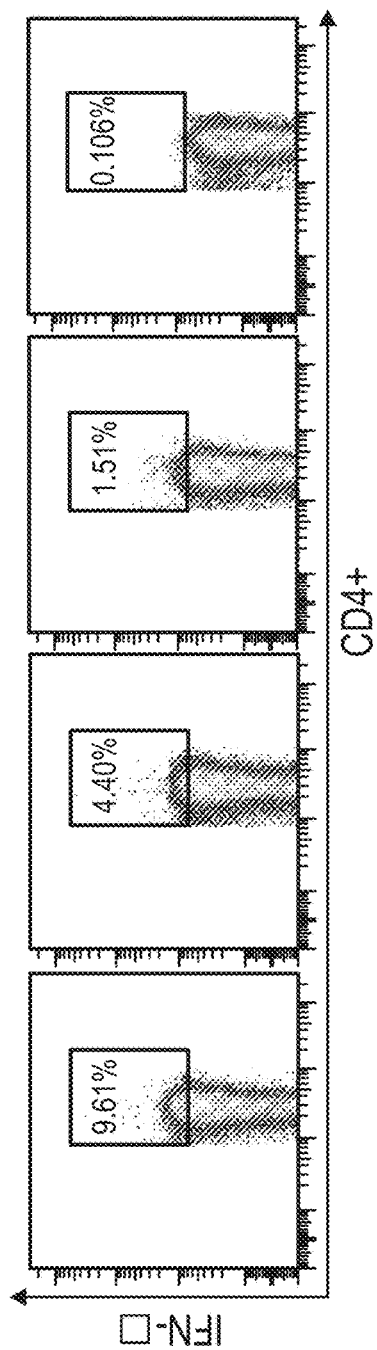

FIG. 30D shows representative IFN-γ versus CD4 plots of splenocytes in different groups.

Figures 30E, 30F:
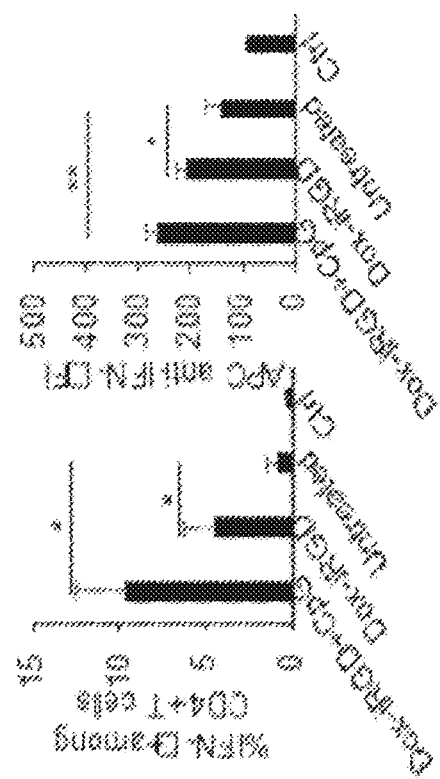

FIGS. 30E and 30F show (FIG. 30E) percentage of IFN-γ$^+$ cells and (FIG. 30F) mean APC anti-IFN-γ fluorescence intensity among CD4$^+$ T cells in spleens of different groups.

FIG. 30G shows representative IFN-γ versus CD4 plots of cells isolated from tumor-draining lymph nodes (tdLNs).

Figure 1D:
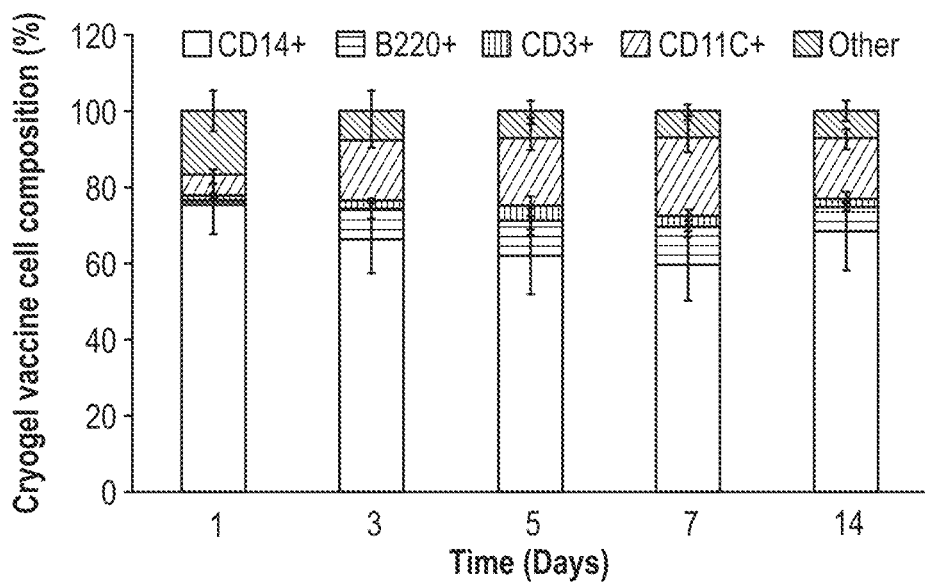
Figure 1E:
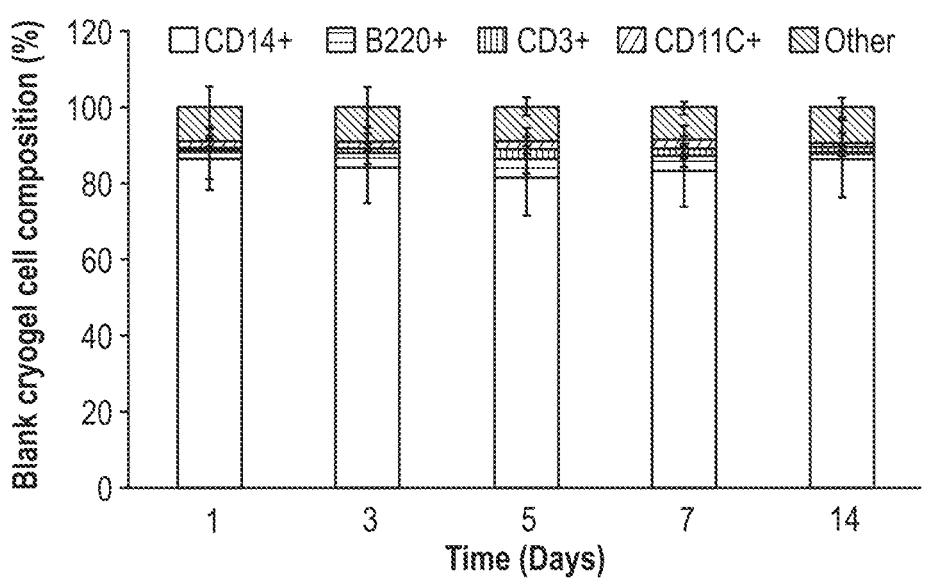

FIGS. 30H and 30I show (FIG. 30I1) percentage of IFN-γ$^+$ cells and (FIG. 30I) mean APC anti-IFN-γ fluorescence intensity among CD4$^+$ T cells in tdLNs. All the numerical data in FIGS. 30A-30I are presented as mean±SD (n=3-4; 0.01<*P≤0.05; P≤0.01; *P≤0.001).

FIGS. 31A-31D show in situ gel vaccine containing GM-CSF, Dox-iRGD (200 μg) and CpG (100 μg) slows tumor growth and prolongs animal survival.

FIG. 31A shows time frame of efficacy study. GM-CSF was incorporated in all gels.

FIG. 31B shows tumor growth curves for each animal of different groups.

FIG. 31C shows summary of median survival for each group and the increase of median survival in treatment groups in comparison to the untreated group.

Figure 31D:
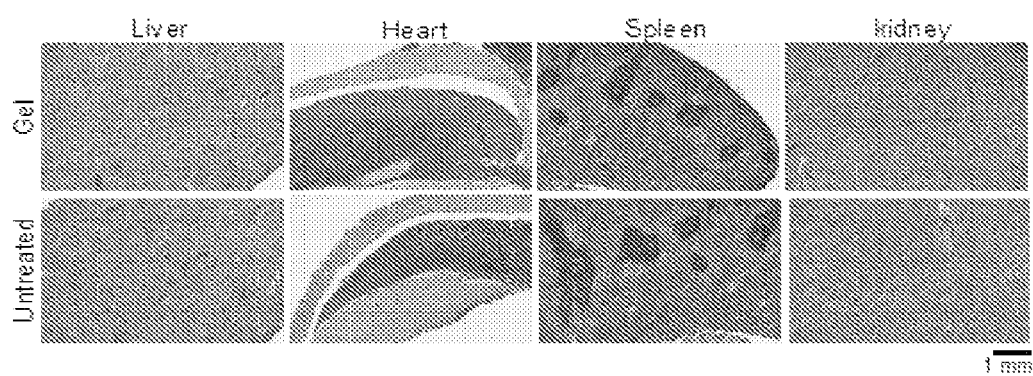

FIG. 31D shows representative images of H&E stained liver, heart, spleen, and kidney tissues harvested from mice treated with the gel vaccine (upper row) and untreated mice (lower row).

FIGS. 32A-32G show pore-forming gels loaded with GM-CSF, Dox-iRGD and CpG induce immunogenic death of tumor cells, inflame tumor microenvironment, and increase effector T cell infiltration. Following 4T1 tumor inoculation on day 0, gels containing Dox-iRGD (200 μg) and CpG (100 μg) or Dox-iRGD (200 μg) alone or CpG (100 μg) alone were injected peritumorally on day 5. Tumors were analyzed on day 16. GM-CSF was incorporated in all groups.

Figure 32A:
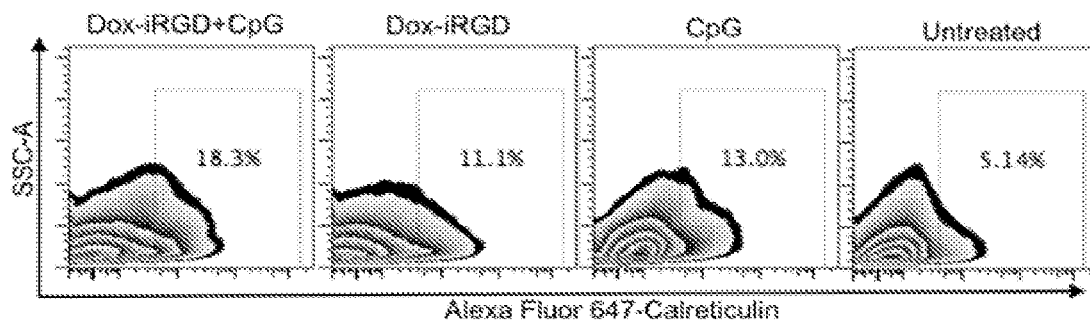

FIG. 32A depicts representative FACS plots of tumor cells stained for the immunogenic death marker, calreticulin. CD111)$^+$, CD3$^+$, and CD8$^+$ cells have been excluded for these plots.

Figures 32B, 32C, 32D:
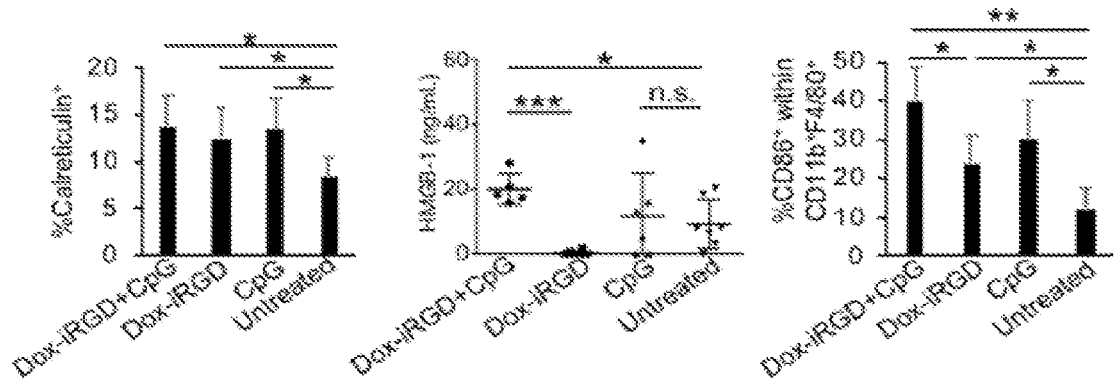

FIG. 32B depicts percentage of calreticulin$^+$ tumor cells in different groups.

FIG. 32C depicts HMGB-1 level in the tumor extracts of each group, as quantified by ELISA.

FIG. 32D depicts percentage of CD86$^+$ cells among CD11b$^+$F4/80$^+$ tumor-associated macrophages.

Figures 32E, 32F, 32G:
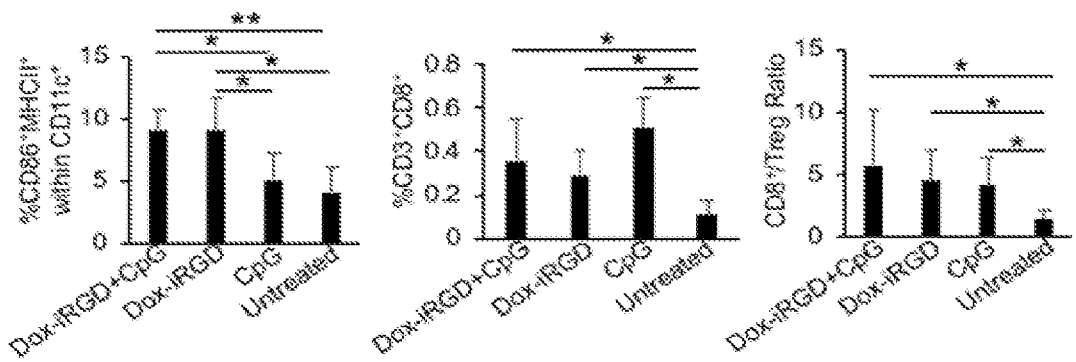

FIG. 32E depicts percentage of CD86$^+$MHCII$^+$ cells among CD11 DCs in tumors.

FIG. 32F depicts intratumoral infiltration of CD8$^+$ T cells in different groups.

FIG. 32G depicts ratio of CD8$^+$ to regulatory T cells in tumors. All the numerical data in FIGS. 32A-32G are presented as mean±SD (n=6; 0.01<*P≤0.05; P≤0.01; *P≤0.001).

FIGS. 33A-33F show in situ gel vaccine induces immunogenic death of 4T1 cells and polarizes tumor-associated macrophages towards M1 phenotype.

Figure 33A:
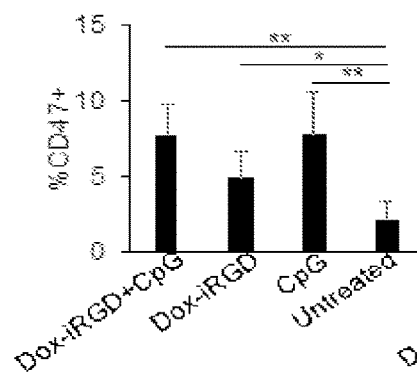
Figure 33B:
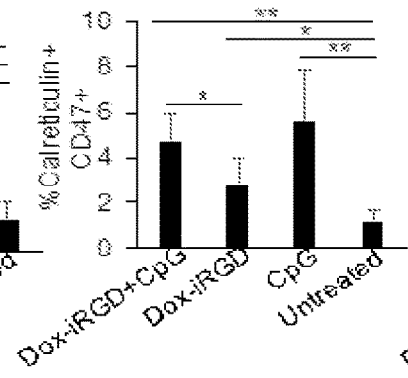

FIGS. 33A and 33B show percentage of (FIG. 33A) CD47$^+$ and (FIG. 33B) calreticulin$^+$ CD47$^+$ tumor cells at 11 days post injection of gels containing Dox-iRGD (200 μg) and CpG (100 μg) or Dox-iRGD alone or CpG alone. GM-CSF was incorporated in all gels.

Figure 33C:
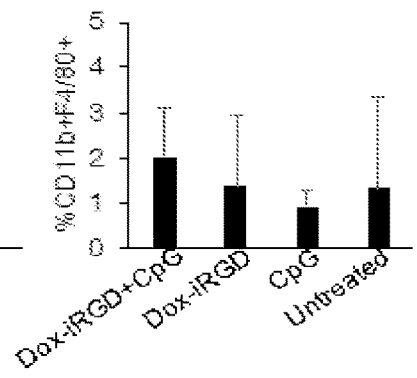

FIG. 33C shows percentage of CD11b$^+$F4/80$^+$ macrophages in the tumor microenvironment.

Figure 33D:
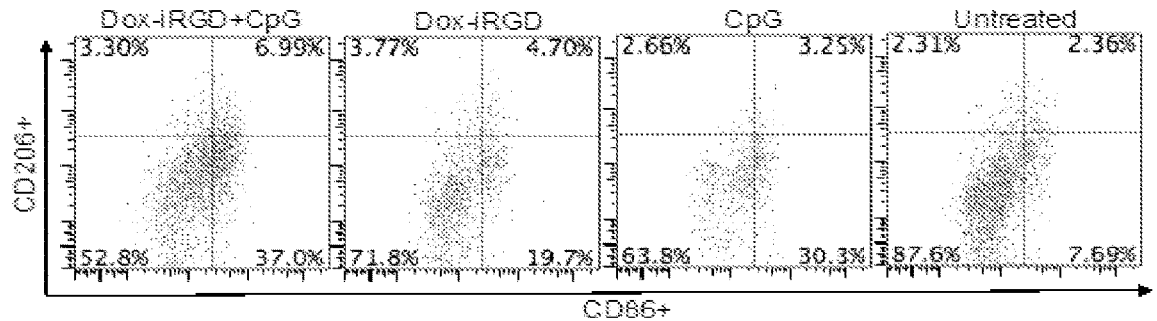

FIG. 33D shows representative CD206 versus CD86 plots of tumor-associated macrophages in different groups.

Figures 33E, 33F:
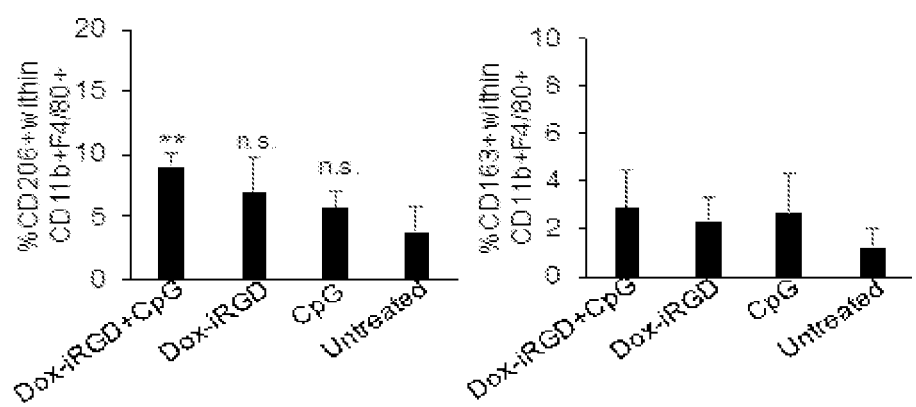

FIGS. 33E and 33F show percentage of (FIG. 33E) CD206$^+$ and (FIG. 33F) CD163$^+$ macrophages in tumors after different treatments. All the numerical data in FIGS. 33A-33F are presented as mean±SD (n=6; 0.01<*P≤0.05; P≤0.01; *P≤0.001).

FIGS. 34A-34D show that in situ gel vaccine activates DCs in the tumor microenvironment.

Figure 34A:
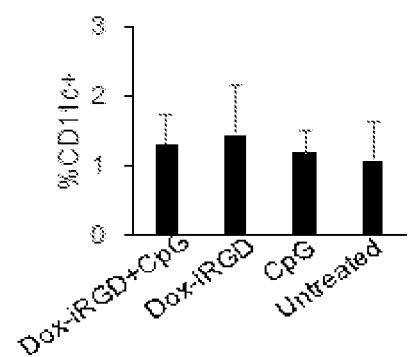

FIG. 34A shows percentage of CD11 DCs in tumors at 11 days post injection of gels containing Dox-iRGD (200 μg) and CpG (100 μg) or Dox-iRGD alone or CpG alone. GM-CSF was incorporated in all gels.

Figure 34B:
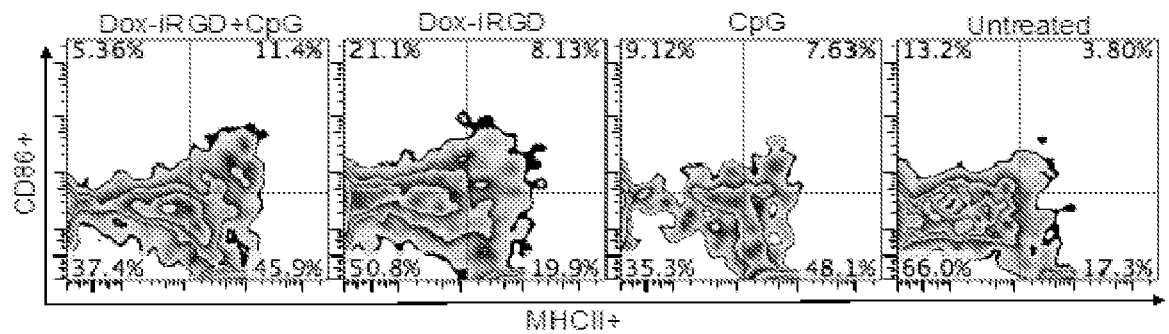

FIG. 34B shows representative CD86 versus MHC II plots of intratumoral DCs in different groups.

Figures 34C, 34D:
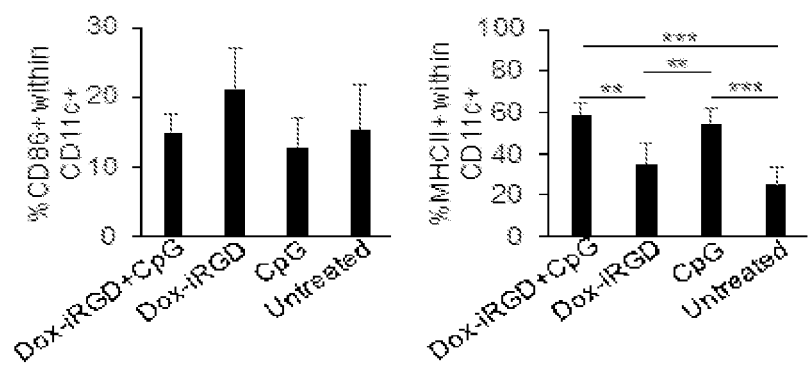

FIGS. 34C and 34D show percentage of (FIG. 34C) CD86$^+$ DCs and (FIG. 34D) CD86$^+$MHCII$^+$ DCs in tumors after different treatments. All the numerical data are presented as mean±SD (n=6; 0.01<*P≤0.05; P≤0.01; *P≤0.001).

FIGS. 35A and 35B show in situ gel vaccine increases tumor-infiltrating T cells. Number of (FIG. 35A) tumor-infiltrating CD8$^+$ T cells and (FIG. 35B) CD4$^+$FoxP3$^+$ regulatory T cells at 11 days post injection of gels containing Dox-iRGD (200 μg) and CpG (100 μg) or Dox-iRGD alone or CpG alone. GM-CSF was incorporated in all gels. All the numerical data are presented as mean±SD (n=6; 0.01<*P≤0.05; P≤0.01; *P≤0.001).

FIGS. 36A-36D show 4T1 tumor-infiltrating CD8$^+$ T cells express exhaustion markers. Percentage of (FIG. 36A) PD-1$^+$, (FIG. 36B) CTLA-4$^+$, (FIG. 36C) TIM3$^+$, and (FIG. 36D) LAG3$^+$ cells among intratumoral CD8$^+$ T cells at 11 days post injection of gels containing Dox-iRGD (200 μg) and CpG (100 μg) or Dox-iRGD alone or CpG alone. GM-CSF was incorporated in all gels. All the numerical data are presented as mean±SD (n=6).

FIGS. 37A-37F show in situ gel vaccine synergizes with anti-PD-1 therapy for tumor control. GM-CSF was incorporated in all gels.

Figure 37A:
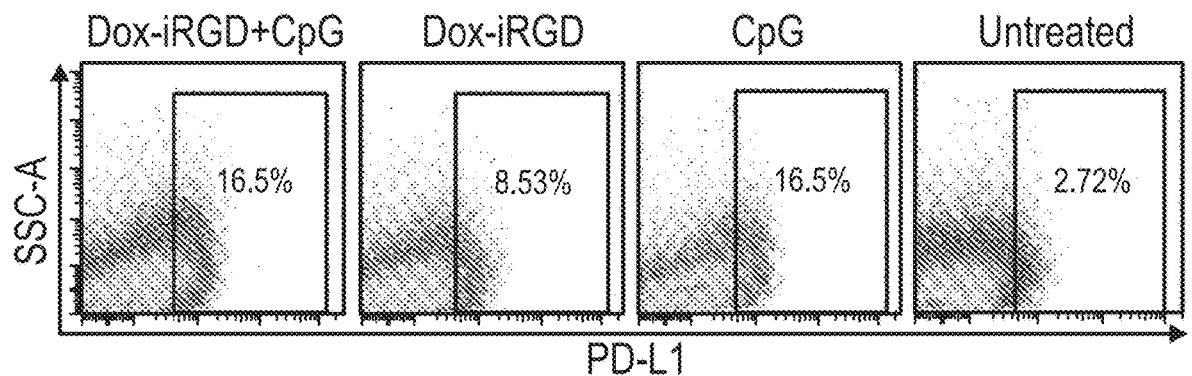
Figure 37B:
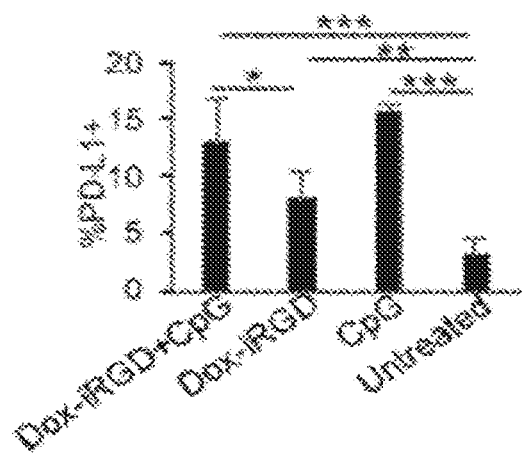

FIGS. 37A and 37B show representative FACS plots (FIG. 37A) for PD-L1 expression of tumor cells (CD11b$^+$, CD3$^+$, and CD8$^+$ cells have been excluded for these plots) and percentage of PD-L1$^+$ tumor cells (FIG. 37B) after treatment with gels containing Dox-iRGD (200 μg) and CpG (100 μg) or Dox-iRGD (200 μg) alone or CpG (100 μg) alone.

Figure 37C:
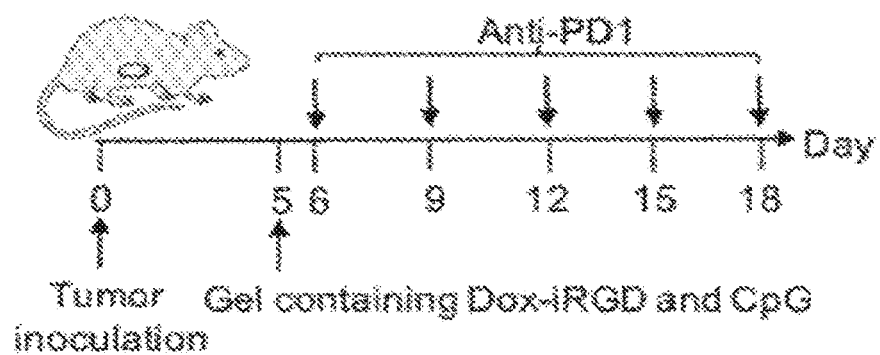

FIG. 37C shows time frame of efficacy study. Following 4T1 tumor inoculation on day 0, gels containing Dox-iRGD (200 μg) and CpG (100 μg) were injected next to tumors on day 5, and anti-PD-1 was intraperitoneally injected on days 6, 9, 12, 15, and 18, respectively.

Figure 37D:
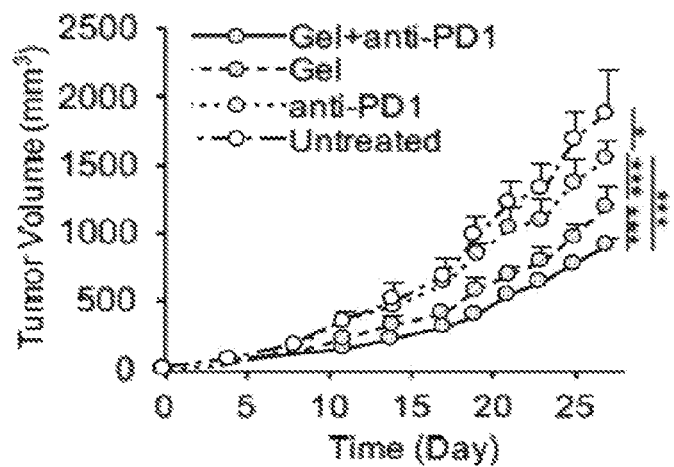

FIG. 37D shows average 4T1 tumor volume of each group over the course of the efficacy study (n=8-9).

Figure 37E:
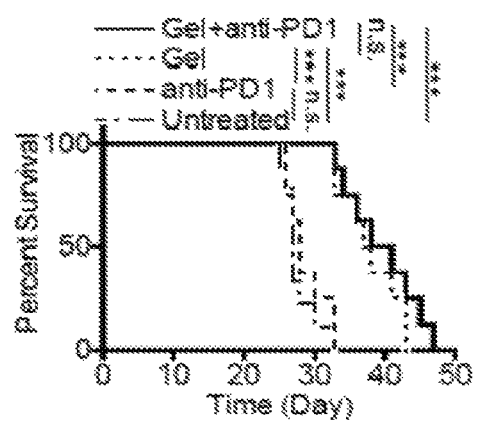

FIG. 37E shows Kaplan-Meier plots for all groups (n=8-9).

FIG. 37F shows average tumor nodule counts on the lung tissues harvested from mice at the time of euthanasia (n=7-9). All the numerical data in FIGS. 37A-37F are presented as mean±SD (0.01<*P≤0.05; P≤0.01; *P≤0.001).

FIGS. 38A and 38B show in situ gel vaccine synergizes with anti-PD-1 therapy for tumor control.

FIG. 38A shows tumor growth curves for each animal of different groups.

FIG. 38B shows summary of median survival for each group and the increase of median survival in treatment groups in comparison to the untreated group.

FIGS. 39A-39I show in situ gel vaccine prevents tumor recurrence and metastases when applied post-surgical tumor resection.

FIGS. 39A-39D show that following surgical resection of luciferase-expressing 4T1 (luc-4T1) tumors, gels containing GM-CSF, Dox-iRGD (200 μg) and CpG (100 μg) or bolus vaccines (solution of same quantities of GM-CSF, Dox-iRGD, and CpG) were injected at surgical site.

Figure 39A:
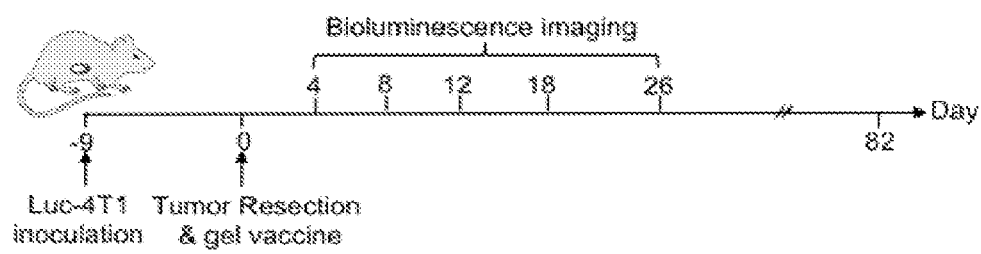

FIG. 39A shows outline of study.

Figure 39B:
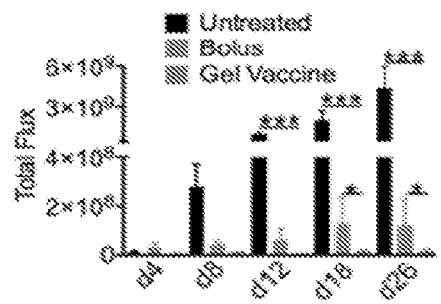

FIG. 39B shows luminescence signals of mice at different times (n=8-9).

Figure 39C:
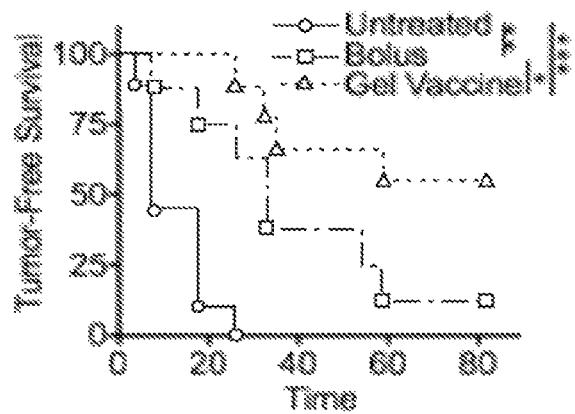

FIG. 39C shows Kaplan-Meier plots for tumor-free survival of all groups (n=8-9).

Figure 39D:
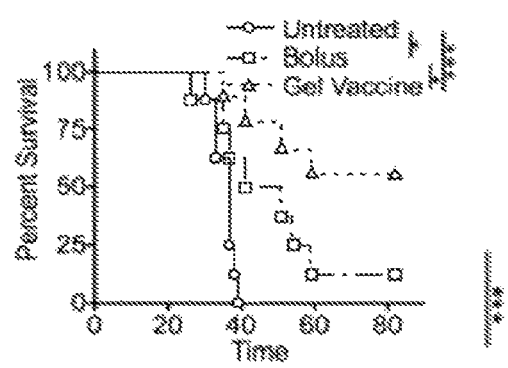

FIG. 39D shows Kaplan-Meier plots for overall survival of all groups.

FIGS. 39E-39I show that following re-challenge with i.v. injected luc-4T1 cells at 82 days post surgery, tumor growth and animal survival were monitored. Naïve mice receiving i.v. injection of luc-4T1 cells were used as controls.

Figure 39E:
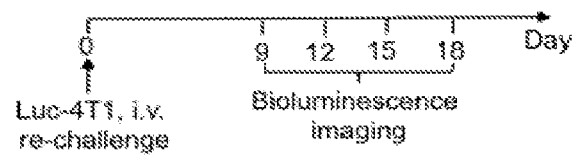

FIG. 39E shows outline of re-challenge study.

Figure 39F:
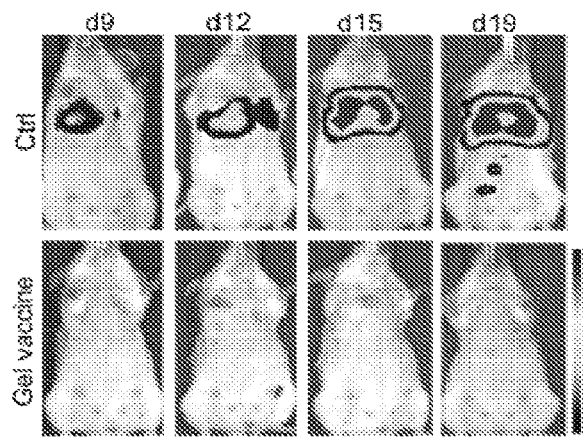

FIG. 39F shows representative bioluminescence images of mice at different times post injection of luc-4T1 cells.

Figure 39G:
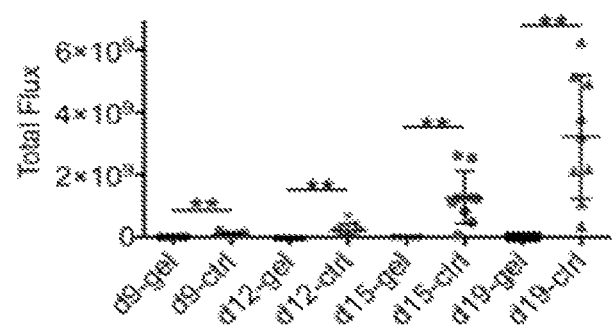
Figure 39H:
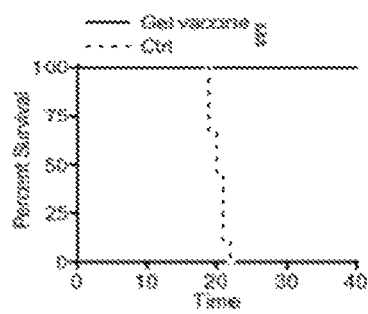

FIG. 39G shows quantification of luminescence intensity of mice at different times post injection of luc-4T1 cells (n=5-9).

FIG. 39I shows Kaplan-Meier plots for all groups. All the numerical data in FIGS. 39A-39I are presented as mean±SD (0.01<*P≤0.05; P≤0.01; *P≤0.001).

Figure 40:
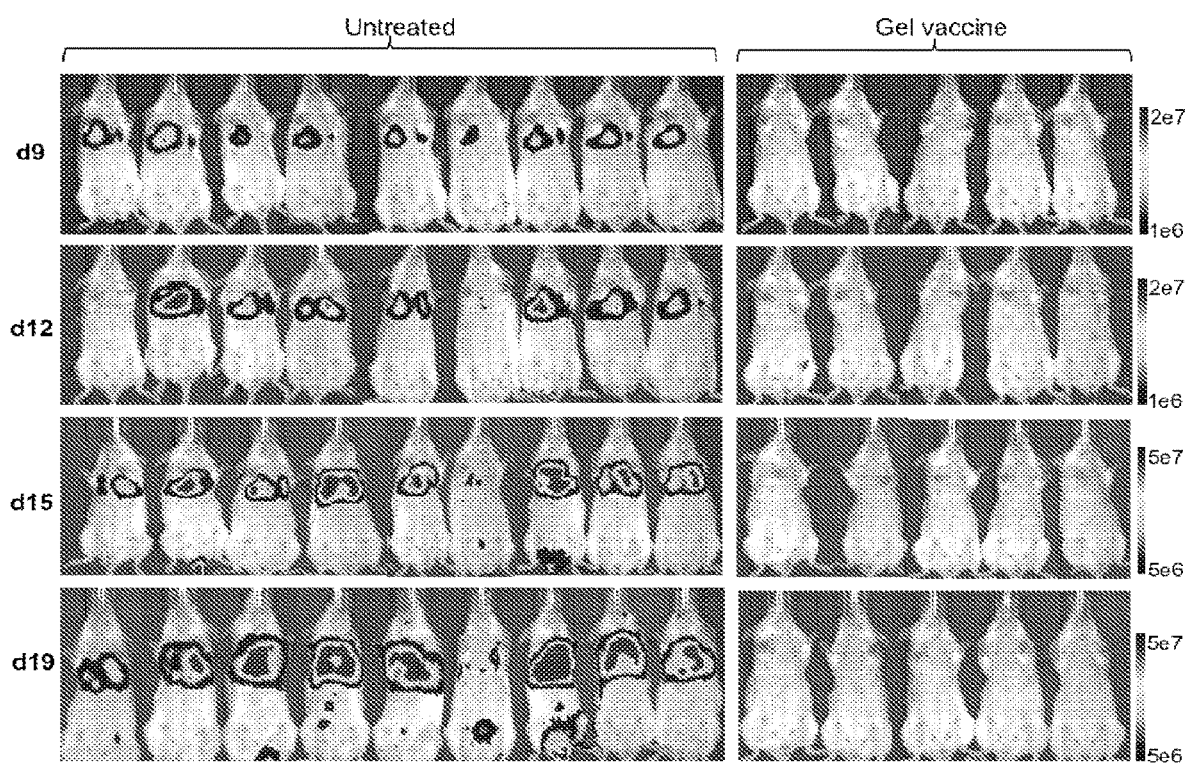

FIG. 40 shows in situ gel vaccines injected at the tumor resection site prevent the formation of 4T1 metastatic cancers. Following surgical resection of 4T1 tumors, gels containing GM-CSF, Dox-iRGD (200 μg) and CpG (100 μg) were injected at surgical site. Mice were re-challenge with i.v. injected luciferase-expressing 4T1 (luc-4T1) cells at ~80 days post gel injection. Shown are bioluminescence images of mice at different times post i.v. injection of luc-4T1 cells.

DETAILED DESCRIPTION OF THE INVENTION

I. Definitions

In order that the present invention may be more readily understood, certain terms are first defined.

Unless otherwise defined herein, scientific and technical terms used in connection with the present invention shall have the meanings that are commonly understood by those of ordinary skill in the art. The meaning and scope of the terms should be clear, however, in the event of any latent ambiguity, definitions provided herein take precedent over any dictionary or extrinsic definition.

The use of the terms "a" and "an" and "the" and similar referents in the context of describing the invention (especially in the context of the following claims) are to be construed to cover both the singular and the plural (i.e., one or more), unless otherwise indicated herein or clearly contradicted by context. The terms "comprising, "having," "including," and "containing" are to be construed as open-ended terms (i.e., meaning "including, but not limited to") unless otherwise noted. Recitation of ranges of values herein are merely intended to serve as a shorthand method of referring individually to each separate value recited or falling within the range, unless otherwise indicated herein, and each separate value is incorporated into the specification as if it were individually recited.

The term "about" or "approximately" usually means within 5%, or more preferably within 1%, of a given value or range.

Generally, the term "treatment" or "treating" is defined as the application or administration of a therapeutic agent to a patient, or application or administration of a therapeutic agent to an isolated tissue or cell line from a patient, said patient having a disease, a symptom of disease or a predisposition toward a disease, with the purpose to cure, heal, alleviate, relieve, alter, remedy, ameliorate, improve or affect the disease, the symptoms of disease or the predisposition toward disease. Thus, treating can include suppressing, inhibiting, preventing, treating, or a combination thereof. Treating refers, inter alia, to increasing time to sustained progression, expediting remission, inducing remission, augmenting remission, speeding recovery, increasing efficacy of or decreasing resistance to alternative therapeutics, or a combination thereof. "Suppressing" or "inhibiting", refers, inter alia, to delaying the onset of symptoms, preventing relapse to a disease, decreasing the number or frequency of relapse episodes, increasing latency between symptomatic episodes, reducing the severity of symptoms, reducing the severity of an acute episode, reducing the number of symptoms, reducing the incidence of disease-related symptoms, reducing the latency of symptoms, ameliorating symptoms, reducing secondary symptoms, reducing secondary infections, prolonging patient survival, or a combination thereof. In one embodiment the symptoms are primary, while in another embodiment, symptoms are secondary. "Primary" refers to a symptom that is a direct result of a disorder, e.g., diabetes, while, secondary refers to a symptom that is derived from or consequent to a primary cause. Symptoms may be any manifestation of a disease or pathological condition.

Accordingly, as used herein, the term "treatment" or "treating" includes any administration of a composition described herein and includes: (i) preventing the disease from occurring in a subject which may be predisposed to the disease but does not yet experience or display the pathology or symptomatology of the disease; (ii) inhibiting the disease in an subject that is experiencing or displaying the pathology or symptomatology of the diseased (i.e., arresting further development of the pathology and/or symptomatology); or (iii) ameliorating the disease in a subject that is experiencing or displaying the pathology or symptomatology of the diseased (i.e., reversing the pathology and/or symptomatology).

By "treatment", "prevention" or "amelioration" of a disease or disorder is meant delaying or preventing the onset of such a disease or disorder, reversing, alleviating, ameliorating, inhibiting, slowing down or stopping the progression, aggravation or deterioration the progression or severity of a condition associated with such a disease or disorder. In one embodiment, the symptoms of a disease or disorder are alleviated by at least 5%, at least 10%, at least 20%, at least 30%, at least 40%, or at least 50%.

Efficacy of treatment is determined in association with any known method for diagnosing the disorder. Alleviation of one or more symptoms of the disorder indicates that the composition confers a clinical benefit. Any of the therapeutic methods described to above can be applied to any suitable subject including, for example, mammals such as dogs, cats, cows, horses, rabbits, monkeys, and most preferably, humans.

As used herein, the term "subject" includes any subject who may benefit from being administered a hydrogel or an implantable drug delivery vaccine composition of the invention. The term "subject" includes animals, e.g., vertebrates, amphibians, fish, mammals, non-human animals, including humans and primates, such as chimpanzees, monkeys and the like. In one embodiment of the invention, the subject is a human.

The term "subject" also includes agriculturally productive livestock, for example, cattle, sheep, goats, horses, pigs, donkeys, camels, buffalo, rabbits, chickens, turkeys, ducks, geese and bees; and domestic pets, for example, dogs, cats, caged birds and aquarium fish, and also so-called test animals, for example, hamsters, guinea pigs, rats and mice.

The present invention is based upon, at least in part, the discovery that a biomaterial based vaccine composition effectively enhances an immune response against a cancer in a subject. The present invention provides vaccine compositions and the methods to use the same to prevent and/or treat a cancer. The present invention offers advantages over the treatments of cancers in the art.

For example, the compositions and/or methods according to the present invention provoke strong immune response of a subject, while the treatements of cancers in the art fail to do so. Without wishing to be bound by any theory, it is hypothesized that the biomaterial of the vaccine compostion of the present invention facilitates the enhancement of the immune response. The biomaterial recruits immune cells, e.g., dendritic cells, to the biomaterial. The immune cells temporarily reisde in the biomaterial to contact and/or interact with other components, such as adjuvant, antigen, or other substance. The microenviroment provided by the biomaterial also prevents or reduces the interaction of the recruited immune cells with other immunosuppressive signals. Thus, the immune cells are activated with high efficiency in the biomaterial.

In certain aspects, the present invention provides a vaccine composition that does not comprise an antigen prior to administration to a subject. The vaccine composition can acquire antigen generated in vivo to induce a specific adaptive immune response. As such, the vaccine composition exposes immune cells on or in the vaccine compositions to cancer antigens acquired after administration of the vaccine composition. The present invention, at least in part, is based on the surprising discovery that such vaccines that do not include an antigen prior to administration but that acquire an antigen generated in vivo, exhibit equal or superior efficacy. For example, such antigen free vaccines can be administered subsequent or concurrently with chemotherapy, e.g., administration of an agent that induces immunogenic cell death, and yet still exhibit equal or even superior efficacy. Alternatively, or in combination, the vaccine composition of the present invention can include an immunogenic cancer cell death inducing agent that kills cancer cells which are subsequently incorporated into or recruited to the vaccine composition.

The antigen-free vaccine compositions of the invention do not require the preparation and incorporation of the cancer antigens to the vaccine composition. The antigen-free vaccine compositions of the invention are particularly beneficial if there is no known antigen against certain cancer or the known antigens fail to provoke a strong immune response. Like the neoantigen approach, the compositions and the methods of the present invention can generate patient-specific, potent immune response. However, unlike the neoantigen approach and advantageously, the methods to use antigen-free vaccine do not require patient-specific manufacturing of each vaccine, which creates significant financial and technical complexity.

II. Antigen Free Vaccines

The present invention provides antigen free vaccines and methods to use the same to prevent or treating a cancer. An "antigen free vaccine," as used herein, refers to a vaccine composition that does not comprise an antigen before administration of the vaccine composition to a subject. Without wishing to be bound by any theory, it is hypothesized that the antigen free vaccine attracts, traps, captures, or otherwise acquires a cancer antigen to or near the vaccine composition after administering to the subject, and subsequently exposes the cancer antigen to an immune cell, thereby generating cancer-specific and/or subject-specific immune response and/or preventing or treating cancer.

In certain embodiments, the vaccine composition is a biomaterial based vaccine. As used herein, a "biomaterial based vaccine composition" is a vaccine that comprises a porous scaffold, as described in detail herein. Such a biomaterial based antigen-free vaccine composition offers advantages in preventing or treating cancer. The vaccine composition can be prepared without the need to prepare and incorporate the cancer antigen. This is particularly beneficial if there is no known antigen against a certain cancer or the known antigens fail to provoke strong immune response. The antigen-free vaccine can be used in combination with an immunogenic cancer cell death inducing agent to generate patient-specific, potent immune response as neoantigen approach. Advantageously, unlike neoantigen approach, the method of the invention does not require identifying the neoantigens and/or patient-specific manufacturing of each vaccine, which creates significant financial and technical complex.

In some embodiments, the antigen free vaccine composition is used in combination with an agent that induces immunogenic cancer cell death, which is described in detail herein. Without wishing to be bound by any theory, it is hypothesized that the agent induces an immunogenic cancer cell death and renders cancer antigens available to the vaccine composition. Such agent may be administered prior to, concurrently with or subsequent to administration of the vaccine composition. Preferably, the agent is administered prior to the vaccine composition.

In a particular example, the antigen free vaccine comprises a recruitment composition (e.g., GM-CSF) that recruits an immune cell (e.g., dendritic cells) to the scaffold, and an adjuvant (e.g., CpG-ODN).

The antigen free vaccine composition is used in combination of a chemotherapeutic agent (e.g., doxorubicin), for the treatment of a hematological maglinancy, such as acute myeloid leukemia (AML). Without wishing to be bound by any theory, it is hypothesized that the chemotherapeutic agent kills the cancer cell. The vaccine composition recruits the cancer cells that are still alive but undergoing immunogenic cell death, orcancer cells that have undergone immunogenic cell death to or near the scaffold, which are subsequently lysed on or in or near the scaffold to release the cancer antigens. The vaccine composition may also attract, trap, capture, or otherwise acquire cancer antigens that are released from dead cancer cells to or near the scaffold. The vaccine composition also recruits immune cells, e.g., dendritic cells to the scaffold. The immune cells are exposed to the cancer antigens presented in, on or near the scaffold, thereby generating cancer-specific and/or subject-specific immune response and/or preventing or treating cancer.

In certain embodiments, the antigen free vaccine composition incorporates the agent that induces immunogenic cancer cell death (e.g., doxorubicin) to the scaffold. The vaccine composition may also comprise a recruitment composition (e.g., GM-CSF) and an adjuvant (e.g., CpG-ODN).

The antigen free vaccine may also be used in combination with surgery therapy. Without wishing to be bound by any theory, it is hypothesized that cancer specific and/or subject specific antigens are generated in situ to provoke immunoresponses to prevent or reduce the recurrence and/or metastasis. The vaccine composition may be administered to or near a tumor site after the primary resection. The chemotherapeutic agent may kill the cancer cells immunogenically nearby. Immune cells recruited to the scaffold by the recruitment composition are exposed to cancer antigens released from the cancer cells. Cancer specific immune responses are thereby provoked and/or recurrence/metastasis are prevented and/or reduced.

III. Immunogenic Cancer Cell Death Inducing Agents

The present invention provides immunogenic cancer/tumor cell death inducing agents and the method for using the same. Immunogenic cell death (ICD or immunogenic apoptosis) is a form of cell death that is recognized by the immune system and results in immune activation. This cell death is characterized by apoptotic morphology, maintaining membrane integrity. Endoplasmic reticulum (ER) stress is generally recognised as a causative agent for ICD, with high production of reactive oxygen species (ROS). Two groups of ICD inducers are recognised. Type I inducers cause stress to the ER only as collateral damage, mainly targeting DNA or chromatin maintenance apparatus or membrane components. Type II inducers target the ER specifically. ICD is induced by some cytostatic agents such as anthracyclines, oxaliplatin and bortezomib, or radiotherapy and photodynamic therapy (PDT). Some viruses can be listed among biological causes of ICD. Just as immunogenic death of infected cells induces immune response to the infectious agent, immunogenic death of cancer cells can induce an effective antitumor immune response through activation of dendritic cells (DCs) and consequent activation of specific T cell response.

ICD is characterized by secretion of damage-associated molecular patterns (DAMPs). There are three most important DAMPs which are exposed to the cell surface during ICD. Calreticulin (CRT), one of the DAMP molecules, which is normally in the lumen of the endoplasmic reticulum, is translocated after the induction of immunogenic death to the surface of dying cell. There it functions as an "eat me" signal for professional phagocytes. Other important surface exposed DAMPs are heat-shock proteins (HSPs), namely HSP70 and HSP90, which under stress condition also translocate to the plasma membrane. On the cell surface they have an immunostimulatory effect, based on their interaction with number of antigen-presenting cell (APC) surface receptors like CD91 and CD40 and also facilitate crosspresentation of antigens derived from tumour cells on MHC class I molecule, which then leads to the CD8+ T cell response. Other important DAMPs, characteristic for ICD are secreted high mobility group box 1 (HMGB1) and ATP. HMGB1 is considered to be a marker of late ICD and its release to the extracellular space seems to be required for the optimal presentation of antigens by dendritic cells. It binds to several pattern recognition receptors (PRRs) such as Toll-like receptors (TLR) 2 and 4, which are expressed on APCs. ATP released during immunogenic cell death functions as a "find-me" signal for phagocytes when secreted and induces their attraction to the site of ICD. Also, binding of ATP to purinergic receptors on target cells has immunostimulatory effect through inflammasome activation. DNA and RNA molecules released during ICD activate TLR3 and cGAS responses, both in the dying cell and in phagocytes.

The agent that induces immunogenic cancer cell death can be any substance, chemical entity or therapy method utilizing other means that causes a death of cancer cell, which subsequently results in an immune response to the cancer cell. An "agent" that induces immunogenic cancer cell death can include, but is not limited to an atom, an antibiotics, a chemical group, a compound, an inorganic substance, an organic compound, a poly saccharide, a lipid, a nucleoside, a nucleotide, a nucleobase, a sugar, a nucleic acid, an amino acid, a peptide, a polypeptide, a protein, a protein complex, an organism such as a virus, a bacterial cell, an eukaryotic cell including an immune cell such as CAR-T, or an immunotherapy. The agent can be an artificial or natural substance.

In certain embodiments, the agent that induces immunogenic cancer cell death is selected from the group consisting of a radioactive isotope, a radiation therapy, a photodynamic therapy, a hyperthermia therapy, a hypothermia therapy, a virus, and a chemotherapeutic agent. In certain embodiments, the immunogenic tumor cell inducing agent is a chemotherapeutic agent. Such chemotherapeutic agents include members of the anthracycline class of compounds, e.g., doxorubicin, daunorubicin, epirubicin, idarubicin, and valrubicin as well as mitoxantrone, an anthracycline analog. This class of compounds is preferred due to their ability to activate the immune system, in addition to directly killing cancer cells. The agents oxaliplatin and cyclophosphamide also lead to immunogenic cell death. Other non-limiting examples of compounds that induce immunogenic cell death include shikonin, the proteasome inhibitor bortezomib, 7A7 (an epidermal growth factor receptor-specific antibody), cardiac glycosides, and vorinostat (a histone deacetylase inhibitor). See, e.g., H Inoue and K Tani (2014) Cell Death and Differentiation 21, 39-49, the entire content of which is hereby incorporated herein by reference.

In some embodiments, the agent that induces immunogenic cell death comprises a derivative or analog of any agent described herein. The term "derivative," as used herein, refers to a compound that is derived from a similar compound by a chemical reaction. For example, doxorubicin-iRGD, which is derived from doxorubicin through addition, is a derivate of doxorubicin. The term "analog," as used herein, is a compound having a structure similar to that of another compound, but differeing from it in respect to a certain component. It can differ in one or more atoms, functional groups, or substructures, which are replaced with other atoms, groups, or substances.

In addition to chemotherapy drugs, the agent that induces immunogenic tumor cell death of present invention also encompasses radiation therapy and/or photodynamic therapy, which can also lead to immunogenic cell death, as well as other approaches that kill tumor cells while activating immune responses to the tumor. The agent that induces immunogenic tumor cell death includes a substance that provides radiation therapy and/or photodynamic therapy.

In some embodiments, the radiation is provided by a radioactive isotpe. Suitable radioactive isotopes include iodine-131, iodine-125, rhenium-185, phosphorous-33, phosphorous-32, palladium-100, palladium-101, palladium- 201, palladium-103, palladium-105, palladium-106, palladium-108, palladium-109, palladium-110, palladium-111, palladium-112, caesium-137, iridium-192, cobalt-60, lutetium-177, yttrium-90, thallium-201, gallium-67, technetium-99m, strontium-90, or strontium-89.

In certain embodiments, the immunogenic tumor cell death inducing agent comprises a hyperthermia-inducing composition. Suitable hyperthermia-inducing compositions include a magnetic nanoparticle or a near infrared (NIR) absorbing nanoparticle. In some cases, the nanoparticle is magnetic, and the method further comprises contacting the magnetic nanoparticle with an alternative magnetic field (AMF) to induce local hyperthermia in situ, thereby altering or disrupting the cancer cell and producing a processed tumor antigen. In another example, the method further comprises contacting the NIR nanoparticle with NIR radiation to induce local hyperthermia in situ, thereby altering or disrupting the cancer cell and producing a processed tumor antigen. Hyperthermia is characterized by a local temperature of greater than 37 degrees Celsius (° C.). For example, the local temperature, e.g., the temperature in an area that tumor cells are enriched, is temporarily heated to about 40, 45, 50, 60, 70, 75, 80, 85, 90, 95° C. or more.

Chemotherapeutic Agents

The present invention includes chemotherapeutic agents that induce immunogenic tumor cell death. Such chemotherapeutic agents include members of the anthracycline class of compounds, e.g., doxorubicin, daunorubicin, epirubicin, idarubicin, and valrubicin as well as mitoxantrone, an anthracycline analog.

Chemotherapeutic agents may be used to generate antigen and prime the immune system. The anthracycline class of chemotherapeutic agents kill tumor cells in a way that causes priming of the immune system (immunogenic cell death). Anthracyclines are anticancer compounds that were originally derived from *Streptomyces* sp. Chemotherapeutic agents that induce immunogenic cancer cell death, for example, anthracyclines such as doxorubicin, or cardiac glycosides, are known in the art. See, e.g., US Patent Publication No. US2018/0021253A, incorporated herein by reference.

The activity of such inducers of immunogenic cell death results in antigen presenting cells being recruited to engulf dying tumor cells at the vaccine composition injection site.

The agent that induces immunogenic cancer cell death may be present in an amount effective to kill cancer cells in the scaffold or release from the scaffold to kill cancer cells nearby. Depending on the size and properties of the scaffold and the particular agent, a scaffold composition may contain the recruitment composition at microgram level or minigram. A pore-forming hydrogel of about 100 mm$^3$ may include about 100 µg Dox-iRGD. It is known in the art about how to quantify the release of an agent that induces immunogenic cancer cell death and its effect on recruiting immune cells. See, e.g., US Patent Publication No. US2018/0021253A1, incorporated herein by reference.

IV. Vaccine Compositions

The present invention features vaccine compositions and methods that enhance an immune response of a subject against a disease. The vaccine compositions of the present invention include a porous scaffold, a recruitment composition that recruits an immune cell to the scaffold, and an adjuvant. Depending on the context, vaccine composition may sometimes be referred to as "vaccine device," "device," or "composition" in this disclosure.

Scaffolds

The vaccine compositions of the present invention comprise a scaffold, e.g., a polymer scaffold. The scaffold can comprise one or more biomaterials. Preferably, the biomaterial is a biocompatible material that is non-toxic and/or non-immunogenic. As used herein, the term "biocompatible material" refers to any material that does not induce a significant immune response or deleterious tissue reaction, e.g., toxic reaction or significant irritation, over time when implanted into or placed adjacent to the biological tissue of a subject.

The scaffold can comprise biomaterials that are non-biodegradable or biodegradable. In certain embodiments, the biomaterial can be a non-biodegradable material. Exemplary non-biodegradable materials include, but are not limited to, metal, plastic polymer, or silk polymer. In certain embodiments, the polymer scaffold comprises a biodegradable material. The biodegradable material may be degraded by physical or chemical action, e.g., level of hydration, heat, oxidation, or ion exchange or by cellular action, e.g., elaboration of enzyme, peptides, or other compounds by nearby or resident cells. In certain embodiments, the polymer scaffold comprises both non-degradable and degradable materials.

In some embodiments, the scaffold composition can degrade at a predetermined rate based on a physical parameter selected from the group consisting of temperature, pH, hydration status, and porosity, the cross-link density, type, and chemistry or the susceptibility of main chain linkages to degradation. Alternatively, the scaffold composition degrades at a predetermined rate based on a ratio of chemical polymers. For example, a high molecular weight polymer comprised of solely lactide degrades over a period of years, e.g., 1-2 years, while a low molecular weight polymer comprised of a 50:50 mixture of lactide and glycolide degrades in a matter of weeks, e.g., 1, 2, 3, 4, 6, or 10 weeks. A calcium cross-linked gels composed of high molecular weight, high guluronic acid alginate degrade over several months (1, 2, 4, 6, 8, 10, or 12 months) to years (1, 2, or 5 years) in vivo, while a gel comprised of low molecular weight alginate, and/or alginate that has been partially oxidized, will degrade in a matter of weeks. In certain embodiments, the scaffold composition comprises oxidized alginate and the degradation rate of the scaffold composition can be adjusted by adjusting the oxidization degree of the alginate. See, US Patent Publication No. US2014/0079752 A1, the contents of which are incorporated herein by reference.

In certain embodiments, one or more compounds or proteins (e.g., the recruitment composition, the adjuvant, and the antigen), disclosed herein, are covalently or non-covalently linked or attached to the scaffold composition. In various embodiments, one or more compounds or proteins disclosed herein is incorporated on, into, or present within the structure or pores of, the scaffold composition.

In some embodiments, the scaffolds comprise biomaterials that are modified, e.g., oxidized or reduced. The degree of modification, such as oxidation, can be varied from about 1% to about 100%. As used herein, the degree of modification means the molar percentage of the sites on the biomaterial that are modified with a functional group. For example, the degree of modification can be about 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100%. It is intended that values and ranges intermediate to the recited values are part of this invention. Exemplary modified biomaterials, e.g., hydrogels, include, but not limited to, reduced-alginate, oxidized alginate, MA-alginate (methacrylated alginate), MA-gelatin, or MA-polyethylene glycol (MA-PEG).

Exemplary biomaterials suitable for use as scaffolds in the present invention include glycosaminoglycan, silk, fibrin, MATRIGEL®, poly-ethyleneglycol (PEG), polyhydroxy ethyl methacrylate, polyacrylamide, poly (N-vinyl pyrolidone), (PGA), poly lactic-co-glycolic acid (PLGA), poly e-carpolactone (PCL), polyethylene oxide, poly propylene fumarate (PPF), poly acrylic acid (PAA), polyhydroxybutyric acid, hydrolysed polyacrylonitrile, polymethacrylic acid, polyethylene amine, esters of alginic acid; pectinic acid; and alginate, fully or partially oxidized alginate, hyaluronic acid, carboxy methyl cellulose, heparin, heparin sulfate, chitosan, carboxymethyl chitosan, chitin, pullulan, gellan, xanthan, collagen, gelatin, carboxymethyl starch, carboxymethyl dextran, chondroitin sulfate, cationic guar, cationic starch, and combinations thereof. In certain embodiments, the biomaterial is selected from the group consisting of alginate, fully or partially oxidized or reduced alginate, and combinations thereof.

The scaffolds of the present invention may comprise an external surface. Alternatively, or in addition, the scaffolds may comprise an internal surface. External or internal surfaces of the scaffolds of the present invention may be solid or porous. Pore size of the scaffolds can be less than about 10 nm, between about 100 nm-20 µm, or greater than about 20 µm, e.g., up to and including 1000 µm in diameter. For example, the pores may be nanoporous, microporous, or macroporous. For example, the diameter of nanopores is less than about 10 nm; the diameter of micropores is in the range of about 100 nm-20 µm; and, the diameter of macropores is greater than about 20 µm, e.g., greater than about 50 µm, e.g., greater than about 100 µm, e.g., greater than about 400 µm, e.g., greater than 600 µm or greater than 800 µm. In some embodiment the diameter of the pore is between about 50 µm and about 80 µm.

In some embodiments, the scaffolds of the present invention are organized in a variety of geometric shapes (e.g., discs, beads, pellets), niches, planar layers (e.g., thin sheets). For example, discs of about 0.1-200 millimeters in diameter, e.g., 5, 10, 20, 40, or 50 millimeters may be implanted subcutaneously, intravenously, intraperitoneally, or intramuscularly. The disc may have a thickness of 0.1 to 10 millimeters, e.g., 1, 2, or 5 millimeters. The discs are readily compressed or lyophilized for administration to a patient. An exemplary disc for subcutaneous administration has the following dimensions: 8 millimeters in diameter and 1 millimeter in thickness.

The scaffolds of the present invention may be of any suitable size depending on the intended application. The scaffolds can be prepared in the micrometer-scale to centimeter-scale. Exemplary volumes vary from a few hundred µm$^3$ (e.g., about 100-500 µm$^3$) to about 10 cm$^3$. In certain embodiment, an exemplary scaffold is between about 100 µm$^3$ to 100 mm$^3$ in size. In various embodiments, the scaffold is between about 10 mm$^3$ to about 100 mm$^3$ in size. In certain embodiments, the scaffold is about 30 mm$^3$ or about 100 mm$^3$ in size.

In some embodiments, the scaffolds may comprise multiple components and/or compartments. In certain embodiments, a multiple compartment scaffold is assembled in vivo by applying sequential layers of similarly or differentially doped gel or other scaffold material to the target site. For example, the scaffold is formed by sequentially injecting the next, inner layer into the center of the previously injected material using a needle, thereby forming concentric spheroids. In certain embodiments, non-concentric compartments are formed by injecting material into different locations in a previously injected layer. A multi-headed injection scaffold extrudes compartments in parallel and simultaneously. The layers are made of similar or different biomaterials differentially doped with pharmaceutical compositions. Alternatively, compartments self-organize based on their hydrophilic/phobic characteristics or on secondary interactions within each compartment. In certain embodiments, multi-component scaffolds are optionally constructed in concentric layers each of which is characterized by different physical qualities such as the percentage of polymer, the percentage of crosslinking of polymer, chemical composition of the hydrogel, pore size, porosity, and pore architecture, stiffness, toughness, ductility, viscoelasticity, the recruitment composition, the adjuvant, and/or the antigen incorporated therein and/or any other compositions incorporated therein.

Hydrogel and Cryogel Scaffolds

In certain embodiments, the scaffolds of present invention comprise one or more hydrogels. A hydrogel is a polymer gel comprising a network of crosslinked polymer chains. A hydrogel is usually a composition comprising polymer chains that are hydrophilic. The network structure of hydrogels allows them to absorb significant amounts of water. Some hydrogels are highly stretchable and elastic; others are viscoelastic. Hydrogel are sometimes found as a colloidal gel in which water is the dispersion medium. In certain embodiments, hydrogels are highly absorbent (they can contain over 99% water (v/v)) natural or synthetic polymers that possess a degree of flexibility very similar to natural tissue, due to their significant water content. In certain embodiments, a hydrogel may have a property that, when an appropriate shear stress is applied, the deformable hydrogel is dramatically and reversibly compressed (up to 95% of its volume), resulting in injectable macroporous preformed scaffolds. Hydrogels have been used for therapeutic applications, e.g., as vehicles for in vivo delivery of therapeutic agents, such as small molecules, cells and biologics. Hydrogels are commonly produced from polysaccharides, such as alginates. The polysaccharides may be chemically manipulated to modulate their properties and properties of the resulting hydrogels. A hydrogel scaffold is sometimes referred to as "gel" in the present disclosure.

Preferably the compositions of the invention are formed of porous hydrogels. For example, the hydrogels may be nanoporous wherein the diameter of the pores is less than about 10 nm; microporous wherein the diameter of the pores is preferably in the range of about 100 nm-20 µm; or macroporous wherein the diameter of the pores is greater than about 20 µm, more preferably greater than about 100 µm and even more preferably greater than about 400 µm. In certain embodiments, the hydrogel is macroporous with pores of about 50-80 µm in diameter. In certain embodiments, the hydrogel is macroporous with aligned pores of about 400-500 µm in diameter. Methods of preparing porous hydrogel products are known in the art. (See, e.g., U.S. Pat. No. 6,511,650, incorporated herein by reference).

The hydrogel may be constructed out of a number of different rigid, semi-rigid, flexible, gel, self-assembling, liquid crystalline, or fluid compositions such as peptide polymers, polysaccharides, synthetic polymers, hydrogel materials, ceramics (e.g., calcium phosphate or hydroxyapatite), proteins, glycoproteins, proteoglycans, metals and metal alloys. The compositions are assembled into hydrogels using methods known in the art, e.g., injection molding, lyophilization of preformed structures, printing, self-assembly, phase inversion, solvent casting, melt processing, gas foaming, fiber forming/processing, particulate leaching or a combination thereof. The assembled scaffolds are then implanted or administered to the body of an individual to be treated.

The composition comprising a hydrogel may be assembled in vivo in several ways. The hydrogel is made from a gelling material, which is introduced into the body in its ungelled form where it gels in situ. Exemplary methods of delivering components of the composition to a site at which assembly occurs include injection through a needle or other extrusion tool, spraying, painting, or methods of deposit at a tissue site, e.g., delivery using an application scaffold inserted through a cannula. In some embodiments, the ungelled or unformed hydrogel material is mixed with at least one pharmaceutical composition prior to introduction into the body or while it is introduced. The resultant in vivo/in situ assembled scaffold, e.g., hydrogel, contains a mixture of the at least one pharmaceutical composition.

In situ assembly of the hydrogel may occur as a result of spontaneous association of polymers or from synergistically or chemically catalyzed polymerization. Synergistic or chemical catalysis is initiated by a number of endogenous factors or conditions at or near the assembly site, e.g., body temperature, ions or pH in the body, or by exogenous factors or conditions supplied by the operator to the assembly site, e.g., photons, heat, electrical, sound, or other radiation directed at the ungelled material after it has been introduced. The energy is directed at the hydrogel material by a radiation beam or through a heat or light conductor, such as a wire or fiber optic cable or an ultrasonic transducer. Alternatively, a shear-thinning material, such as an amphiphile, is used which re-cross links after the shear force exerted upon it, for example by its passage through a needle, has been relieved.

In some embodiments, the hydrogel may be assembled ex vivo. In some embodiments, the hydrogel is injectable. For example, the hydrogels are created outside of the body as macroporous scaffolds. Upon injection into the body, the pores collapse causing the gel to become very small and allowing it to fit through a needle. See, e.g., WO2012/149358; and Bencherif et al., 2012, *Proc. Natl. Acad. Sci. USA* 109.48:19590-5, the content of which are incorporated herein by reference).

Suitable hydrogels for both in vivo and ex vivo assembly of hydrogel scaffolds are well known in the art and described, e.g., in Lee et al., 2001, *Chem. Rev.* 7:1869-1879. The peptide amphiphile approach to self-assembly assembly is described, e.g., in Hartgerink et al., 2002, *Proc. Natl. Acad. Sci. USA* 99:5133-5138. A method for reversible gellation following shear thinning is exemplified in Lee et al., 2003, *Adv. Mat.* 15:1828-1832.

In certain embodiments, exemplary hydrogels are comprised of materials that are compatible with encapsulation of materials including polymers, nanoparticles, polypeptides, and cells. Exemplary hydrogels are fabricated from alginate, polyethylene glycol (PEG), PEG-acrylate, agarose, hyaluronic acid, or synthetic protein (e.g., collagen or engineered proteins (i.e., self-assembly peptide-based hydrogels)). For example, a commercially available hydrogel includes BD™ PuraMatrix™. BD™ PuraMatrix™ Peptide Hydrogel is a synthetic matrix that is used to create defined three dimensional (3D) micro-environments for cell culture.

In some embodiments, the hydrogel is a biocompatible polymer matrix that is biodegradable in whole or in part. Examples of materials which can form hydrogels include alginates and alginate derivatives, polylactic acid, polyglycolic acid, poly(lactic-co-glycolic acid) (PLGA) polymers, gelatin, collagen, agarose, hyaluronic acid, hyaluronic acid derivative, natural and synthetic polysaccharides, polyamino acids such as polypeptides particularly poly(lysine), polyesters such as polyhydroxybutyrate and poly-epsilon.-caprolactone, polyanhydrides; polyphosphazines, poly(vinyl alcohols), poly(alkylene oxides) particularly poly(ethylene oxides), poly(allylamines)(PAM), poly(acrylates), modified styrene polymers such as poly(4-aminomethylstyrene), pluronic polyols, polyoxamers, poly(uronic acids), poly(vinylpyrrolidone), and copolymers of the above, including graft copolymers. Synthetic polymers and naturally-occurring polymers such as, but not limited to, collagen, fibrin, hyaluronic acid, agarose, and laminin-rich gels may also be used. The term "derivative," as used herein, refers to a compound that is derived from a similar compound by a chemical reaction. For example, oxidized or reduced alginate, which is derived from alginate through oxidization reaction, is a derivative of alginate.

The implantable composition can have virtually any regular or irregular shape including, but not limited to, spheroid, cubic, polyhedron, prism, cylinder, rod, disc, or other geometric shape. Accordingly, in some embodiments, the implant is of cylindrical form from about 0.5 to about 10 mm in diameter and from about 0.5 to about 10 cm in length. Preferably, its diameter is from about 1 to about 5 mm and its length from about 1 to about 5 cm.

In some embodiments, the compositions of the invention are of spherical form. When the composition is in a spherical form, its diameter can range, in some embodiments, from about 0.5 to about 50 mm in diameter. In some embodiments, a spherical implant's diameter is from about 5 to about 30 mm. In an exemplary embodiment, the diameter is from about 10 to about 25 mm.

In certain embodiments, the scaffold comprises click-hydrogels and/or click-cryogels. A click hydrogel or cryogel is a gel in which cross-linking between hydrogel or cryogel polymers is facilitated by click reactions between the polymers. Each polymer may contain one of more functional groups useful in a click reaction. Given the high level of specificity of the functional group pairs in a click reaction, active compounds can be added to the preformed scaffold prior to or contemporaneously with formation of the hydrogel scaffold by click chemistry. Non-limiting examples of click reactions that may be used to form click-hydrogels include Copper I catalyzed azide-alkyne cycloaddition, strain-promoted assize-alkyne cycloaddition, thiol-ene photocoupling, Diels-Alder reactions, inverse electron demand Diels-Alder reactions, tetrazole-alkene photo-click reactions, oxime reactions, thiol-Michael addition, and aldehyde-hydrazide coupling. Non-limiting aspects of click hydrogels are described in Jiang et al., 2014, Biomaterials, 35:4969-4985, the entire content of which is incorporated herein by reference.

In various embodiments, a click alginate is utilized (see, e.g., PCT International Patent Application Publication No. WO 2015/154078 published Oct. 8, 2015, hereby incorporated by reference in its entirety).

In certain embodiments, a hydrogel (e.g., cryogel) system can deliver one or more agent (e.g., a recruitment composition such as GM-CSF, and/or an adjuvant, such as CpG, while creating a space for cells (e.g., immune cells such as dendritic cells (DCs) infiltration and trafficking). In some embodiments, the hydrogel system according to the present invention delivers GM-CSF, which acts as an immune cell recruitment composition, and CpG as an adjuvant, which may enhance activation of the immune cell.

In some embodiments, a cryogel composition, e.g., formed of MA-alginate, can function as a delivering platform by creating a local niche, such as a specific niche for enhancing T-lineage specification. In some embodiments, the cryogel creates a local niche in which the encounter of cells, such as recruited stem cells or progenitor cells, and various exemplary agent of the invention, such as the recruitment composition and/or adjuvant can be controlled. In certain embodiments, the cells and the exemplary agents of the present invention are localized into a small volume, and the contacting of the cells and the agents can be quantitatively controlled in space and time.

In certain embodiments, the hydrogel (e.g., cryogel) can be engineered to coordinate the delivery of both recruitment composition and adjuvant in space and time, potentially enhancing overall immune response by adjusting the differentiation and/or activation of recruited cells, such as dendritic cells. In certain embodiments, the cells and recruitment composition/adjuvant are localized into a small volume, and the delivery of factors in space and time can be quantitatively controlled. As the recruitment compositions/adjuvants are released locally, few systemic effects are anticipated, in contrast to systemically delivered agents, such as adjuvants.

Examples of polymer compositions from which the cryogel or hydrogel is fabricated are described throughout the present disclosure, and include alginate, hyaluronic acid, gelatin, heparin, dextran, carob gum, PEG, PEG derivatives including PEG-co-PGA and PEG-peptide conjugates. The techniques can be applied to any biocompatible polymers, e.g., collagen, chitosan, carboxymethylcellulose, pullulan, polyvinyl alcohol (PVA), Poly(2-hydroxyethyl methacrylate) (PHEMA), Poly(N-isopropylacrylamide) (PNIPAAm), or Poly(acrylic acid) (PAAc). For example, in a particular embodiment, the composition comprises an alginate-based hydrogel/cryogel. In another example, the scaffold comprises a gelatin-based hydrogel/cryogel.

Cryogels are a class of materials with a highly porous interconnected structure that are produced using a cryotropic gelation (or cryogelation) technique. Cryogels also have a highly porous structure. Typically, active compounds are added to the cryogel scaffold after the freeze formation of the pore/wall structure of the cryogel. Cryogels are characterized by high porosity, e.g., at least about 50, 55, 60, 65, 70, 75, 80, 85, 90, or 95% pores with thin pore walls that are characterized by high density of polymer crosslinking. As used herein, the term "porosity" refers to the percentage of the volume of pores to the volume of the scaffold. It is intended that values and ranges intermediate to the recited values are part of this invention. The walls of cryogels are typically dense and highly cross-linked, enabling them to be compressed through a needle into a subject without permanent deformation or substantial structural damage.

In various embodiments, the pore walls comprise at least about 10, 15, 20, 25, 30, 35, or 40% (w/v) polymer. It is intended that values and ranges intermediate to the recited values are part of this invention. In other embodiments, the pore walls comprise about 10-40% polymer. In some embodiments, a polymer concentration of about 0.5-4% (w/v) (before the cryogelation) is used, and the concentration increases substantially upon completion of cryogelation. Non-limiting aspects of cryogel gelation and the increase of polymer concentration after cryogelation are discussed in Beduer et al., 2015 *Advanced Healthcare Materials* 4.2: 301-312, the entire content of which is incorporated herein by reference.

In certain embodiments, cryogelation comprises a technique in which polymerization-crosslinking reactions are conducted in quasi-frozen reaction solution. Non-limiting examples of cryogelation techniques are described in U.S. Patent Application Publication No. 20140227327, published Aug. 14, 2014, the entire content of which is incorporated herein by reference. An advantage of cryogels compared to conventional macroporous hydrogels obtained by phase separation is their high reversible deformability. Cryogels may be extremely soft but can be deformed and reform their shape. In certain embodiments, cryogels can be very tough, can withstand high levels of deformations, such as elongation and torsion and can also be squeezed under mechanical force to drain out their solvent content. The improved deformability properties of alginate cryogels originate from the high crosslinking density of the unfrozen liquid channels of the reaction system.

In the cryogelation process, during freezing of the macromonomer (e.g., methacrylated alginate) solution, the macromonomers and initiator system (e.g., APS/TEMED) are expelled from the ice concentrate within the channels between the ice crystals, so that the reactions only take place in these unfrozen liquid channels. After polymerization and, after melting of ice, a porous material is produced whose microstructure is a negative replica of the ice formed. Ice crystals act as porogens. Desired pore size is achieved, in part, by altering the temperature of the cryogelation process. For example, the cryogelation process is typically carried out by quickly freezing the solution at −20° C. Lowering the temperature to, e.g., −80° C., would result in more ice crystals and lead to smaller pores. In some embodiments, the cryogel is produced by cryo-polymerization of at least methacrylated (MA)-alginate and MA-PEG. In some embodiments, the cryogel is produced by cryo-polymerization of at least MA-alginate, MA-PEG the recruitment composition, and the adjuvant. In some embodiments, the cryogel is produced by cryo-polymerization of MA-alginate and is substantially free of MA-PEG.

In some embodiments, the invention also features gelatin scaffolds, e.g., gelatin hydrogels such as gelatin cryogels, which are a cell-responsive platform for biomaterial-based therapy. Gelatin is a mixture of polypeptides that is derived from collagen by partial hydrolysis. These gelatin scaffolds have distinct advantages over other types of scaffolds and hydrogels/cryogels. For example, the gelatin scaffolds of the invention support attachment, proliferation, and survival of cells and are degraded by cells, e.g., by the action of enzymes such as matrix metalloproteinases (MMPs) (e.g., recombinant matrix metalloproteinase-2 and -9).

In certain embodiments, prefabricated cryogels, such as gelation cryogels, alginate cryogels, PEG cryogels, or cryogels comprising more than one cryogel material, rapidly reassume their approximately original shape ("shape memory") when injected subcutaneously, intraperitoneally, intravenously, or intramuscularly, or by any other type of injection into a subject (e.g., a mammal such as a human, dog, cat, pig, or horse) and elicit little or no harmful host immune response (e.g., immune rejection) following injection.

In some embodiments, the hydrogel (e.g., cryogel) comprises polymers that are modified, e.g., sites on the polymer molecule are modified with a methacrylic acid group (methacrylate (MA)) or an acrylic acid group (acrylate). Exemplary modified hydrogels/cryogels are MA-alginate (methacrylated alginate), MA-gelatin, or MA-PEG. In the case of MA-alginate, MA-gelatin, or MA-PEG, 50% corresponds to the degree of methacrylation of alginate or gelatin. This means that every other repeat unit contains a methacrylated group. The degree of methacrylation can be varied from about 1% to about 100%. Preferably, the degree of methacrylation varies from about 1% to about 90%.

In certain embodiments, polymers can also be modified with acrylated groups instead of methacrylated groups. The product would then be referred to as an acrylated-polymer. The degree of methacrylation (or acrylation) can be varied for most polymers. However, some polymers (e.g., PEG) maintain their water-solubility properties even at 100% chemical modification. After crosslinking, polymers normally reach near complete methacrylate group conversion indicating approximately 100% of cross-linking efficiency. As used herein, the term "cross-linking efficiency" refers to the percentage of macromonomers that are covalently linked. For example, the polymers in the hydrogel are 50-100% crosslinked (covalent bonds). The extent of cross-linking correlates with the durability of the hydrogel. Thus, a high level of crosslinking (90-100%) of the modified polymers is desirable.

For example, the highly crosslinked hydrogel/cryogel polymer composition is characterized by at least about 50% polymer crosslinking (e.g., about 75%, 80%, 85%, 90%, 95%, 98%, 99%, or 100%; it is intended that values and ranges intermediate to the recited values are part of this invention). The high level of crosslinking confers mechanical robustness to the structure. Preferably, the percentage of crosslinking is less than about 100%. The composition is formed using a free radical polymerization process and a cryogelation process. For example, the cryogel is formed by cryopolymerization of methacrylated gelatin, methacrylated alginate, or methacrylated hyaluronic acid. In some embodiments, the cryogel comprises a methacrylated gelatin macromonomer or a methacrylated alginate macromonomer at concentration of about 1.5% (w/v) or less (e.g., about 1.5%, 1.4%, 1.3%, 1.2%, 1.1%, 1%, 0.9%, 0.8%, 0.7%, 0.6%, 0.5%, 0.4%, 0.3%, 0.2% or less; it is intended that values and ranges intermediate to the recited values are part of this invention). In some embodiments, the methacrylated gelatin or alginate macromonomer concentration is about 1% (w/v).

In certain embodiments, the cryogel comprises at least about 75% (v/v) pores, e.g., about 80%, 85%, 90%, 91%, 92%, 93%, 94%, 95%, 96%, 97%, 98%, or 99% (v/v) or more pores. It is intended that values and ranges intermediate to the recited values are part of this invention. In some embodiments, the pores are interconnected. Interconnectivity is important to the function of the hydrogel and/or cryogel, as without interconnectivity, water would become trapped within the gel. Interconnectivity of the pores permits passage of water (and other compositions such as cells and compounds) in and out of the structure. In certain embodiments, in a fully hydrated state, the hydrogel (e.g., cryogel) comprises at least about 90% water (volume of water/volume of the scaffold) (e.g., between about 90-99%, at least about 92%, 95%, 97%, 99%, or more). For example, at least about 90% (e.g., at least about 92%, 95%, 97%, 99%, or more) of the volume of the cryogel is made of liquid (e.g., water) contained in the pores. It is intended that values and ranges intermediate to the recited values are part of this invention. In certain embodiments, in a compressed or dehydrated hydrogel, up to about 50%, 60%, 70% of that water is absent, e.g., the cryogel comprises less than about 25% (e.g., about 20%, 15%, 10%, 5% or less) water.

In certain embodiments, the cryogels of the invention comprise pores large enough for a cell to travel through. For example, the cryogel contains pores of about 20-500 µm in diameter, e.g., about 20-30 µm, about 30-150 µm, about 50-500 µm, about 50-450 µm, about 100-400 µm, about 200-500 µm. In some embodiments, the hydrated pore size is about 1-500 µm (e.g., about 10-400 µm, about 20-300 µm, about 50-250 µm). In certain embodiments, the cryogel contains pores about 50-80 µm in diameter.

In some embodiments, injectable hydrogels or cryogels are further functionalized by addition of a functional group selected from the group consisting of: amino, vinyl, aldehyde, thiol, silane, carboxyl, azide, or alkyne. Alternatively or in addition, the cryogel is further functionalized by the addition of a further cross-linker agent (e.g., multiple arms polymers, salts, aldehydes, etc.). The solvent can be aqueous, and in particular, acidic or alkaline. The aqueous solvent can comprise a water-miscible solvent (e.g., methanol, ethanol, DMF, DMSO, acetone, dioxane, etc).

For cryogels, the cryo-crosslinking may take place in a mold and the cryogels (which may be injected) can be degradable. The pore size can be controlled by the selection of the main solvent used, the incorporation of a porogen, the freezing temperature and rate applied, the crosslinking conditions (e.g. polymer concentration), and also the type and molecule weight of the polymer used. The shape of the cryogel may be dictated by a mold and can thus take on any shape desired by the fabricator, e.g., various sizes and shapes (disc, cylinders, squares, strings, etc.) are prepared by cryogenic polymerization.

Injectable cryogels can be prepared in the micrometer-scale to centimeter-scale. Exemplary volumes vary from a few hundred $\mu m^3$ (e.g., about 100-500 $\mu m^3$) to about 10 $cm^3$. In certain embodiment, an exemplary scaffold composition is between about 100 $\mu m^3$ to 100 $mm^3$ in size. In various embodiments, the scaffold is between about 10 $mm^3$ to about 100 $mm^3$ in size. In certain embodiments, the scaffold is about 30 $mm^3$ in size.

In some embodiments, the cryogels are hydrated, loaded with compounds and loaded into a syringe or other delivery apparatus. For example, the syringes are prefilled and refrigerated until use. In another example, the cryogel is dehydrated, e.g., lyophilized, optionally with a compound (such as a recruitment composition or adjuvant) loaded in the gel and stored dry or refrigerated. Prior to administration, a cryogel-loaded syringe or apparatus may be contacted with a solution containing compounds to be delivered. For example, the barrel of the cryogel pre-loaded syringe is filled with a physiologically-compatible solution, e.g., phosphate-buffered saline (PBS) or saline (0.9% sodium chloride). Alternatively, the cryogel may be administered to a desired anatomical site followed by administration of the physiologically-compatible solution, optionally containing other ingredients, e.g., a recruitment composition and/or an adjuvant or together with one or more compounds disclosed herein. The cryogel is then rehydrated and regains its shape integrity in situ. In certain embodiments, the volume of PBS or other physiologic solution administered following cryogel placement is generally about 10 times the volume of the cryogel itself.

The cryogel also has the advantage that, upon compression, the cryogel composition maintains structural integrity and shape memory properties. For example, the cryogel is injectable through a hollow needle. For example, the cryogel returns to its approximately original geometry after traveling through a needle (e.g., a 16 gauge (G) needle, e.g., having a 1.65 mm inner diameter). Other exemplary needle sizes are 16-gauge, an 18-gauge, a 20-gauge, a 22-gauge, a 24-gauge, a 26-gauge, a 28-gauge, a 30-gauge, a 32-gauge, or a 34-gauge needle. Injectable cryogels have been designed to pass through a hollow structure, e.g., very fine needles, such as 18-30 G needles. In certain embodiments, the cryogel returns to its approximately original geometry after traveling through a needle in a short period of time, such as less than about 10 seconds, less than about 5 seconds, less than about 2 seconds, or less than about 1 second.

The cryogels may be injected to a subject using any suitable injection scaffold. For example, the cryogels may be injected using syringe through a needle. A syringe may include a plunger, a needle, and a reservoir that comprises compositions of the present invention. The injectable cryogels may also be injected to a subject using a catheter, a cannula, or a stent.

The injectable cryogels may be molded to a desired shape, in the form of rods, square, disc, spheres, cubes, fibers, foams. In some cases, the cryogel is in the shape of a disc, cylinder, square, rectangle, or string. For example, the cryogel composition is between about 100 µm$^3$ to 10 cm$^3$ in size, e.g., between 10 mm$^3$ to 100 mm$^3$ in size. For example, the cryogel composition is between about 1 mm in diameter to about 50 mm in diameter (e.g., about 5 mm). Optionally, the thickness of the cryogel is between about 0.2 mm to about 50 mm (e.g., about 2 mm).

Three exemplary cryogel materials systems are described below.

a) Methacrylated gelatin cryogel (CryoGelMA)—An exemplary cryogel utilized methacrylated gelatin and the results are described in detail in U.S. Patent Application Publication No. 2014-0227327, published Aug. 14, 2014, the entire contents of which are incorporated herein by reference.

b) Methacrylated alginate cryogel (CryoMAAlginate)—An exemplary cryogel utilized methacrylated alginate and the results are described in detail in U.S. Patent Application Publication No. 2014-0227327, published Aug. 14, 2014, the entire contents of which are incorporated herein by reference.

c) Click Alginate cryogel with Laponite nanoplatelets (CryoClick)—The base material is click alginate (PCT International Patent Application Publication No. WO 2015/154078 published Oct. 8, 2015, hereby incorporated by reference in its entirety). In some examples, the base material contains laponite (commercially available silicate clay used in many consumer products such as cosmetics). Laponite has a large surface area and highly negative charge density which allows it to adsorb positively charged moieties on a variety of proteins and other biologically active molecules by an electrostatic interaction, thereby allowing drug loading. When placed in an environment with a low concentration of drug, adsorbed drug releases from the laponite in a sustained manner. This system allows release of a more flexible array of various agents, e.g., recruitment composition, compared to the base material alone.

Various embodiments of the present subject matter include delivery vehicles comprising a pore-forming scaffold composition. For example, pores (such as macropores) are formed in situ within a hydrogel following hydrogel injection into a subject. Pores that are formed in situ via degradation of a sacrificial porogen hydrogel within the surrounding hydrogel (bulk hydrogel) facilitate recruitment and trafficking of cells, as well as the release of any composition or agent of the present invention, for example, a recruitment composition, such as GM-CSF, an adjuvant, or an antigen, or any combination thereof. In some embodiments, the sacrificial porogen hydrogel, the bulk hydrogel, or both the sacrificial porogen hydrogel and the bulk hydrogel may comprise any composition or agent of the present invention, for example, a recruitment composition, an adjuvant, and/or, an antigen, or any combination thereof.

In various embodiments, the pore-forming composition becomes macroporous over time when resident in the body of a recipient animal such as a mammalian subject. For example, the pore-forming composition may comprise a sacrificial porogen hydrogel and a bulk hydrogel, wherein the sacrificial porogen hydrogel degrades at least about 10% faster (e.g., at least about 15%, at least about 20%, at least about 25%, at least about 30%, at least about 35%, at least about 40%, at least about 45%, or at least about 50% faster) than the bulk hydrogel. It is intended that values and ranges intermediate to the recited values are part of this invention. The sacrificial porogen hydrogel may degrade leaving macropores in its place. In certain embodiments, the macropores are open interconnected macropores. In some embodiments, the sacrificial porogen hydrogel may degrade more rapidly than the bulk hydrogel, because the sacrificial porogen hydrogel (i) is more soluble in water (comprises a lower solubility index), (ii) is cross-linked to protease-mediated degradation motifs as described in U.S. Patent Application Publication No. 2005-0119762, published Jun. 2, 2005 (incorporated herein by reference in its entirety), (iii) comprises a shorter polymer that degrades more quickly compared to that of a longer bulk hydrogel polymer, (iv) is modified to render it more hydrolytically degradable than the bulk hydrogel (e.g., by oxidation), and/or (v) is more enzymatically degradable compared to the bulk hydrogel.

In various embodiments, a scaffold is loaded (e.g., soaked with) with one or more active compounds after polymerization. In certain embodiments, scaffold or scaffold polymer forming material is mixed with one or more active compounds before polymerization. In some embodiments, a scaffold or scaffold polymer forming material is mixed with one or more active compounds before polymerization, and then is loaded with more of the same or one or more additional active compounds after polymerization.

In some embodiments, pore size or total pore volume of a composition or scaffold is selected to influence the release of compounds from the scaffold or scaffold. Exemplary porosities (e.g., nanoporous, microporous, and macroporous scaffolds and scaffolds) and total pore volumes (e.g., about 5, 10, 15, 20, 25, 30, 35, 40, 45, 50, 55, 60, 65, 70, 75, 80, 85, 90, 95% or more of the volume of the scaffold) are described herein. It is intended that values and ranges intermediate to the recited values are part of this invention. Increased pore size and total pore volume increases the amount of compounds that can be delivered into or near a tissue, such as bone marrow. In some embodiments, a pore size or total pore volume is selected to increase the speed at which active ingredients exit the composition or scaffold. In various embodiments, an active ingredient may be incorporated into the scaffold material of a hydrogel or cryogel, e.g., to achieve continuous release of the active ingredient from the scaffold or scaffold over a longer period of time compared to active ingredient that may diffuse from a pore cavity.

In various embodiments, the composition is manufactured in one stage in which one layer or compartment is made and infused or coated with one or more compounds. Exemplary bioactive compositions comprise polypeptides or polynucleotides. In certain embodiments, the composition is manufactured in two or more (3, 4, 5, 6, . . . . 10 or more) stages in which one layer or compartment is made and infused or coated with one or more compounds followed by the construction of second, third, fourth or more layers, which are in turn infused or coated with one or more compounds in sequence. In some embodiments, each layer or compartment is identical to the others or distinguished from one another by the number or mixture of bioactive compositions as well as distinct chemical, physical and biological properties. Polymers may be formulated for specific applications by controlling the molecular weight, rate of degradation, and method of scaffold formation. Coupling reactions can be used to covalently attach bioactive agent, such as the differentiation factor to the polymer backbone.

In some embodiments, one or more compounds is added to the scaffold compositions using a known method including surface absorption, physical immobilization, e.g., using a phase change to entrap the substance in the scaffold material. For example, a recruitment composition is mixed with the scaffold composition while it is in an aqueous or liquid phase, and after a change in environmental conditions (e.g., pH, temperature, ion concentration), the liquid gels or solidifies thereby entrapping the bioactive substance. In certain embodiments, the components of the vaccine, e.g., the recruitment composition, or the adjuvant, are added prior to the fabrication of the scaffold, e.g., cryogelation. In other embodiments, the already formed scaffold is loaded with components dropwise. The vaccine composition may be either immediately injected or incubated for a period of time, e.g., 1 to 6 hours to integrate the components, e.g., some CpG-ODN variants such as PEI-condensed CpG-ODN.

In some embodiments, covalent coupling, e.g., using alkylating or acylating agents, is used to provide a stable, long term presentation of a compound on the scaffold in a defined conformation. Exemplary reagents for covalent coupling of such substances are provided in the table below.

TABLE 1

Methods to Covalently Couple Peptides/Proteins to Polymers

| Functional Group of Polymer | Coupling Reagents and Cross-Liner | Reacting Groups on Proteins/Peptides |
|---|---|---|
| —OH | Cyanogen bromide (CNBr) Cyanuric chloride 4-(4,6-Dimethoxy-1,3,5-triazin-2-yl)-4-methylmorpholinium chloride (DMT-MM) | —NH$_2$ |
| —NH$_2$ | Diisocyanate compounds Diisothoncyanate compounds Glutaraldehyde Succinic anhydride | —NH$_2$ —OH |
| —NH$_2$ | Nitrous Acid Hydrazine + nitrous acid | —NH$_2$ —SH —Ph—OH |
| —NH$_2$ | Carbodiimide compounds (e.g., EDC, DCC)[a] DMT-MM | —COOH |
| —COOH | Thiony I chloride N-hydroxysuccinimide N-hydroxysulfosuccinimide + EDC | —NH$_2$ |
| —SH | Disulfide compound | —SH |

[a]EDC: 1-ethyl-3-(3-dimethylaminopropyl) carbodiimide hydrochloride;
DCC: dicyclohexylcarbodiimide In some particular embodiments, the present invention provides a cryogel that comprises at least two polymers, such as MA-alginate and MA-PEG. The molar ratio of the MA-alginate to MA-PEG may be between about 100:1 to 0.1:1, for example, about 50:1, 25:1, 10:1, 4:1, 2:1, or 1:1. In some embodiments, the present invention provides a cryogel that comprises MA-alginate and is substantially free of MA-PEG. It is intended that values and ranges intermediate to the recited values are part of this invention.

Alginate Scaffolds

In certain embodiments, the composition of the invention comprises an alginate hydrogel. Alginates are versatile polysaccharide based polymers that may be formulated for specific applications by controlling the molecular weight, rate of degradation and method of scaffold formation. Alginate polymers are comprised of two different monomeric units, (1-4)-linked β-D-mannuronic acid (M units) and a L-guluronic acid (G units) monomers, which can vary in proportion and sequential distribution along the polymer chain. Alginate polymers are polyelectrolyte systems which have a strong affinity for divalent cations (e.g., $Ca^{2+}$, $Mg^{2+}$, $Ba^{2+}$) and form stable hydrogels when exposed to these molecules. See Martinsen A., et al., 1989, Biotech. & Bioeng., 33: 79-89). For example, calcium cross-linked alginate hydrogels are useful for dental applications, wound dressings chondrocyte transplantation and as a matrix for other cell types. Without wishing to be bound by theory, it is believed that G units are preferentially crosslinked using calcium crosslinking, whereas click reaction based crosslinking is more indiscriminate with respect to G units or M units (i.e., both G and M units can be crosslinked by click chemistry). Alginate scaffolds and the methods for making them are known in the art. See, e.g., International Patent Application Publication No. WO2017/075055 A1, published on May 4, 2017, the entire contents of which are incorporated herein by reference.

The alginate polymers useful in the context of the present invention can have an average molecular weight from about 20 kDa to about 500 kDa, e.g., from about 20 kDa to about 40 kDa, from about 30 kDa to about 70 kDa, from about 50 kDa to about 150 kDa, from about 130 kDa to about 300 kDa, from about 230 kDa to about 400 kDa, from about 300 kDa to about 450 kDa, or from about 320 kDa to about 500 kDa. In one example, the alginate polymers useful in the present invention may have an average molecular weight of about 32 kDa. In another example, the alginate polymers useful in the present invention may have an average molecular weight of about 265 kDa. In some embodiments, the alginate polymer has a molecular weight of less than about 1000 kDa, e.g., less than about 900 KDa, less than about 800 kDa, less than about 700 kDa, less than about 600 kDa, less than about 500 kDa, less than about 400 kDa, less than about 300 kDa, less than about 200 kDa, less than about 100 kDa, less than about 50 kDa, less than about 40 kDa, less than about 30 kDa or less than about 25 kDa. In some embodiments, the alginate polymer has a molecular weight of about 1000 kDa, e.g., about 900 kDa, about 800 kDa, about 700 kDa, about 600 kDa, about 500 kDa, about 400 kDa, about 300 kDa, about 200 kDa, about 100 kDa, about 50 kDa, about 40 kDa, about 30 kDa or about 25 kDa. In one embodiment, the molecular weight of the alginate polymers is about 20 kDa.

Coupling reactions can be used to covalently attach bioactive agent, such as an atom, a chemical group, a nucleoside, a nucleotide, a nucleobase, a sugar, a nucleic acid, an amino acid, a peptide, a polypeptide, a protein, or a protein complex, to the polymer backbone.

The term "alginate", used interchangeably with the term "alginate polymers", includes unmodified alginate or modified alginate. Modified alginate includes, but not limited to, oxidized alginate (e.g., comprising one or more algoxalate monomer units), reduced alginate (e.g., comprising one or more algoxinol monomer units), methacrylated or acrylated alginate, click-modified alginate, and/or fluorophore-coupled alginate (for in vivo visualization). In some embodiments, oxidized alginate comprises alginate comprising one or more aldehyde groups, or alginate comprising one or more carboxylate groups. In other embodiments, oxidized alginate comprises highly oxidized alginate, e.g., comprising one or more algoxalate units. Oxidized alginate may also comprise a relatively small number of aldehyde groups (e.g., less than 15%, e.g., 14%, 13%, 12%, 11%, 10%, 9%, 8%, 7%, 6%, 5%, 4%, 3%, 2%, 1%, 0.9%, 0.8%, 0.7%, 0.6%, 0.5%, 0.4%, 0.3%, 0.2%, or 0.1% aldehyde groups or oxidation on a molar basis). It is intended that values and ranges intermediate to the recited values are part of this invention. The term "alginate" or "alginate polymers" may also include alginate, e.g., unmodified alginate, oxidized alginate or reduced alginate, or methacrylated alginate or acrylated alginate. Alginate may also refer to any number of derivatives of alginic acid (e.g., calcium, sodium or potassium salts, or propylene glycol alginate). See, e.g., WO1998012228A1, hereby incorporated by reference.

Polyethylene Glycol (PEG)

In certain embodiments, the composition of the present invention comprises a polyethylene glycol (PEG) hydrogel. PEG a polyether compound with many applications, from industrial manufacturing to medicine. PEG is also known as polyethylene oxide (PEO) or polyoxyethylene (POE), depending on its molecular weight. The structure of PEG is commonly expressed as H—(O—CH$_2$—CH$_2$)$_n$—OH. PEG is widely used as an artificial scaffold in tissue engineering research. PEG chains of any length can be easily synthesized by the controlled polymerization of ethylene oxide or ethylene glycol in aqueous solution. PEG is highly biocompatible and well-suited for use in hydrogels for biological studies. Its repeating alkane-ether motif makes PEG not only very hydrophilic, which is important for nutrient and waste transport, but also biochemically inert. PEG is also non-immunogenic and resistant to protein adsorption, making it suitable for in vivo as well as in vitro studies. PEG is commonly incorporated in block copolymers with biodegradable polymers, such as poly(glycolic acid) (PGA), poly (lactic acid) (PLA), or alginate.

The term "PEG," includes unmodified PEG or modified PEG. Modified hyaluronic acid includes, but is not limited to, methacrylated PEG and/or acrylated PEG. The term "PEG" or "PEG polymers" may also include PEG, e.g., unmodified PEG, or methacrylated hyaluronic acid or acrylated hyaluronic acid. PEG may also refer to any number of derivatives of PEG.

Porous and Pore-Forming Scaffolds

Preferably, the scaffolds of the present invention are porous. Porosity of the scaffold composition influences migration of the cells through the scaffold. Pores may be nanoporous, microporous, or macroporous. For example, the diameter of nanopores is less than about 10 nm. Micropores are in the range of about 100 nm to about 20 μm in diameter. Macropores are greater than about 20 μm (e.g., greater than about 100 μm or greater than about 400 μm) in diameter. Exemplary macropore sizes include about 50 μm, 100 μm, 150 μm, 200 μm, 250 μm, 300 μm, 350 μm, 400 μm, 450 μm, 500 μm, 550 μm, and 600 μm in diameter. It is intended that values and ranges intermediate to the recited values are part of this invention. Macropores are of a size that permits a eukaryotic cell to traverse into or out of the composition. In certain embodiments, a macroporous composition has pores of about 400 μm to 500 μm in diameter. The size of pores may be adjusted for different purpose. For example, for cell recruitment and cell release, the pore diameter may be greater than 50 μm. In another example, the pore diameter may be adjusted depending on the cell type. In certain embodiments, a macroporous composition has pores of about 50 μm-about 300 μm in diameter.

In some embodiments, the scaffolds contain pores before the administration into a subject. In some embodiments, the scaffolds comprise a pore-forming scaffold composition. Pore-forming scaffolds and the methods for making pore-forming scaffolds are known in the art. See, e.g., U.S. Patent Publication US2014/0079752A1, the content of which is incorporated herein by reference. In certain embodiments, the pore-forming scaffolds are not initially porous, but become macroporous over time resident in the body of a recipient animal such as a mammalian subject. In certain embodiments, the pore-forming scaffolds are hydrogel scaffolds. The pore may be formed at different time, e.g., after about 12 hours, or 1, 3, 5, 7, or 10 days or more after administration, i.e., resident in the body of the subject.

In certain embodiments, the pore-forming scaffolds comprise a first hydrogel and a second hydrogel, wherein the first hydrogel degrades at least about 10% faster (e.g., at least about 15%, at least about 20%, at least about 25%, at least about 30%, at least about 35%, at least about 40%, at least about 45%, at least about 50% faster, at least about 2 times faster, or at least about 5 times faster) than the second hydrogel. It is intended that values and ranges intermediate to the recited values are part of this invention. In certain embodiments, the first hydrogel comprises a porogen that degrades leaving a pore in its place. For example, the first hydrogel is a porogen and the resulting pore after degradation in situ is within 25% of the size of the initial porogen, e.g., within 20%, within 15%, or within 10% of the size of the initial porogen. Preferably, the resulting pore is within 5% of the size of the initial porogen. It is intended that values and ranges intermediate to the recited values are part of this invention. The first hydrogel may degrade faster than the second hydrogel due to the difference in their physical, chemical, and/or biological properties. In certain embodiments, the first hydrogel degrades more rapidly than the second hydrogel, because the first hydrogel is more soluble in water (comprises a lower solubility index). In certain embodiments, the first hydrogel degrades more rapidly because it is cross-linked to protease-mediated degradation motifs as described in U.S. Patent Publication US2005/0119762A1, the content of which is incorporated herein by reference.

In certain embodiments, the molecular mass of the polymers used to form the first hydrogel composition (a porogen) is approximately 50 kilodaltons (kDa), and the molecular mass of the polymers used to form the second hydrogel composition (bulk) is approximately 250 kDa. A shorter polymer (e.g., that of a porogen) degrades more quickly compared to that of a longer polymer (e.g., that of the bulk composition). In certain embodiments, a composition is modified to render it more hydrolytically degradable by virtue of the presence of sugar groups (e.g., approximately 3-10% sugar of an alginate composition). In certain embodiments, the porogen hydrogel is chemically modified, such as oxidized or reduced, to render it more susceptible to degradation. In some embodiments, the porogen hydrogel is more enzymatically degradable compared to the bulk hydrogel. The composite (first and second hydrogel) composition is permeable to bodily fluids, e.g., containing an enzyme which is exposed to the composition and degrades the porogen hydrogel. In some embodiments, the second hydrogel is cross-linked around the first hydrogel, i.e., the porogens (first hydrogel) are completely physically entrapped in the bulk (second) hydrogel.

The click reagents disclosed herein can be provided in the bulk hydrogel or the porogen hydrogel. In exemplary embodiments, the click reagents, e.g., polymers or nanoparticles, are provided in the bulk hydrogel.

In certain embodiments, hydrogel micro-beads ("porogens") are formed. Porogens are encapsulated into a "bulk" hydrogel that is either non-degradable or which degrades at a slower rate compared to the porogens. Immediately after hydrogel formation, or injection into the desired site in vivo, the composite material lacks pores. Subsequently, porogen degradation causes pores to form in situ. The size and distribution of pores are controlled during porogen formation, and mixing with the polymers which form the bulk hydrogel.

In some embodiments, the polymer utilized in the pore-forming scaffolds is naturally-occurring or synthetically made. In one example, both the porogens and bulk hydrogels are formed from alginate.

In certain embodiments, the alginate polymers suitable for porogen formation have a molecular weight from 5,000 to 500,000 Daltons. The polymers are optionally further modified (e.g., by oxidation with sodium periodate, (Bouhadir et al., 2001, *Biotech. Prog.* 17:945-950, hereby incorporated by reference), to facilitate rapid degradation. In certain embodiments, the polymers are crosslinked by extrusion through a nebulizer with co-axial airflow into a bath of divalent cation (for example, $Ca^{2+}$ or $Ba^{2+}$) to form hydrogel micro-beads. Higher airflow rate leads to lower the porogen diameter.

In some embodiments, the porogen hydrogel microbeads contain oxidized or reduced alginate. For example, the porogen hydrogel can contain about 1-50% (w/v) oxidized or reduced alginate. In exemplary embodiments, the porogen hydrogel can contain about 1-10% oxidized or reduced alginate. In one embodiment, the porogen hydrogel contains about 7.5% oxidized or reduced alginate. In another embodiment, the porogen hydrogel contains about 2% oxidized or reduced alginate. The alginate may also be oxidized first and then reduced.

In certain embodiments, the concentration of divalent ions used to form porogens may vary from about 5 to about 500 mM, and the concentration of polymer from about 1% to about 5% by weight/volume. However, any method which produces porogens that are significantly smaller than the bulk phase is suitable. Porogen chemistry can further be manipulated to produce porogens that interact with host proteins and/or cells, or inhibit interactions with host proteins and/or cells.

The alginate polymers suitable for formation of the bulk hydrogel have a molecular weight from about 5,000 to about 500,000 Da. The polymers may be further modified (for example, by oxidation with sodium periodate), to facilitate degradation, as long as the bulk hydrogel degrades more slowly than the porogen. The polymers may also be modified to present biological cues to control cell responses (e.g., integrin binding adhesion peptides such as RGD). Either the porogens or the bulk hydrogel may also encapsulate bioactive factors such as oligonucleotides, recruitment compositions or drugs to further control cell responses. The concentration of divalent ions used to form the bulk hydrogel may vary from about 5 to about 500 mM, and the concentration of polymer from about 1% to about 5% by weight/volume. The elastic modulus of the bulk polymer is tailored for its purpose, e.g., to recruit stem cells or progenitor cells.

Methods relevant to generating the hydrogels described herein include the following. Bouhadir et al., 1999, *Polymer*, 40: 3575-84 (incorporated herein by reference in its entirety) describes the oxidation of alginate with sodium periodate, and characterizes the reaction. Bouhadir et al., 2001, *Biotechnol. Prog.*, 17: 945-50 (incorporated herein by reference in its entirety) describes oxidation of high molecular weight alginate to form alginate dialdehyde (alginate dialdehyde is high molecular weight ($M_w$) alginate in which a certain percent, e.g., 5%, of sugars in alginate are oxidized to form aldehydes), and application to make hydrogels degrade rapidly. Kong et al., 2002, *Polymer*, 43: 6239-46 (incorporated herein by reference in its entirety) describes the use of gamma-irradiation to reduce the weight-averaged molecular weight ($M_w$) of guluronic acid (GA) rich alginates without substantially reducing GA content (e.g., the gamma irradiation selectively attacks mannuronic acid, MA blocks of alginate). Alginate is comprised of GA blocks and MA blocks, and it is the GA blocks that give alginate its rigidity (elastic modulus). Kong et al., 2002, *Polymer*, 43: 6239-46 (incorporated herein by reference in its entirety) shows that binary combinations of high $M_w$, GA rich alginate with irradiated, low $M_w$, high GA alginate crosslinks with calcium to form rigid hydrogels, but which degrade more rapidly and also have lower solution viscosity than hydrogels made from the same overall weight concentration of only high $M_w$, GA rich alginate. Alsberg et al., 2003, *J Dent Res*, 82(11): 903-8 (incorporated herein by reference in its entirety) describes degradation profiles of hydrogels made from irradiated, low $M_w$, GA-rich alginate, with application in bone tissue engineering. Kong et al., 2004, *Adv. Mater*, 16(21): 1917-21 (incorporated herein by reference) describes control of hydrogel degradation profile by combining gamma irradiation procedure with oxidation reaction, and application to cartilage engineering.

Techniques to control degradation of hydrogen biomaterials are well known in the art. For example, Lutolf M P et al., 2003, *Nat Biotechnol.*, 21: 513-8 (incorporated herein by reference in its entirety) describes poly(ethylene glycol) based materials engineered to degrade via mammalian enzymes (MMPs). Bryant S J et al., 2007, *Biomaterials*, 28(19): 2978-86 (U.S. Pat. No. 7,192,693 B2; incorporated herein by reference in its entirety) describes a method to produce hydrogels with macro-scale pores. A pore template (e.g., poly-methylmethacrylate beads) is encapsulated within a bulk hydrogel, and then acetone and methanol are used to extract the porogen while leaving the bulk hydrogel intact. Silva et al., 2008, *Proc. Natl. Acad. Sci USA*, 105(38): 14347-52 (incorporated herein by reference in its entirety; US 2008/0044900) describes deployment of endothelial progenitor cells from alginate sponges. The sponges are made by forming alginate hydrogels and then freeze-drying them (ice crystals form the pores). Ali et al., 2009, *Nat Mater* (incorporated herein by reference in its entirety) describes the use of porous scaffolds to recruit dendritic cells and program them to elicit anti-tumor responses. Huebsch et al., 2010, *Nat Mater*, 9: 518-26 (incorporated herein by reference in its entirety) describes the use of hydrogel elastic modulus to control the differentiation of encapsulated mesenchymal stem cells.

In some embodiments, the scaffold composition comprises open interconnected macropores. Alternatively or in addition, the scaffold composition comprises a pore-forming scaffold composition. In certain embodiments, the pore-forming scaffold composition may comprise a sacrificial porogen hydrogel and a bulk hydrogel, wherein the pore-forming scaffold composition lacks macropores. For example, the sacrificial porogen hydrogel may degrade at least 10% faster than the bulk hydrogel leaving macropores in its place following administration of said pore-forming scaffold into a subject. In some embodiments, the sacrificial porogen hydrogel is in the form of porogens that degrade to form said macropores. For example, the macropores may comprise pores having a diameter of, e.g., about 10-400 µm.

Recruitment Composition

In certain embodiments, the vaccine composition comprises a recruitment composition. The term "recruitment composition," as used herein, refers to any agent that attracts a motile cell, such as immune cells, to the scaffold.

In certain embodiments, the recruitment composition for immune cells is a growth factor or cytokine. In some embodiments, the recruitment composition is a chemokine. Exemplary chemokines include, but are not limited to, CC chemokines, CXC chemokines, C chemokines, $CX_3C$ chemokines. Exemplary cytokines include, but are not limited to, interleukin, lymphokines, monokines, interferons, and colony stimulating factors. All known growth factors are encompassed by the compositions, methods, and scaffolds of the present invention. Exemplary growth factors include, but are not limited to, transforming growth factor beta (TGF-β), granulocyte-colony stimulating factor (G-CSF), granulocyte-macrophage colony stimulating factor (GM-CSF), nerve growth factor (NGF), neurotrophins, Platelet-derived growth factor (PDGF), erythropoietin (EPO), thrombopoietin (TPO), myostatin (GDF-8), growth differentiation factor-9 (GDF9), acidic fibroblast growth factor (aFGF or FGF-1), basic fibroblast growth factor (bFGF or FGF-2), epidermal growth factor (EGF), hepatocyte growth factor (HGF). In some embodiments, the vaccine composition includes a recruitment composition for immune cells. In some embodiments, the vaccine composition comprises a compound that attracts an immune cell to or into the scaffold, wherein the immune cell comprises a macrophage, T-cell, B-cell, natural killer (NK) cell, or dendritic cell. Non-limiting examples of compounds useful for attracting an immune cell to or into the scaffold comprises granulocyte-macrophage colony stimulating factor (GM-CSF), an FMS-like tyrosine kinase 3 ligand (Flt3L), chemokine (C-C motif) ligand 19 (CCL-19), chemokine (C-C motif) ligand 20 (CCL20), chemokine (C-C motif) ligand 21 (CCL-21), a N-formyl peptide, fractalkine, monocyte chemotactic protein-1, macrophage inflammatory protein-3 (MIP-3a), CXCL10 (IP-10), CXCL9 (MIG), and CCL5. The present invention encompasses cytokines as well as growth factors for stimulating dendritic cell activation. Exemplary cytokines include, but are not limited to, IL-1, IL-2, IL-3, IL-4, IL-5, IL-6, IL-8, IL-10, IL-12 1L-15, 1L-17, 1L-18, TNF-α, IFN-γ, and IFN-α.

In certain embodiments, the recruitment composition for immune cells is Granulocyte-macrophage colony-stimulating factor (GM-CSF). Granulocyte-macrophage colony-stimulating factor (GM-CSF) is a protein secreted by macrophages, T cells, mast cells, endothelial cells and fibroblasts. Specifically, GM-CSF is a cytokine that functions as a white blood cell growth factor. GM-CSF stimulates stem cells to produce granulocytes and monocytes. Monocytes exit the blood stream, migrate into tissue, and subsequently mature into macrophages.

In some embodiments, the vaccine composition can comprise and release GM-CSF polypeptides to attract host DCs to the scaffold. Contemplated GM-CSF polypeptides are isolated from endogenous sources or synthesized in vivo or in vitro. Endogenous GM-CSF polypeptides may be isolated from healthy human tissue. Synthetic GM-CSF polypeptides are synthesized in vivo following transfection or transformation of template DNA into a host organism or cell, e.g., a mammalian or human cell line. Alternatively, synthetic GM-CSF polypeptides are synthesized in vitro by polymerase chain reaction (PCR) or other art-recognized methods Sambrook, J., Fritsch, E. F., and Maniatis, T., Molecular Cloning: A Laboratory Manual. Cold Spring Harbor Laboratory Press, NY, Vol. 1, 2, 3 (1989), herein incorporated by reference).

In certain embodiments, GM-CSF polypeptides may be recombinant. In some embodiments, GM-CSF polypeptides are humanized derivatives of mammalian GM-CSF polypeptides. Exemplary mammalian species from which GM-CSF polypeptides are derived include, but are not limited to, mouse, rat, hamster, guinea pig, ferret, cat, dog, monkey, or primate. In some embodiments, GM-CSF is a recombinant human protein (PeproTech, Catalog #300-03). In some embodiments, GM-CSF is a recombinant murine (mouse) protein (PeproTech, Catalog #315-03). In some embodiments, GM-CSF is a humanized derivative of a recombinant mouse protein.

In certain embodiments, GM-CSF polypeptides may be modified to increase protein stability in vivo. In certain embodiments, GM-CSF polypeptides may be engineered to be more or less immunogenic. Endogenous mature human GM-CSF polypeptides are glycosylated, reportedly, at amino acid residues 23 (leucine), 27 (asparagine), and 39 (glutamic acid) (see U.S. Pat. No. 5,073,627). In certain embodiments, GM-CSF polypeptides of the present invention may be modified at one or more of these amino acid residues with respect to glycosylation state.

The recruitment composition for immune cells may recruit immune cells to the scaffolds of the present invention. Immune cells include cells of the immune system that are involved in immune response. Exemplary immune cells include, but not limited to, T cells, B cells, leucocytes, lymphocytes, antigen presenting cells, dendritic cells, neutrophils, eosinophils, basophils, monocytes, macrophages, histiocytes, mast cells, microglia, and NK cells.

In certain embodiments, the recruitment composition for immune cells recruits dendritic cells (DCs) to the scaffold of the present invention. Dendritic cells (DCs) are immune cells within the mammalian immune system and are derived from hematopoietic bone marrow progenitor cells. More specifically, dendritic cells can be categorized into lymphoid (or plasmacytoid) dendritic cell (pDC) and myeloid dendritic cell (mDC) subdivisions having arisen from a lymphoid (or plasmacytoid) or myeloid precursor cell, respectively. Dendritic cells can further be divided into conventional (cDC1s and cDC2s), which can further be divided migratory or lymph node-resident subpopulations. From the progenitor cell, regardless of the progenitor cell type, an immature dendritic cell is born. Immature dendritic cells are characterized by high endocytic activity and low T-cell activation potential. Thus, immature dendritic cells constitutively sample their immediate surrounding environment for pathogens. Exemplary pathogens include, but are not limited to, a virus or a bacterium. Sampling is accomplished by pattern recognition receptors (PRRs) such as the toll-like receptors (TLRs). Dendritic cells activate and mature once a pathogen is recognized by a pattern recognition receptor, such as a toll-like receptor.

The recruitment composition may be present in an amount effective to recruit immune cells to the scaffold. Depending on the size and properties of the scaffold and the particular recruitment composition, a scaffold composition may contain the recruitment composition at microgram level. For example, a cryogel scaffold of about 30 mm³ may include about 0.5-3 µg, e.g., 1 µg GM-CSF. A pore-forming hydrogel of about 100 mm³ may include about 2-4 µg, e.g., 3 µg GM-CSF. It is known in the art about how to quantify the release of a recruitment composition and its effect on recruiting immune cells. See, e.g., U.S. Pat. No. 8,067,237, US Patent Publication No. US 2016/0220667A1, U.S. Pat. No. 9,821,045, incorporated herein by reference.

Adjuvant

In certain embodiments, the vaccine composition of the present invention comprises an adjuvant. The term "adjuvant", as used herein, refers to compounds that can be added to vaccines to stimulate immune responses against antigens. Adjuvants may enhance the immunogenicity of highly purified or recombinant antigens. Adjuvants may reduce the amount of antigen or the number of immunizations needed to protective immunity. For example, adjuvants may activate antibody-secreting B cells to produce a higher amount of antibodies. Alternatively, adjuvants can act as a depot for an antigen, present the antigen over a longer period of time, which could help maximize the immune response and provide a longer-lasting protection. Adjuvants may also be used to enhance the efficacy of a vaccine by helping to modify the immune response to particular types of immune system cells, for example, by activating T cells instead of antibody-secreting B cells depending on the purpose of the vaccine. Adjuvants are also used in the production of antibodies from immunized animals (Petrovskyl et al, 2002, Immunology and Cell Biology 82: 488-496).

Adjuvants can be classified according to their source, mechanism of action or physicochemical properties. For example, adjuvants can be classified into three groups: (i) active immunostimulants, being substances that increase the immune response to the antigen; (ii) carriers, being immunogenic proteins that provide T-cell help; and (iii) vehicle adjuvants, being oil emulsions or liposomes that serve as a matrix for antigens as well as stimulating the immune response (Edelman R. 1992, *AIDS Res. Hum. Retroviruses* 8: 1409-11). An alternative adjuvant classification divides adjuvants according to administration route, namely mucosal or parenteral. A third classification divides adjuvants into alum salts and other mineral adjuvants; tensoactive agents; bacterial derivatives; vehicles and slow release materials or cytokines (Byars et al., 1990, *Laboratory Methods in Immunology:* 39-51). A fourth classification divides adjuvants into the following groups: gel-based adjuvants, tensoactive agents, bacterial products, oil emulsions, particulated adjuvants, fusion proteins or lipopeptides (Jennings R et al., 1998, *Dev. Biol. Stand,* 92: 19-28).

The vaccine composition of the present invention may comprise one or more adjuvants. Adjuvants suitable for use in the present invention include, but are not limited to, mineral salt-based adjuvants such as alum-based adjuvants, calcium-based adjuvants, iron-based adjuvants, zirconium-based adjuvants; particulate adjuvants; mucosal adjuvants; tensoactive adjuvants; bacteria-derived adjuvants; oil-based adjuvants; cytokines, liposome adjuvants, polymeric microsphere adjuvants, carbohydrate adjuvants.

Exemplary adjuvants include, but are not limited to, aluminium hydroxide, aluminum phosphate, calcium phosphate, Quil A, Quil A derived saponin QS-21, or other types of saponins, Detox, ISCOMs, cell wall peptidoglycan or lipopolysaccharide of Gram-negative bacteria, trehalose dimycolate, bacterial nucleic acids such as DNA containing CpG motifs, FIA, Montanide, Adjuvant 65, Freund's complete adjuvant, Freund's incomplete adjuvant, Lipovant, interferon, granulocyte-macrophage colony stimulating factor (GM-CSF), AS03, AS04, IL-1, IL-2, IL-3, IL-4, IL-5, IL-6, IL-7, IL-8, IL-10, IL-12, IL-15, IL-17, IL-18, STING, Toll-like receptor ligand, CD40L, ovalbumin (OVA), monophosphoryl lipid A (MPL), polyinosinic:polycytidylic acid (poly(I:C)), a combination of LPS (or MPLA) and OxPAPC, MF59, N-acetyl muramyl-L-alanyl-D-isoglutamine (MDP), poly (DL-lactide-coglycolide) microspheres, paraffin oil, squalene, virosome, gamma inulin, glucans, dextrans, lentinans, glucomannans and galactomannans, pathogen-associated molecular patterns (PAMPs), damage-associated molecular pattern molecules (DAMPs), antibodies against immune suppressive molecules (e.g., antibody or antagonist against transforming growth factor (TGF)-beta, A2aR antagonists), Freund's complete adjuvant, Freund's incomplete adjuvant, lipopolysaccharides (LPS), Fas ligand, Trail, lymphotactin, Mannan (M-FP), APG-2, Hsp70 and Hsp90.

In certain embodiments, the vaccine composition of the present invention comprises an adjuvant that activates and matures recruited immune cells. In some embodiments, the adjuvant comprises a toll-like receptor (TLR) ligand.

TLRs are a class of single transmembrane domain, non-catalytic, receptors that recognize structurally conserved molecules referred to as pathogen-associated molecular patterns (PAMPs). PAMPs are present on microbes and are distinguishable from host molecules. TLRs are present in all vertebrates. Thirteen TLRs (referred to as TLRs1-13, consecutively) have been identified in humans and mice. Human TLRs comprise TLRs 1-10. In some embodiments, the TLR ligand is a TLR agonist selected from the group consisting of TLR1, TLR2, TLR3, TLR4, TLR5, TLR6, TLR7, TLR8, TLR9, TLR10, TLR11, TLR12, and TLR13.

TLRs and interleukin-1 (IL-1) receptors comprise a receptor superfamily the members of which all share a TIR domain (Toll-IL-1 receptor). TIR domains exist in three varieties with three distinct functions. TIR domains of subgroup 1 are present in receptors for interleukins produced by macrophages, monocytes, and dendritic cells. TIR domains of subgroup 2 are present in classical TLRs which bind directly or indirectly to molecules of microbial origin. TIR domains of subgroup 3 are present in cytosolic adaptor proteins that mediate signaling between proteins comprising TIR domains of subgroups 1 and 2.

TLR ligands comprise molecules that are constantly associated with and highly specific for a threat to the host's survival such as a pathogen or cellular stress. TLR ligands are highly specific for pathogens and not the host. Exemplary pathogenic molecules include, but are not limited to, lipopolysaccharides (LPS), lipoproteins, lipoarabinomannan, flagellin, double-stranded RNA, and unmethylated CpG islands of DNA.

All known TLR ligands found either on a cell surface or an internal cellular compartment are encompassed by the compositions, methods, and scaffolds of the present invention. Exemplary TLR ligands include, but are not limited to, triacyl lipoproteins (TLR1); lipoproteins, gram positive peptidoglycan, lipteichoic acids, fungi, and viral glycoproteins (TLR2); double-stranded RNA, poly I:C (TLR 3); lipopolysaccaride, viral glycoproteins (TLR 4); flagellin (TLR5); diacyl lipoproteins (TLR6); Imiquimod (TLR7); small synthetic compounds, single-stranded RNA (TLR7 and TLR 8); unmethylated CpG DNA (TLR9); Profilin (TLR11). Also included as TRL ligands are host molecules like fibronectin and heat shock proteins (HSPs). Host TLR ligands are also encompassed by the present invention. The role of TLRs in innate immunity and the signaling molecules used to activate and inhibit them are known in the art (for a review, see Holger K. Frank B., Hessel E., and Coffman R L. Therapeutic targeting of innate immunity with Toll-like receptor agonists and antagonists. Nature Medicine 13, 552-559 (2007), the content of which is herein incorporated by reference).

In certain embodiments, a nucleic acid TLR ligands or any nucleic acid adjuvants are condensed using polyethylimine (PEI).

CpG sites are regions of deoxyribonucleic acid (DNA) where a cysteine nucleotide occurs next to a guanine nucleotide in the linear sequence of bases along its length (the "p" represents the phosphate linkage between them and distinguishes them from a cytosine-guanine complementary base pairing). CpG sites play a pivotal role in DNA methylation, which is one of several endogenous mechanisms cells use to silence gene expression. Methylation of CpG sites within promoter elements can lead to gene silencing. In the case of cancer, it is known that tumor suppressor genes are often silenced while oncogenes, or cancer-inducing genes, are expressed. Importantly, CpG sites in the promoter regions of tumor suppressor genes (which prevent cancer formation) have been shown to be methylated while CpG sites in the promoter regions of oncogenes are hypomethylated or unmethylated in certain cancers. The TLR-9 receptor binds unmethylated CpG sites in DNA.

In certain embodiments, the vaccine composition of present invention comprises a cytosine-guanosine dinucleotides and oligonucleotides (CpG-ODN). Contemplated CpG oligonucleotides may be isolated from endogenous sources or synthesized in vivo or in vitro. Exemplary sources of endogenous CpG oligonucleotides include, but are not limited to, microorganisms, bacteria, fungi, protozoa, viruses, molds, or parasites. In some embodiments, endogenous CpG oligonucleotides are isolated from mammalian benign or malignant neoplastic tumors. In some embodiments, synthetic CpG oligonucleotides are synthesized in vivo following transfection or transformation of template DNA into a host organism. In certain embodiments, Synthetic CpG oligonucleotides are synthesized in vitro by polymerase chain reaction (PCR) or other art-recognized methods (Sambrook, J., Fritsch, E. F., and Maniatis, T., Molecular Cloning: A Laboratory Manual. Cold Spring Harbor Laboratory Press, NY, Vol. 1, 2, 3 (1989), herein incorporated by reference).

CpG oligonucleotides are presented for cellular uptake by dendritic cells. In some embodiments, naked CpG oligonucleotides are used. The term "naked" is used to describe an isolated endogenous or synthetic polynucleotide (or oligonucleotide) that is free of additional substituents. In some embodiments, CpG oligonucleotides are bound to one or more compounds to increase the efficiency of cellular uptake. In some embodiments, CpG oligonucleotides are bound to one or more compounds to increase the stability of the oligonucleotide within the scaffold and/or dendritic cell.

In certain embodiments, CpG oligonucleotides are condensed prior to cellular uptake. In some embodiments, CpG oligonucleotides are bound to one or more compounds to increase the stability of the oligonucleotide within the scaffold and/or dendritic cell. CpG oligonucleotides are optionally condensed prior to cellular uptake. For example, CpG oligonucleotides are condensed using polyethylimine (PEI), a cationic polymer that increases the efficiency of cellular uptake into dendritic cells to yield cationic nanoparticles. CpG oligonucleotides may also be condensed using other polycationic reagents to yield cationic nanoparticles. Additional non-limiting examples of polycationic reagents that may be used include poly-L-lysine (PLL) and polyamidoamine (PAMAM) dendrimers.

Vector systems that promote CpG internalization into DCs to enhance delivery and its localization to TLR9 have been developed. The amine-rich polycation, polyethylimine (PEI) has been extensively used to condense plasmid DNA, via association with DNA phosphate groups, resulting in small, positively charge condensates facilitating cell membrane association and DNA uptake into cells (Godbey W. T., Wu K. K., and Mikos, A. G. J. of Biomed Mater Res, 1999, 45, 268-275; Godbey W. T., Wu K. K., and Mikos, A. G. Proc Natl Acad Sci USA. 96(9), 5177-81. (1999); each herein incorporated by reference). An exemplary method for condensing CpG-ODN is described in U.S. Patent Application No. US 20130202707 A1 published Aug. 8, 2013, the entire content of which is incorporated herein by reference. Consequently, PEI has been utilized as a non-viral vector to enhance gene transfection and to fabricate PEI-DNA loaded PLG matrices that promoted long-term gene expression in host cells in situ (Huang Y C, Riddle F, Rice K G, and Mooney D J. Hum Gene Ther. 5, 609-17. (2005), herein incorporated by reference).

CpG oligonucleotides can be divided into multiple classes. For example, exemplary CpG-ODNs encompassed by compositions, methods and scaffolds of the present invention are stimulatory, neutral, or suppressive. The term "stimulatory" used herein is meant to describe a class of CpG-ODN sequences that activate TLR9. The term "neutral" used herein is meant to describe a class of CpG-ODN sequences that do not activate TLR9. The term "suppressive" used herein is meant to describe a class of CpG-ODN sequences that inhibit TLR9. The term "activate TLR9" describes a process by which TLR9 initiates intracellular signaling.

Simulatory CpG-ODNs can further be divided into three types A, B and C, which differ in their immune-stimulatory activities. Type A stimulatory Cpg-odns are characterized by a phosphodiester central CpG-containing palindromic motif and a phosphorothioate 3' poly-G string. Following activation of TLR9, these Cpg-odns induce high IFN-α production from plasmacytoid dendritic cells (pDC). Type A Cpg-odns weakly stimulate TLR9-dependent NF-κB signaling.

Type B stimulatory Cpg-odns contain a full phosphorothioate backbone with one or more CpG dinucleotides. Following TLR9 activation, these CpG-ODNs strongly activate B cells. In contrast to Type A Cpg-ODNs, Type B CpG-ODNs weakly stimulate IFN-α secretion.

Type C stimulatory Cpg-odns comprise features of Types A and B. Type C CpG-ODNs contain a complete phosphorothioate backbone and a CpG containing palindromic motif. Similar to Type A Cpg-odns, Type C Cpg-odns induce strong IFN-α production from pDC. Simlar to Type B Cpg-odns, Type C Cpg-odns induce strong B cell stimulation.

Exemplary stimulatory Cpg-odns comprise, but are not limited to, ODN 1585, ODN 1668, ODN 1826, ODN 2006, ODN 2006-G5, ODN 2216, ODN 2336, ODN 2395, ODN M362 (all InvivoGen). The present invention also encompasses any humanized version of the preceding Cpg-odns. In one preferred embodiment, compositions, methods, and scaffolds of the present invention comprise ODN 1826 (the sequence of which from 5' to 3' is tccatgacgttcctgacgtt, wherein CpG elements are bolded, SEQ ID NO: 2).

Neutral, or control, Cpg-odns that do not stimulate TLR9 are encompassed by the present invention. These ODNs comprise the same sequence as their stimulatory counterparts but contain GpC dinucleotides in place of CpG dinucleotides.

Exemplary neutral, or control, Cpg-odns encompassed by the present invention comprise, but are not limited to, ODN 1585 control, ODN 1668 control, ODN 1826 control, ODN 2006 control, ODN 2216 control, ODN 2336 control, ODN 2395 control, ODN M362 control (all InvivoGen). The present invention also encompasses any humanized version of the preceding Cpg-odns.

Suppressive Cpg-odns that inhibit TLR9 are encompassed by the present invention. Exemplary potent inhibitory sequences are (TTAGGG)$_4$ (ODN TTAGGG, InvivoGen, SEQ ID NO:3), found in mammalian telomeres and ODN 2088 (InvivoGen), derived from a murine stimulatory Cpg-odn by replacement of 3 bases. Suppressive ODNs disrupt the colocalization of Cpg-odns with TLR9 in endosomal vesicles without affecting cellular binding and uptake. Suppressive Cpg-odns encompassed by the present invention are used to fine-tune, attenuate, reverse, or oppose the action of a stimulatory CpG-ODN. Alternatively, or in addition, compositions, methods, or scaffolds of the present invention comprising suppressive Cpg-odns are used to treat autoimmune conditions or prevent immune responses following transplant procedures.

Additional non-limiting examples of TLR agonists include Imiquimod, CRX-527 and OM-174.

Imiquimod is described in U.S. Pat. No. 7,323,568 issued Jan. 29, 2008; U.S. Pat. No. 8,642,616 issued Feb. 4, 2004; Walter et al. (2013) Nat Commun 4: 1560; Bilu and Sauder (2003) Br. J. Dermatol. 149 Suppl 66: 5-8; and Miller et al. (1999) Int J Immunopharmacol 21 (1): 1-14, the entire contents of each of which are incorporated herein by reference.

CRX-527 is described in Lembo et al., J Immunol. 2008 Jun. 1; 180(11):7574-81; and Hennessy et al., Nature Reviews Drug Discovery 9, 293-307 (April 2010), the entire content of which is hereby incorporated herein by reference. CRX-527 has the chemical name (2S)-2-[[(3R)-3-decanoyloxytetradecanoyl]amino]-3-[(2R,3R,4R,5S,6R)-3-[[(3R)-3-decanoyloxytetradecanoyl]amino]-4-[(3R)-3-decanoyloxytetradecanoyl]oxy-6-(hydroxymethyl)-5-phosphonooxyoxan-2-yl]oxypropanoic acid.

OM-174 has the chemical name [(3R)-1-[[(2R,3R,4R,5S,6R)-2-[[(2R,3S,4R,5R,6R)-3,4-dihydroxy-5-[[(3R)-3-hydroxytetradecanoyl]amino]-6-phosphonooxyoxan-2-yl]methoxy]-4-hydroxy-6-(hydroxymethyl)-5-phosphonooxyoxan-3-yl]amino]-1-oxotetradecan-3-yl]dodecanoate. OM-174 is described in Onier et al., Int J Cancer. 1999 May 31; 81(5):755-60; Isambert et al., BMC Cancer (2013) 13:172; and Hennessy et al., Nature Reviews Drug Discovery 9, 293-307 (April 2010), the entire content of each of which is hereby incorporated herein by reference.

The adjuvant may be present in an amount effective to activate immune cells on or in the scaffold. Depending on the size and properties of the scaffold and the particular adjuvant, a scaffold composition may contain the recruitment composition at microgram level or minigram. For example, a cryogel scaffold of about 30 mm$^3$ may include about 50-150 μg, e.g., 100 μg CpG-ODN. A pore-forming hydrogel of about 100 mm$^3$ may include about 50-200, e.g., 100 μg CpG-ODN. Quantifying the release of an adjuvant and its effect on immune cells can be assessed by art known techniques. See, e.g., U.S. Pat. No. 8,067,237, US Patent Publication No. US 2016/0220667A1, and U.S. Pat. No. 9,821,045, the contents of each of which are incorporated herein by reference.

In addition to adjuvant as described herein, the present inention also provide other immunostimulatory compounds. As used herein and depending on context, the term "immunostimulatory compound" includes compounds that increase a subject's immune response to an antigen. Examples of immunostimulatory compounds include immune stimulants and immune cell activating compounds. Devices of the present subject matter may contain immunostimulatory compounds that help program the immune cells to recognize ligands and enhance antigen presentation. Immune cell activating compounds include TLR agonists. Additional non-limiting immunostimulatory compounds include immunostimulatory antibodies.

Antigen

In certain embodiments, the device of the present invention acquires an antigen upon administration to the subject. Alternatively, or in combination, the device comprises an antigen upon administration. The antigen can be a cancer antigen or a non-cancer antigen (e.g., a microbial antigen or a viral antigen). In one embodiment, the antigen is a polypeptide. In one embodiment, the polypeptide antigen comprises a stretch of at least 10 consecutive amino acids identical to a stretch of at least 10 consecutive amino acids of a tumor antigen, a microbial antigen, or a viral antigen. In some embodiments, the antigen is a cancer antigen. The device comprising a cancer antigen can be used to vaccinate and/or provide protective immunity to a subject to whom such a device was administered. In some embodiments, a cancer/tumor antigen is from a subject who is administered a device provided herein. In certain embodiments, a cancer/tumor antigen is from a different subject. In various embodiments, a cancer antigen is present in a cancer cell lysate. For example, the cancer cell lysate may comprise one or more lysed cells from a biopsy. In some embodiments, the cancer antigen is present on an attenuated live cancer cell. For example, the attenuated live cancer cell may be an irradiated cancer cell or cancer cell that is treated by a chemotherapeutic agent, such as doxorubicin. In still some embodiments, the cancer antigen is a secreted factor from cancer cell, e.g., extracellular vesicles (EVs) derived from cancer cells, or proteins secreted from these cells. Antigens may be used alone or in combination with other components of the vaccine composition, such as GM-CSF, CpG-ODN sequences, or immunomodulators. Moreover, antigens can be provided simultaneously or sequentially with other components of the vaccine composition such as GM-CSF, CpG-ODN sequences, or immunomodulators. In yet some embodiments, the cancer antigen may be formulated to enhance immunogenicity. For example, a polypeptide antigen may be linked to a protein carrier.

One or more antigens may be selected based on an antigenic profile of a subject's cancer or of a pathogen. In certain embodiments, the vaccine composition lacks a tumor antigen prior to administration to a subject. In some embodiments, the vaccine composition comprises an immunoconjugate, wherein the immunoconjugate comprises an immunostimulatory compound covalently linked to an antigen. In various embodiments, the antigen comprises a tumor antigen, such as a central nervous system (CNS) cancer antigen, CNS germ cell tumor antigen, lung cancer antigen, leukemia antigen, acute myeloid leukemia antigen, multiple myeloma antigen, renal cancer antigen, malignant glioma antigen, medulloblastoma antigen, breast cancer antigen, prostate cancer antigen, Kaposi's sarcoma antigen, ovarian cancer antigen, adenocarcinoma antigen, or melanoma antigen. In some embodiments, treating the subject comprises reducing metastasis in the subject.

In some embodiments, the antigen is a cancer antigen, also sometimes referred to herein as a tumor antigen. A cancer antigen is an antigen that is selectively or semiselectively expressed by cancer cells, and that is generally not expressed under normal conditions by non-cancerous cells. A cancer antigen may be a cancer/tumor specific antigen (TSA), which is present only on tumor cells and not on any other cell. A cancer antigen may also be cancer/tumor associated antigen (TAA), which is present on some tumor cells and also some normal cells. A TAA is selectively upregulated or expressed in cancer cells. TAAs may also arise through oncogenic signaling processes that increase the expression of proteins or polysaccharides that are otherwise weakly or transiently expressed.

The cancer antigen may be derived from an extracelluar protein or an intracellular protein. The extracellular protein is a protein that is expressed on the surface of the cancer cell. The intracellular protein is a protein that is typically located within a cancer cell, i.e., not on the surface of the cancer cell. An intracellular protein can be degraded by the proteasome into short, commonly 8-10 amino acid long, peptides that are presented on the cell surface in the context of major histocompatibility complex class I (MHC-I) molecules, and recognized by TCR on T cells. Exemplary intracellular proteins that give rise to cancer antigens include, but are not limited to, p53, hCGβ, TARP, hTERT, MIF, proteinase 3, or Wilms Tumor protein-1 (WT-1).

Exemplary cancer antigens encompassed by the compositions, methods, and devices of the present invention include, but are not limited to, tumor lysates extracted from biopsies, and irradiated tumor cells. Exemplary polypeptide cancer antigens include one or more of the following proteins, or fragments thereof: MAGE series of antigens (MAGE-1 is an example), MART-1/melana, tyrosinase, ganglioside, gp100, GD-2, O-acetylated GD-3, GM-2, MUC-1, Sosl, Protein kinase C-binding protein, Reverse transcriptase protein, AKAP protein, VRK1, KIAA1735, T7-1, T11-3, T11-9, *Homo Sapiens* telomerase ferment (hTRT), Cytokeratin-19 (CYFRA21-1), SQUAMOUS CELL CARCINOMA ANTIGEN 1 (SCCA-1), (PROTEIN T4-A), SQUAMOUS CELL CARCINOMA ANTIGEN 2 (SCCA-2), Ovarian carcinoma antigen CA125 (1A1-3B) (KIAA0049), MUCIN 1 (TUMOR-ASSOCIATED MUCIN), (CARCINOMA-ASSOCIATED MUCIN), (POLYMORPHIC EPITHELIAL MUCIN), (PEM), (PEMT), (EPISIALIN), (TUMOR-ASSOCIATED EPITHELIAL MEMBRANE ANTIGEN), (EMA), (H23AG), (PEANUT-REACTIVE URINARY MUCIN), (PUM), (BREAST CARCINOMA-ASSOCIATED ANTIGEN DF3), CTCL tumor antigen sel-1, CTCL tumor antigen se14-3, CTCL tumor antigen se20-4, CTCL tumor antigen se20-9, CTCL tumor antigen se33-1, CTCL tumor antigen se37-2, CTCL tumor antigen se57-1, CTCL tumor antigen se89-1, Prostate-specific membrane antigen, 5T4 oncofetal trophoblast glycoprotein, Orf73 Kaposi's sarcoma-associated herpesvirus, MAGE-C1 (cancer/testis antigen CT7), MAGE-B1 ANTIGEN (MAGE-XP ANTIGEN) (DAM10), MAGE-B2 ANTIGEN (DAME), MAGE-2 ANTIGEN, MAGE-4a antigen, MAGE-4b antigen, Colon cancer antigen NY-CO-45, Lung cancer antigen NY-LU-12 variant A, Cancer associated surface antigen, Adenocarcinoma antigen ART1, Paraneoplastic associated brain-testis-cancer antigen (onconeuronal antigen MA2; paraneoplastic neuronal antigen), Neuro-oncological ventral antigen 2 (NOVA2), Hepatocellular carcinoma antigen gene 520, TUMOR-ASSOCIATED ANTIGEN CO-029, Tumor-associated antigen MAGE-X2, Synovial sarcoma, X breakpoint 2, Squamous cell carcinoma antigen recognized by T cell, Serologically defined colon cancer antigen 1, Serologically defined breast cancer antigen NY-BR-15, Serologically defined breast cancer antigen NY-BR-16, Chromogranin A; parathyroid secretory protein 1, DUPAN-2, CA 19-9, CA 72-4, CA 195, Carcinoembryonic antigen (CEA), Trp2, ovalbumin, M27, and M30. In embodiments, the antigen comprises a fragment of one or more of the following proteins. In exemplary embodiments, the fragment can comprise 10 or more consecutive amino acids identical in sequence to one or more of the foregoing proteins. In some embodiments, the fragment can comprise 10, 20, 30, 40, 50, 60, 70, 80, 90, 100, 150, 200, 250, 300, 350, 400, 450, 500, 600, 700, 800, 900, 1000 or more amino acids. In one embodiment, the fragment can comprise 10-500 amino acids.

In one embodiment, the antigen is a melanoma antigen. Exemplary melanoma antigens include, but are not limited to, tyrosinase, gp75 (tyrosinase related protein-1 (TRP-1)), gp100 (Pme117), Melan A/MART-1, TRP-2, MAGE family, BAGE family, GAGE family, NY-ESO-1, CDK4, β-catenin, mutated introns, N-acetylglucosaminyltransferase V gene product, MUM-1, p15, gangliosides (e.g., GM2, GD2, GM3, GD3), high molecular weight chondroitin sulfate proteoglycan, p97 melanotransferrin, and SEREX antigens (e.g., D-1, SSX-2) (Hodi F S, Clin Cancer Res, Feb. 1, 2006, 12: 673-678), or fragments thereof.

In certain embodiments, the antigen comprises a non-tumor antigen such as a microbial antigen. For example, the microbial antigen may comprise a bacterial antigen, a fungal antigen, an archaean antigen, or a protozoan antigen. In some embodiments, the microbial antigen is a viral antigen, e.g., an HIV antigen or influenza antigen. In some embodiments, the antigen is from a microbe such as a bacterium, virus, protozoan, archaean, or fungus. Various embodiments relate to vaccinating against or treating a bacterial, viral, or fungal infection. In various embodiments, a delivery vehicle comprising an antigen from a pathogen. For example, a pathogen includes but is not limited to a fungus, a bacterium (e.g., *Staphylococcus* species, *Staphylococcus aureus*, *Streptococcus* species, *Streptococcus pyogenes*, *Pseudomonas aeruginosa*, *Burkholderia cenocepacia*, *Mycobacterium* species, *Mycobacterium tuberculosis*, *Mycobacterium avium*, *Salmonella* species, *Salmonella typhi*, *Salmonella typhimurium*, *Neisseria* species, *Brucella* species, *Bordetella* species, *Borrelia* species, *Campylobacter* species, *Chlamydia* species, *Chlamydophila* species, *Clostrium* species, *Clostrium botulinum*, *Clostridium difficile*, *Clostridium tetani*, *Helicobacter* species, *Helicobacter pylori*, *Mycoplasma pneumonia*, *Corynebacterium* species, *Neisseria gonorrhoeae*, *Neisseria meningitidis*, *Enterococcus* species, *Escherichia* species, *Escherichia coli*, *Listeria* species, *Francisella* species, *Vibrio* species, *Vibrio cholera*, *Legionella* species, or *Yersinia pestis*), a virus (e.g., adenovirus, Epstein-Barr virus, Hepatitis A virus, Hepatitis B virus, Hepatitis C virus, Herpes simplex virus type 1, 2, or 8, human immunodeficiency virus, influenza virus, measles, Mumps, human papillomavirus, poliovirus, rabies, respiratory syncytial virus, rubella virus, or varicella-zoster virus), a parasite or a protozoa (e.g., *Entamoeba histolytica*, *Plasmodium*, *Giardia lamblia*, *Trypanosoma brucei*, or a parasitic protozoa such as malaria-causing *Plasmodium*). In one embodiment, a pathogen antigen can be derived from a pathogen cell or particle described herein.

Chemoattractant for Cancer Cells

In some embodiments, the vaccine composition comprises a chemoattractant for tumor cell. The chemoattractant for tumor cell attracts a motile tumor cell to the scaffold. Such molecules (and their amino acid (aa) and nucleic acid (na) sequences) are well known in the art. For example, the chemoattractant of cancer cells is a chemokine selected from the group consisting of chemokine (C-C motif) ligand 21 (CCL-21, GenBank Accession Number: (aa) CAG29322.1 (GI:47496599), (na) EF064765.1 (GI:117606581), incorporated herein by reference), chemokine (C-C motif) ligand 19 (CCL-19, GenBank Accession Number: (aa) CAG33149.1 (GI:48145853), (na) NM_006274.2 (GI:22165424), incorporated herein by reference), stromal cell-derived factor-1 (SDF-1, GenBank Accession Number: (aa) ABC69270.1 (GI:85067619), (na) E09669.1 (GI:22026296), incorporated herein by reference), vascular endothelial growth factor (e.g., VEGFA; GenBank Accession Number: (aa) AAA35789.1 (GI:181971), (na) NM_001171630.1 (GI: 284172472), incorporated herein by reference), and interleukin-4 (IL-4, GenBank Accession Number: (aa) AAH70123.1 (GI:47123367), incorporated herein by reference).

In some embodiments, the chemoattractant for the cancer cell recruits a cancer cell that is still alive but undergoing immunogenic death. For example, apoptotic markers were highly expressed on the tumor cell recruited to the scaffold. In various embodiments, the chemoattractant for the cancer cell recruits a cancer cell that remains motile after exposed to an agent that induces immunogenic death.

Immunogenic Cancer Cell Death Inducing Agents

In certain embodiments, the vaccine composition comprises an agent that induces immunogenic tumor cell death. Immunogenic tumor cell death inducing agent is described elsewhere herein.

In some embodiments, the vaccine composition comprises a chemotherapeutic agent that induces immunogenic tumor cell death, e.g., anthryaccline class of compounds as described elsewhere herein. In other embodiments, the vaccine composition comprises a hyperthermia-inducing composition as described elsewhere herein. In some embodiments, the hyperthermia-inducing composition is on the surface of the scaffold of the invention, e.g., the scaffold is coated with the hyperthermia-inducing composition. In various embodiments, the hyperthermia-inducing composition is within or throughout a scaffold.

In certain embodiments, the vaccine composition comprises a radioactive isotope as described elsewhere herein. In some embodiments, the radioactive isotope is on the surface of a device or scaffold of the invention, e.g., the scaffold is coated with the radioactive isotope. In various embodiments, the radioactive isotope composition is within or throughout a scaffold.

V. Inhibitor of Immunosuppression

Inhibitors of a tumor-generated immunosuppressive microenvironment are used to downregulate immunosuppression at the tumor site, potentiating the action of the agents listed above. Inhibitors comprise proteins, peptides, antibodies, small molecules, or RNA interference (RNAi) molecules that reduce the expression of a target protein.

Many inhibitory pathways exist within tumors that suppress tumor antigen presentation and the anti-tumor immune response. For example, TGF-β dampens tumor immunosurveillance and polarizes innate immune cells towards an immature differentiation status that prevents optimal anti-tumor immunity. Additionally, the STAT3 pathway promotes the production of immune inhibitory cytokines within the tumor, dampens anti-tumor T-helper 1-mediated immunity, and inhibits dendritic cell maturation. Also, Indoleamine-pyrrole 2,3-dioxygenase (DO or INDO EC 1.13.11.52). IDO is an enzyme that in humans is encoded by the IDO1 gene and catalyzes the degradation of the essential amino acid L-tryptophan to N-formylkynurenine. IDO can deplete tryptophan in the tumor microenvironment, inhibiting the activity of T cells and dendritic cells. Small molecule inhibitors of these (TGF-β, STAT3, and IDO) and other immunosuppressive pathways have been developed and are being tested clinically. Examples of such inhibitors include TGF-β pathway inhibitors (LY2157299), STAT3 pathway inhibitors (BP-1-102), IDO pathway inhibitors (NLG919); PD-1 pathway inhibitors, CTLA-4 pathway inhibitors, LAG-3 pathway inhibitors, B7-H3 pathway inhibitors, and/or TIM3 pathway inhibitors.

In some embodiments, the inhibitors may target factors that contribute to create the tumor microenvironment. For example, the inhibitors may decrease an angiogenic factor's function, thus targeting tumor vasculature. Such inhibitors may include, for example, an inhibitor for angiogenic factors, such as anti-VEGF antibodies, anti-fibrotic growth factor antibodies, or small molecules that inhibits the function of such factors. In some other examples, the inhibitors may be enzymes that deplete tumor ECM, e.g., hyaluronidase, collagenase.

In addition to protein inhibitors and antibody-based inhibitors, small molecule inhibitors may be loaded into or onto the device and are delivered to the location of a tumor/tumor site to inhibit the local tumor-mediated immunosuppression. Small molecules are compounds that have a molecular mass of a less than 1000 daltons, e.g., 500 daltons or less, 250 daltons or less, 100 daltons or less. Exemplary small molecule immunomodulatory compounds, e.g., inhibitors of immune suppression, are described below. Many are generally hydrophobic. Inhibitors of immunosuppression are described in US Patent Publication US2018/0021253A1, incorporated herein by reference.

RNA Interference

As used herein, "RNA interference inducing compound" or "RNAi compound" refers to a compound capable of inducing RNA interference or "RNAi" of protein expression, depending on the context. RNAi involves mRNA degradation, but many of the biochemical mechanisms underlying this interference are unknown. The use of RNAi has been described in Fire et al., 1998, Carthew et al., 2001, and Elbashir et al., 2001, the contents of which are incorporated herein by reference.

As used herein the phrase "mediate RNAi" refers to and indicates the ability to distinguish which mRNA molecules are to be afflicted with the RNAi machinery or process. RNA that mediates RNAi interacts with the RNAi machinery such that it directs the machinery to degrade particular mRNAs or to otherwise reduce the expression of the target protein. In one embodiment, the present invention relates to RNA molecules that direct cleavage of specific mRNA to which their sequence corresponds. It is not necessary that there be perfect correspondence of the sequences, but the correspondence must be sufficient to enable the RNA to direct RNAi inhibition by cleavage or blocking expression of the target mRNA.

As noted above, the RNA molecules of the present invention in general comprise an RNA portion and some additional portion, for example a deoxyribonucleotide portion. In some embodiments, an RNAi molecules comprises about 10, 11, 12, 13, 14, 15, 16, 17, 18, 19, 20, 21, 22, or 23 nucleotides, about 16 to 29 nucleotides, about 18 to 23 nucleotides, or about 21-23 nucleotides. In various embodiments, a device or scaffold comprises one or more RNAi molecules that mediate RNAi of one or more genes that inhibit T cell or dendritic cell suppression. In some embodiments, the target gene is an immune checkpoint gene. In some embodiments, the target gene is an immune suppression gene. In certain embodiments, the target gene encodes a TGF-β, STAT3, DO, PD-1, PD-1 ligand 1, CTLA-4, LAG-3, or TIM3 protein. Exemplary nucleotide sequences for each of these targets can be identified and retrieved from National Center of Biotechnology Information (NCBI), including GenBank. The GenBank IDs or NCBI reference numbers of these targets are as follows: TGF-0 (GenBank No: M60316.1); STAT3 (NCBI Reference Sequence No: NM_139276.2); IDO1 (NCBI Reference Sequence No: NM_002164.5); PD-1 (NCBI Reference Sequence No: NM_005018.2); PD-L1 (NCBI Reference Sequence No: NM_014143.3); CTLA-4 (NCBI Reference Sequence No: NM_001037631.2); LAG-3 (GenBank No: X51985.3); and TIM3 (GenBank No: AF450242.1). These sequences are not limiting, as additional variants and isoforms of each protein may be targeted.

In various embodiments, an RNAi molecule may be present in a device or scaffold with a transfection agent. For example, the RNAi molecule may be condensed with polyethylimine (PEI), poly-L-lysine (PLL), or a polyamidoamine (PAMAM) dendrimer. See, e.g., Huang et al. (2005) Human Gene Therapy 16:609-617. Additional non-limiting examples of transfection agents include liposomes (e.g., lipofectamine).

VI. Preventing or Treating Cancer Using Vaccine Composition

The present invention features methods of enhancing an immune response of a subject against a disease. The present invention also features methods of preventing or treating cancer in a subject. In certain embodiments of the present invention, the method includes administering to the subject one or more compostions of the present invention. The composition may include a porous scaffold, a recruitment composition that recruit an immune cell to the scaffold, and an adjuvant.

In certain embodiment, the administration of the vaccine composition is combined with another therapy regimen, such as a therapy that induces immunogenic tumor cell death or a checkpoint blockade therapy.

In one aspect, the present invention provides methods of preventing or treating a cancer in a subject or enhancing an immune response against a cancer in a subject. The methods include administering to the subject a vaccine composition and an agent that induces an immunogenic cancer cell death. The vaccine composition includes a porous scaffold, a recruitment composition that recruits an immune cell to the scaffold, and an adjuvant. In certain embodiments, the vaccine composition does not include a cancer antigen prior to the administration of the vaccine composition to the subject.

In another aspect, the present invention provides methods of preventing or reducing the recurrence or metastasis of a solid tumor after surgery in a subject. The methods include administering to the subject a vaccine composition after a primary tumor resection at or near the original tumor area. The vaccine composition may include a porous scaffold, an agent that induces an immunogenic cancer cell death, and a recruitment composition that recruit an immune cell to the scaffold. In some embodiments, the vaccine composition further comprises an adjuvant. In certain embodiments, the vaccine composition does not include a cancer antigen prior to administration of the composition to the subject.

In still another aspect, the present invention provides methods of treating a cancer in a subject. The methods include administering to the subject an inhibitor of immunosuppression and a vaccine composition. The vaccine composition may comprise a porous scaffold, an agent that induces an immunogenic cancer cell death, a recruitment composition that recruits an immune cell to the scaffold, and an adjuvant.

The compositions and methods of the present invention, when used in preventing or treating cancer, can have the effects including, but not limited to, preventing a cancer from developing, reducing tumor burden, reduce tumor size, increasing survival time, depleting cancer cells, preventing relapse, or preventing recurrence and/or metastasis after primary resection.

The compositions and methods of the present invention, when used in enhancing immune responses against a cancer, can have effects including, but not limited to, activation of dendritic cell, sustained activation of dendritic cell, activation of dendritic cell in tumor microenvironment, recognition of antigen by a cytotoxic T lymphocyte, increase of tumor infiltrating T cells, and enhancement of CD8+: Treg ratio at tumor site.

Prevention and/or Treatment of Various Cancers

The vaccine composition of the present invention can be used to prevent or treat a variety of cancer in a subject. In certain embodiments, the cancer is a hematologic malignancy. In some embodiments, the cancer is a solid tumor.

Hematologic malignancy, also known as hematologic cancer, blood cancer, or liquid tumor, is a cancer that begins in blood-forming tissue, such as the bone marrow, or in the cells of the immune system. Examples of hematologic cancer are leukemia, lymphoma, and multimyeloma. Solid tumor refers an abnormal mass of tissue that usually does not contain cysts or liquid areas. Cancers include malignant solid tumors. Different types of solid tumors may be named from the type of cells that form them. Example of solid tumors includes sarcomas, carinomas, or lymphomas.

In a particular embodiment, the present invention provides methods for preventing a cancer, e.g., AML or breast cancer, in a subject. The method comprises administering to the subject a vaccine composition of the present invention. The vaccine composition may comprise a porous scaffold, a recruitment composition that recruits an immune cell to the scaffold, and an adjuvant. In certain embodiments, the vaccine composition further comprises a cancer antigen.

In some embodiments, the subject is a subject that has a high risk of developing a cancer. For example, the subject may have been treated for a cancer, e.g., AML or breast cancer, and is currently cancer free. In another example, the subject may be identified as having high risk of developing a cancer, for example, a hematologic malignancy, through diagnosis and/or analysis, e.g., biomarker analysis. The subject may be prophylactically administered a vaccine composition of the present invention before developing a cancer. For prophylactic applications, the vaccine composition comprises a porous scaffold, a recruitment composition that recruits immune cells to the scaffold, an adjuvant, and an antigen for the cancer. In some particular embodiments, the cancer to be prevented is AML, and the scaffold is an injectable macroporous cryogel, the recruitment composition is GM-CSF, the adjuvant is CpG-ODN, and the antigen is a WT-1 peptide, WT-1$_{126-134}$.

In certain embodiments, the present invention provides an adoptive cell therapy. The term "adoptive cell therapy," also known as "adoptive cell transfer," "cellular adoptive immunotherapy," as used herein, refers to a type of immunotherapy in which immune cells are given to a subject to help the body fight diseases, such as cancer. The immune cells can be T cells, such as cytotoxic T cells specifically targeting cancer cells, or antigen presenting cells, such as dendritic cells.

In some embodiments, a subject is administered a vaccine composition of the present invention prophylactically or therapeutically as described elsewhere herein. The administration of the vaccine composition may be combined with one or more other cancer therapies. The immune cells, such as cytotoxic T cells or dendritic cells may be harvested from the subject and may be given to a subject in need.

In certain embodiments, the adoptive cell transfer may be autologous, that is, a subject receives his or her own immune cells, for example, when a subject is prophylactically or therapeutically administered one or more vaccine compositions of the present invention. The immune cells are collected from the subject and stored for later use on the same subject.

In certain embodiments, the adoptive cell transfer may be allogeneic, that is, a subject receives immune cells from another subject. This may occur when a subject is prophylactically or therapeutically administered one or more vaccine compositions of the present invention. The immune cells are collected from the subject and used on a different subject.

In some embodiments, the adoptive cell transfer may involve additional manipulation of the immune cells collected. For example, the immune cells may be stimulated, and/or proliferated by methods well known in the art before transferring to a subject.

Hematologic Malignancies

In a particular aspect, the methods and vaccine compositions of the present invention may be used to treat or prevent hematologic malignancies. Exemplary hematologic malignancies include Hodgkin's disease, non-Hodgkin's lymphoma (such as Burkitt's lymphoma, anaplastic large cell lymphoma, spelenic marginal zone lymphoma, hepatospelenic T-cell lymphoma, angioimmunoblastic T-cell lymphoma), multiple myeloma, Waldenstrom macroglobulinemia, plasmacytoma, acute lymphcytic leukemia (ALL), chronic lyphcytic leukemia (CLL), acute myeloid leukemia (AML), acute megakaryoblastic leukemia (AMKL), chronic idiopthic myelofibrosis (MF), chronic myelogenous leukemia (CML), T-cell prolymphocytic leukemia (T-PLL), B-cell prolymphocytic leukemia (B-PLL), chronic neutrophilic leukemia (CNL), hairy cell leukemia (HCL), T-cell large granular lymphocyte leukemia (T-LGL), and aggressive NK-cell leukemia.

In certain embodiments, the present invention provides a method of treating a hematologic malignancy in a subject. The method comprises administering to the subject a vaccine composition of the present invention. The vaccine composition may comprise a porous scaffold, and a recruitment composition that recruit an immune cell to the scaffold. In certain embodiments, the vaccine composition further comprises an adjuvant. In certain embodiments, the vaccine composition further comprises a caner antigen.

In some embodiment, the administration of the vaccine composition is combined with one or more cancer therapies. The cancer therapy may be selected from radiation therapy, chemotherapy, immunotherapy, or targeted therapy. In certain embodiments, the cancer therapy causes immunogenic cancer cell death. For example, the cancer therapy may be a radiation therapy or chemotherapeutic therapy that causes immunogenic cancer cell death. The vaccine composition of the present invention may be administered prior to, concurrently with, or after the cancer therapy.

In certain embodiments, if the cancer therapy (e.g., chemotherapy) causes immunogenic cancer cell death, the vaccine composition does not comprises a cancer antigen prior to the administration to a subject. In some particular example, a subject receives a chemotherapeutic agent (e.g., doxorubicin) and an antigen free vaccine, which includes a scaffold (e.g., an injectable cryogel, such as methacrylated alginate and methacrylated PEG cryogel), and a recruitment composition (e.g., GM-CSF), but does not comprises a cancer antigen prior to the administration of the antigen free vaccine. In some embodiments, the antigen free vaccine further comprises an adjuvant (e.g., CpG-ODN). Without wishing to be bound by any theory, the chemotherapeutic agent kills cancer cells immunogenically. The vaccine composition acquires cancer antigen. The immune cells are recruited to the vaccine composition and are exposed to the antigen, thereby generating cancer specific immune response.

In certain embodiments, the vaccine composition comprises a cancer antigen. The cancer antigen may be a cancer specific antigen or a cancer associated antigen, such as a protein that is specifically expressed in the tumor cell or selectively upregulated in the cancer cell. The cancer antigen may also be cancer cell lysate. The cancer cells of a hematologic malignancy may be obtained from a subject and lysate prepared according to any technique known in the art.

Solid Tumor Cancers

In certain embodiments, the present invention provides a method of treating a solid tumor cancer in a subject. The method comprises administering to the subject a vaccine composition of the present invention. In one aspect, the vaccine composition may comprise a porous scaffold, a recruitment composition that recruits an immune cell to the scaffold, and an agent that induces the immunogenic tumor cell death. In certain embodiments, the vaccine composition further comprises an adjuvant. In some embodiments, the vaccine composition does not comprise a tumor antigen prior to the administration to a subject. In some embodiments, the vaccine composition comprises a tumor antigen. The vaccine composition may be administered peritumorally or intratumorally.

In some embodiments, the administration of vaccine composition is combined with one or more other cancer therapy, such as surgery and/or immunotherapy. The vaccine composition of the present invention may be administered to a subject prior to, concurrently with, or after one or more other cancer therapy. In certain embodiments, the vaccine composition is administered to a subject after primary tumor resection at or near the original tumor area to prevent or reduce recurrence and/or metastasis of the tumor. In other embodiments, the vaccine composition of the present invention is administered in combination of immunotherapy. The immunotherapy comprises administration of one or more inhibitors of a tumor-generated immunosuppressive microenvironment. In certain embodiments, the immunotherapy is a checkpoint blockade therapy.

Exemplary solid tumor cancers include, but not limited to, bladder cancer, breast cancer, cervical cancer, colon and rectal cancer, endometrial cancer, kidney cancer, lip and oral cancer, liver cancer, melanoma, mesothelioma, non-small cell lung cancer, nonmelanoma skin cancer, ovarian cancer, pancreatic cancer, prostate cancer, sarcoma, small cell lung cancer, and thyroid cancer. In certain embodiment, the solid tumor cancer is breast cancer.

Cancers with Metastatic Cells

In certain embodiments, the present invention provides a method of treating a solid cancer with metastatic cells in a subject. Cancers with metastatic cells include both hematologic malignancies and solid tumor cancers.

In the case of solid tumor cancers, cancer cells may break away from the main tumor, enter the circulatory system or lymphatic system, and become metastatic. The systems carry fluids around the body and the cancer cells can travel within the system far from the original tumor and form new tumors when they settle and grow in a different part of the body. Metastasis develops when cancer cells become mobile and spread to other parts of the body.

In some embodiment, the present invention provides a method of (i) treating a solid tumor cancer which has metastasized (e.g., developed metastatic cells) or is predisposed to metastasize and/or (ii) preventing or reducing metastasis of a cancer, for example, that has already metastasized or is predisposed to metastasize. The solid tumor cancer may include any solid tumor cancer described elsewhere herein. The method comprises administering to the subject a vaccine composition of the present invention. The vaccine composition may comprise a porous scaffold, and a recruitment composition that recruits an immune cell to the scaffold. In certain embodiments, the vaccine composition further comprises an adjuvant. In certain embodiments, the vaccine composition further comprises a cancer antigen.

In some embodiment, the administration of the vaccine composition is combined with one or more cancer therapies. The cancer therapy may be selected from radiation therapy, chemotherapy, immunotherapy, or targeted therapy. In certain embodiments, the cancer therapy causes immunogenic cancer cell death. For example, the cancer therapy may be a radiation therapy or chemotherapeutic therapy that causes immunogenic cancer cell death. The vaccine composition of the present invention may be administered prior to, concurrently with, or after the cancer therapy.

In certain embodiments, the vaccine composition does not comprise a cancer antigen prior to administration to a subject. In a particular example, a subject receives a chemotherapeutic agent (e.g., doxorubicin) and an antigen free vaccine, which includes a scaffold (e.g., an injectable cryogel, such as methacrylated alginate and methacrylated PEG cryogel), and a recruitment composition (e.g., GM-CSF), but does not comprises a cancer antigen prior to the administration of the antigen free vaccine. In some embodiments, the antigen free vaccine further comprises an adjuvant (e.g., CpG-ODN). Without wishing to be bound by any theory, the chemotherapeutic agent kills cancer cells immunogenically.

According to the foregoing methods, the antigen free vaccine composition acquires a cancer antigen upon immunogenic induced death thereof. The immune cells are recruited to the vaccine composition and are exposed to the antigen, thereby generating a cancer specific immune response.

In alternative embodiments, the vaccine composition comprises a cancer antigen. The cancer antigen may be a cancer specific antigen or a cancer associated antigen, such as a protein that is specifically expressed in the tumor cell or selectively upregulated in the cancer cell. The cancer antigen may also be cancer cell lysate. The cancer cells may be obtained from a subject and lysate prepared according to any technique known in the art.

Poorly Immunogenic Cancer

In certain embodiments, the vaccine compositions and methods of the present invention are used to prevent or treat a cancer that is characterized by a poorly immunogenic tumor. As used herein, and depending on context, the term "poorly immunogenic tumor" and "poorly immunogenic cancer" may be used interchangeably. Immunogenicity is the ability of a particular composition to provoke an immune response in the body of a subject. Accordingly, a poorly immunogenic cancer/tumor is a cancer/tumor that has reduced caner/tumor immunogenicity such that the immune system can no longer control tumor cell outgrowth.

Poorly immunogenic tumors escape from the immune system of a subject through many different mechanisms involving both changes in tumor cells and/or the microenvironment. A tumor may lose antigenicity through the acquisition of defects in antigen process and presentation or through the loss of immunogenic tumor antigens leading to a lack of immunogenic peptide presented in the context of a peptide-MHC complex. Cancer cells can gain additional immunosuppressive properties, such as expression of PD-L1 or secretion of suppressive cytokines (e.g., IL-10 and TGFβ). Tumors may also escape immune surveillance by creating an immunosuppressive microenvironment through recruitment of suppressive cells such as myeloid-derived suppressor cells and regulatory T cells (Tregs), production of immunosuppressive cytokines such as IL-10 and transforming growth factor beta or expression of immune checkpoints of the B7 family such as programmed death ligand 1 (PD-L1)/PD-1, cytotoxic T lymphocyte antigen-4 (CTLA-4), lymphocyte-activation gene 3 (LAG-3), T cell immunoglobulin and mucin domain 3 (TIM-3) by either tumor cells, immune cells, or both also promote immune escape.

Exemplary cancer caused by poorly immunogenical tumors include, but not limited to, pancreatic cancer, certain breast cancer (e.g., triple negative breast cancer), melanoma, glioblastoma, medulloblastoma, or neuroblastoma. Tumor immunogenicity can be determined by methods known in the art. Through various mechanisms, poorly immunogenic cancers can avoid eliciting a cytotoxic T cell response. Thus, poorly immunogenic tumor may be characterized by the failure or inefficiency of the cytotoxic T cell's ability to lyse or kill the tumor cells. A subject with poorly immunogenic tumor may also lack or fail to produce sufficient amount of antibodies or antibody with sufficient affinity against tumor antigen.

Enhancement of Immune Response Against Cancer

In certain embodiments, the present invention provides methods that enhance a subject's immune response against a cancer. The method comprising administering to the subject one or more vaccine compositions of the present invention. The vaccine compositions may comprise a porous scaffold, a recruitment composition that recruits immune cells to the scaffold, and an adjuvant.

The immune responses include, but not limited to, activation of antigen presenting cells (e.g., dendritic cells), sustained activation of antigen presenting cells, enhancement of cytotoxic T lymphocyte activity (e.g., lysis of tumor cell and/or recognition of tumor antigen), promotion of de novo T cell responses, and/or changes in tumor microenvironments.

Without wishing to be bound by any theory, it is hypothesized that the vaccine composition of the present invention recruits immune cells to the scaffold, in which the immune cells contact and/or interact with other components of the vaccine composition, such as adjuvant and/or antigen, thereby enhancing the immune response against a cancer.

Immune Cells

The recruitment composition recruits immune cells to the scaffold. Immune cells include cells of the immune system that are involved in immune response. Exemplary immune cells includes, but not limited to, T cells, B cells, leucocytes, lymphocytes, antigen presenting cells, dendritic cells, neutrophils, eosinophils, basophils, monocytes, macrophages, histiocytes, mast cells, microglia, and NK cells.

In certain embodiments, the recruitment composition recruits antigen present cells to the scaffold. Antigen-presenting cells (APCs) are a heterogeneous group of immune cells that mediate the cellular immune response by processing and presenting antigens for recognition by certain lymphocytes such as T cells. Classical APCs include dendritic cells, macrophages, Langerhans cells and B cells.

In some embodiments, the recruitment composition recruits dendritic cells (DCs) to the scaffold of the present invention. Dendritic cells (DCs) are immune cells within the mammalian immune system and are derived from hematopoietic bone marrow progenitor cells. More specifically, dendritic cells can be categorized into lymphoid (or plasmacytoid) dendritic cell (pDC) and myeloid dendritic cell (mDC) subdivisions having arisen from a lymphoid (or plasmacytoid) or myeloid precursor cell, respectively. Dendritic cells can further be divided into conventional (cDC1s and cDC2s), which can further be divided into migratory or lymph node-resident subpopulations. From the progenitor cell, regardless of the progenitor cell type, an immature dendritic cell is born. Immature dendritic cells are characterized by high endocytic activity and low T-cell activation potential. Thus, immature dendritic cells constitutively sample their immediate surrounding environment for pathogens. Exemplary pathogens include, but are not limited to, a virus or a bacteria. Sampling is accomplished by pattern recognition receptors (PRRs) such as the toll-like receptors (TLRs). Dendritic cells activate and mature once a pathogen is recognized by a pattern recognition receptor, such as a toll-like receptor.

Combination Therapy

In various embodiments, one or more vaccine compositions of the present invention may be used in combination with one or more other cancer therapies. The other cancer therapies include, but are not limited to, surgery, radiation therapy, chemotherapy, immunotherapy, targeted therapy, hormone therapy, or stem cell transplant. These therapies are well known in the art. See, e.g., https://www.cancer.gov/about-cancer/treatment/types. In some embodiments, one or more vaccine compositions of the present invention may be used in combination with a PD-1 inhibitor (e.g., an anti-PD-1 antibody such as nivolumab, pembrolizumab, pidilizumab, or BGB-A317), a PD-L1 inhibitor (e.g., an anti-PD-L1 antibody such as avelumab, atezolizumab, durvalumab, or MDX-1105), a CTLA-4 inhibitor (e.g., ipilimumab), a TIM3 inhibitor, a BTLA inhibitor, a TIGIT inhibitor, a CD47 inhibitor, a GITR inhibitor, an antagonist of another T cell co-inhibitor or ligand (e.g., an antibody to CD-28, 2B4, LY108, LAIR1, ICOS, CD160 or VISTA), an indoleamine-2,3-dioxygenase (IDO) inhibitor, a vascular endothelial growth factor (VEGF) antagonist [e.g., a "VEGF-Trap" such as aflibercept or other VEGF-inhibiting fusion protein as set forth in U.S. Pat. No. 7,087,411, or an anti-VEGF antibody or antigen-binding fragment thereof (e.g., bevacizumab, or ranibizumab) or a small molecule kinase inhibitor of VEGF receptor (e.g., sunitinib, sorafenib, or pazopanib)], an Ang2 inhibitor (e.g., nesvacumab), a transforming growth factor beta (TGFβ) inhibitor, an epidermal growth factor receptor (EGFR) inhibitor (e.g., erlotinib, cetuximab), a CD20 inhibitor (e.g., an anti-CD20 antibody such as rituximab), a human epidermal growth factor receptor 2 (HER2) inhibitor (e.g., trastuzumab), an anaplastic lymphoma kinase (ALK) inhibitor (e.g., crizotinib, ceritinib, alectinib, brigatinib, lorlatinib), an antibody to a tumor-specific antigen [e.g., CA9, CA125, melanoma-associated antigen 3 (MAGE3), carcinoembryonic antigen (CEA), vimentin, tumor-M2-PK, prostate-specific antigen (PSA), mucin-1, MART-1, and CA19-9], a vaccine (e.g., *Bacillus* Calmette-Guerin, a cancer vaccine), an adjuvant to increase antigen presentation (e.g., granulocyte-macrophage colony-stimulating factor), a bispecific antibody (e.g., CD3×CD20 bispecific antibody, or PSMA×CD3 bispecific antibody), a cytotoxin, a chemotherapeutic agent (e.g., dacarbazine, temozolomide, cyclophosphamide, docetaxel, doxorubicin, daunorubicin, cisplatin, carboplatin, gemcitabine, methotrexate, mitoxantrone, oxaliplatin, paclitaxel, and vincristine), cyclophosphamide, radiotherapy, surgery, an IL-6R inhibitor (e.g., sarilumab), an IL-4R inhibitor (e.g., dupilumab), an IL-10 inhibitor, a cytokine such as IL-2, IL-7, IL-21, and IL-15, an antibody-drug conjugate (ADC) (e.g., anti-CD19-DM4 ADC, and anti-DS6-DM4 ADC), an anti-inflammatory drug (e.g., corticosteroids, and non-steroidal anti-inflammatory drugs), a dietary supplement such as anti-oxidants or any other therapy care to treat cancer. In certain embodiments, the TCRs of the present invention may be used in combination with cancer vaccines including dendritic cell vaccines, oncolytic viruses, tumor cell vaccines, etc. to augment the anti-cancer response.

In certain embodiment, the other cancer therapy causes or induces immunogenic cancer cell death. For example, the other cancer therapy may be a chemotherapy, a radiation therapy, or an immune therapy that causes or induces immunogenic cancer cell death. The agents that induce immunogenic cancer cell death are described elsewhere herein.

In certain embodiment, a chemotherapy (e.g., a therapy using doxorubicin) that induces immunogenic cancer cell death is combined with the use of the vaccine composition of the present invention. The vaccine composition may comprise a porous scaffold (e.g., macroporous cryogel), a recruitment composition that recrutis immune cells to the scaffold (e.g., GM-CSF), and an adjuvant (e.g., CpG). The vaccine composition may be administered (e.g., through injection) to a subject who receives a chemotherapy. In some embodiments, the vaccine composition does not comprise a cancer antigen prior to the administration of the composition. Without wishing to be bound by any theory, it is hypothesized that the chemotherapy kills cancer cells and release cancer antigens. The vaccine composition recruits immune cells to the scaffold. The released cancer antigens may be exposed to the immune cells recruited to the scaffold to generate a cancer specific immune response.

When the vaccine composition is used in combination with a chemotherapy, the chemotherapeutic agent (e.g., doxorubicin) may be administered prior to, concurrently with, or after the administration of the vaccine composition. In some particular embodiments, the chemotherapeutic agent (e.g., doxorubicin) may be administered prior to the administration of the vaccine composition. The chemotherapeutic agent (e.g., doxorubicin) may be administered between 1 day and 2 years prior to the administration of the vaccine composition, for example, 1 day, 2 days, 3 days, 4 days, 5 days, 6 days, 7 days, 2 weeks, 3 weeks, 4 weeks, 2 months, 3 months, 4 months, 5 months, 6 months, 12 months, 18 months, or two years prior to the administration of the vaccine composition. In still some particular embodiments, the chemotherapeutic agent (e.g., doxorubicin) may be administered after the administration of the vaccine composition. The chemotherapeutic agent (e.g., doxorubicin) may be administered between 1 day and 2 years after the administration of the vaccine composition, for example, 1 day, 2 days, 3 days, 4 days, 5 days, 6 days, 7 days, 2 weeks, 3 weeks, 4 weeks, 2 months, 3 months, 4 months, 5 months, 6 months, 12 months, 18 months, or two years prior to the administration of the vaccine composition. It is intended that values and ranges intermediate to the recited values are part of this invention.

In various embodiments, an immunotherapy is combined with the use of the vaccine compositions of the present invention. The vaccine compositions may comprise a porous scaffold (e.g., an injectable, pore-forming alginate hydrogel), a chemotherapeutic agent that induces immunogenic cancer cell death (e.g., doxorubicin or its derivative), a recruitment composition that recruits an immune cell to the scaffold, and an adjuvant (e.g., CpG). One or more vaccine compositions of the present invention may be used in combination with an inhibitor of immunosuppression as described elsewhere herein. In certain embodiments, one or more vaccine compositions of the present invention may be used in combination with a PD-1 inhibitor (e.g., an anti-PD-1 antibody such as nivolumab, pembrolizumab, pidilizumab, or BGB-A317 or), a PD-L1 inhibitor (e.g., an anti-PD-L1 antibody such as avelumab, atezolizumab, durvalumab, or MDX-1105), a CTLA-4 inhibitor (e.g., ipilimumab), a TIM3 inhibitor, a BTLA inhibitor, a TIGIT inhibitor, a CD47 inhibitor, a GITR inhibitor, an antagonist of another T cell co-inhibitor or ligand (e.g., an antibody to CD-28, 2B4, LY108, LAIR1, ICOS, CD160 or VISTA), an indoleamine-2,3-dioxygenase (IDO) inhibitor, a vascular endothelial growth factor (VEGF) antagonist [e.g., a "VEGF-Trap" such as aflibercept or other VEGF-inhibiting fusion protein as set forth in U.S. Pat. No. 7,087,411, or an anti-VEGF antibody or antigen-binding fragment thereof (e.g., bevacizumab, or ranibizumab) or a small molecule kinase inhibitor of VEGF receptor (e.g., sunitinib, sorafenib, or pazopanib)], an Ang2 inhibitor (e.g., nesvacumab), a transforming growth factor beta (TGFβ) inhibitor, an epidermal growth factor receptor (EGFR) inhibitor (e.g., erlotinib, cetuximab), a CD20 inhibitor (e.g., an anti-CD20 antibody such as rituximab), an antibody to a tumor-specific antigen [e.g., CA9, CA125, melanoma-associated antigen 3 (MAGE3), carcinoembryonic antigen (CEA), vimentin, tumor-M2-PK, prostate-specific antigen (PSA), mucin-1, MART-1, and CA19-9].

In certain embodiments, one or more vaccine compositions of the present invention may be used in combination with an immune checkpoint blockade therapy. In some particular embodiments, the immune checkpoint protein is PD-1.

When the vaccine composition is used in combination with an immunotherapy, the immunotherapy agent (e.g., PD-1 antibody) may be administered prior to, concurrently with, or after the administration of the vaccine composition. In some particular embodiments, the vaccine composition may be administered prior to the administration of the immunotherapy agent (e.g., PD-1 antibody). The vaccine composition may be administered between 1 day and 2 years prior to the administration of the immunotherapy agent (e.g., PD-1 antibody), for example, 1 day, 2 days, 3 days, 4 days, 5 days, 6 days, 7 days, 2 weeks, 3 weeks, 4 weeks, 2 months, 3 months, 4 months, 5 months, 6 months, 12 months, 18 months, or two years prior to the administration of the vaccine composition. It is intended that values and ranges intermediate to the recited values are part of this invention.

In some embodiments, one or more vaccine compositions of the present invention may be used in combination of a surgery. The vaccine composition may comprise a porous scaffold (e.g., an injectable pore-forming alginate hydrogel), a chemotherapeutic agent (e.g., doxorubicin), a recruitment composition (e.g., GM-CSF) that recruits immune cells to the scaffold, and an adjuvant (e.g., CpG). The vaccine composition does not comprise a cancer antigen prior to the administration to the subject. After surgical removal of a solid tumor, the vaccine composition may be administered (e.g., through injection or implantation after the surgery) to a site near the original tumor area. This combination therapy may prevent or reduce the recurrence of the tumor. Without wishing to be bound by any theory, it is hypothesized that cancer specific antigens are generated in situ to provoke immunorespones to prevent the recurrence and/or metastasis. The vaccine composition or local draining lymph node (s) may recruit or capture the residual cancer cells after the surgical removal and the chemotherapeutic agent kills the cancer cells immunogenically. Alternatively or in addition, the chemotherapeutica agent may be released from the vaccine composition to kill the cancer cells nearly. Immune cells recruited to the scaffold or local draining lymph node(s) by the recruitment composition are exposed to cancer antigens released from the cancer cells. Cancer specific immune response are thereby provoked.

VII. Kits

Any of the compositions described herein may be included in a kit. In a non-limiting example, the kit includes a vaccine composition comprising a porous scaffold, a recruitment composition that recruits an immune cell to the scaffold, and an adjuvant.

In some embodiments, the kit includes the composition described elsewhere herein.

In a particular embodiment, the kit comprises a syringe or alternative injection device for administering the vaccine composition. In a specific embodiment, the prefilled syringe or injection device is prefilled with the vaccine composition.

The kit may further include reagents or instructions for administering the composition of the present invention to a subject. It may also include one or more reagents.

The components of the kits may be packaged either in aqueous media or in lyophilized form. The container means of the kits will generally include at least one vial, test tube, flask, bottle, syringe or other container means, into which a component may be placed, and preferably, suitably aliquoted. Where there are more than one component in the kit, the kit also will generally contain a second, third or other additional container into which the additional components may be separately placed. The kits may also comprise a second container means for containing a sterile, pharmaceutically acceptable buffer and/or other diluent. However, various combinations of components may be comprised in a vial. The kits of the present invention also will typically include a means for containing the compositions of the invention, e.g., the vaccine compositions for enhancing an immune response against a disease, and any other reagent containers in close confinement for commercial sale.

When the components of the kit are provided in one and/or more liquid solutions, the liquid solution is an aqueous solution, with a sterile aqueous solution being particularly preferred. However, the components of the kit may be provided as dried powder(s). When reagents and/or components are provided as a dry powder, the powder can be reconstituted by the addition of a suitable solvent. It is envisioned that the solvent may also be provided in another container means.

The present invention is further illustrated by the following examples, which should not be construed as limiting. All cited sources, for example, references, publications, data-bases, database entries, and art cited herein, are incorporated into this application by reference, even if not expressly stated in the citation. In case of conflicting statements of a cited source and the instant application, the statement in the instant application shall control.

Section and table headings are not intended to be limiting.

EXAMPLES

Example I. Harnessing Biomaterial Vaccines to Generate Tumor-Specific Immunotherapy for Acute Myeloid Leukemia 1.1 Materials and Methods
Materials UP MVG sodium alginate with high guluronate content was purchased from ProNova Biomedical; 2-morpholinoethanesulfonic acid (MES), sodium chloride (NaCl), sodium hydroxide (NaOH), N-hydroxysuccinimide (NETS), 1-ethyl-3-(3-dimethylaminopropyl)-carbodiimide hydrochloride (EDC), 2-aminoethyl methacrylate hydrochloride (AEMA) and acetone were purchased from Sigma-Aldrich. ACRL-PEG-NHS (3.5 kDa) and 4 arm PEG Acrylate (10 kDa) were purchased from JenKem Technology. Animals used in this study were, C57BL/6 (Jackson Laboratories). All animals were female and between 6 and 8 weeks old at the start of the experiment. Syngeneic murine HoxA9-Meis1 and MLL-AF9 leukemia cell lines were previously generated and used as described (Sykes et al., Inhibition of Dihydroorotate Dehydrogenase Overcomes Differentiation Blockade in Acute Myeloid Leukemia. *Cell* 167, 171-186 e115 (2016); published online EpubSep 22 (10.1016/j.cell.2016.08.057)). The WT-1 peptide RMFPNAPYL (Arg-Met-Phe-Pro-Asn-Ala-Pro-Tyr-Leu) was custom made by Peptide 2.0.

Cryogel Vaccine Fabrication

The cryogel vaccine was made following a previously described technique with some modifications (Bencherif et al., supra). Methacrylated alginate (MA-alginate) was prepared by reacting alginate with AEMA. Sodium alginate was dissolved in a buffer solution (0.6% (wt/vol), pH ~6.5) of 100 mM MES buffer. NHS and EDC were added to the mixture to activate the carboxylic acid groups on the alginate backbone followed by AEMA (molar ratio of NHS: EDC:AEMA=1:1.3:1.1) and the solution was stirred at room temperature (RT) for 24 h. The mixture was precipitated in acetone, filtered and dried in a vacuum oven overnight at RT. Alginate-PEG cryogel vaccines were synthesized by preparing a 2.5 wt % solution of MA-alginate and 4 arm PEG Acrylate macromonomers (molar ratio MA-alginate:4 arm PEG Acrylate=4:1) in deionized water and subsequently adding tetramethylethylenediamine (TEMED) (0.5% (wt/vol)) and ammonium persulfate (APS) (0.25% (wt/vol)). Cpg-odn 1826, 5'-TCC ATG ACG TTC CTG ACG TT-3' (Invivogen), and GM-CSF (PeproTech) and the antigen (lysate or peptide) were added to the polymer solution before cryopolymerization. All precursor solution was pre-cooled to 4° C. to decrease the rate of polymerization before freezing. After addition of the initiator to the prepolymer solution, the solution was quickly transferred onto a pre-cooled (−20° C.) Teflon mold. After overnight incubation, the gels were thawed and collected in petri dishes on ice.

Biomolecule Release Quantification

To determine the incorporation efficiency and release kinetics of Cpg-odn, GM-CSF and antigen from cryogel vaccines, gels were incubated in 1ml of sterile PBS at 37° C. with shaking. Media was replaced periodically. Micro-BCA (Pierce Biotechnology) was used to quantify total protein content. GM-CSF and Cpg-odn released in the supernatant were detected by ELISA (Invitrogen) and OliGreen assay (Invitrogen), respectively. The amount of antigen was determined by subtracting total protein content from the amount of GM-CSF quantified by ELISA.

In Vivo Cryogel Vaccine Delivery and Cell Trafficking

All animal work was approved by the Harvard Institutional Animal Care and Use Committee and in followed the National Institutes of Health guidelines. Female C57BL/6 mice (Jackson Laboratory), 6-8 weeks of age, were anaesthetized and received subcutaneous injections of two cryogels or bolus vaccines, which were suspended in 0.2 ml of sterile PBS, into the dorsal flank by means of a 16-gauge needle. One cryogel was injected on each side of the spine and positioned approximately midway between the hind and fore-limbs. Subcutaneous nodule size was quantified over time by measuring the nodule length, width and height using a caliper. To quantify and characterize cell infiltrates at the site of the vaccine, cryogels were harvested from euthanized mice at pre-determined time intervals, cut into smaller pieces and digested with collagenase/dispase (~250 U ml$^{-1}$; Roche) at 37° C. for 30 min under agitation. The suspensions were passed through a 40-μm cell strainer to reduce scaffold particles. The cells were counted and assessed for viability with a Cellometer (Nexcelom). The draining lymph nodes were harvested and suspensions from dLNs were prepared by mechanical disruption and pressing of the tissue against 40-μm cell strainers, and single cells were prepared for analysis. A section of subcutaneous skin tissue the same size as a gel was collected at the site of bolus injection and treated with the same gel digestion procedure above to generate a single cell suspension.

Prophylactic and Therapeutic Vaccine Study

Animals were immunized with 2 cryogel vaccines (~30 μl each) containing either cell lysates or WT-1$_{126-134}$ peptide as the antigen, and bolus vaccine containing 100 μg peptide, 100 μg CpG-ODN and 1 μg GM-CSF. After 10 d, animals were challenged with an intravenous injection of 5×10$^6$ MLL-AF9 AML cells and leukemia progression was monitored. After 100 days, the surviving mice were re-challenged with 5×10$^6$ MLL-AF9 leukemia cells. For mice challenged with either 5×10$^6$ MLL-AF9 or HoxA9-Meis1 AML cells, induction chemotherapy or the cryogel vaccine was administered 7 d after challenge and consisted of 100 mg/kg cytarabine (Ara-C) for 5 d and 3 mg/kg doxorubicin for 3 d. Cryogel vaccines contained WT-1$_{126-134}$ peptide as the antigen. Leukemia burden was monitored by bioluminescence imaging. At pre-determined time intervals, blood, bone marrow, cryogel scaffolds, inguinal lymph nodes and the spleen were collected from euthanized mice in the vaccination studies. Bone marrow was collected by crushing the tibia, femur and pelvis. Splenocytes were isolated by mechanical disruption of the spleen against 40-μm cell strainers. Gel and lymph node suspensions were obtained through mechanical disruption in a Petri dish. Red blood cells in the harvested tissues were lysed using ACK Lysing buffer (Lonza) and leukocytes were prepared for analysis.

In Vitro Chemotherapy Treatment

MLL-AF9 AML cells were collected and resuspended in full media, full media containing 100 nM dox/7.95 uM ara-c (iCt low), or full media containing 5 uM dox/397.5 uM ara-c (iCt high). Concentration range was determined from (Haladyna et al., Transient Potential Receptor Melastatin-2 (TRPM2) Does Not Influence Murine MLL-AF9 Driven AML Leukemogenesis or in vitro Response to Chemotherapy. *Experimental Hematology* 44, 596-602 (2016)) with the in vivo dox/ara-c ratio held constant.

Therapeutic Antigen-Free Vaccine Study

Antigen-free vaccination consisted of injection of 2 cryogel vaccines (~30 µl each) containing 100 µs CpG-ODN and 1 µg GM-CSF. The iCt group was inoculated with $5 \times 10^6$ MLL-AF9 AML cells on Day −14, began iCt treatment on Day −7, and received antigen-free vaccination on Day 0. The group without iCt was inoculated with $5 \times 10^6$ MLL-AF9 AML cells on Day −7 and received antigen-free vaccination on Day 0. Analyses were performed on Days 3, 6, and 9 following vaccination.

Flow Cytometry Analysis

Antibodies to CD8-α (53-6.7), IFN-γ (XMG1.2), CD3-ε (145-2C11), B220 (RA3-6B2), Ly-6G (1A8), F4/80 (BM8), CD11b (M1/70), CD11c (N418), CD14 (Sa14-2), CD86 (GL-1), FoxP3 (150D), CD25 (PC61), CD4 (RM4-4), and Annexin V were purchased from BioLegend. Antibody to calreticulin was purchased from Abcam (EPR3924). WT-1 tetramer (Alexa Fluor 647 H-2K$^d$ RMFPNAPYL) and SIIN-FEKL tetramer (Alexa Fluor 647 H-2K$^b$ OVA) were obtained from the NIH Tetramer Core Facility. Intracellular cytokine staining of IFN-γ was performed using Fixation and Permeabilization Solution Golgiplug (BD Biosciences) following the manufacturer's protocol. Intracellular staining of FoxP3 was performed using eBioscience Foxp3/Transcription Factor Staining Buffer Set (Invitrogen). Peptides used for re-stimulation were 10 µg/ml of the relevant antigen. All cells were gated based on forward and side-scatter characteristics to limit debris including dead cells. Antibodies were diluted according to the manufacturer's suggestions. Cells were gated based on positive controls, and the percentages of cells staining positive for each marker was recorded.

DNA Fragmentation Assay for Measuring WT-1 Specific CTL Activity

The spleens of the animals were isolated and gently homogenized at day 10 after prophylactic vaccination. CD8$^+$ T cells were magnetically sorted from each spleen (Miltenyi Biotec). The T cells were then co-cultured with LPS (100 ng/ml)-primed bone marrow derived dendritic cells pulsed with 1 µM WT-1 peptide for 24 h in round-bottomed, 96-well plates. CD8$^+$ T cells and dendritic cells were co-cultured at the ratio of 2 to 1 (T to dendritic cell). Following induction of the WT-1 specific CTLs, thymidine release from killed target AML cells (described previously (Wonderlich et al., Induction and measurement of cytotoxic T lymphocyte activity. *Current protocols in immunology*, 3.11.11-13.11. 23 (2006)), was used to assess in vitro CTL activity. Briefly, target AML cells are labeled with [$^3$H] thymidine and mixed with cytotoxic effector cells, isolated from the spleen of cryogel vaccinated or naïve mice. The percent lysis was calculated by comparing the amount of [$^3$H]thymidine labeled DNA fragments in the presence and absence of CD8$^+$ T cells.

Transplant for Leukemia Transfer Cell Analysis

Bone marrow cells from treated mice were isolated by harvesting, crushing and pooling cells from the femur, pelvis and tibia. $5 \times 10^6$ live cells were injected into each recipient mouse, conditioned with 5Gy sublethal irradiation.

Gene Expression Analysis

GFP-expressing cells were isolated from the bone marrow using fluorescence activated cell sorting. Total RNA was isolated from using QIAGEN RNeasy-Plus Mini columns, with additional on-column DNase treatment to eliminate traces of genomic DNA. cDNA was synthesized with a high-capacity cDNA archive kit (Applied Biosystems; ABI). Equal volumes of cDNA and TaqMan Universal PCR Master Mix (ABI) were combined and loaded into the ports of TaqMan custom low-density arrays following the manufacturer's instructions. Real-time PCR was performed on StepOnePlus Real-Time PCR System (ABI). Gene expression was compared with the Gapdh housekeeping gene.

Statistical Analysis

Experiments were performed by at least two researchers and were not blinded. Normality testing was performed in GraphPad Prism. Results comparing two groups were analyzed in GraphPad Prism using a two-tailed t test for normally distributed samples and Mann-Whitney test otherwise. For comparing multiple groups, one-way ANOVA with a Tukey post hoc test was performed using GraphPad Prism software. Where ANOVA was used, variance between groups was found to be similar by Bartlett's test. Survival curves were analyzed by using the log-rank (Mantel-Cox) test. No samples were excluded from analysis.

1.2 Synthesis and Assembly of a Biomaterial-Based Aml Vaccine

Figure 2:
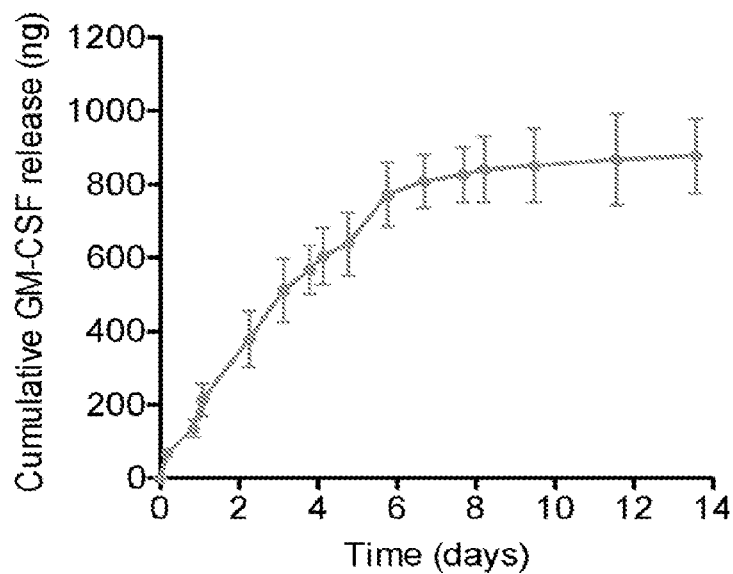
FIG. 2 shows extended characterization of cryogel vaccine. In vitro release of encapsulated granulocyte macrophage colony stimulating factor (GM-CSF).
Figure 3:
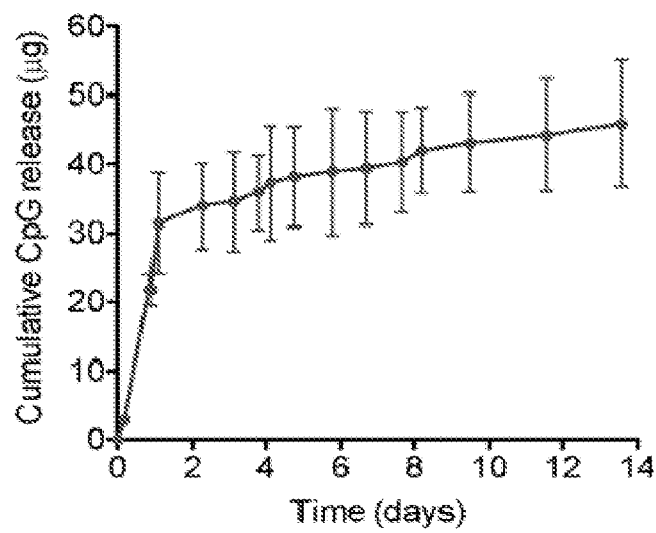
FIG. 3 shows extended characterization of cryogel vaccine. In vitro release of encapsulated CpG-ODN.
Figure 4:
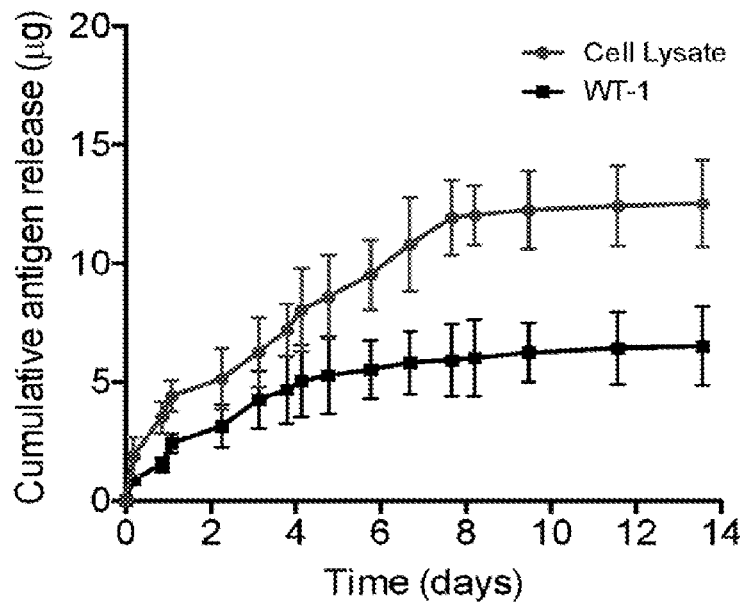
FIG. 4 shows extended characterization of cryogel vaccine. In vitro release of encapsulated antigen consisting of either cell lysates or WT-1$_{126-134}$ antigen.

A macroporous hydrogel including crosslinked methacrylated polyethylene glycol (MA-PEG) and methacrylated alginate (MA-Alginate) (molar ratio: 1:4) was constructed using a previously reported cryo-polymerization technique. Prior to the initiation of cryo-polymerization, one microgram (1 µg) of the cytokine granulocyte-macrophage colony-stimulating factor (GM-CSF) and 100 µg of unmethylated cytosine-guanosine oligodeoxynucleotide (CpG-ODN 1826) were added to the mixture of MA-PEG and MA-Alginate. AML-associated antigens in the form of either 100 µg of freeze-thaw cell lysates derived from the bone marrow of terminally-ill mice with AML or 100 µg of WT-1 H-2D$^b$ peptide WT-1$_{126-134}$ (RMFPNAPYL) (SEQ ID NO: 1) were added to the mixture. The cryo-polymerization process was intended to encapsulate the biomolecules in the resulting macroporous hydrogel, referred to as the vaccine cryogel (FIG. 1A). GM-CSF (encapsulation efficiency 87%), CpG-ODN (encapsulation efficiency 48%) and antigen release (cell lysate encapsulation efficiency 77%; WT-1$_{126-134}$ encapsulation efficiency 75%), were subsequently assayed by sandwich enzyme-linked immunosorbent assay (ELISA), Oligreen assay and micro bicinchoninic acid (micro-BCA) assay respectively. After a burst release of about 8% of the loaded amount, GM-CSF eluted in a sustained manner. Eighty-five percent (85%) of the GM-CSF was released over the first 5 days in vitro (FIG. 2). Fifty percent (50%) of the CpG-ODN eluted from the hydrogel within the first 2 days, followed by sustained release at a slower rate (FIG. 3). It has been previously demonstrated that both GM-CSF and CpG-ODN, encapsulated and released in a similar manner, retain their bioactivity (>80%) in vitro (Bencherif et al., supra). After a burst release of 3.3% of the WT-1$_{126-134}$ or 8% of the loaded cell lysates over the first two days, the antigens released in a sustained manner (FIG. 4). Approximately 4 µg of the WT-1$_{126-134}$ and 9 µg of the cell lysates were released over a period of 10 days after the burst release. The majority of the loaded antigen (>80%) was retained within the scaffold.

1.3 Spatiotemporal Characterization of Innate Immune Cell Trafficking

Figure 5A:
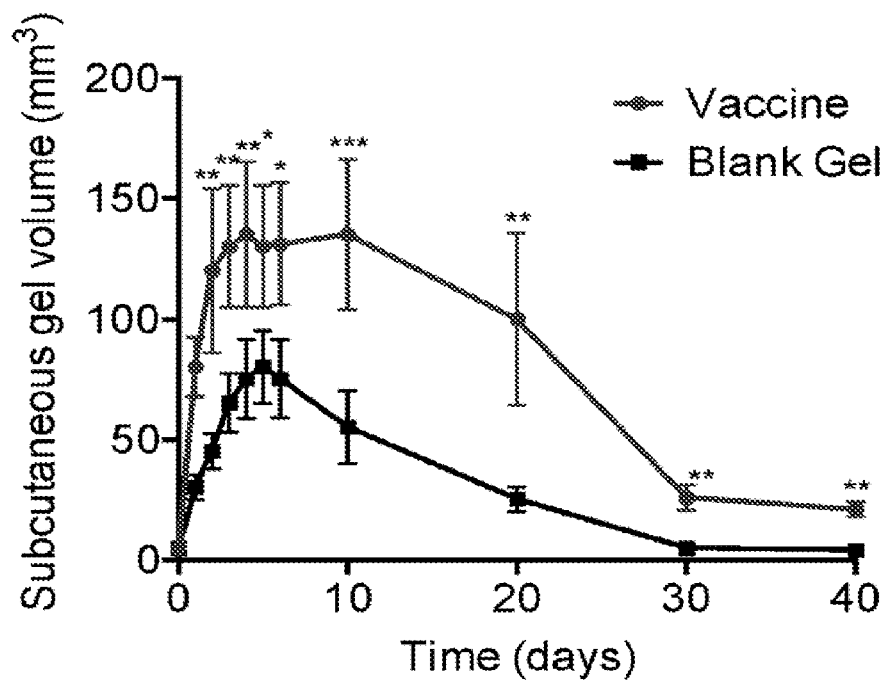
FIGS. 5A-5C show injection site dynamics following vaccination.

The macroporous cryogel was next analyzed for its ability to induce the trafficking of host innate immune cells. Vaccine or blank cryogels, which did not contain the encapsulated GM-CSF, CpG-ODN and AML-associated antigen, were subcutaneously injected in 6-8 week old C57BL/6 mice. To grossly quantify infiltration in the blank and vaccine cryogel after the injection, each subcutaneous nodule was measured over a period of 6 weeks (FIG. 5A). In the cryogel vaccine, nodule size rapidly increased in size over the first 5 days, growing to approximately 25 times the initial volume, followed by size reduction to 3-4 times the initial volume by day 40. In contrast, the blank scaffolds increased to approximately 15 times the initial volume and reduced to the original volume over the same period. The cryogels and draining lymph nodes (dLN) were harvested from mice and analyzed over a period of 2 weeks to quantify the dynamics of cell trafficking. The number of cells present in the vaccine cryogel was 3- and 9-fold higher at day 1 and 7, respectively, compared to the blank cryogel (FIG. 1B). The number of $CD11c^+$ cells was significantly higher at all time points (FIG. 1C).

Figure 1F:
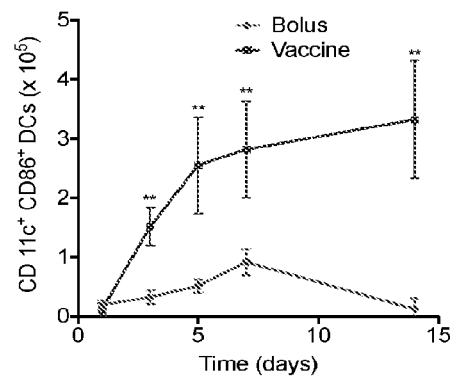
Figure 5B:
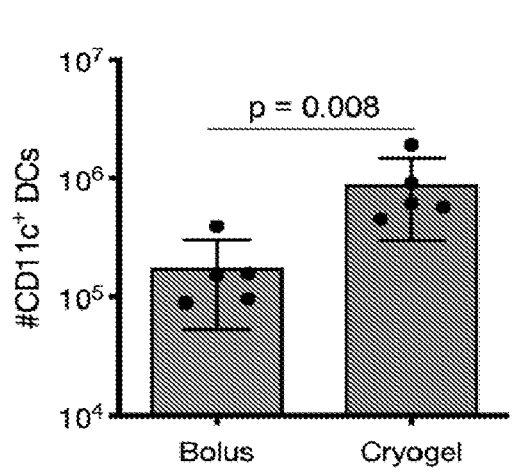
Figure 5C:
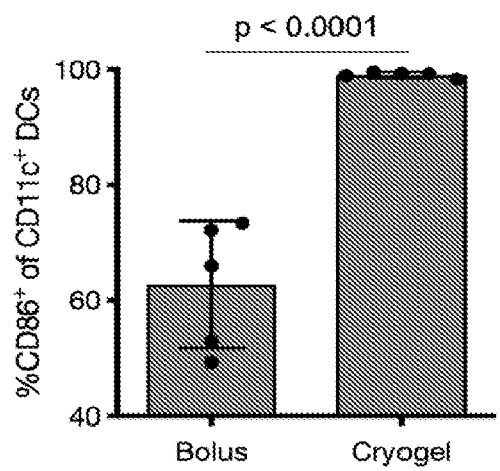

Detailed analysis of the cell composition indicated a peak between days 5 and 7 (FIGS. 1D and 1E) in the number of $CD11c^+$ cells that were present in the vaccine cryogel. At day 5, the vaccine cryogel contained $CD11c^+$ cells (18%), $B220^+$ B cells (9%) and $CD14^+$ monocytes (62%). In contrast, most of the cells in the blank cryogel were $CD14^+$ cells (>80%) at all timepoints. Bolus vaccination, which consisted of a subcutaneous (s.c.) injection of a combined GM-CSF, CpG and $WT-1_{126-134}$ at the same dose as the cryogel vaccine in phosphate buffered saline (PBS), resulted in significantly lower numbers of $CD11c^+$ $CD86^+$ activated dendritic cells in the dLN at all of the time points that were analyzed when compared to the vaccine cryogel (FIG. 1F). Analysis of the vaccination site (cryogel and s.c. skin) of antigen-free vaccines containing GM-CSF and CpG without an antigen source similarly demonstrated significantly greater $CD11c^+$ DC recruitment, as compared to bolus-injected mice on day 7 (FIG. 5B). Strikingly, most of the recruited DCs (>98%) in this formulation of the cryogel vaccine were $CD86^+$, significantly greater than those found in the bolus vaccine (~50-70%) (FIG. 5C).

1.4 Prophylactic Vaccination Prevents Aml Engraftment

Figure 6A:
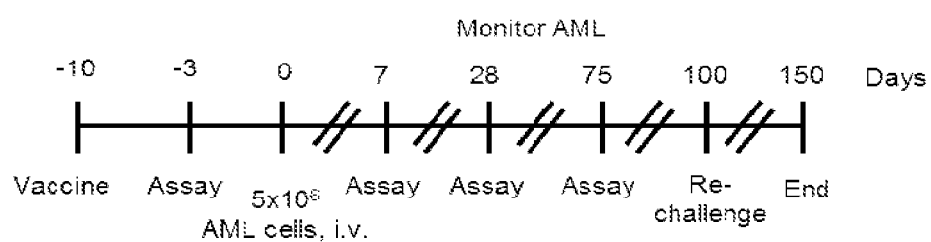
Figure 6B:
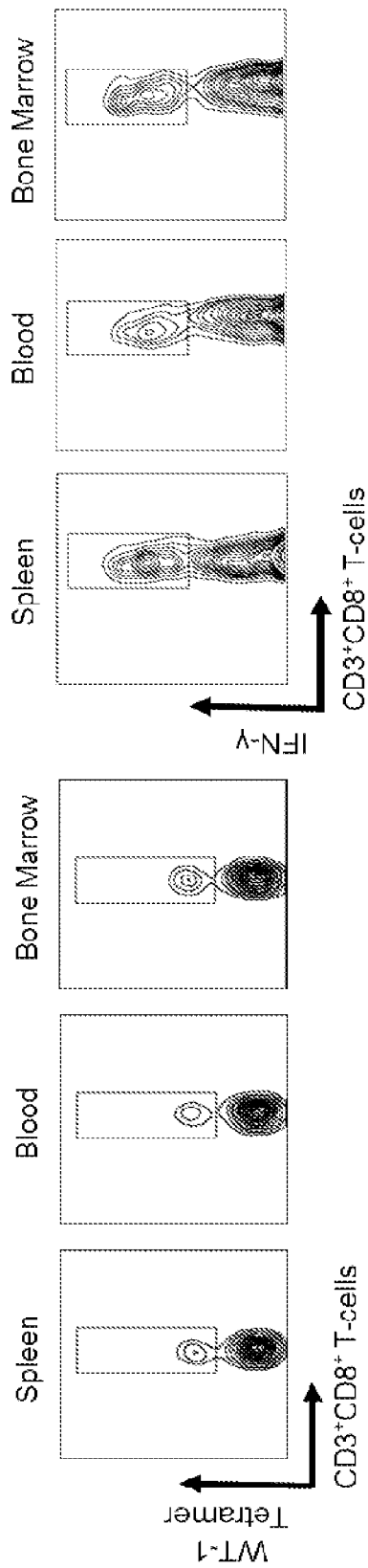
Figure 6E:
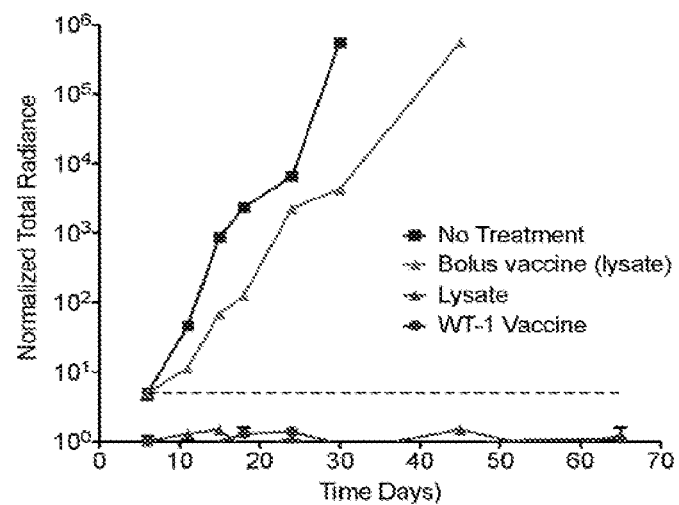
Figure 6F:
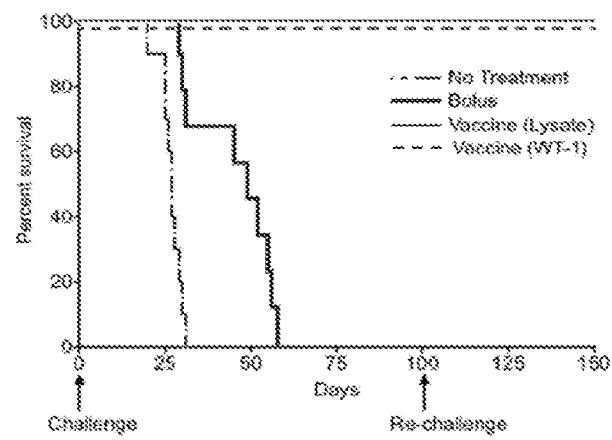
Figure 7:
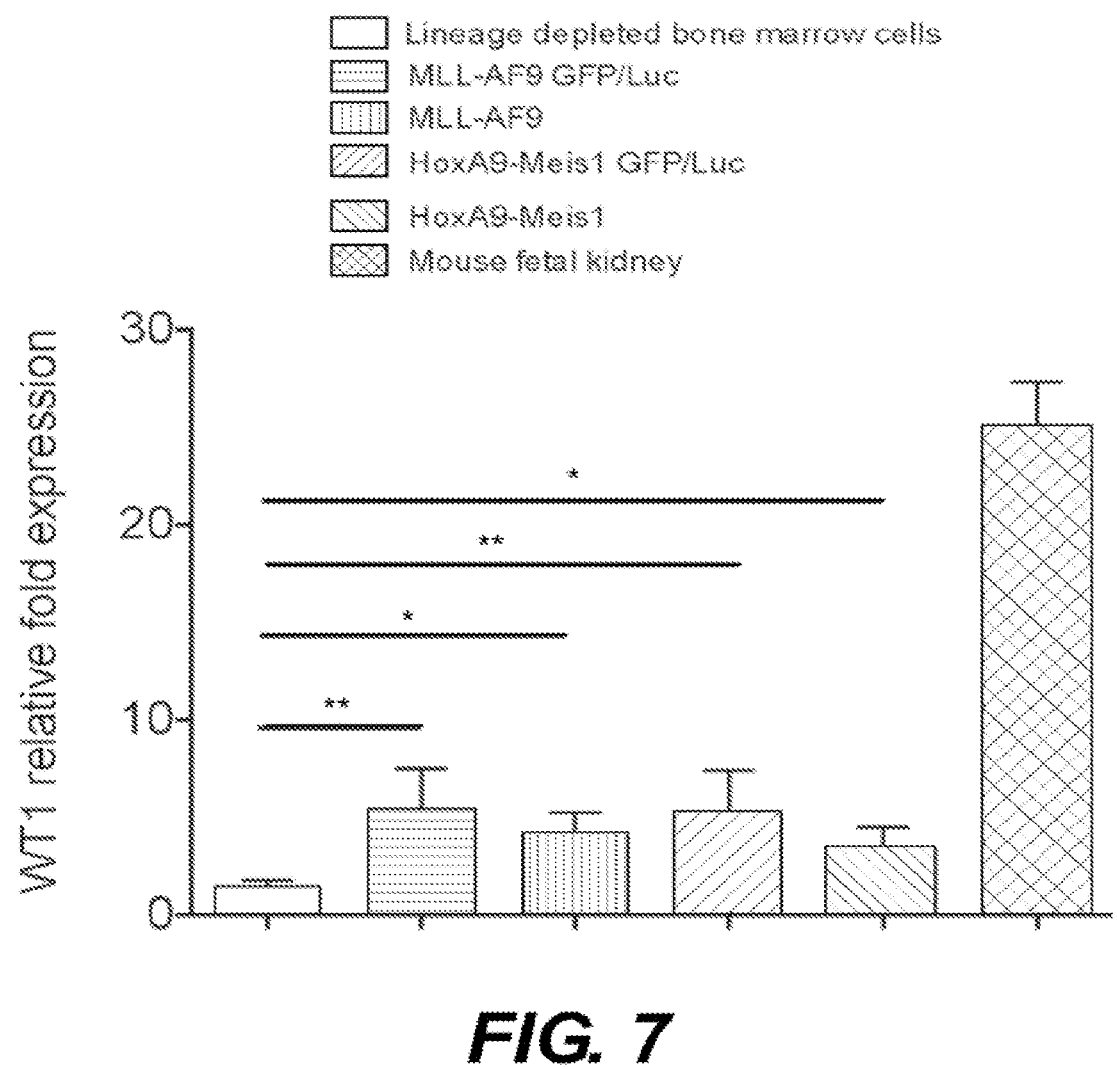
FIG. 7 shows expression of the WT-1 gene in AML cells relative to that in the lineage depleted bone marrow cells from wild type C57Bl/6 mice. Cells isolated from mouse fetal kidney were used as the positive control. Gene expression was normalized to the Gapdh housekeeping gene. (*P<0.05, **P<0.01, analysis of variance (ANOVA) with a Tukey post hoc test).
Figure 8A:
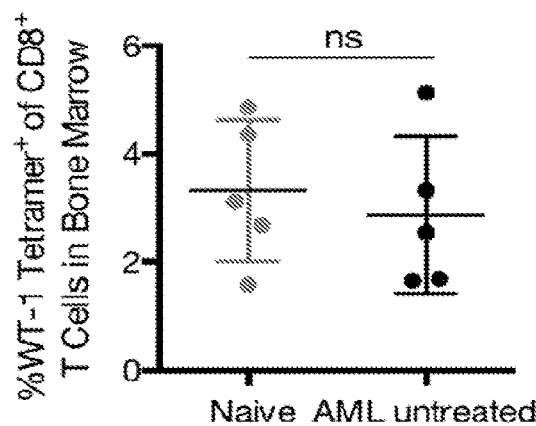
FIGS. 8A and 8B show T cell priming in AML-exposed mice. Percent of WT-1 tetramer$^+$ CTLs in the bone marrow (FIG. 8A) and peripheral blood (FIG. 8B) of naive mice compared to mice inoculated with AML not receiving treatment (two-tailed t test; n=5 per group).
Figure 8B:
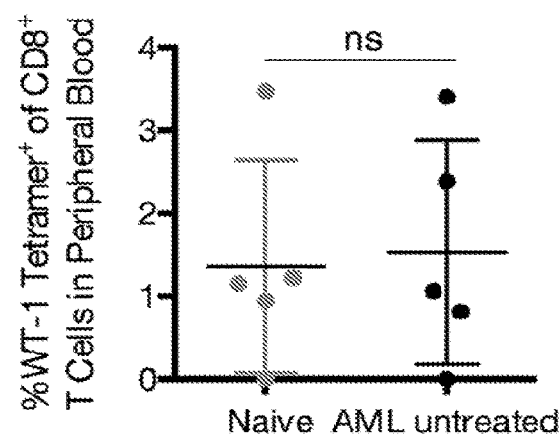

It was next investigated the ability of cryogel vaccination to provide prophylactic protection against AML. Mice were immunized using (i) vaccine cryogel with cell lysates as the antigen, (ii) vaccine cryogel with $WT-1_{126-134}$ as the antigen or (iii) bolus vaccine with $WT-1_{126-134}$ as the antigen at day −10 (FIG. 6A) and subsequently challenged at day 0 with an intravenous injection of 5 million MLL-AF9 AML cells, which expressed WT-1 (FIG. 7). The strength of the $CD8^+$ T cell response was measured by analyzing the frequency of antigen-specific WT-1 tetramer$^+$ $CD8^+$ T cells and IFN-$\gamma^+$ $CD8^+$ T cells following restimulation with $WT-1_{126-134}$ peptide in vitro for a functional readout of CTLs from the blood, spleen and bone marrow, which constitute the hematopoietic compartments in which AML cells are commonly observed. Significantly higher numbers of WT-1 tetramer$^+$ $CD8^+$ T cells (FIGS. 6B and 6C) and IFN-$\gamma^+$ $CD8^+$ T cells (FIGS. 6B and 6D) were found in cryogel vaccinated mice, compared with mice receiving the bolus vaccine, both prior to and at all time-points following AML challenge. No difference was observed in WT1-antigen specific T cell priming between naive mice and mice inoculated with AML but untreated (FIGS. 8A and 8B). One hundred days after the primary AML challenge, vaccinated mice were re-challenged with 5 million MLL-AF9 AML cells. An increase in antigen-specific $CD8^+$ T cells in the blood, spleen and bone marrow following re-challenge mirrored a corresponding increase in IFN-$\gamma$ secreting $CD8^+$ T cells in these compartments (FIGS. 6C and 6D). The cryogel vaccine with either the cell lysates or $WT-1_{126-134}$ as the antigen conferred full protection against the primary AML challenge and subsequent re-challenge in all vaccinated mice. A GFP-luciferase reporter in the AML cells was used to measure the AML burden in live animals up to day 65 post-challenge (FIG. 6E). The surviving animals were not further analyzed using imaging as there was no indication of AML relapse. The progression of AML accelerated in untreated mice, which succumbed to the AML between days 23 and 29 post-challenge (FIG. 6F). The bolus vaccine slowed the progression of AML and significantly increased the survival; however, all mice in the cohort succumbed between days 49 and 59 post-challenge. There were no detectable levels of AML cells observed in cryogel-vaccinated mice.

1.5 Prophylactic Cryogel Vaccination Provides Transferable Immunity

Figure 9A:
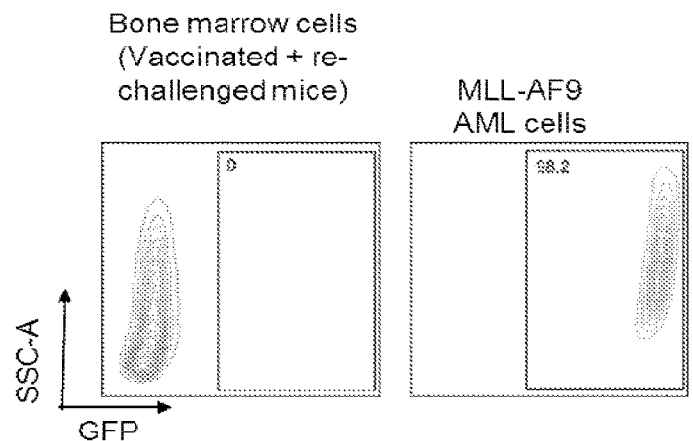
FIGS. 9A-9F show secondary transplants indicate the absence of residual AML cells and the transfer of immunity into transplant recipients.
Figure 9B:
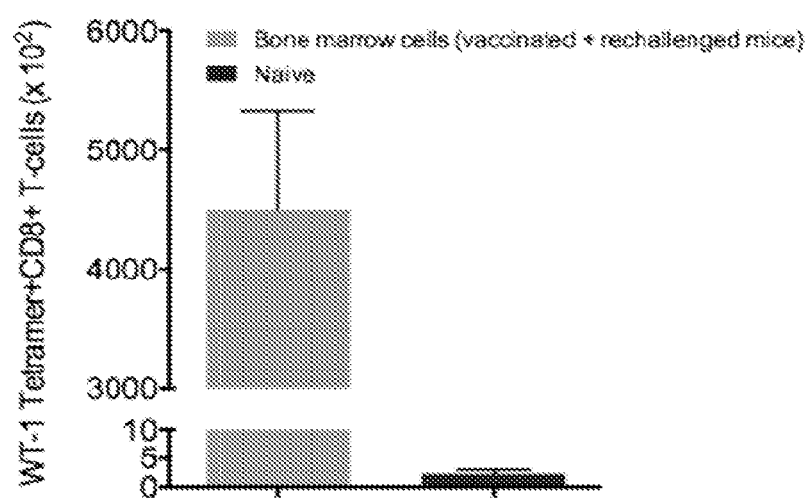
Figure 9C:
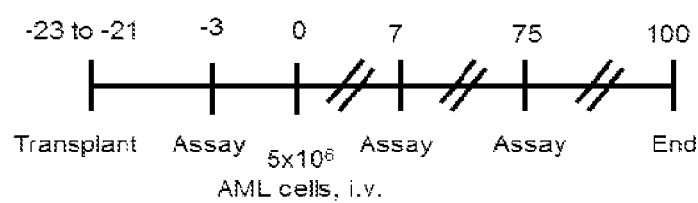
Figure 9D:
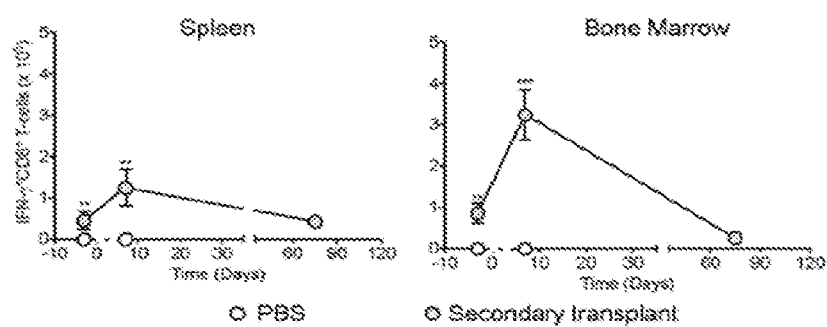
Figure 9E:
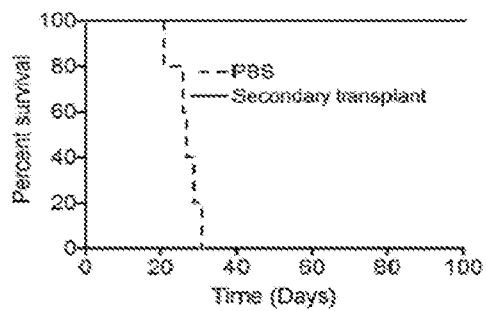
Figure 10A:
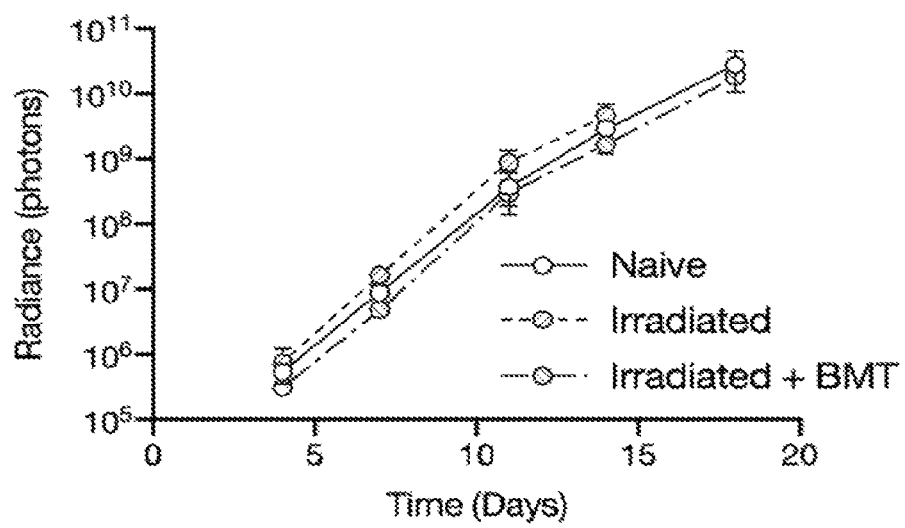
FIGS. 10A-10C show comparison of AML progression between mice that were naïve and non irradiated, sublethally irradiated, and sublethally irradiated with bone marrow transplant.
Figure 10B:
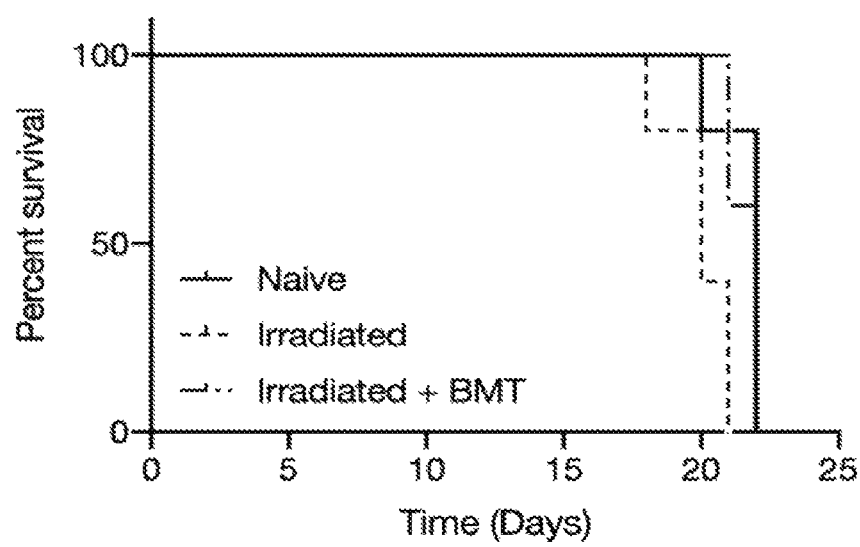
Figure 10C:
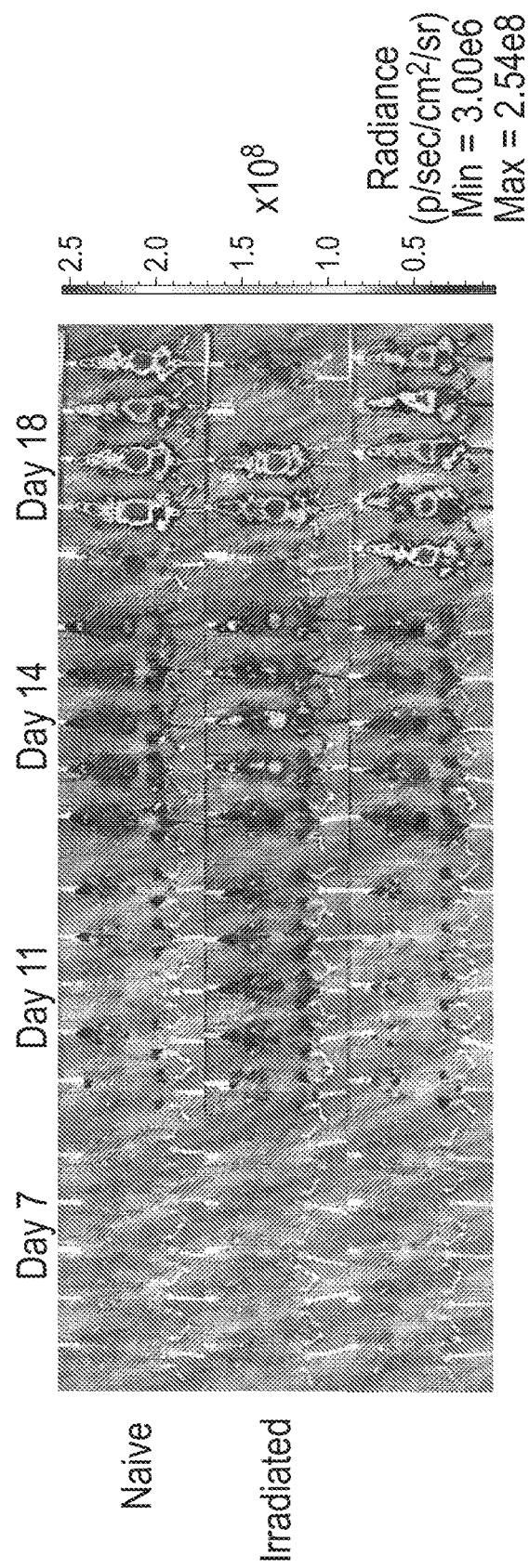

To determine whether there were residual AML cells in the vaccinated mice, bone marrow was harvested and pooled 150 days after the primary AML challenge from all mice vaccinated with the cryogel vaccine containing $WT-1_{126-134}$ as the antigen. The absence of GFP-expressing cells in the harvested bone marrow suggested a lack of residual AML (FIG. 9A). WT-1 tetramer$^+$ $CD8^+$ T cells remained present in large numbers (~$4\times10^5$) in the bone marrow of the vaccinated mice after 150 days, in contrast to pooled bone marrow from naïve controls (FIG. 9B). To test whether (i) the harvested bone marrow contained cells that could induce AML and (ii) AML-reactive immune cells from the immunized mice could be transferred into recipients, a secondary bone marrow transplant was performed (FIG. 9C). Recipient mice were irradiated and injected intravenously with 5 million pooled bone marrow cells from the vaccinated donors. None of the recipient mice succumbed to AML following transplantation over 14 days, noted by body condition (behavior, evidence of splenomegaly and hepatomegaly) and survival. To test whether transplanted cells conferred functional immune protection against AML, recipient mice were challenged with 5 million MLL-AF9 AML cells 14 days after transplantation. Substantial numbers of IFN-$\gamma^+$ $CD8^+$ T cells were measured in the spleen and bone marrow of the transplanted mice as compared to control mice, which did not receive the transplant (FIG. 9D). The response in mice transplanted with bone marrow from vaccinated donors recapitulated the dynamics of the vaccinated mice, and all mice transplanted with bone marrow from vaccinated donors survived the challenge (FIG. 9E). Mice that received control injection of phosphate buffer saline (PBS) alone uniformly succumbed to AML between days 23 and 26. Prior sublethal irradiation with or without bone marrow transplant in mice did not alter AML progression or survival when compared with non-irradiated mice (FIGS. 10A-10C).

1.6 Cytotoxic T Lymphocyte Recognition of Wt-1 in AML Cells

Figure 9F:
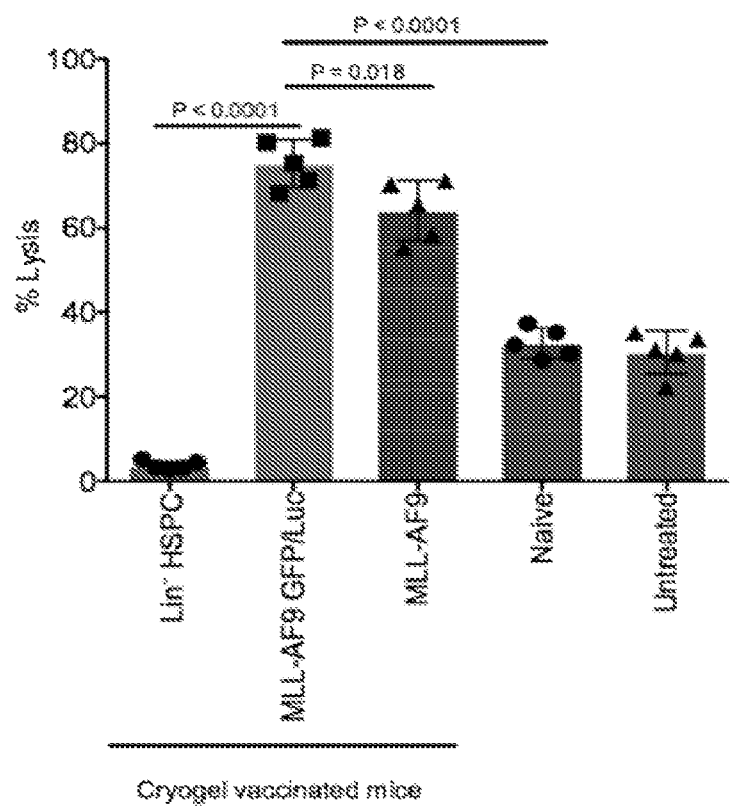

To examine whether AML cells could be lysed by tumor specific CTL generated by vaccination, $CD8^+$ splenocytes were isolated from mice receiving either (i) prophylactic cryogel vaccination, (ii) 5 million AML cells without treatment or (iii) naive controls, 10 days after vaccination or AML injection. MLL-AF9 and HoxA9-Meis1 cells were both susceptible to lysis in vitro by the cells derived from vaccinated mice, whereas lineage depleted hematopoietic stem and progenitor cells did not confer a cytotoxic response (FIG. 9F). $CD8^+$ splenocytes isolated from either untreated AML-exposed mice or naive mice were ineffective at tumor cell lysis, with similar, low levels of lysis of MLL-AF9 found for both. The cytotoxic response was similar in the unlabeled and GFP-luciferase expressing AML cell variants.

Figure 11A:
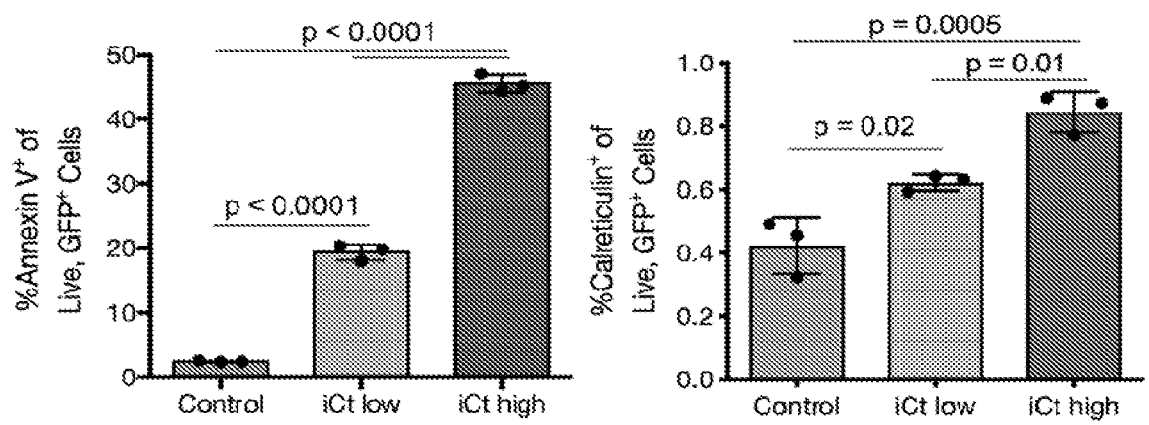
FIGS. 11A-11G show induction chemotherapy induces immunogenic cell death in vitro and combination induction chemotherapy and cryogel vaccination with WT-1 depletes established AML.

1.7 Induction Chemotherapy and Therapeutic Vaccination Prevents AML Relapse in Established Disease The bolus and cryogel vaccines containing WT4126-134 were next tested in a therapeutic model of established disease in combination with a cytotoxic induction chemotherapy (iCt) regimen, following the standard protocol for iCt for established acute myeloid leukemia (Zuber et al., Mouse models of human AML accurately predict chemotherapy response. *Genes & development* 23, 877-889 (2009); published online EpubApr 1 (10.1101/gad. 1771409)). This combination cytarabine (Ara-C) and doxorubicin (Dox) chemotherapy effectively induced apoptosis of AML cells in vitro in a dose-dependent manner, as well as increasing expression of immunogenic cell death marker calreticulin (FIG. 11A).

Figure 11B:
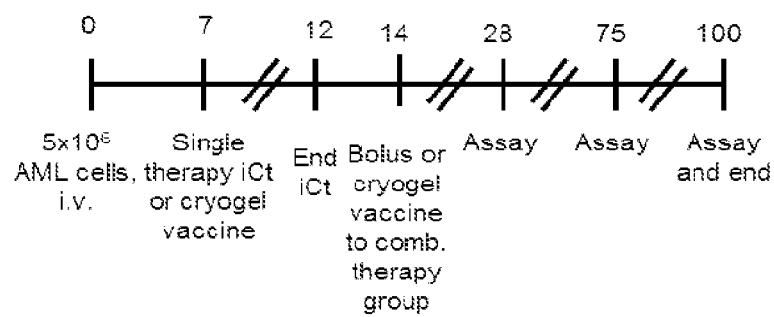
Figure 11C:
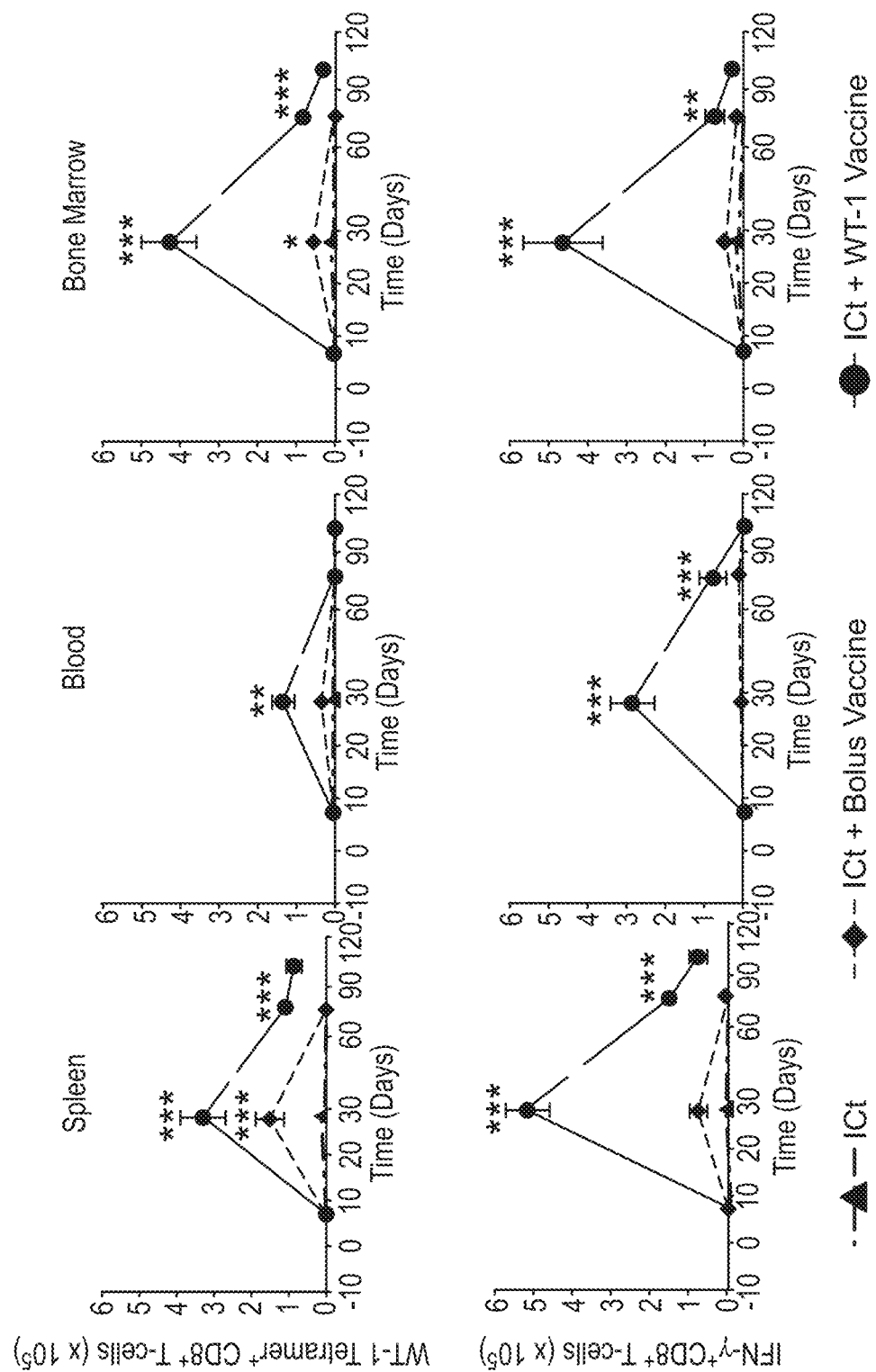

To investigate antigen-specific CTL responses, the frequency of IFN-$\gamma^+$ CD8$^+$ T cells from the blood, spleen and bone marrow from mice subject to different treatment conditions were analyzed (FIGS. 11B and 11C). iCt alone resulted in a short-lived response with very low levels of IFN-$\gamma^+$ CD8$^+$ T cells (<5000 cells) and no detectable WT-1 tetramer$^+$ CD8$^+$ T cells in the hematopoietic compartments. However, when iCt was combined with either bolus vaccination or cryogel vaccination, the IFN-$\gamma^+$ and WT-1 tetramer$^+$ CD8$^+$ T cell responses were significantly enhanced at day 28 relative to iCt alone. The magnitudes of IFN-$\gamma^+$ and WT-1 tetramer$^+$ CD8$^+$ T cell responses generated by the cryogel vaccine in the spleen were 6.4-fold and 2.1-fold higher than bolus vaccination, respectively.

Figure 11D:
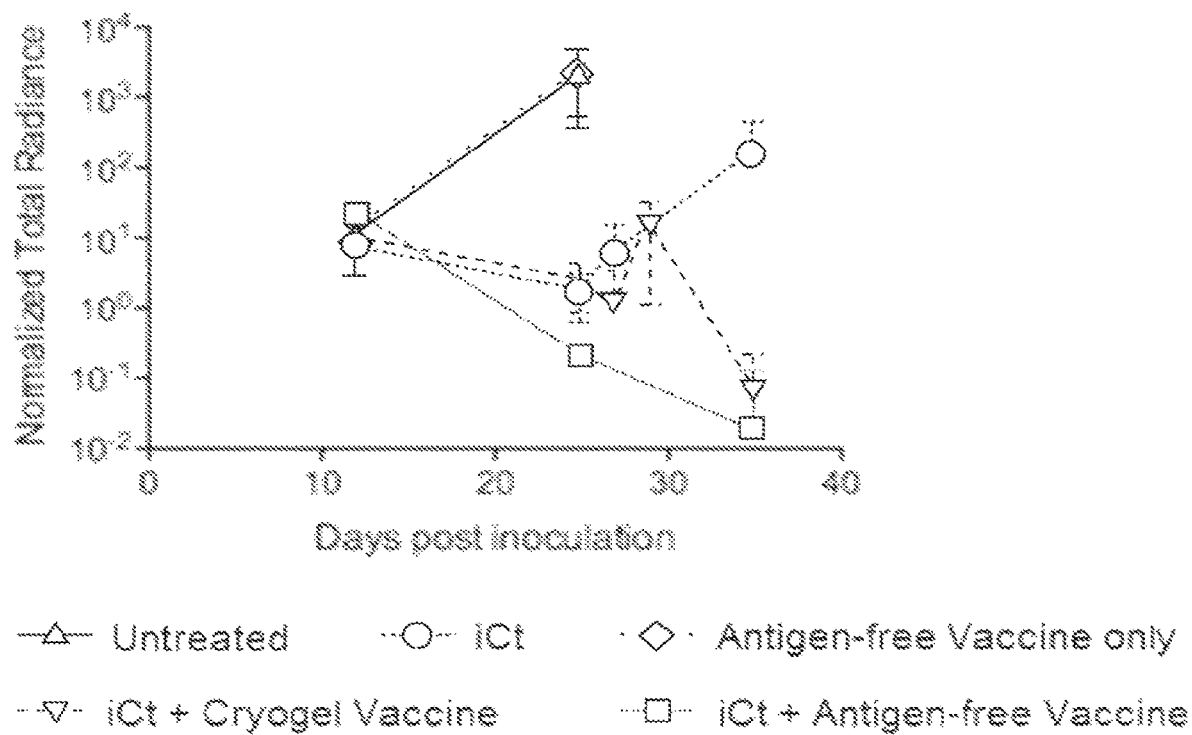
Figure 11E:
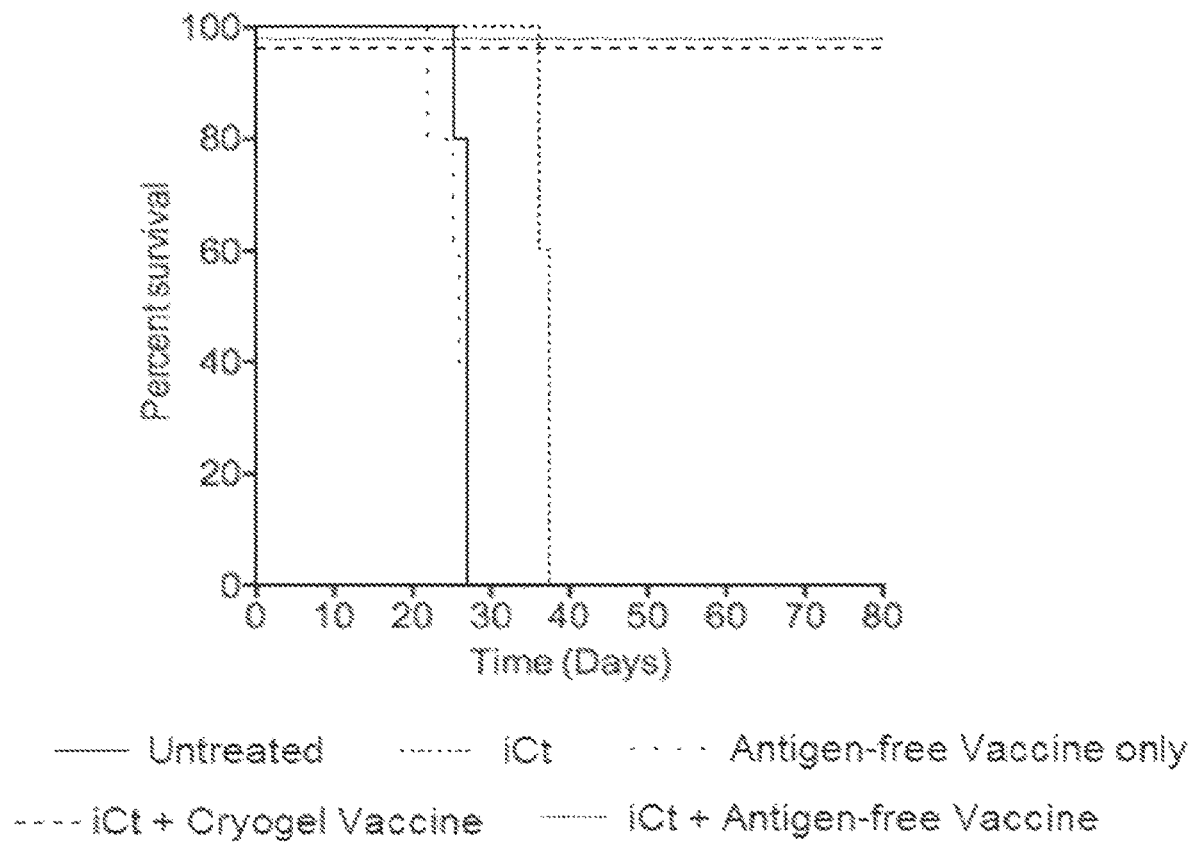
Figure 12A:
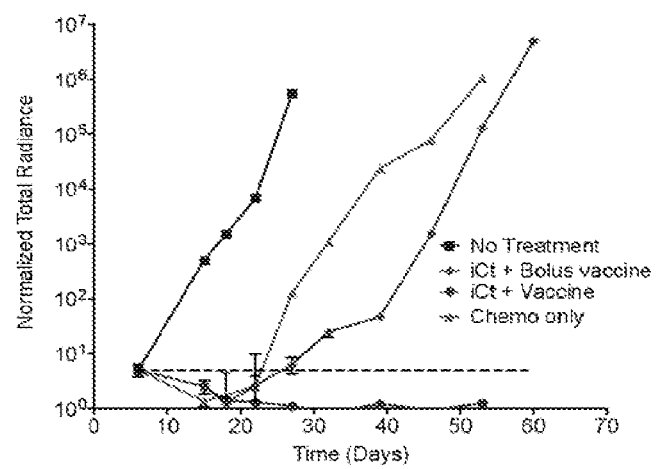
FIGS. 12A-12D show survival rate in AML models and expression of a subset of AML associated genes.
Figure 12B:
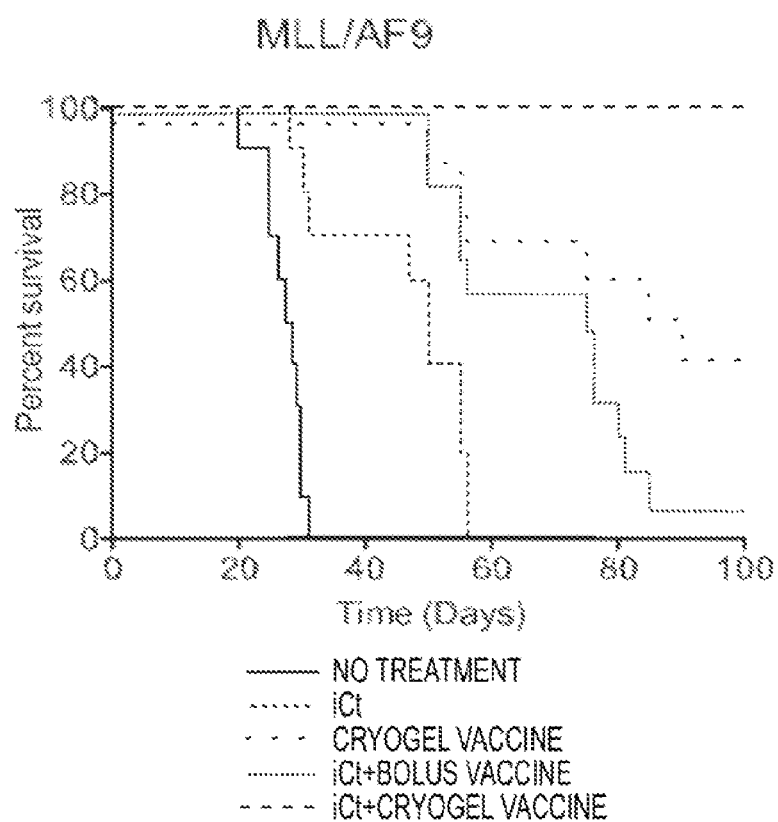

The leukemia burden, as measured by bioluminescence signal, increased in untreated mice whereas it reduced significantly after treatment with iCt (FIG. 11D). However, the AML relapsed in mice treated with iCt alone between day 14 and day 21, quantified by a rapid increase in bioluminescence signal. The cryogel WT-1 vaccine alone and the iCt with the bolus vaccine suppressed AML growth for at least 1 month after the initial AML challenge, after which the AML relapsed at about the same time in both of these groups and increased exponentially although at a significantly slower rate in the cryogel vaccinated mice. The cryogel vaccine alone prolonged survival, and when relapse occurred the mice succumbed at a slower rate than mice that received both the iCt and the bolus vaccine (FIG. 11E and FIGS. 12A and 12B).

Figure 12C:
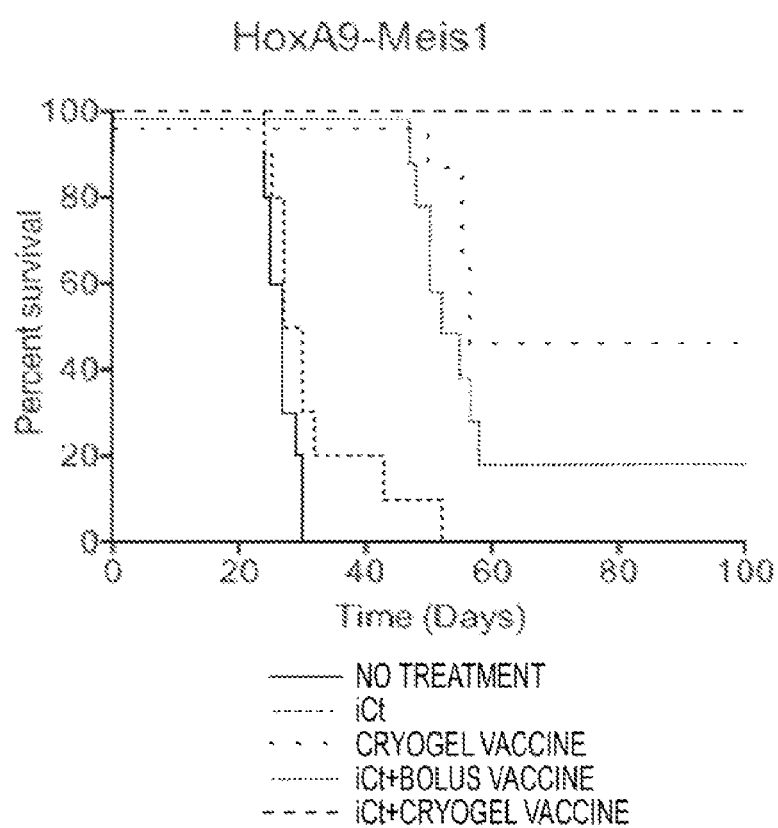

To determine whether the therapeutic benefits extended to other models of AML, the treatment regimens was tested in a GFP-luciferase expressing HoxA9-Meis1 AML model with a similar rate of aggressive lethality. The trends in the treatment groups were similar to those of the MLL-AF9 AML model, in which the combination iCt and the therapeutic vaccine regimen conferred full protection against AML engraftment (FIG. 12C).

1.8 Combination iCT and Cryogel Vaccine Promote De Novo T Cell Responses

Figure 11F:
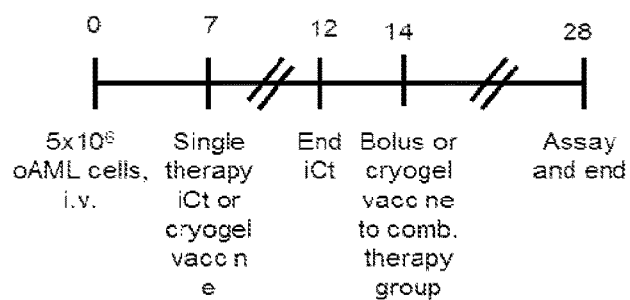
Figure 11G:
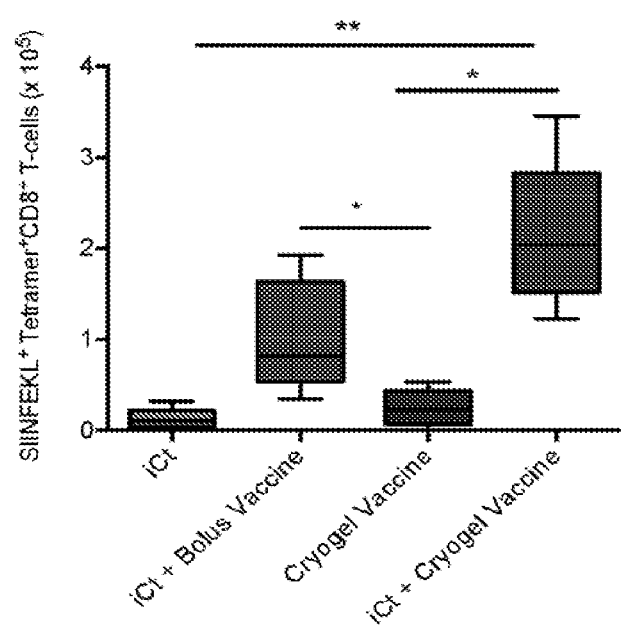
Figure 12D:
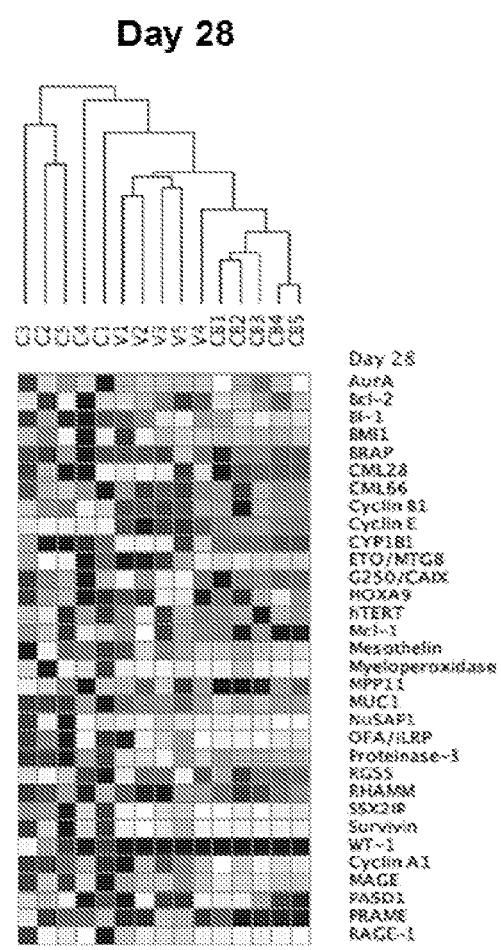

As cytoreductive chemotherapy using anthracyclines is associated with immunogenic cell death, it was investigated the generation of de novo adaptive immune responses for AML-associated antigens that were not delivered by the vaccine. AML cells were isolated from terminally ill mice on Day 28 for a targeted gene expression analysis in a subset of known AML-associated antigens (FIG. 12D). The iCt+bolus vaccine treatment was broadly suppressive to a subset of AML antigens relative to the WT-1 cryogel vaccine or iCt alone. Two groups could not be included in the comparison as untreated mice did not survive until Day 28 and no AML cells could be isolated in the iCt+cryogel vaccination group. To test if the protection conferred by the cryogel vaccine was mediated by a broad adaptive immune response, mice were inoculated with ovalbumin (OVA)-expressing AML cells (oAML) and subsequently treated with (i) iCt, (ii) cryogel vaccine containing WT-1$_{126\text{-}134}$ as the antigen, (iii) iCt and cryogel vaccine containing WT-1$_{126\text{-}134}$ as the antigen, or (iv) iCt and bolus vaccine with WT-1$_{126\text{-}134}$ (FIG. 11F). Twenty eight days after inoculation with the oAML cells, the number of SIINFEKL tetramer$^+$ CD8$^+$ T cells was elevated in both vaccine groups in combination with iCt, and significantly higher in the mice which received both iCt and the cryogel vaccine (FIG. 11G). iCt or the cryogel vaccine alone resulted in weak responses.

Figure 13A:
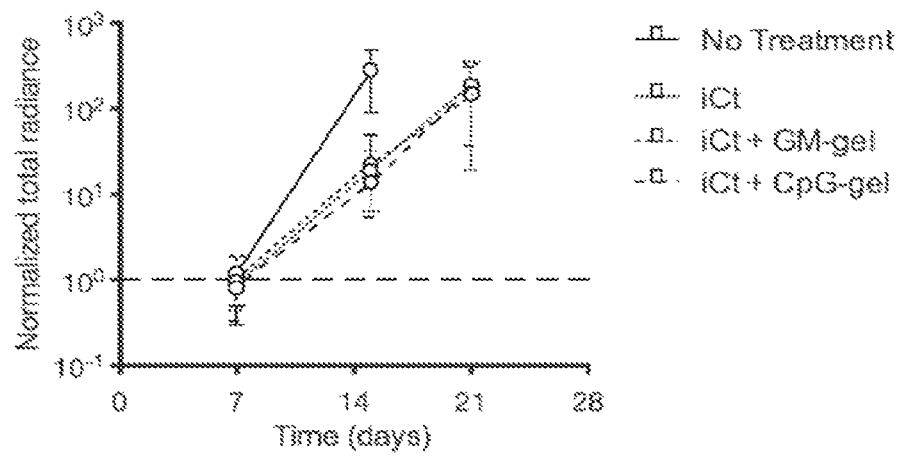
FIGS. 13A-13C show therapeutic efficacy of single-factor, antigen-free cryogel vaccines.
Figure 13B:
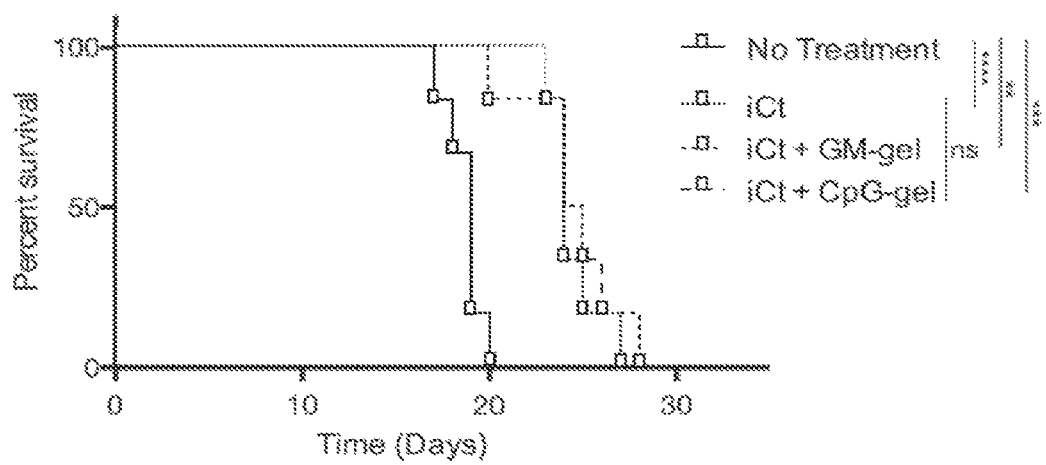
Figure 13C:
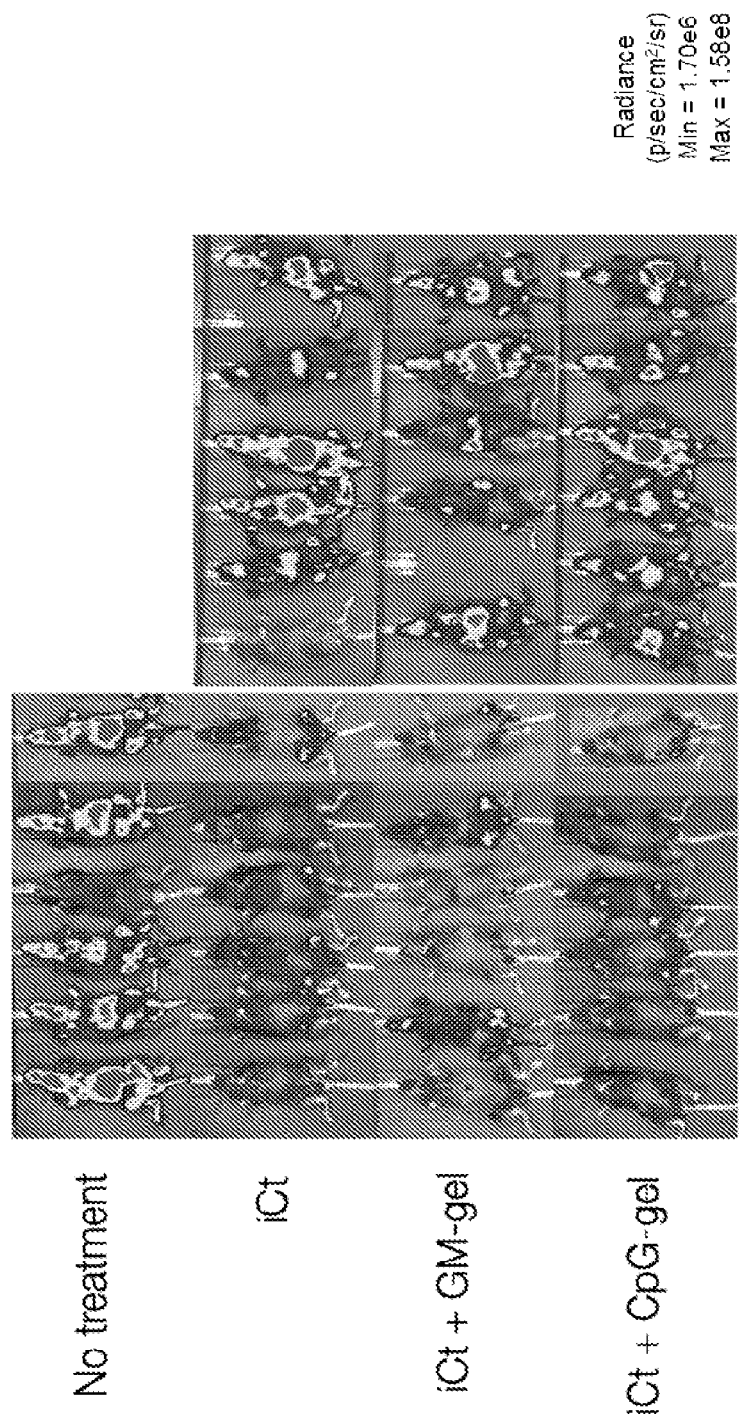
Figure 14A:
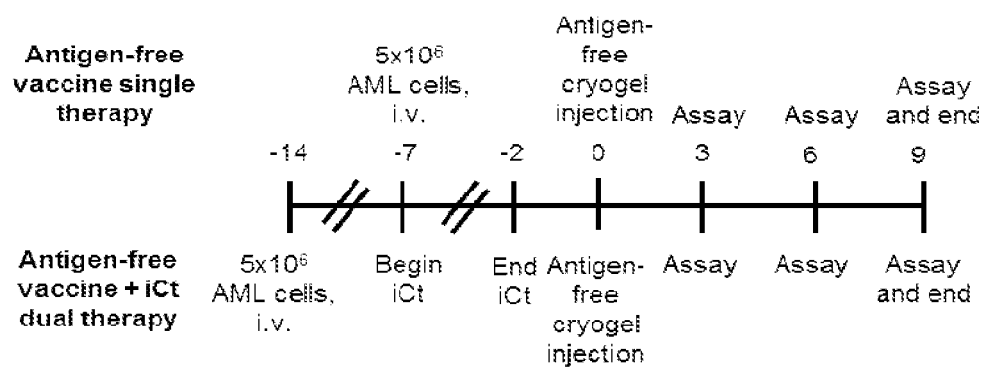
FIGS. 14A-14G show combination of induction chemotherapy with antigen-free vaccination debulks AML, depletes $T_{regs}$, and enhances antigen-specific T cells.
Figure 14B:
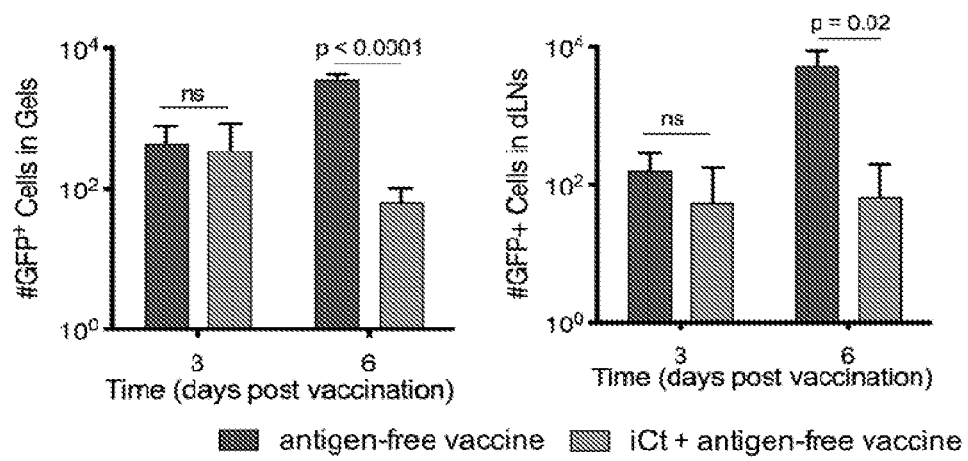
Figure 14C:
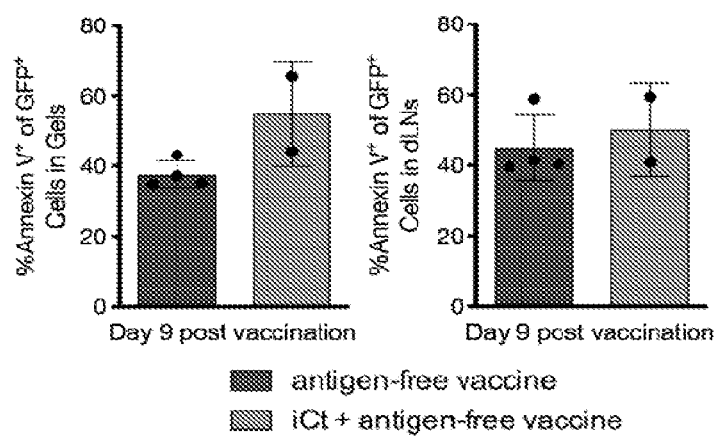
Figure 15:
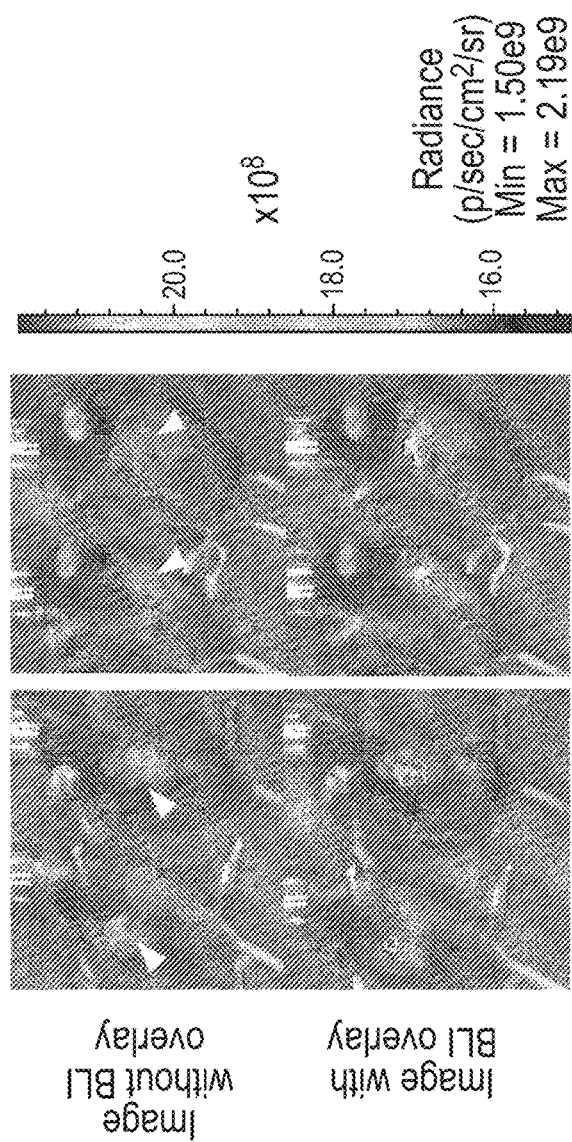
FIG. 15 shows Localization of AML bioluminescence signal at cryogels. Photographs (above) and bioluminescence images (below) of luciferase expressing AML cells in antigen-free cryogels in two mice 21 days following AML transfer. White arrows indicate scaffold site.
Figure 16A:
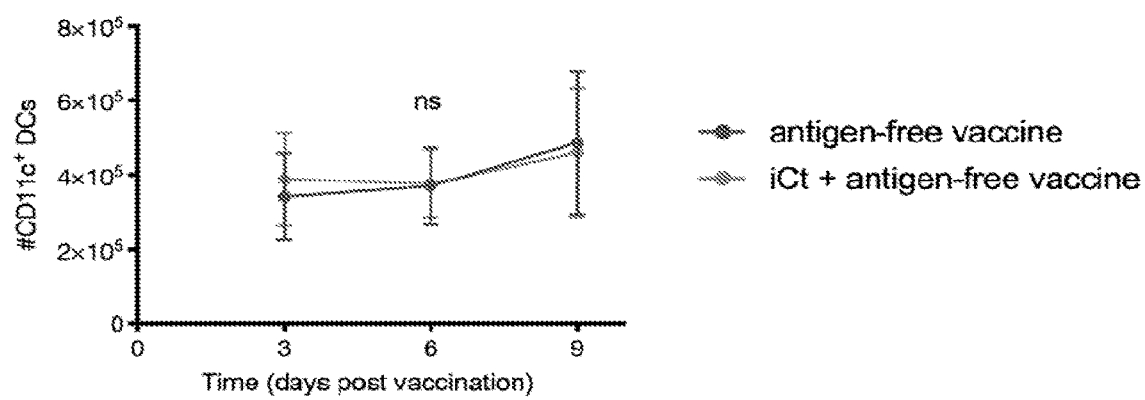
FIGS. 16A and 16B show dendritic cell recruitment and activation in cryogels delivered to mice with established AML untreated or given chemotherapy.
Figure 16B:
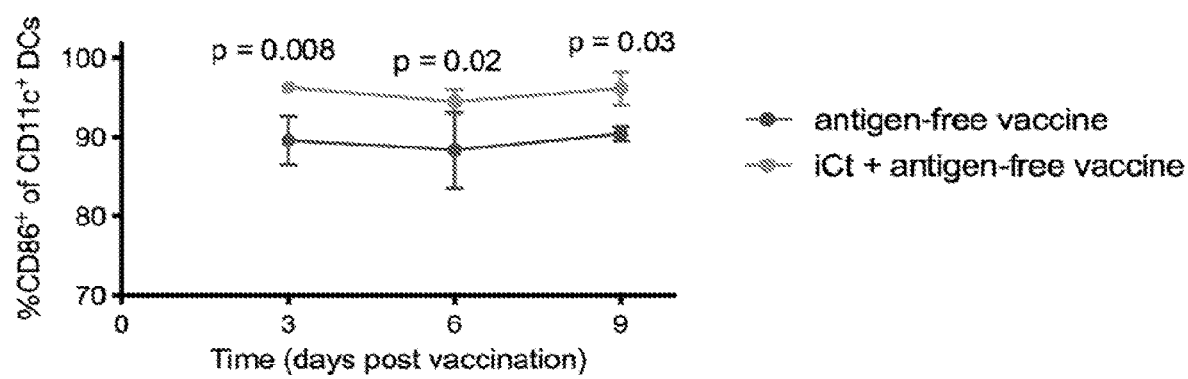

Strikingly, similar rates of survival were found in animals treated with iCt followed by a cryogel vaccine that either delivered no antigens or with WT-1$_{126\text{-}134}$ (FIG. 11E) and all mice survived in both of these treatment groups. This effect was dependent on both GM-CSF and CpG within the scaffold (FIGS. 13A-13C). In the absence of chemotherapy, the survival rate in mice treated with a cryogel vaccine without an antigen was similar to that of the untreated mice. To identify the potential sites of antigen uptake by DCs in this setting, AML cell recruitment to the cryogel scaffolds and draining lymph nodes were measured in mice treated with either the antigen-free cryogel vaccine only, or treatment with this vaccine following iCt (FIG. 14A). Over 9 days following vaccination, the number of GFP$^+$ AML cells in both the cryogel scaffolds (FIG. 15) and dLNs increased both with and without iCt, with significantly higher numbers in the mice not receiving iCt (FIG. 14B). Apoptotic markers were highly expressed on AML cells found in scaffolds and draining lymph nodes of both groups (>=35% of cells) (FIG. 14C). The iCt regimen did not affect the number of CD11c$^+$ DCs recruited to the scaffold, which was comparable between the two groups (FIG. 16A), and the percentage of CD86$^+$ DCs was modestly elevated when mice were subject to iCt treatment (FIG. 16B).

Figure 14D:
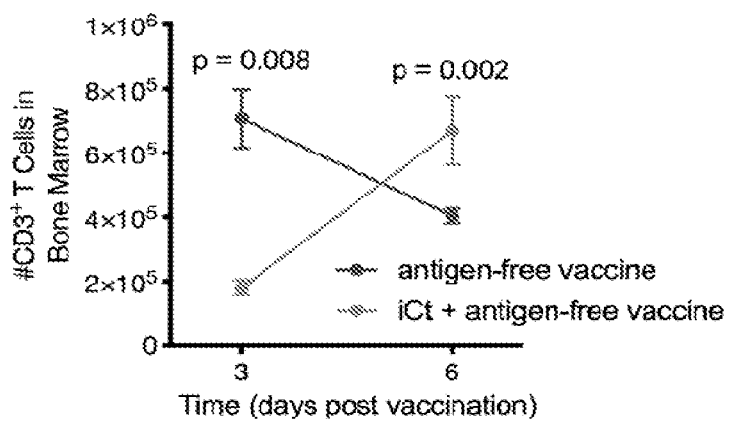
Figure 14E:
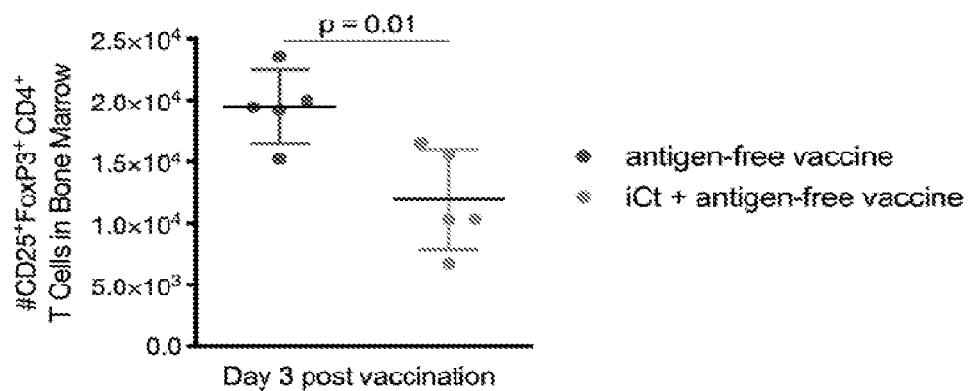
Figure 14F:
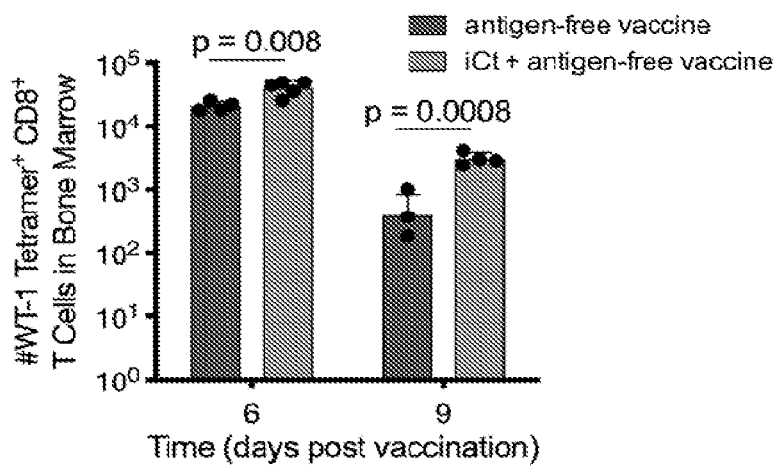
Figure 14G:
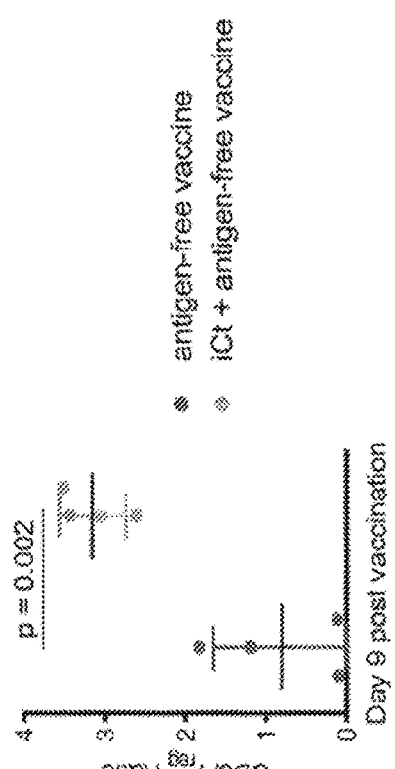
Figure 17A:
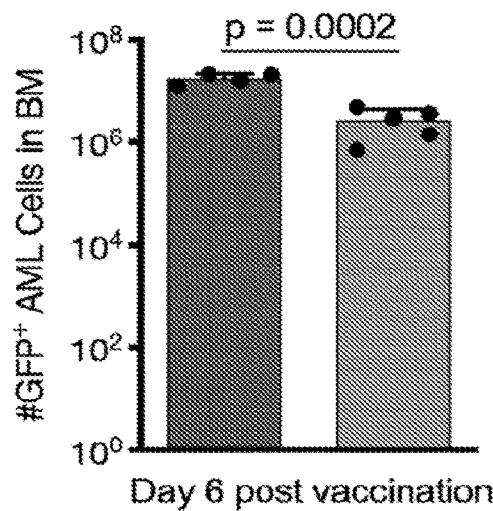
FIGS. 17A-17D show AML burden in bone marrow and spleen.
Figure 17B:
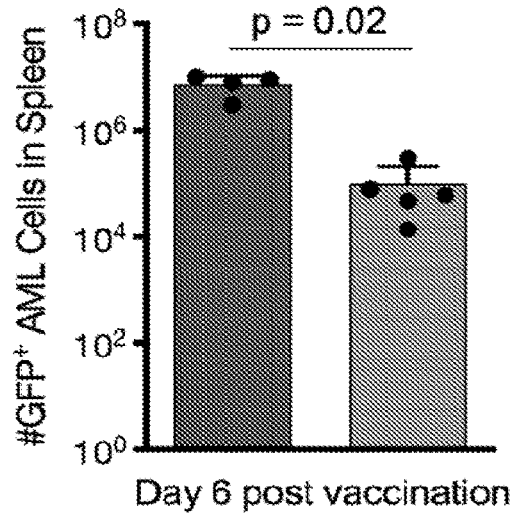
Figure 17C:
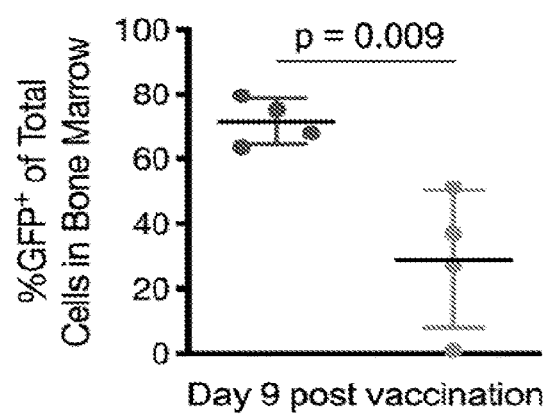
Figure 17D:
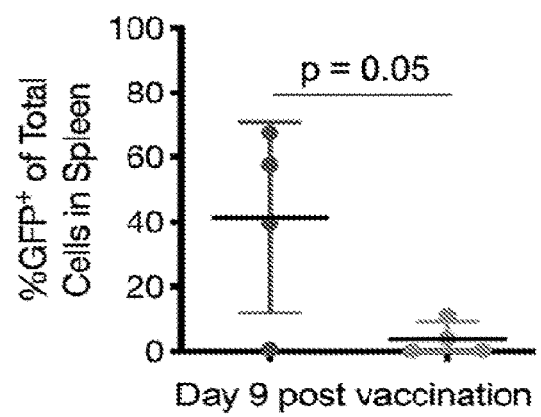
Figure 18A:
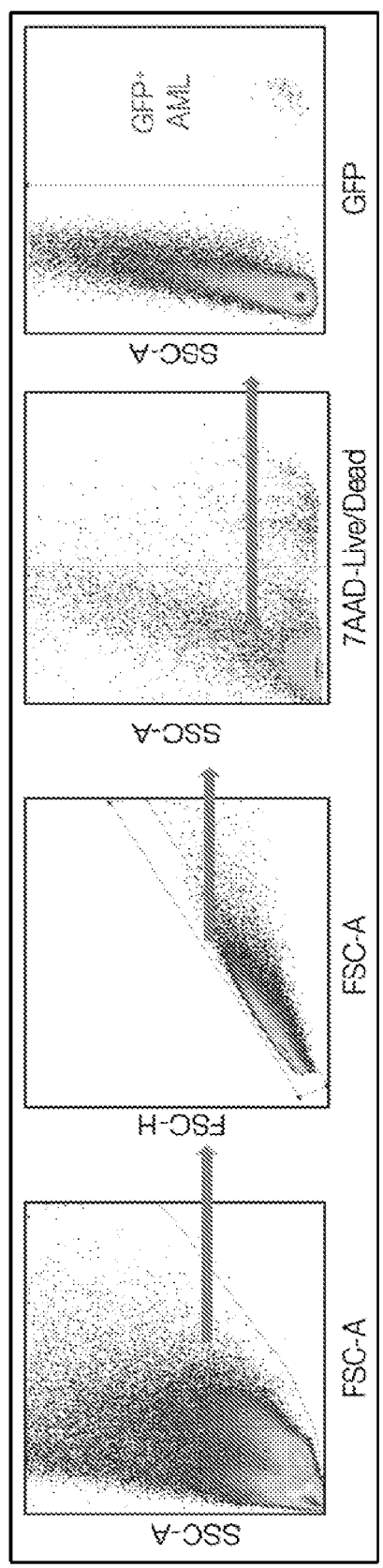
FIGS. 18A and 18B show Representative gating strategies. Flow cytometry plots used to identify GFP$^+$ AML cells (FIG. 18A) and CD25$^+$FoxP3$^+$ Tregs (FIG. 18B).
Figure 18B:
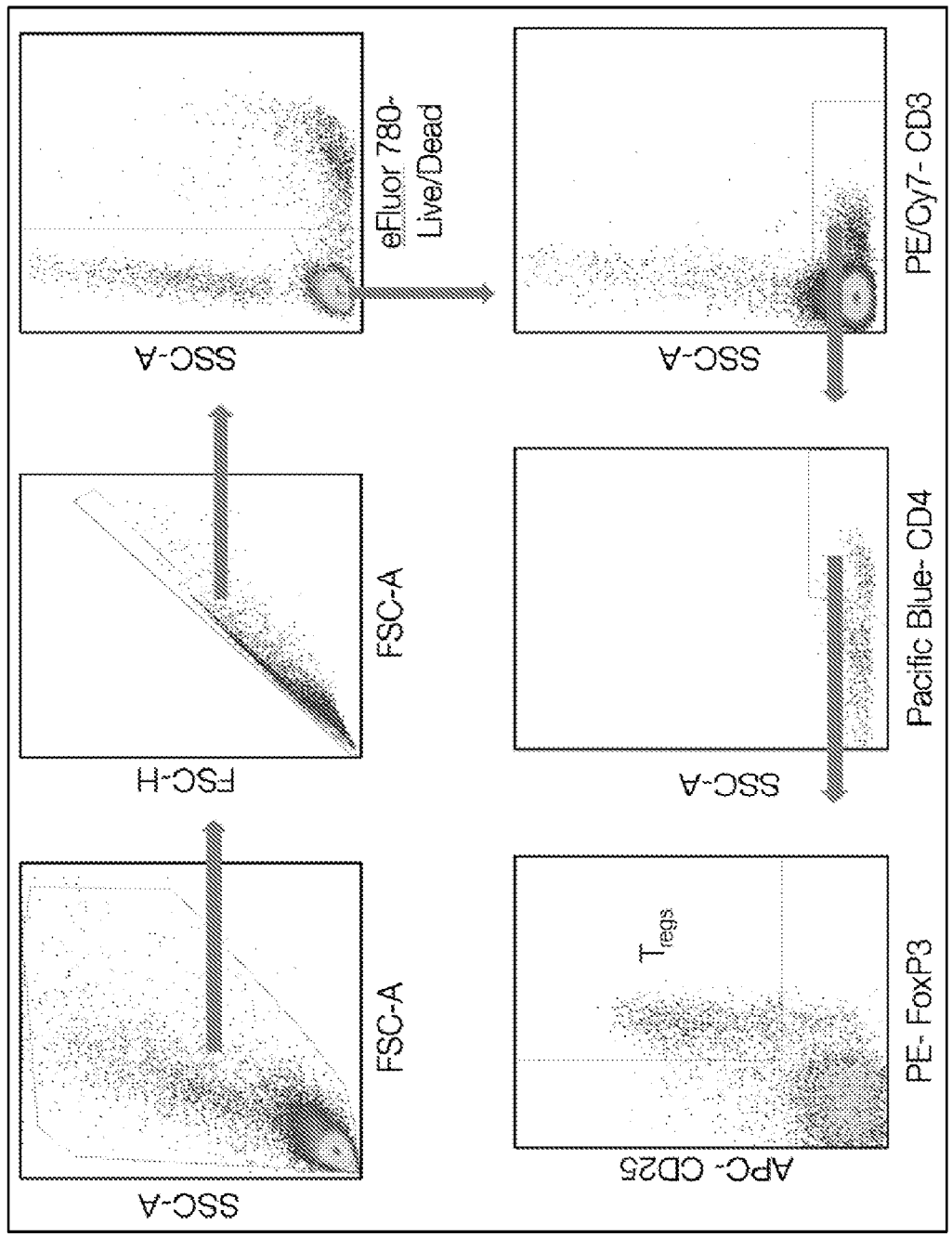
Figure 19:
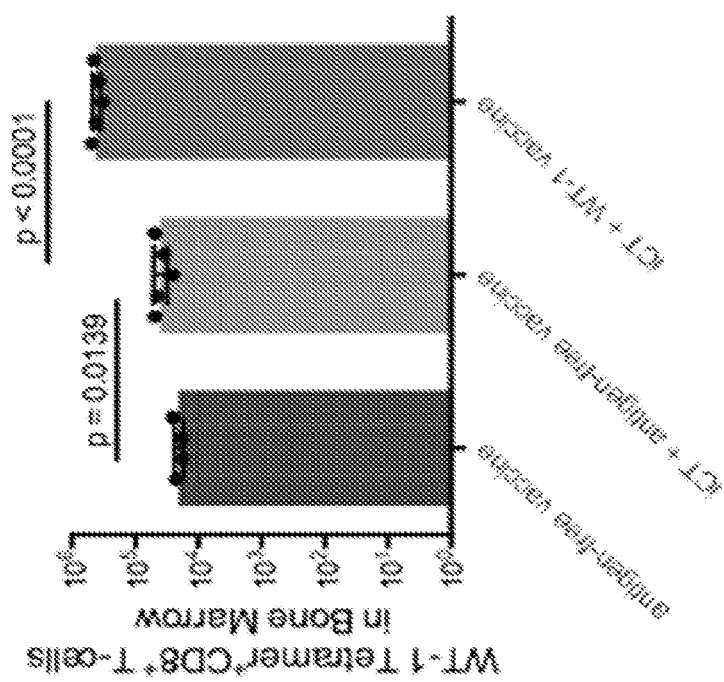
FIG. 19 shows WT-1-specific T cell responses comparing full versus antigen-free cryogel vaccines. WT-1 tetramer$^+$ CD8$^+$ T cells in mice receiving the antigen-free vaccine only, the antigen-free vaccine+iCt, or the antigen-including vaccine+iCt 6 days post-injection of the vaccine (analysis of variance (ANOVA) with a Tukey post hoc test, n=5).

To quantify the effect of iCt on modulating the immunosuppressive bone marrow environment, regulatory T-cells (T$_{regs}$) in the bone marrow were analyzed. iCt significantly reduced AML burden from the bone marrow and spleen at all timepoints characterized, as expected (FIGS. 17A-17D). By Day 9, approximately 70% of total bone marrow cells were GFP$^+$ AML cells in mice treated with the antigen-free vaccine alone, reduced to approximately 30% when combined with iCt (p=0.0286) (FIG. 17C). There were ~2×10$^5$ total CD3$^+$ T cells in the bone marrow on Day 3 in the group receiving iCt, and this increased to ~6.5×10$^5$ by Day 6 (FIG. 14D). In contrast, the number of bone marrow T cells in mice receiving the antigen-free vaccine alone decreased by approximately 45% from Day 3 to Day 6 (FIG. 14D). iCt in combination with the antigen-free vaccine transiently decreased bone marrow FoxP3$^+$ CD25$^+$ T$_{regs}$ on Day 3 compared to the antigen-free vaccine alone (FIG. 14E and FIG. 18). The tumor-specific T cells were similarly enhanced with combination iCt, as significantly greater numbers of WT-1 tetramer$^+$ CTLs were found in the bone marrow on Days 6 and 9 following vaccination (FIG. 14F and FIG. 19). The CD8$^+$ T cell/T$_{reg}$ ratio was higher in the bone marrow of mice treated with iCt and the antigen-free vaccine, compared to the antigen-free vaccine alone (FIG. 14G).

Figure 20A:
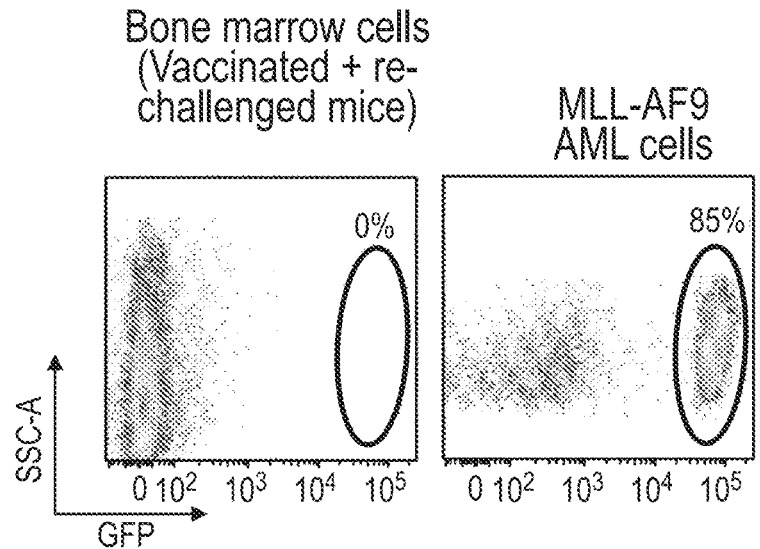
FIGS. 20A-20F show secondary transplants indicate the absence of residual AML cells and the transference of immunity into transplant recipients.
Figure 20B:
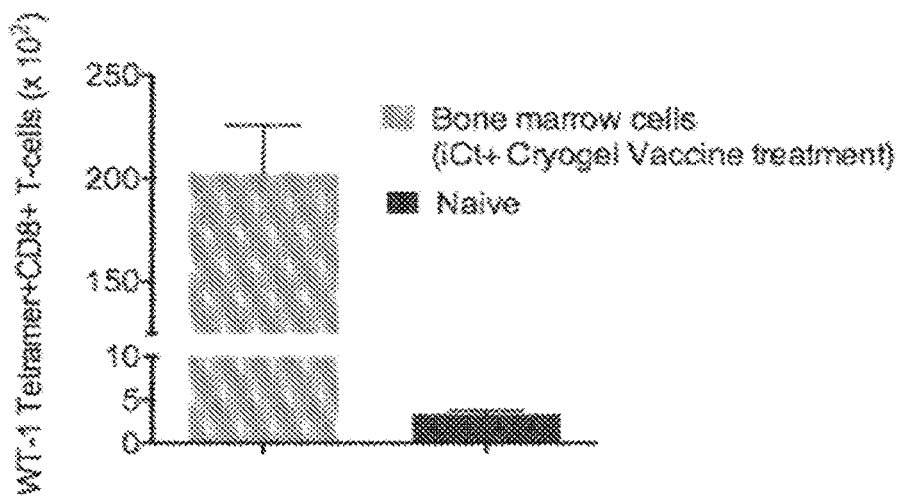
Figure 20C:
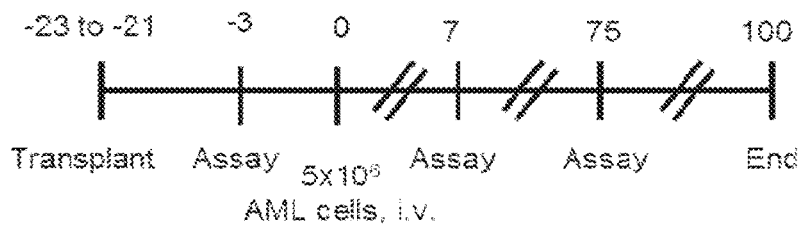
Figure 20D:
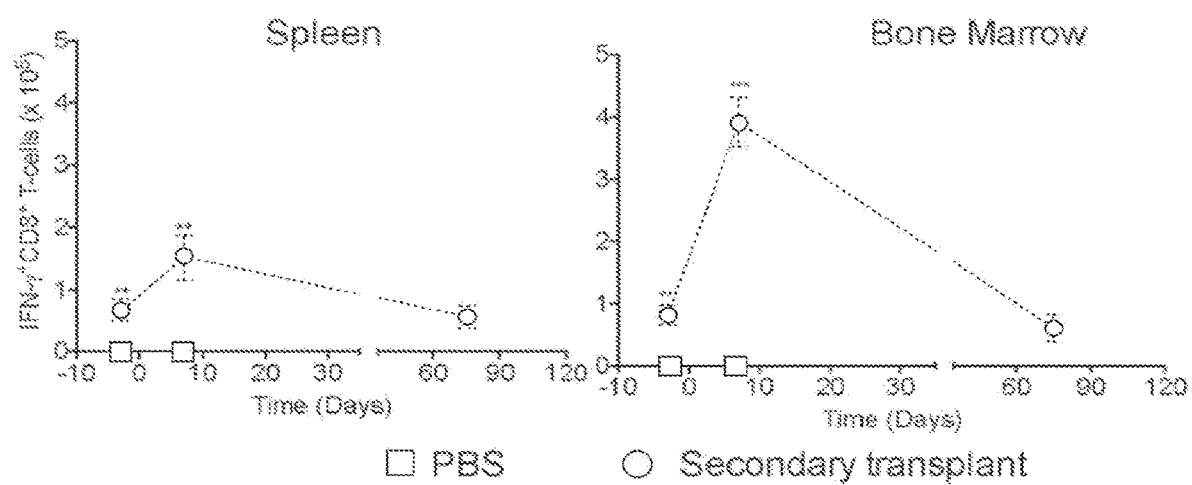
Figure 20E:
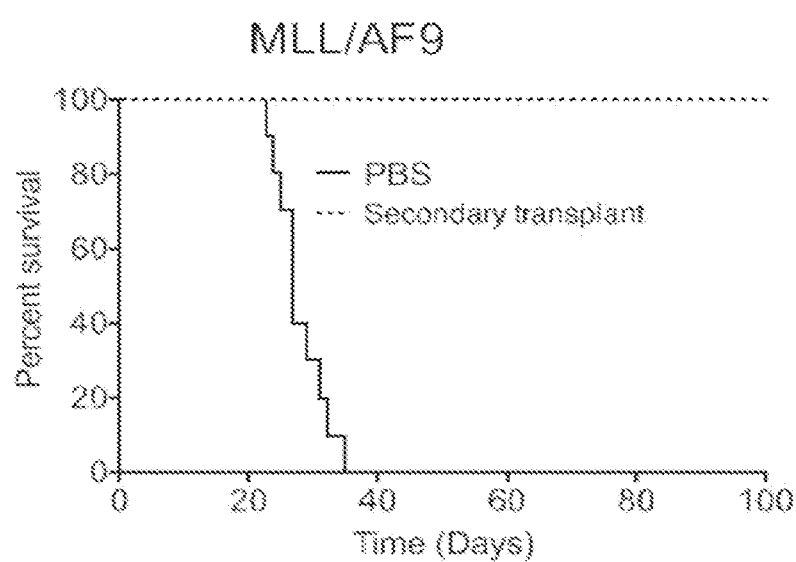
Figure 20F:
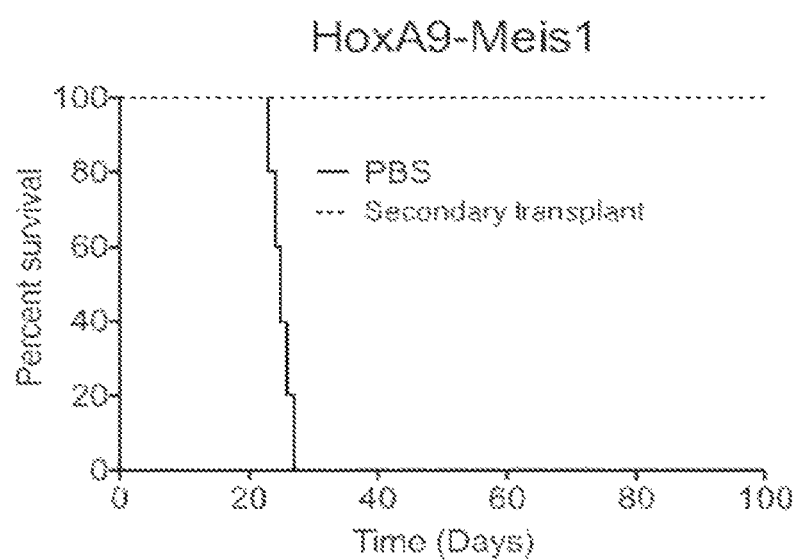
Figure 21:
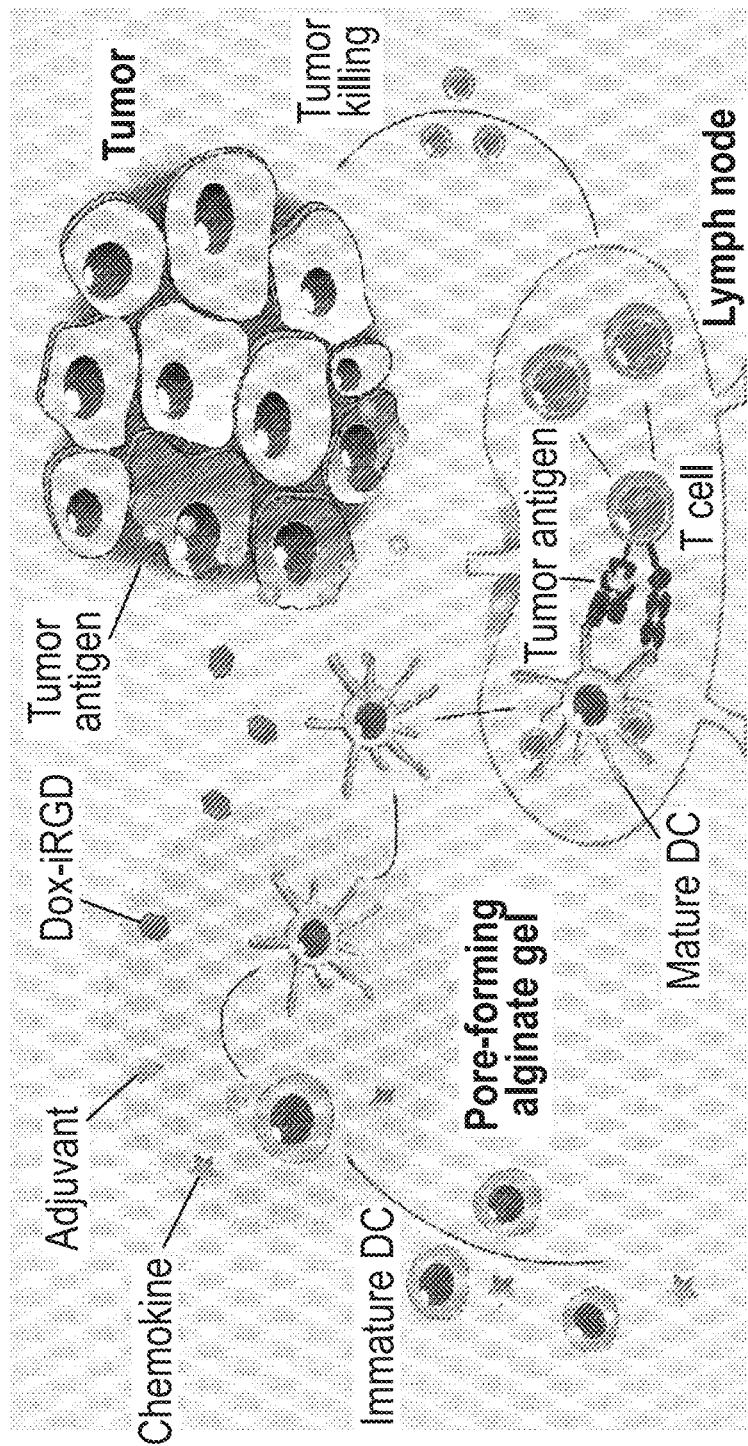
FIG. 21 shows schematic illustration of the in situ cancer vaccine composed of a biomaterial scaffold (circle) loaded with chemokines, adjuvants, and chemotherapeutic drugs (Dox-iRGD). The biomaterial is injected peritumorally, and Dox-iRGD is released to penetrate into tumors and induce immunogenic death of tumor cells, while released chemokines can recruit large numbers of immature dendritic cells (DCs) to the scaffold site. Recruited DCs can take up and process tumor antigens while being activated with adjuvants to prime tumor-specific T cells for tumor cell killing.

1.9 Combination iCT and Cryogel Vaccination Effectively Deplete Leukemia Cells and Provide Transferable Immunity To test for residual leukemia cells in the mice that received the iCt and cryogel vaccine containing WT-1$_{126\_134}$ as the antigen, bone marrow was harvested from treated mice at Day 100 after the initial MLL-AF9 AML challenge. No GFP-expressing cells were detected, indicating a lack of residual AML cells (FIG. 20A). Higher levels of WT-1 tetramer⁺ CD8⁺ T cells were observed in the bone marrow of the treated mice, compared with naïve controls (FIG. 20B). Secondary bone marrow transplants were subsequently performed (FIG. 20C), as previously described, with bone marrow cells from the treated donors. None of the recipient mice succumbed to AML up to 14 days following transplantation, as assessed by body condition and survival. Subsequently, transplanted mice were challenged with 5 million MLL-AF9 AML cells to test for functional immune protection. IFN-γ⁺ CD8⁺ T cells were measured in the spleen and bone marrow of the transplanted mice (FIG. 20D). The response in mice transplanted with bone marrow from vaccinated donors recapitulated the dynamics of the vaccinated mice and all transplanted mice survived the challenge (FIG. 20E). Mice receiving control injection of phosphate buffer saline (PBS) succumbed to AML between days 26 and 31 as expected. In another model of AML, secondary transplantation using bone marrow from surviving mice challenged with HoxA9-Meis1 AML cells again resulted in survival and protection from a subsequent challenge (FIG. 20F).

1.10 Discussion

Patients with AML generally present with a high burden of disseminated disease at the time of diagnosis and require effective and tolerable systemic therapy. Chemotherapy can rapidly induce an apparent remission but relapse occurs in the majority of patients, highlighting the difficulty in eradicating all AML cells. Therapeutic vaccines have the potential of achieving a lasting AML-specific immune response capable of eradicating the residual disease that remains following chemotherapy. The development of cancer vaccines requires T cell activation resulting from effective presentation of one or more tumor antigens in the context of co-stimulation (Palucka & Banchereau, Cancer immunotherapy via dendritic cells. *Nature reviews. Cancer* 12, 265-277 (2012); published online EpubMar 22 (10.1038/nrc3258)). This study demonstrates that an injectable biomaterial vaccine can generate a local, controlled immunological microenvironment and serve as a site for regulation of the immune response against AML. The cryogel vaccines locally deliver immunoregulatory factors to evoke a potent and durable response against AML. In a model of established AML, the cryogel vaccine, when used in combination with induction chemotherapy, depletes leukemia cells and confers transferable immunity in mice even without incorporation of tumor antigens.

The prophylactic administration of the cryogel vaccine elicited a strong and durable systemic immune response, compared with the bolus vaccine. It was observed that the induction of a WT-1 specific CTL response by the vaccine cryogel induced cell lysis in an AML-specific manner as measured by a thymidine-release assay in vitro. The vaccinated mice rejected the engraftment of AML cells after primary challenge, with both AML cell lysates and the WT-1$_{126-134}$ peptide serving as effective vaccine antigens. Moreover, mice were able to overcome a re-challenge after 100 days, indicating the potential of these vaccines to establish a long-term immunity. The induction of strong cellular immune responses is likely a result of the high number of dendritic cells localized to the vaccine, their sustained and prolonged activation and priming, and subsequent interactions with immune cells in the lymph node. In contrast to some DC adoptive transfer techniques for prophylactic AML vaccination, efficacy is observed without the need for ex-vivo manipulation of cells (Delluc et al., Dramatic efficacy improvement of a DC-based vaccine against AML by CD25 T cell depletion allowing the induction of a long-lasting T cell response. *Cancer immunology, immunotherapy* 58, 1669-1677 (2009); Gattinoni et al., Adoptive immunotherapy for cancer: building on success. *Nature Reviews Immunology* 6, 383-393 (2006)). The cryogel vaccine platform is also well suited to be combined with sequencing of patient tumors for neoantigen identification to personalize the vaccine, and to explore potential synergies with T cell and other adoptive transfer techniques (Davila et al., Chimeric antigen receptors for the adoptive T cell therapy of hematologic malignancies. *International journal of hematology* 99, 361-371 (2014); Gubin et al., Tumor neoantigens: building a framework for personalized cancer immunotherapy. *The Journal of clinical investigation* 125, 3413-3421 (2015); Ritchie et al., Persistence and efficacy of second generation CAR T cell against the LeY antigen in acute myeloid leukemia. *Molecular Therapy* 21, 2122-2129 (2013); Rosenblatt et al., Individualized vaccination of AML patients in remission is associated with induction of antileukemia immunity and prolonged remissions. *Science translational medicine* 8, 368ra171-368ra171 (2016)10.1126/scitranslmed.aag1298)).

The benefit in overall survival with cryogel vaccination is most notably observed in the murine models of established AML. By recruiting DCs and sustaining their activation in an otherwise immunosuppressive AML environment, the vaccine cryogel can harness a broad range of tumor antigens arising from chemotherapy-induced AML cell death. The iCt reduced the leukemia burden, as measured both through bioluminescence imaging and GFP⁺ cell numbers in harvested bone marrow and spleen. The reduction in AML cells was a logical prelude to administering the cryogel vaccine to deplete residual AML cells and prevent a relapse. Mice treated with combination iCt and cryogel vaccine had more robust WT-1-specific CTLs compared with combination iCt and bolus vaccine or iCt alone, with lasting and transferable immune protection. The effect was derived likely in part by the generation of immunity against leukemia antigens not delivered through the vaccine. In AML cells collected from mice receiving the partially effective WT-1-targeted treatments (iCt+bolus vaccine and cryogel vaccine alone) compared to iCt alone, WT-1 expression was reduced, along with a subset of AML-associated antigens (e.g. RHAMM, PRAME). However, several other antigens (e.g. BMI1, RGS5, Bl-1) were expressed at similar or higher levels in AML cells collected from mice treated with the partially effective vaccine conditions compared to the iCt-only group, which likely contributed to disease relapse in these groups. This mode of immune escape is further supported by the similar rates of post-relapse AML progression in mice treated with bolus vaccine in combination with iCt and untreated mice. In contrast, the cryogel vaccine in combination with chemotherapy effectively induced a robust immune response providing long-term relapse-free survival.

The striking observation of full protection with iCt and a cryogel vaccine without antigens underscores the key role of iCt in the therapeutic treatment of AML. In vitro, exposure of AML cells to iCt promoted apoptosis and expression of calreticulin on the cell surface. In vivo, iCt along with the antigen-free vaccine transiently reduced T$_{reg}$ numbers in the bone marrow and further increased the CD8⁺/T$_{reg}$ ratio, modulating the immunosuppressive microenvironment to overcome immune evasion by AML. AML cells that accumulated in the vaccine cryogels and draining lymph node expressed high levels of apoptotic markers. In clinical trials, the expression of calreticulin has been associated with enhanced antitumor immune response and an improved treatment outcome in AML patients (Fucikova et al., Calreticulin exposure by malignant blasts correlates with robust anticancer immunity and improved clinical outcome in AML patients. *Blood* 128, 3113-3124 (2016)). These results indicate that human tumor cells may similarly be subject to immune responses amenable to combination with a cryogel vaccine. The data disclosed herein suggest that with iCt, apoptotic AML cells are recruited to cryogels and draining lymph nodes, where they co-localize with DCs and supply AML-associated antigens for priming DCs. The CD86+ DCs within scaffolds and enhanced antigen-specific CTL response in the bone marrow after combination treatment of iCt and the antigen-free vaccine, but not the vaccine cryogel alone, lend further support to the importance of iCt.

The cryogel vaccine treatment was well-tolerated and promoted AML rejection without the indication of pancytopenia or autoimmunity in the studies. While targeting cancer-associated antigens may carry the risk of autoimmunity, it has been demonstrated that the long-term presence of WT-1-specific T cells does not result in the development of autoimmunity (Pospori et al., Specificity for the tumor-associated self-antigen WT1 drives the development of fully functional memory T cells in the absence of vaccination. *Blood* 117, 6813-6824 (2011)). In the clinic, the importance of maintaining a balance between appropriate immunological activation while preventing an over-exuberant reaction is well known following the treatment of AML patients with HSCT, in which the GvL effects are associated with the graft-versus-host disease. Clinical studies have observed that a rapid expansion of pre-existing lymphocytes in the HSCT graft promotes T cell reactivity and that donor-derived T cells protect against relapse (Kolb, Graft-versus-leukemia effects of transplantation and donor lymphocytes. *Blood* 112, 4371-4383 (2008)).

Another area of application could be the combination of lower intensity iCt and the cryogel vaccination treatment, which could be applicable in older patients who constitute the bulk of AML patients but experience particularly poor outcomes as they are unable to undergo HSCT (National Cancer Institute: SEER Cancer Statistics Review. 2016, (2016)).

The mode and delivery mechanism of an AML vaccine is likely key to its efficacy. It has been demonstrated that the requirement of multiple vaccinations to achieve efficacy can significantly down regulate the cytotoxic T cell response (Hailemichael et al., Persistent antigen at vaccination sites induces tumor-specific CD8+ T cell sequestration, dysfunction and deletion. *Nature Medicine* 19, 465-472 (2013); Melero et al., Therapeutic vaccines for cancer: an overview of clinical trials. *Nature reviews clinical oncology* 11, 509-524 (2014); Rezvani et al., Repeated PR1 and WT1 peptide vaccination in Montanide-adjuvant fails to induce sustained high-avidity, epitope-specific CD8+ T cells in myeloid malignancies. *Haematologica* 96, 432-440 (2011)). Standard extended release antigen/adjuvant delivery strategies such as water-in-oil emulsions can release for several months but may lead to a deficient immune response at the site of the disease (Herbert, The mode of action of mineral-oil emulsion adjuvants on antibody production in mice. *Immunology* 14, 301 (1968)). The vaccine cryogel is a single-dose subcutaneous injection that elicited a robust immune response conferring efficacy against AML in both a prophylactic and therapeutic setting. It was not observed a deficiency in the long-term cell-mediated immune response with the cryogel vaccine, as evidenced by the eradication of the leukemia and efficacy in preventing AML engraftment after secondary transplantation in mice.

It was demonstrated that a biomaterial-based cryogel vaccine targeting a defined antigen can lead to robust immune responses against AML. The prevention of AML engraftment relied on a prophylactic vaccination strategy to activate cell-mediated immunity against AML, whereas the eradication of established AML relied on a broader response, elicited by combining iCt and the cryogel vaccine, even in the context of antigen-free delivery. In contrast to neoantigen-based vaccination, a scaffold generating tumor specific immune responses in situ can be an off-the-shelf approach for treating patients post-iCt. The findings disclosed herein suggest that induction of a potent anti-AML immune response in such a setting might prevent the life-threatening evolution of this disease.

Example 2. Antigen-Free Cancer Vaccine to Treat Poorly Immunogenic Tumors

Poorly immunogenic tumors, including triple negative breast cancers (TNBCs), remain resistant to current immunotherapies, due in part to the difficulty of reprogramming the highly immunosuppressive tumor microenvironment (TME). Here it is shown that peritumorally injected, macroporous alginate gels loaded with granulocyte-macrophage colony-stimulating factor for recruiting dendritic cells (DCs), CpG oligonucleotides, and a doxorubicin-iRGD conjugate enhanced the immunogenic death of tumor cells, increased systemic tumor-specific CD8+ T cells, repolarized tumor-associated macrophages towards an inflammatory M1-like phenotype, and significantly improved antitumor efficacy against poorly immunogenic 4T1 TNBC. This vaccine also prevented tumor recurrence after surgical resection, and resulted in 100% metastasis-free survival upon re-challenge. This approach to cancer vaccination that concentrates massive DCs to present endogenous tumor antigens generated in situ may broadly serve as a facile platform to modulate the suppressive TME and enable in situ personalized cancer vaccination.

2.1 Materials and Methods

Materials and Instrumentation

Doxorubicin was purchased from AstaTech Inc. (Bristol, PA, USA). N-β-maleimidopropionic acid hydrazide was purchased from Thermo Fisher Scientific (Waltham, MA, USA). iRGD-SH and iRDG-SH were ordered from Peptide 2.0 Inc. (Chantilly, VA, USA). PRONOVA UP MVG sodium alginate (endotoxin-free) was purchased from Fmc Biopolymer AS (Sandvika, Norway). Cpg-odn-SH was purchased from Integrated DNA Technologies (Coralville, IA, USA). Primary antibodies used in this study include brilliant violet 421-conjugated anti-CD11b (Biolegend), FITC-conjugated anti-CD11c (Biolegend), PE/Cy7-conjugated anti-CD3 (Biolegend), PE-conjugated anti-F4/80 (Tonbo biosciences), APC-conjugated anti-Gr1 (Biolegend), PE/Cy7-conjugated anti-MHCII (Biolegend), and PE-conjugated anti-CD86 (ebioscience), efluor450-conjugated anti-CD4 (ebioscience), and FITC-conjugated anti-CD8 (Biolegend), APC-conjugated IFN-γ (ebioscience) and PE-conjugated anti-TNF-α (ebioscience), pacific blue-conjugated anti-CD103 (ebioscience), PerCP/Cy5.5-conjugated anti-PD-L1 (Biolegend), APC-conjugated anti-CD8 (Biolegend), PE/Cy7-conjugated anti-CD11b (ebioscience), efluor450-conjugated anti-CD163 (Biolegend), APC-conjugated anti-CD206 (Biolegend), FITC-conjugated anti-CD86 (Biolegend), efluor450-conjugated anti-CD8 (ebioscience), FITC-conjugated anti-PD-1 (Biolegend), PE-conjugated anti-LAG3 (Biolegend), APC-conjugated anti-CTLA-4 (Biolegend), PE/Cy7-conjugated anti-TIM (Biolegend), FITC-conjugated anti-CD25 (Biolegend), PE-conjugated anti-Foxp3 (Biolegend), Alexa fluor 647-conjugated anti-calreticulin (Abcam), and FITC-conjugated anti-CD47 (Biolegend). Fixable viability dye efluor780 was obtained from Thermo Fisher Scientific. FACS analyses were conducted on BD LSRII or BD LSR Fortessa flow cytometry. Fluorescence measurement of Dox was conducted on a plate reader. Small compounds were run on the Agilent 1290/6140 ultra high performance liquid chromatography/mass spectrometer. Proton nuclear magnetic resonance spectra were collected on the Agilent DD2 600. Matrix-assisted laser desorption/ionization mass spectra were collected on the Bruker Ultraflextreme MALDI-TOF/TOF Mass Spectrometer. Confocal images were taken using the Upright Zeiss LSM 710 microscope.

Cell Line and Animals

The 4T1 cell line was purchased from American Type Culture Collection (Manassas, VA, USA). Cells were cultured in DMEM containing 10% FBS, 100 units/mL Penicillin G and 100 μg/mL streptomycin at 37° C. in 5% $CO_2$ humidified air. BALB/c mice were purchased from the Jackson Laboratory (Bar Harbor, ME, USA). Feed and water were available ad libitum. Artificial light was provided in a 12 h/12 h cycle. All procedures involving animals were done in compliance with National Institutes of Health and Institutional guidelines with approval of Harvard University's Institutional Animal Care and Use Committee.

Synthesis of Dox-iRGD and Dox-iRDG

Dox (0.1 mmol) and N-β-maleimidopropionic acid hydrazide (0.11 mmol) were dissolved in methanol, followed by the addition of acetic acid (20 μL). The mixture was stirred at 45° C. for 48 h. After removal of the solvent, the crude product was purified on preparative HPLC to yield Dox-Mal. Dox-Mal (0.02 mmol) and iRGD-SH (0.02 mmol) or iRDG-SH (0.02 mmol) were dissolved in PBS (pH 7.4) and stirred at room temperature for 48 h. After dialysis against DI water with a 1 k Da cut-off membrane for 72 h, Dox-iRGD and Dox-iRDG were lyophilized and stored for use.

Degradation of Dox-iRGD

Dox-iRGD was dissolved in PBS with a pH value of 4 and 8, respectively, and added to dialysis tubes bearing membranes with a molecular weight cut off of 1 k Da. The dialysis tubes were placed in PBS bath with a pH value of 4 and 8, respectively. At different time points, an aliquot of the release medium was taken out for fluorescence measurement on a plate reader. A concentration series of Dox were used for determining the standard curve.

Preparation of Dox-iRGD-Loaded Pore-Forming Alginate Gels

Porogen beads were prepared following the reported method (Verbeke & Mooney, supar). Three percent (3%) w/v alginate solution containing Dox-iRGD was mixed with GM-CSF-conjugated gold nanoparticles (Verbeke et al., supra), resulting in a final concentration of 2% w/v unmodified alginate. This mixture, which constituted the bulk phase of the gels, was then mixed with pre-formed porogen beads. Finally, the bulk phase alginates were cross-linked by mixing with a sterile $CaSO_4$ slurry (0.2 g/mL). The volume of $CaSO_4$ cross-linking solution used was 4% v/v relative to the bulk alginate, and the volume fraction of porogens was 50% of the total gel volume. All mixing steps were performed using Luer-Lock syringes joined with Luer-Lock connectors. For in vitro studies, the gels were immediately cast between two silanized glass plates separated by 2 mm spacers. After allowing the gels to cross-link for 30 min, gel disks were punched out using a sterile biopsy punch. For in vivo studies, gels (100 μL) containing 3 μg of GM-CSF were freshly prepared and subcutaneously injected via an 18 G needle.

Release of Dox-iRGD or Dox from Pore-Forming Alginate Gels

Gel disks loaded with Dox-iRGD or free Dox were incubated in DMEM at 37° C. At selected time points, aliquots of the release medium were taken out for fluorescence measurement on a plate reader, and the same amount of fresh medium was added. A concentration series of Dox-iRGD or Dox were used for determining the standard curve.

In Vitro Immunogenic Cell Death Assay

4T1 cells were incubated with different concentrations of Dox at 37° C. for 24 h. Cells without drug treatment were used as controls. Cells were washed with PBS for three times, collected, and stained with FITC-conjugated anti-CD47, Alex Fluor 647-conjugated anti-calreticulin, and fixable viability dye efluor780 for 20 min prior to FACS analyses.

Tumor Penetration Study of Dox-iRGD

4T1 cells (0.6 million) in HBSS buffer were subcutaneously injected into the right flank of Balb/c mice. After 5 days, pore-forming alginate gels loaded with GM-CSF (3 μg)+Dox-iRGD (50 μg in Dox-equivalent) or GM-CSF+Dox-iRDG or GM-CSF+Dox were injected next to the tumors. After 48 h, gels and tumors were harvested and frozen with O.C.T. compound, and sectioned with a thickness of 8 μm. To determine the tumor penetration of drugs, tissue sections were stained with DAPI for 10 min and imaged under a confocal microscope. Tumor apoptosis was analyzed via TUNEL assay.

Flow Cytometry Analysis of Cells in Gels

Alginate gels were harvested from mice, dissociated in 40 mM EDTA for 10 min on ice, and filtered through a 40-μm cell strainer. Cells were pelleted and re-suspended in FACS buffer and blocked with anti-CD16/32 for 20 min. For gross evaluation of immune cell population, cells were stained with brilliant violet 421-conjugated anti-CD11b, FITC-conjugated anti-CD11c, PE/Cy7-conjugated anti-CD3, PE-conjugated anti-F4/80, and APC-conjugated anti-Gr1 for 20 min. For DC analyses, cells were stained with brilliant violet 421-conjugated anti-CD11b, FITC-conjugated anti-CD11c, PE/Cy7-conjugated anti-MHCII, and PE-conjugated anti-CD86 for 20 min.

Histological Evaluation of Tissues

Lungs, liver, heart, kidneys, spleen, and spinal bone were harvested from mice and fixed in formalin, paraffin-embedded, sectioned with a thickness of 4 μm, and stained with H&E. Tissues were analyzed by a board certified pathologist in a blinded manner. Images were taken under a microscope.

In Vitro Re-Stimulation of T Cells from Spleens and Lymph Nodes

Lymph nodes were treated with collagenase, disrupted, and filtrated through a 40-μm cell strainer to obtain the single cell suspension. Spleens were disrupted, filtrated through a 40-μm cell strainer, and treated with ACK lysis buffer to yield the single cell suspension. Cells isolated from lymph nodes and spleens were added to 4T1 cells that were pre-incubated in a 96-well plate overnight, and treated with GolgiPlug in T cell medium at 37° C. for 4 h. Cells were then stained for flow cytometry analyses.

Therapeutic Efficacy Study

4T1 tumors were established in Balb/c mice by subcutaneous injection of 4T1 cells (0.6 million cells in 50 μL of HBSS) into the right flank. After 5 or 6 days when the tumors reached a diameter of 6-7 mm, mice were randomly divided into four groups. Pore-forming alginate gels were freshly prepared and subcutaneously injected next to the tumor. The tumor volume and body weight of mice were measured every other day. The tumor volume was calculated using the formula (length)×(width)²/2, where the long axis diameter was regarded as the length and the short axis diameter was regarded as the width. For Antitumor efficacy studies of gels containing Dox-iRGD, pore-forming alginate gels (100 μL) containing Dox-iRGD (50 μg in Dox-equivalent) or Dox-iRDG (50 μg in Dox equivalent) or Dox (50 μg) were used (N=5). At 18 days post gel injection, mice were sacrificed, and gels and tumors were harvested for analyses. For antitumor efficacy studies of gels containing Dox-iRGD and CpG, pore-forming alginate gels containing Dox-iRGD (100 μg) and CpG (50 μg) or Dox-iRGD (100 μg) alone or CpG (50 μg) alone were used (N=7-8). For dose-increased antitumor efficacy studies, pore-forming alginate gels containing Dox-iRGD (200 μg) and CpG (100 μg) were used (N=7). For the booster vaccine group, a second dose of gels containing Dox-iRGD (200 μg) and CpG (100 μg) were peritumorally injected at 7 days post the first gel injection. All gels were loaded with GM-CSF (3 μg).

Analyses of Tumor Microenvironment after Vaccination

4T1 tumors were established in Balb/c mice by subcutaneous injection of 4T1 cells (0.6 million cells in 50 μL of HBSS) into the right flank. After 5 days, mice were randomly divided into different groups (N=6). Pore-forming alginate gels containing Dox-iRGD (200 μg) and CpG (100 μg) or Dox-iRGD (200 μg) alone or CpG (100 μg) alone were freshly prepared and subcutaneously injected next to the tumors. Mice without treatment were used as controls. At 11 days post gel injection, gels, tumors, lymph nodes, and spleens were harvested for analyses. Cells were isolated from gels following the abovementioned procedures and analyzed via flow cytometry. Tumors were incubated with collagenase and DNAse for 40 min at 37° C., disrupted, and filtered through a 40-μm cell strainer. Cells were pelleted, blocked with anti-CD16/32 for 20 min and then stained with fluorescently labeled antibodies for 20 min. For DC analysis, pacific blue-conjugated anti-CD103, FITC-conjugated anti-CD11c, PE-conjugated anti-CD86, PE/Cy7-conjugated anti-MHCII, PerCP/Cy5.5-conjugated anti-PD-L1, APC-conjugated anti-CD8, and fixable viability dye efluor780 were used. For macrophage analysis, PE/Cy7-conjugated anti-CD11b, PE-conjugated anti-F4/80, efluor450-conjugated anti-CD163, APC-conjugated anti-CD206, FITC-conjugated anti-CD86, and fixable viability dye efluor780 were used. For T cell analyses, two antibody cocktails were used: (1) efluor450-conjugated anti-CD8, FITC-conjugated anti-PD1, PE-conjugated anti-LAG3, APC-conjugated anti-CTLA-4, PE/Cy7-conjugated anti-TIM, and fixable viability dye efluor780; (2) efluor450-conjugated anti-CD4, APC-conjugated anti-CD8, FITC-conjugated anti-CD25, and fixable viability dye efluor780. After staining with the second cocktail, cells were incubated in fixation/permeabilization working solution for 40 min at 4° C. After washing with permeabilization buffer for twice, cells were stained with PE-conjugated anti-Foxp3 in permeabilization buffer at room temperature for 30 min. For tumor cell staining, Alexa Fluor 647-conjugated anti-calreticulin, FITC-conjugated anti-CD47, PerCP/Cy5.5-conjugated anti-PD-L1, and fixable viability dye efluor780 were used. Tumor extracts were analyzed for HMGB-1 using the ELISA kit.

Combination with Anti-PD-1

4T1 tumors were established in Balb/c mice by subcutaneous injection of 4T1 cells (0.6 million cells in 50 μL of HBSS) into the right flank on Day 0. After 5 days when the tumors reached a diameter of 6-7 mm, mice were randomly divided into different groups (N=8-9). Pore-forming alginate gels containing Dox-iRGD (200 μg) and CpG (100 μg) were freshly prepared and subcutaneously injected next to the tumor. Anti-PD-1 (100 μg) was intraperitoneally injected on Day 6, 9, 12, 15, and 18. The tumor volume and body weight of mice were measured every other day.

Tumor Resection Model

4T1 tumors were established in Balb/c mice by subcutaneous injection of luciferase-expressing 4T1 cells (luc-4T1, 1 million cells in 50 μL of HBSS) into the right flank. After 9 days when the tumors reached a diameter of ~10-12 mm, tumors were surgically resected by an experienced surgeon. In brief, after anaesthetizing the animals, a scalpel was used to create a small incision at ~1 cm from the tumor site, followed by the resection of the vast majority of the tumor under a microscope. The visible tumor residues were further cleared using a scalpel under the microscope, without damaging the connective tissues. The incision was then closed using sutures, and before the last few stitches, pore-forming alginate gels containing GM-CSF (3 μg), Dox-iRGD (200 μg) and CpG (100 μg) or bolus vaccines (solution of GM-CSF, Dox-iRGD, and CpG) were injected to the surgical site through an 18 G needle. Tumor growth was then monitored by bioluminescence imaging or size measurement. At ~80 days post tumor resection, surviving mice were re-challenged with tail vein injection of luc-4T1 (100 k in 200 μL of HBSS). Development of metastases was monitored by bioluminescence imaging.

Statistical Analysis

Statistical analysis was performed using GraphPad Prism and Microsoft Excel. Sample variance was tested using the F test. For samples with equal variance, the significance between the groups was analyzed by a two-tailed student's t test. For samples with unequal variance, a two-tailed Welch's t-test was performed. For multiple comparisons, a one-way analysis of variance (ANOVA) with post hoc Fisher's LSD test was used. The results were deemed significant at $0.01 < *P \leq 0.05$, highly significant at $0.001 < P \leq 0.01$, and extremely significant at $*P \leq 0.001$. Sample size was empirically set at n=3-6 for in vitro cell experiments, and n=5-9 for tumor studies.

2.2 Immunogenic Death of 4T1 TNBC Cells In Vitro and In Vivo

It was first studied whether an anthracycline commonly used in the clinic, doxorubicin (Dox), can induce the immunogenic death of 4T1 TNBC cells in vitro and in vivo. 4T1 cells cultured with Dox for 24 h upregulated cell-surface calreticulin, which has been reported as a biomarker for the immunogenic death of cancer cells (Obeid et al., supra; Pfirschke et al., supra; Yamazaki et al., Defective immunogenic cell death of HMGB1-deficient tumors: compensatory therapy with TLR4 agonists. *Cell Death Differ.* 21, 69 (2014)). Calreticulin surface expression increased with Dox concentration in the range of 0-100 nM (FIG. 22A and FIG. 23A). 4T1 cells treated with Dox also increased expression of the anti-phagocytic marker CD47 (FIGS. 23B and 23C), previously demonstrated to aid in immunoevasion by cancer cells (Jaiswal et al., CD47 is upregulated on circulating hematopoietic stem cells and leukemia cells to avoid phagocytosis. *Cell* 138, 271-285 (2009); Chao et al., Calreticulin is the dominant pro-phagocytic signal on multiple human cancers and is counterbalanced by CD47. *Sci. Transl. Med.* 2, 63ra94-63ra94 (2010)). To circumvent the rapid clearance, limited tumor accumulation, and severe off-target cytotoxicity of systemic Dox delivered intravenously or intraperitoneally (Allen & Cullis, Drug delivery systems:

entering the mainstream. Science 303, 1818-1822 (2004)), it was aimed to incorporate Dox into pore-forming alginate gels for controlled and local release to tumors. Pore-forming alginate gels encapsulating Dox were formed by mixing a 3% (w/v) alginate solution containing Dox with degradable porogens before crosslinking with calcium ions. Dox exhibited a rapid release profile from the gels, with ~30% being released within 6 h and more than 60% being released within 24 h (FIG. 22B). To achieve a more sustained release and potentially aid in tumor-penetration, Dox was conjugated with a tumor-penetrating iRGD peptide. Briefly, Dox was modified with a maleimide functional group via an acid-labile hydrazone linker, followed by conjugation to thiol-bearing iRGD to yield Dox-iRGD (FIG. 24A). Dox-maleimide was characterized by liquid chromatography-mass spectrometry and proton nuclear magnetic resonance ($^1$H NMR) (FIGS. 24B-24D), and Dox-iRGD was characterized by $^1$HNMR and matrix assisted laser desorption/ionization mass spectrometry (FIGS. 24D and 24E). As expected, Dox-iRGD was rapidly degraded into Dox at pH 4, but remained stable at pH 8 (FIG. 24F). Dox-iRGD and a scrambled control Dox-iRDG showed similar anticancer effect against 4T1 cells in vitro, with a higher $IC_{50}$ value than Dox (FIG. 24G) as expected. Compared to Dox, Dox-iRGD showed a slower release profile from the pore-forming alginate gel, with ~20% being released within 24 h and ~28% being released within 48 h in vitro, presumably due to greater number of positive charges and increased electrostatic interactions between Dox-iRGD and alginate gels, as compared to Dox (FIG. 22B).

2.3 Penetration of Dox Released from Peritumorally Injected Pore-Forming Gels into 4T1 Tumor It was next studied whether Dox released from peritumorally injected pore-forming gels can penetrate into 4T1 tumors and induce the apoptosis of tumor cells. Balb/c mice bearing subcutaneous 4T1 tumors (6-7 mm in diameter) were peritumorally injected with gels containing GM-CSF along with either Dox-iRGD, Dox-iRDG or unmodified Dox, and gels and tumors were collected for analyses four days later. Confocal imaging of gel and tumor sections showed significantly improved tumor penetration of Dox-iRGD compared to Dox-iRDG (FIGS. 22C and 22D), substantiating the previously reported tumor-penetrating capacity of iRGD (Sugahara et al., Coadministration of a tumor-penetrating peptide enhances the efficacy of cancer drugs. Science 328, 1031-1035 (2010); Sugahara et al. Tissue-penetrating delivery of compounds and nanoparticles into tumors. Cancer Cell 16, 510-520 (2009)). Unmodified Dox showed negligible accumulation in tumor tissues (FIGS. 22C and 22D), presumably due to its rapid release from gels and poor retention in surrounding tissues. Within the penetration range, Dox-iRGD induced significant apoptosis of tumor cells (FIG. 22E). To confirm the ability of these gels to concentrate DCs, gels were collected 18 days post gel injection and infiltrating cells characterized. A significant number of cells (~1.6 million) were found in all gels, and ~40% and 32% were CD11b$^+$ CD11c$^+$ DCs in Dox-iRGD and Dox-loaded gels, respectively (FIGS. 22F and 22G). Approximately 23% of DCs in the Dox-iRGD-loaded gels were CD86$^+$MHCII$^+$ (FIGS. 22H and 22I).

The anti-tumor efficacy of gels with Dox-iRGD and GM-CSF was next explored (FIG. 25A). Dox-iRGD-loaded gels significantly slowed the growth of 4T1 tumors in comparison to Dox-iRDG or Dox-loaded gels, or untreated animals (FIG. 26A). Cancer metastases were observed in lungs of all groups at 18 days post gel injection (FIG. 26B), but mice treated with Dox-iRGD-loaded gels displayed significantly fewer pulmonary tumor nodules compared to unmodified Dox or untreated mice (FIGS. 26B and 26C). Both histological evaluation of the spinal bone marrow tissue and body weight change of mice showed higher toxicity of Dox-loaded gels than Dox-iRGD-loaded gels (FIG. 25B and FIG. 26D), presumably because of more significant leakage of Dox into the bloodstream and resulting systemic exposure. Together, these experiments suggest that peritumorally injected pore-forming gels loaded with Dox-iRGD and GM-CSF can release Dox-iRGD into 4T1 tumors, induce apoptosis of tumor cells, concentrate DCs in situ, and slow tumor growth while reducing off-target systemic toxicity.

2.4 Potentiation of In Situ Vaccination and Antitumor Efficacy by CpG

Next, it was explored the ability of the adjuvant CpG to further potentiate in situ vaccination and antitumor efficacy. After 4T1 tumor inoculation on day 0, gels loaded with Dox-iRGD (100 µg) and CpG (50 µg), CpG (50 µs) alone, or Dox-iRGD (100 µg) alone were injected peritumorally on day 5 (FIG. 27A). GM-CSF was incorporated to concentrate DCs in all gel conditions of this and all subsequent studies unless otherwise noted. All three treatment groups showed a reduced tumor growth rate compared to the untreated group (FIG. 28A). Compared to either Dox-iRGD or CpG alone, Dox-iRGD with CpG resulted in significantly slower tumor growth (FIG. 28A). The median survival of mice treated with gels loaded with Dox-iRGD and CpG was significantly longer than the CpG alone group, the Dox-iRGD alone group, and the untreated group (FIG. 27B and FIG. 28B). Taken together, these data suggest that the combination of Dox-iRGD and adjuvant CpG has the potential to improve antitumor efficacy, presumably due to improved activation of recruited DCs, and facilitated antigen presentation and T cell priming processes. However, lung metastases were still observed in mice treated with Dox-iRGD and CpG at the end of the study, indicating insufficient potency of the generated anti-tumor CTL responses.

2.5 Effect of Dosage of Dox-iRGD and CpG

It was then investigated whether the antitumor efficacy of the in situ gel vaccine could be further improved by increasing the dose of Dox-iRGD and CpG. After 4T1 tumor inoculation on day 0, gels loaded with Dox-iRGD (200 µg) and CpG (100 µg) were injected next to the tumors on day 5. To characterize the immune response, DC recruitment and activation in the gels were analyzed, as was the presence of 4T1-specific CD8$^+$ T cells in spleens and tumor-draining lymph nodes (tdLNs) 4 days post gel injection. Gels loaded with Dox-iRGD and CpG recruited a similar total number of cells and CD11 DCs, compared to gels loaded with Dox-iRGD alone (FIGS. 29A and 29B). However, more DCs in the former group expressed an activated phenotype, with 28% CD86$^+$MHCII$^+$ DCs (FIGS. 29C and 29D). Strikingly, 24% of CD8$^+$ T cells from tdLNs of mice treated with gels containing Dox-iRGD and CpG were IFN-γ$^+$ upon restimulation by 4T1 cells ex vivo, significantly higher than found from mice treated with gels containing Dox-iRGD alone (14%) or untreated mice (9%) (FIGS. 28C-28E). CD8$^+$ T cells isolated from the spleens and CD4$^+$ T cells isolated from spleens/tdLNs of mice treated with gels containing Dox-iRGD and CpG also showed increased expression of IFN-γ, as compared to Dox-iRGD alone or untreated groups (FIG. 30). The observed DC activation and IFN-γ$^+$ T cell responses in mice treated with gels containing the increased dose of Dox-iRGD and CpG correlated to significantly reduced tumor growth compared to untreated mice (FIG. 28F and FIGS. 31A and 31B), with median survival increasing by 50% to 45 days (FIG. 28G and FIG. 31C). By giving a booster gel vaccine on day 12 (7 days after the first gel injection), tumor control was further improved, with a median survival of 49 days (FIGS. 28F and 28G, FIG. 31C). It is noteworthy that while tumor burden was low in gel vaccine groups at study termination, lung metastases were observed in mice, and these were likely responsible for animal loss. Histological evaluation of liver, heart, spleen, and kidney tissues showed minimal off-target toxicity of the higher-dose in situ gel vaccine compared to untreated mice (FIG. 31D). Taken together, these experiments demonstrate that the in situ gel vaccine loaded with GM-CSF, Dox-iRGD and CpG enhances tumor-specific CD8$^+$ and CD4$^+$ T cell activity in tdLNs and the systemic circulation, and slows the growth of 4T1 tumors.

2.6 Post-Treatment Changes in the Tumor Microenvironment

The immunosuppressive tumor microenvironment may constitute a barrier against tumor control, even with strong systemic CTL responses (Zon, Immunosuppressive networks in the tumour environment and their therapeutic relevance. *Nat. Rev. cancer* 5, 263 (2005)). To better understand the underlying immunomodulatory effects of the in situ gel vaccine, it was next analyzed post-treatment changes in the tumor microenvironment, including immunogenic death of tumor cells, population and activation status of tumor-infiltrating DCs, effector T cells and exhaustion, regulatory T cells, and tumor-associated macrophages (TAMs). GM-CSF containing gels loaded with both Dox-iRGD and CpG or either Dox-iRGD or CpG alone were again injected adjacent to 4T1 tumors. Gels and tumors were harvested for analyses 11 days later, as the in situ vaccine had shown efficacy in slowing tumor growth at this time. Cells in tumors treated with gels containing Dox-iRGD and CpG showed enhanced cell-surface expression of calreticulin compared to tumors treated with gels containing Dox-iRGD alone or untreated tumors, indicating increased immunogenic death of tumor cells (FIGS. 32A and 32B). Tumors treated with gels containing CpG alone also showed an increased expression of calreticulin in comparison to untreated tumors (FIGS. 32A and 32B), suggesting CpG-induced amplification of endogenous immunogenic cancer cell death. The cell-surface expression of CD47 was also enhanced in tumors treated with gels containing Dox-iRGD and CpG compared to untreated tumors (FIGS. 33A and 33B), presumably as part of the immune evasion mechanism. Consistent with the upregulated expression of calreticulin and CD47, the concentration of released HMGB1 in the tumor milieu was also significantly increased in mice treated with gels containing Dox-iRGD and CpG in comparison to mice treated with gels containing Dox-iRGD alone or untreated mice (FIG. 32C), further demonstrating the immunogenic death of tumor cells. The number of CD11b$^+$F4/80$^+$ TAMs in the tumor microenvironment was not significantly changed after the gel treatment (FIG. 33C). However, mice treated with gels containing Dox-iRGD and CpG showed a significantly increased number of CD86$^+$ TAMs, known as pro-inflammatory M1-type macrophages, compared to mice treated with gels containing Dox-iRGD alone or untreated mice (FIG. 32D and FIG. 33D). Together, these data suggest that the in situ gel vaccine is able to repolarize TAMs towards the pro-inflammatory M1-phenotype, which has been shown to be positively associated with improved anticancer efficacy and extended survival in both preclinical and clinical settings (Ohri et al., Macrophages within NSCLC tumour islets are predominantly of a cytotoxic M1 phenotype associated with extended survival. *Eur. Respir. J.* 33, 118-126 (2009)).

Gels incorporating Dox-iRGD with or without CpG roughly increased the number of activated (CD86$^+$MHCII$^+$) tumor-infiltrating CD11c$^+$ DCs by 50% (FIG. 32E and FIGS. 34B-34D) as compared to treatment with gels containing CpG alone or untreated tumors, although the total number of DCs remained unchanged (FIG. 34A). Tumor infiltration of CD8$^+$ T cells was also significantly improved in all three treatment groups (FIG. 32F and FIG. 35A), along with a significantly increased CD8$^+$/FoxP3$^+$ regulatory T (Treg) cell ratio (FIG. 32G and FIG. 35B). Tumors treated with gels containing CpG alone showed a slightly increased infiltration of CD8$^+$ T cells as compared to tumors treated with gels containing Dox-iRGD and CpG, but the number of regulatory T cells also increased, resulting in a slightly lower CD8$^+$/Treg ratio (FIG. 32G and FIG. 35B). Finally, as the antitumor efficacy of vaccines can be dampened by upregulation of homeostatic immune checkpoint pathways, expression of classical immunoregulatory and exhaustion markers on tumor infiltrating CD8$^+$ T cells was next analyzed. Approximately 30% of CD8$^+$ T cells in tumors treated with Dox-iRGD and CpG were PD-1-positive, with no significant differences across the different treatment groups (FIG. 36A). TIM3 and LAG3 expression were also found on a subset of intratumoral CD8$^+$ T cells in all groups, and no significant differences between conditions were observed (FIGS. 36B-36D). Interestingly, in contrast, the PD-L1 expression on the surface of tumor cells was significantly upregulated in the treatment groups. Specifically, 13% of tumor cells treated with gels containing Dox-iRGD and CpG were PD-L1-positive, as compared to 3% in untreated tumor cells (FIGS. 37A and 37B). Tumors treated with gels containing CpG alone exhibited a similar PD-L1 expression as tumors treated with gels containing Dox-iRGD and CpG, both were significantly higher than tumors treated with gels containing Dox-iRGD alone (FIGS. 32A and 32B). Together, these data indicate that the in situ vaccine improves the activation of tumor-infiltrating DCs and tumoral infiltration of CD8$^+$ T cells, increases CD8$^+$/Treg number ratios, and upregulates PD-L1 expression of tumor cells.

2.7 Improvement of the Antitumor Efficacy of the Gel Vaccines Via Combination with Anti-PD-1 Checkpoint Blockade Therapy Considering the upregulated PD-L1 expression of tumor cells after treatment with the in situ gel vaccine and intrinsically high PD-1 expression of tumor-infiltrating CD8$^+$ T cells, it was next studied whether the antitumor efficacy of the gel vaccines could be further improved via combination with anti-PD-1 checkpoint blockade therapy (FIG. 37C). The gel vaccine group again significantly slowed growth of 4T1 tumors compared to the untreated group (FIG. 37D and FIG. 38A). Anti-PD-1 alone did not demonstrate an antitumor effect until day 21, when a slightly decreased tumor growth rate was observed (FIG. 37D and FIG. 38A). Mice treated with the combination of gel vaccine and anti-PD-1 showed significantly reduced tumor size compared to mice treated with the gel vaccine alone or anti-PD-1 alone (FIG. 37D and FIG. 38A). The median survival of mice treated with anti-PD-1 alone was 28 days, similar to that of untreated mice (27 days) (FIG. 37E and FIG. 38B). Mice treated with the combination of gel vaccine and anti-PD-1 or the gel vaccine alone showed significantly longer survival than untreated mice or mice treated with anti-PD-1 alone, with a median survival of 40 and 37.5 days, respectively (FIG. 37E and FIG. 38B). Strikingly, mice treated with both gel vaccine and anti-PD-1 developed significantly fewer pulmonary tumor nodules, in comparison to mice treated with anti-PD-1 alone or untreated mice (FIG. 37F). Mice treated with anti-PD-1 alone also had fewer pulmonary tumor nodules than untreated mice, despite the absence of survival improvement (FIG. 37F). Collectively, these experiments demonstrate the synergy of combination therapy between the in situ gel vaccine and anti-PD-1 in controlling the development of lung metastases and the growth of primary 4T1 tumors.

2.8 Prevention of Cancer Recurrence after Primary Tumor Resection

To explore a more clinically relevant situation, it was next studied whether the in situ gel vaccine could prevent cancer recurrence after primary tumor resection. Upon surgical removal of luciferase-expressing 4T1 tumors, a gel vaccine or bolus vaccine (containing all active components of vaccine in PBS without the gel carrier) was injected near the original tumor area (FIG. 39A). Subsequent bioluminescence imaging revealed an increasing tumor signal over time and a high rate of tumor recurrence in the untreated group (FIG. 39B). Both treated groups had significantly lower tumor recurrence, as evidenced by lower bioluminescence signal and improved tumor-free and overall survival (FIGS. 39B-39D). However, in comparison to the bolus vaccine, the gel vaccine resulted in significantly slower tumor growth and improved survival (FIGS. 39B-39D), confirming the importance of a biomaterial scaffold for therapeutic effect. To test for persistent immunological memory, mice were re-challenged with i.v. injected luciferase-expressing 4T1 cancer cells (FIG. 39E). Bioluminescence imaging of control mice without gel vaccine treatment confirmed the occurrence and proliferation of 4T1 metastases in the lung parenchyma (FIGS. 39F and 39G). Strikingly, mice previously treated with the gel vaccine showed 100% metastasis-free survival, in contrast to 0% in the untreated group (FIGS. 39F-39H and FIG. 40), demonstrating the potency and persistence of antitumor immune responses generated by the in situ gel vaccine. While the ability of Dox-iRGD to penetrate established tumors is likely not relevant in this setting, its sustained, local release and ability to kill residual tumor cells, coupled with in situ concentrated DCs, is likely responsible for the observed antitumor immune responses, as observed in the primary tumor model.

2.9 Summary

While 4T1 tumor growth and metastasis rates varied between experiments in this study, the in situ gel vaccine consistently showed significant therapeutic benefit. It is noteworthy that 4T1 TNBC is a notoriously aggressive tumor model with a high metastasis rate, and has proven refractory to various therapies (Sengupta et al., Cholesterol-tethered platinum II-based supramolecular nanoparticle increases antitumor efficacy and reduces nephrotoxicity. *Proc. Natl. Acad. Sci.* 109, 11294-11299 (2012); Schrand et al., Radiation-induced enhancement of antitumor T-cell immunity by VEGF-targeted 4-1BB costimulation. *Cancer Res.* 77, 1310-1321 (2017); Sagiv-Barfi et al.m Therapeutic antitumor immunity by checkpoint blockade is enhanced by ibrutinib, an inhibitor of both BTK and ITK. *Proc. Natl. Acad. Sci.* 112, E966-E972, (2015)). Compared to the chemo- and radiotherapies reported thus far for treating the poorly-immunogenic 4T1 tumor model (Sengupta et al., supar; Schrand et al., supra), the in situ gel vaccine involves one single injection, results in better or comparable efficacy, and reduces systemic toxicity. This single-dose gel vaccine also outperforms the vast majority of previously reported immunotherapies in treating 4T1 tumors, including checkpoint blockade therapies, DC vaccines, and immunostimulatory agents (Schrand et al., supra; Sagiv-Barfi, I. et al., Therapeutic antitumor immunity by checkpoint blockade is enhanced by ibrutinib, an inhibitor of both BTK and ITK, *Proc. Natl. Acad. Sci.* 112, E966-E972, (2015)) presumably because of its superior capability to reshape the tumor microenvironment and concentrate DCs to prime potent antitumor T cell responses. While combination therapies involving chemotherapeutics and locally administered immunomodulatory agents have previously been explored in this model (Murad et al., CPG-7909 (PF-3512676, Pro-Mune®): Toll-like receptor-9 agonist in cancer therapy. *Expert Opin. Biol. Ther.* 7, 1257-1266 (2007); Smyth et al., Combination cancer immunotherapies tailored to the tumour microenvironment. *Nat. Rev. Clin. Oncol.* 13, 143 (2016)), the immune subsets targeted and mechanism of immunomodulation at times remain unclear. In contrast, the system disclosed herein allows for controlled release of rationally designed components with specific functions in a biomaterial niche for massive recruitment and programming of DCs in situ. Current clinical treatment of breast cancers typically includes surgery to debulk the tumor, followed by other additional therapies to provide long-term prevention of recurrence/metastasis. In this setting, the in situ gel vaccine also demonstrated significant potential in the 4T1 TNBC model. Further improvements may be achieved in the future via exploiting additional synergy among immunotherapies, chemotherapy, and radiation therapy (Bouquet et al., TGFβ1 inhibition increases the radiosensitivity of breast cancer cells in vitro and promotes tumor control by radiation in vivo. *Clin. Cancer Res.* 17, 6754-6765 (2011); Janát-Amsbury et aim Combination of local, nonviral IL12 gene therapy and systemic paclitaxel treatment in a metastatic breast cancer model. *Mol. Ther.* 9, 829-836 (2004)).

To conclude, it was described herein a general strategy for in situ, antigen-free cancer vaccination that exploits both the immunogenic death of tumor cells and DC recruitment by biomaterial scaffolds. The strategy controls 4T1 tumor growth and reduces metastases with minimal systemic toxicity, potentially providing a potent therapeutic option for TNBCs. Checkpoint blockade therapies alone are not effective in the treatment of a variety of cancers including TNBCs, but the antitumor efficacy can be improved via combination with the in situ gel vaccine. The facile fabrication of the gel vaccine, which involves simple mixing of an alginate solution, pre-formed porogen beads, chemokines, drugs, adjuvants, and calcium ions over several minutes, is amenable to clinical translation. Components of the in situ gel vaccine used in this study, such as Dox-iRGD and CpG, can be readily replaced with other chemotherapeutic and immunotherapeutic drugs and adjuvants. This in situ gel vaccine can also be readily applied to various other types of cancers, and is likely to be especially relevant to cancers with limited availability of identified TAAs and neoantigens. This approach has the ability to develop robust, personalized in situ cancer vaccines without requiring identification of TAAs and personalized manufacturing.

The invention claimed is:

1. A vaccine composition for treating a hematological malignancy, comprising:
   a porous scaffold,
   a cell recruitment composition, wherein the cell recruitment composition comprises a GM-CSF;
   an adjuvant, wherein the adjuvant comprises a CpG-ODN;
   a chemotherapeutic agent; and
   a cancer antigen, wherein the cancer antigen is one or both of a WT-1 peptide or an acute myeloid leukemia cancer cell lysate, and wherein the WT-1 peptide is not from a cancer cell lysate.

2. The vaccine composition of claim 1, wherein the cancer antigen is a WT-1 peptide.

3. The vaccine composition of claim 2, wherein the cancer antigen is both of a WT-1 peptide and an acute myeloid leukemia (AML) cancer cell lysate.

4. The vaccine composition of claim 1, wherein the chemotherapeutic agent comprises a cytarabine, anthracycline, oxaliplatin, bortezomib, doxorubicin, daunorubicin, epirubicin, idarubicin, valrubicin or doxorubicin-iRGD.

5. The vaccine composition of claim 1, wherein the chemotherapeutic agent comprises a derivative or analog of cytarabine, anthracycline, oxaliplatin, bortezomib, doxorubicin, daunorubicin, epirubicin, idarubicin, valrubicin or doxorubicin-iRGD.

6. The vaccine composition of claim 1, wherein the composition recruits immune cells to treat a subject suffering from a hematological malignancy.

7. The vaccine composition of claim 6, wherein the immune cells comprise dendritic cells (DCs).

8. The vaccine composition of claim 6, wherein the hematological malignancy comprises Hodgkin's disease, non-Hodgkin's lymphoma, Burkitt's lymphoma, anaplastic large cell lymphoma, splenic marginal zone lymphoma, hepatospelenic T-cell lymphoma, angioimmunoblastic T-cell lymphoma, multiple myeloma, Waldenstrom macro globulinemia, plasmacytoma, acute lymphocytic leukemia (ALL), chronic lyphcytic leukemia (CLL), acute myeloid leukemia (AML), acute megakaryoblastic leukemia (AMKL), chronic idiopthic myelofibrosis (MF), chronic myelogenous leukemia (CML), T-cell prolymphocytic leukemia (T-PLL), B-cell prolymphocytic leukemia (B-PLL), chronic neutrophilic leukemia (CNL), hairy cell leukemia (HCL), T-cell large granular lymphocyte leukemia (T-LGL), and aggressive NK-cell leukemia.

9. The vaccine composition of claim 1, wherein the CpG-ODN is a Type A, Type B or Type C CpG-ODN.

10. The vaccine composition of claim 1, wherein the CpG-ODN is one or more of ODN 1585, ODN 1668, ODN 1826, ODN 2006, ODN 2006-G5, ODN 2216, ODN 2336, ODN 2395 or ODN M362.

11. The vaccine composition of claim 1, wherein the porous scaffold has a pore size of less than 10 nm.

12. A method of treating an acute myeloid leukemia (AML) in a subject, comprising administering to the subject a vaccine composition, wherein the vaccine composition comprises
   a porous scaffold;
   a cell recruitment composition, wherein the cell recruitment composition comprises a GM-CSF;
   an adjuvant, wherein the adjuvant comprises a CpG-ODN; and a chemotherapeutic agent,
thereby treating the AML.

13. The method of claim 12, further comprising administering to the subject a cancer antigen.

14. The method of claim 12, wherein the chemotherapeutic agent comprises a cytarabine, oxiplatin, bortezomib, anthracycline and a derivative or analog thereof.

15. The method of claim 12, wherein the chemotherapeutic agent is selected from the group consisting of doxorubicin, doxorubicin-IRGD, daunorubicin, epirubicin, idarubicin, valrubicin, mitoxantrone and derivative or analog thereof.

16. A method of preventing or treating an acute myeloid leukemia (AML) in a subject, comprising administering to the subject a vaccine composition, wherein the vaccine composition comprises
a scaffold;
a cell recruitment composition, wherein the cell recruitment composition comprises a GM-CSF;
an adjuvant, wherein the adjuvant comprises a CpG-ODN;
a chemotherapeutic agent; and
a cancer antigen, wherein the cancer antigen is one or both of a WT-1 peptide or an acute myeloid leukemia cancer cell lysate,
thereby preventing or treating the AML.

17. The method of claim 16, wherein the chemotherapeutic agent comprises a cytarabine, anthracycline, oxaliplatin, bortezomib, doxorubicin, daunorubicin, epirubicin, idarubicin, valrubicin or doxorubicin-iRGD.

18. The method of claim 16, wherein the chemotherapeutic agent comprises a derivative or analog of cytarabine, anthracycline, oxaliplatin, bortezomib, doxorubicin, daunorubicin, epirubicin, idarubicin, valrubicin or doxorubicin-iRGD.

19. A method of treating a hematological malignancy in a subject, comprising administering to the subject the vaccine composition of claim 1, thereby treating the cancer.

20. The method of claim 19, wherein the subject was administered a chemotherapeutic agent prior to the administration of the vaccine composition.

* * * * *